United States Patent [19]

Drever et al.

[11] Patent Number: 4,758,703
[45] Date of Patent: Jul. 19, 1988

[54] SYSTEM AND METHOD FOR ENCODING OBJECTS

[75] Inventors: Donald C. Drever, Weston, Conn.; Larry Nordstrom, Oviedo, Fla.; Shiv C. Dass, Albuquerque, N. Mex.

[73] Assignee: Estee Lauder Inc., New York, N.Y.

[21] Appl. No.: 46,625

[22] Filed: May 6, 1987

[51] Int. Cl.⁴ .............................................. B23K 26/00
[52] U.S. Cl. .......................... 219/121.68; 219/121.62; 219/121.69; 219/121.83; 346/76 L
[58] Field of Search ................. 219/121 LJ, 121 LH, 219/121 LA, 121 LB, 121 LU, 121 LZ; 346/76 L

[56] References Cited

U.S. PATENT DOCUMENTS

| | | | |
|---|---|---|---|
| 2,905,068 | 9/1959 | Friedman | 95/4.5 |
| 3,054,203 | 9/1962 | French | 40/28 |
| 3,085,158 | 4/1963 | Miller | 250/203 |
| 3,146,367 | 8/1964 | McNaney | 313/86 |
| 3,154,370 | 10/1964 | Johnson | 346/108 |
| 3,195,405 | 7/1965 | Clark et al. | 88/61 |
| 3,314,073 | 4/1967 | Becker | 346/76 |
| 3,365,714 | 1/1968 | Timares et al. | 340/347 |
| 3,399,475 | 9/1968 | Rinder | 40/28 |
| 3,448,458 | 6/1969 | Carlson et al. | 346/17 |
| 3,465,352 | 9/1969 | Carlson et al. | 346/76 |
| 3,570,380 | 3/1971 | Kamenstein | 95/4.5 |
| 3,588,439 | 6/1971 | Heller et al. | 219/121 |
| 3,656,175 | 4/1972 | Carlson et al. | 346/76 L |
| 3,677,465 | 7/1972 | Johnson et al. | 235/61.7 R |
| 3,832,547 | 8/1974 | Silverman | 250/319 |
| 3,898,417 | 8/1975 | Atkinson | 219/121 LJ X |
| 4,024,545 | 5/1977 | Dowling et al. | 346/76 L |
| 4,156,124 | 5/1979 | Macken et al. | 219/121 LU X |
| 4,194,814 | 3/1980 | Fischer et al. | 351/160 R |
| 4,202,602 | 5/1980 | Torres | 350/272 |
| 4,304,981 | 12/1981 | Gappa | 219/121 LJ X |
| 4,307,282 | 12/1981 | Gappa | 219/121 LJ |
| 4,323,317 | 4/1982 | Hasegawa | 400/118 |
| 4,360,728 | 11/1982 | Drexler | 235/462 |
| 4,370,542 | 1/1983 | Mills et al. | 219/121 LJ X |
| 4,675,498 | 6/1987 | Lemelson | 219/121 LB |

*Primary Examiner*—C. L. Albritton
*Attorney, Agent, or Firm*—Richard M. Barnes; Jeffrey H. Ingerman

[57] ABSTRACT

A system and method for encoding objects with a microscopically visible code are provided. A laser beam is passed through a mask to impose a pattern representative of the code on the beam. The power level of the beam is adjusted in accordance with the output of a reflectivity sensor which measures the object, so that the beam intensity is sufficient to produce a microscopically visible pattern, but insufficient to produce a visible pattern.

16 Claims, 27 Drawing Sheets

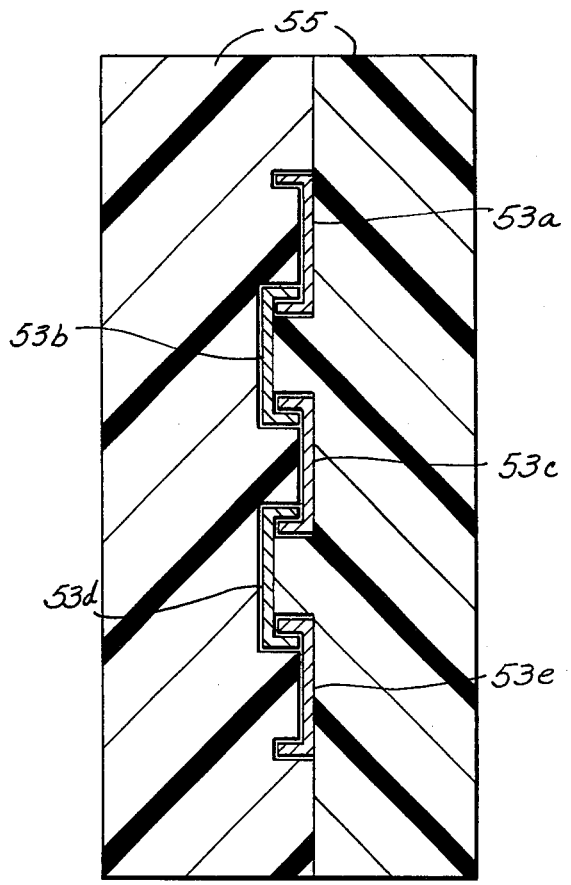
F I G. 6

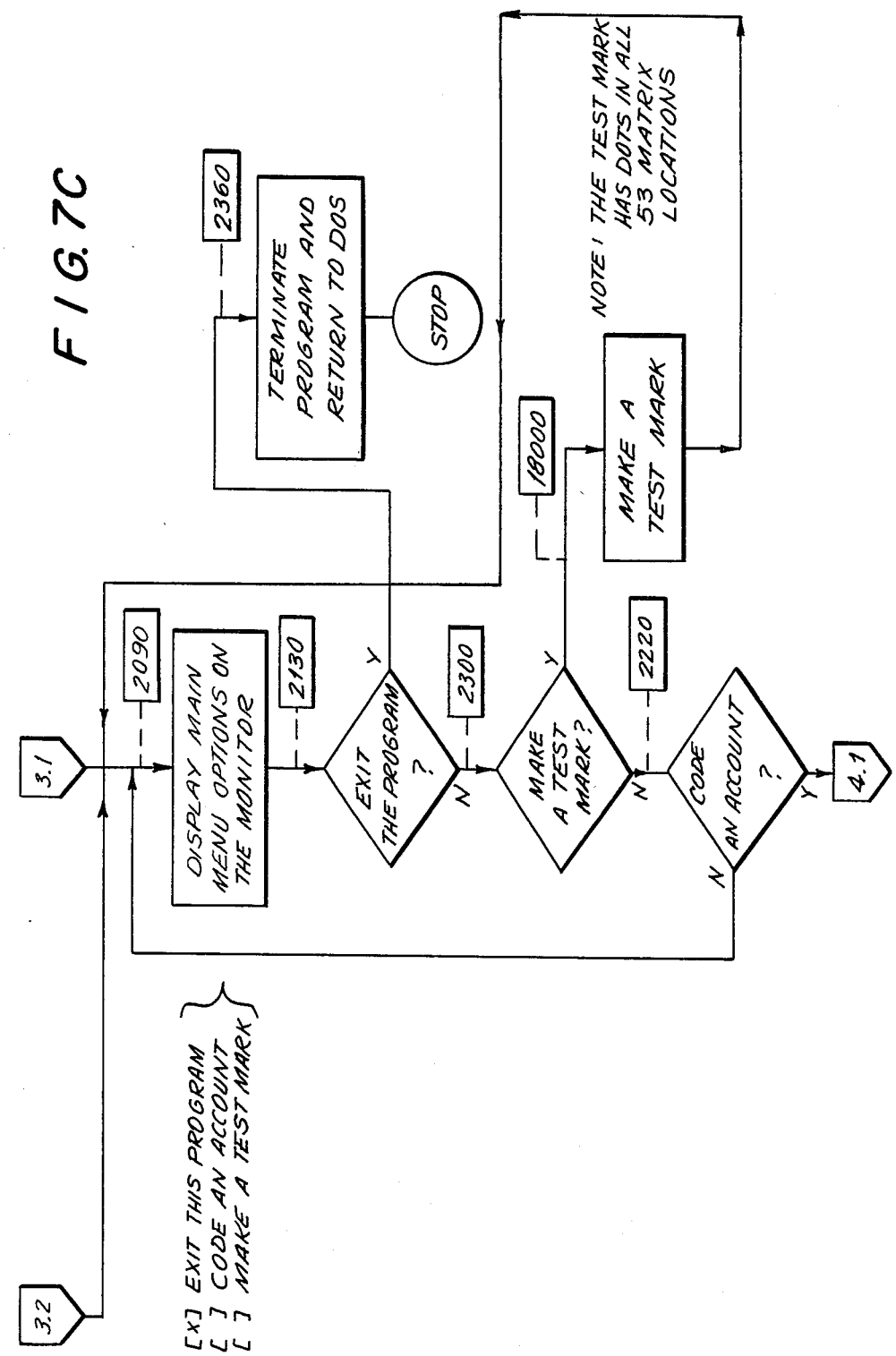

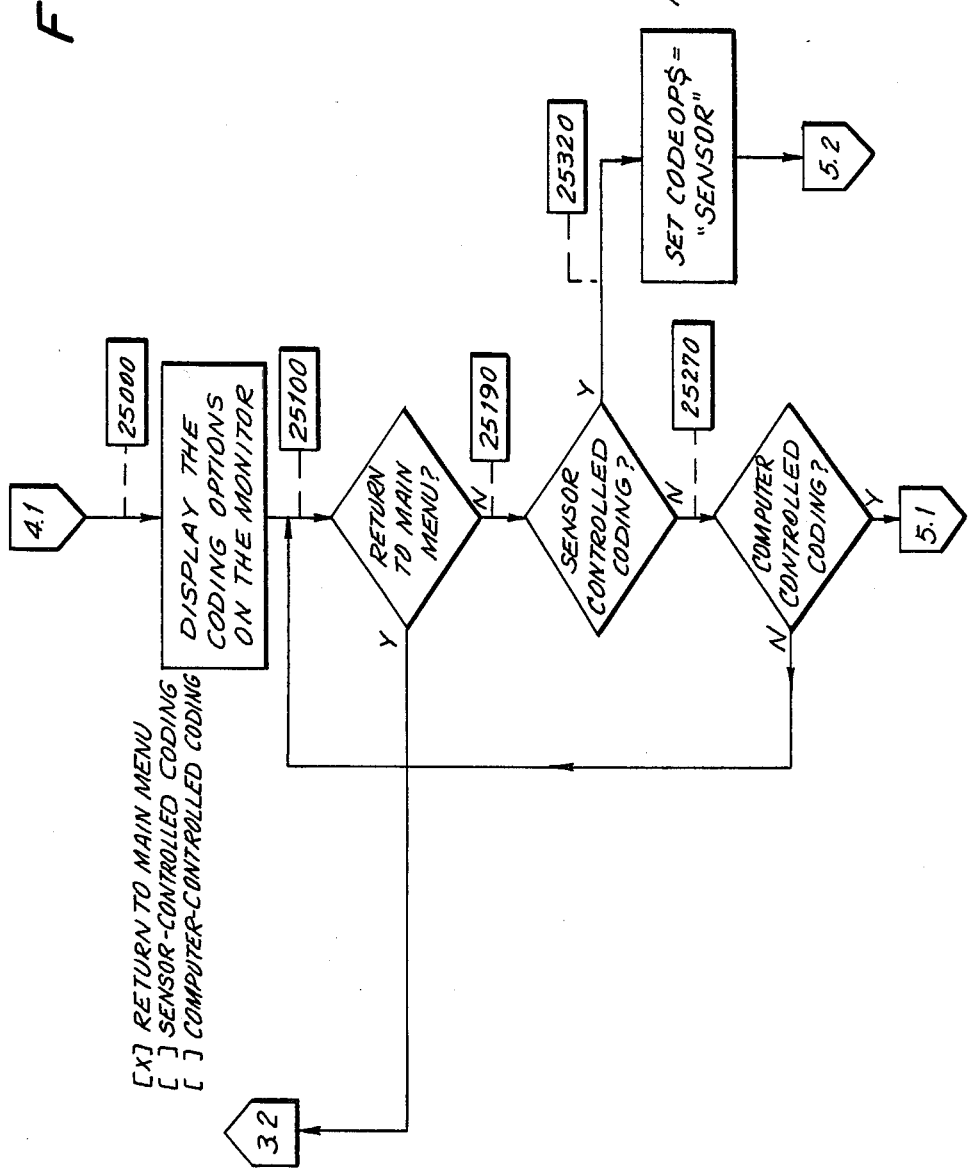

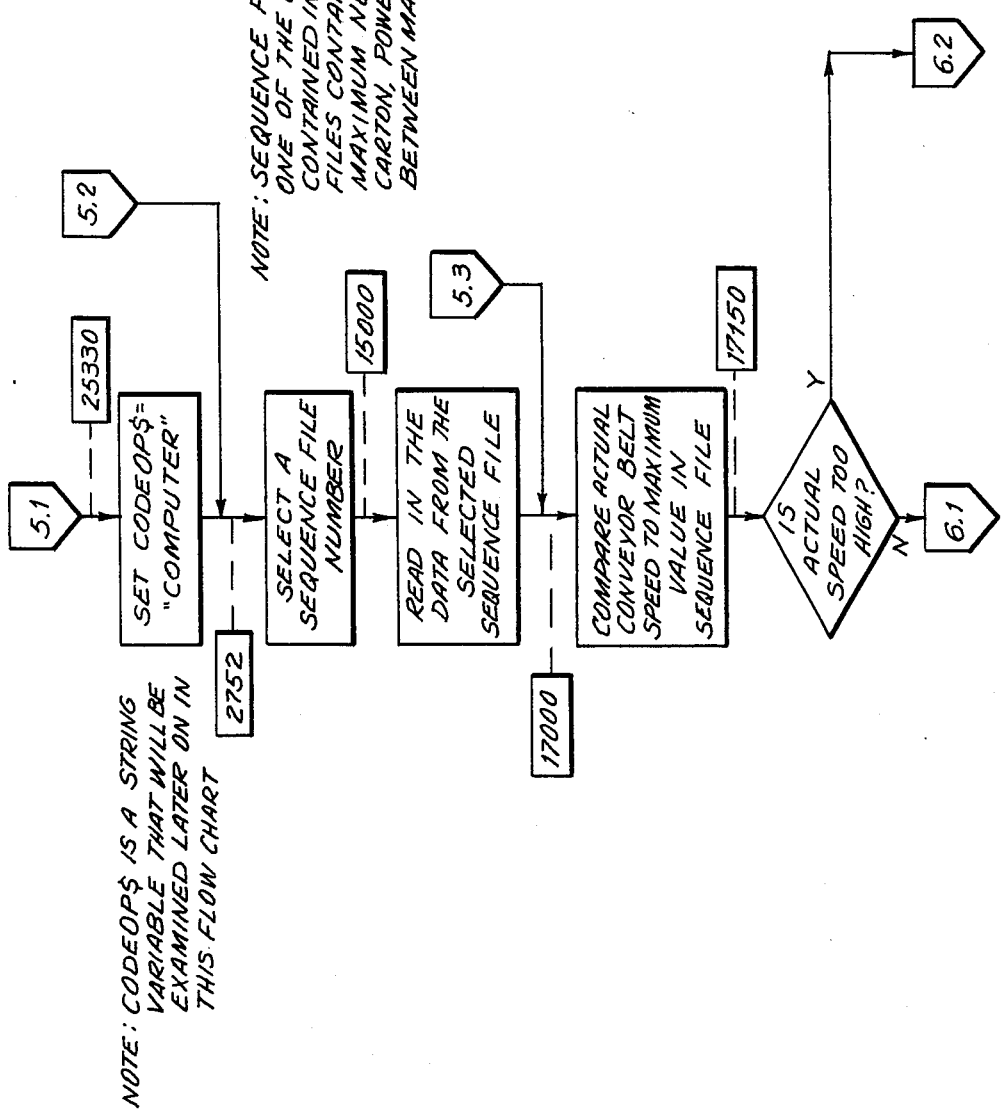

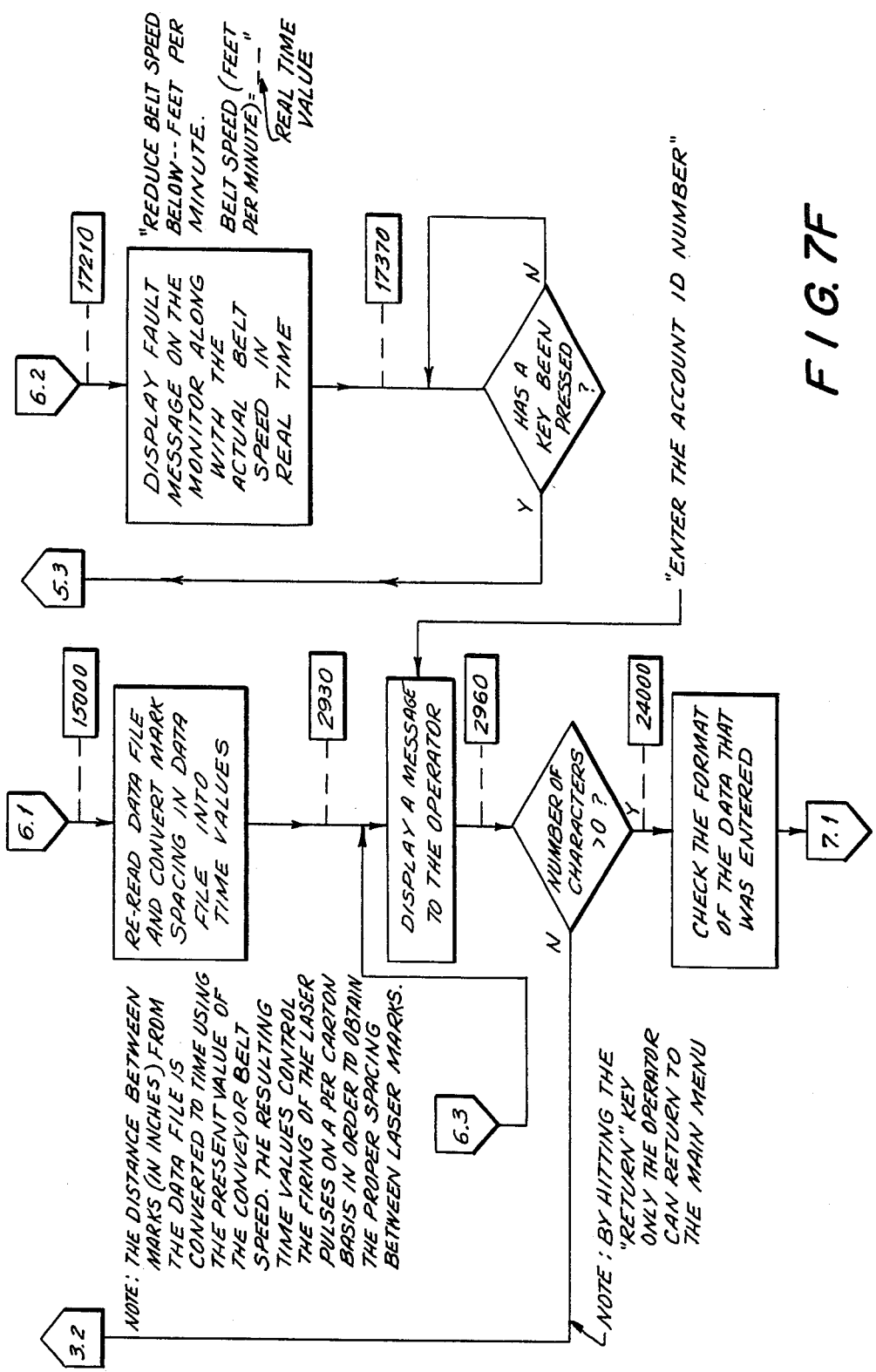

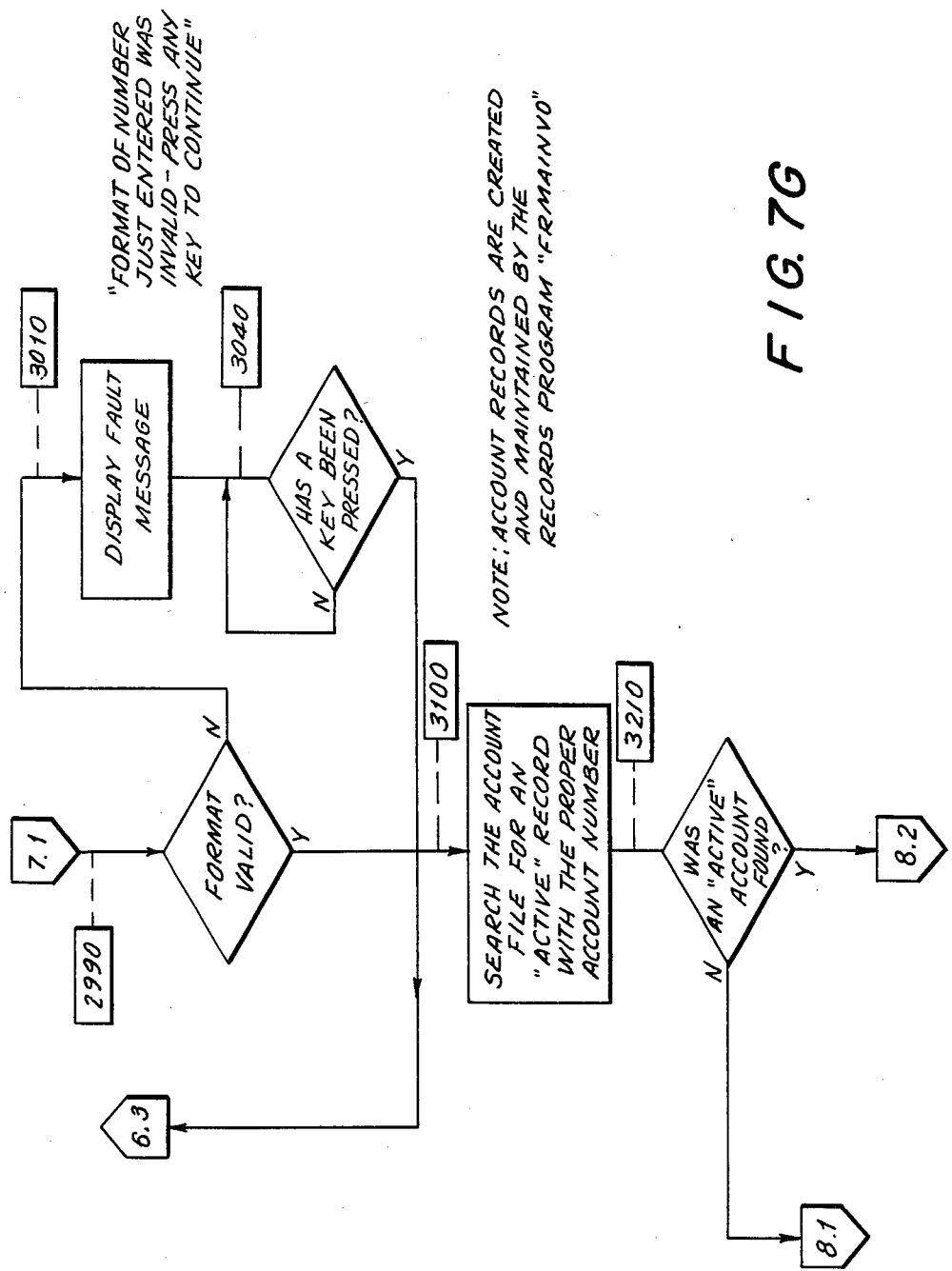

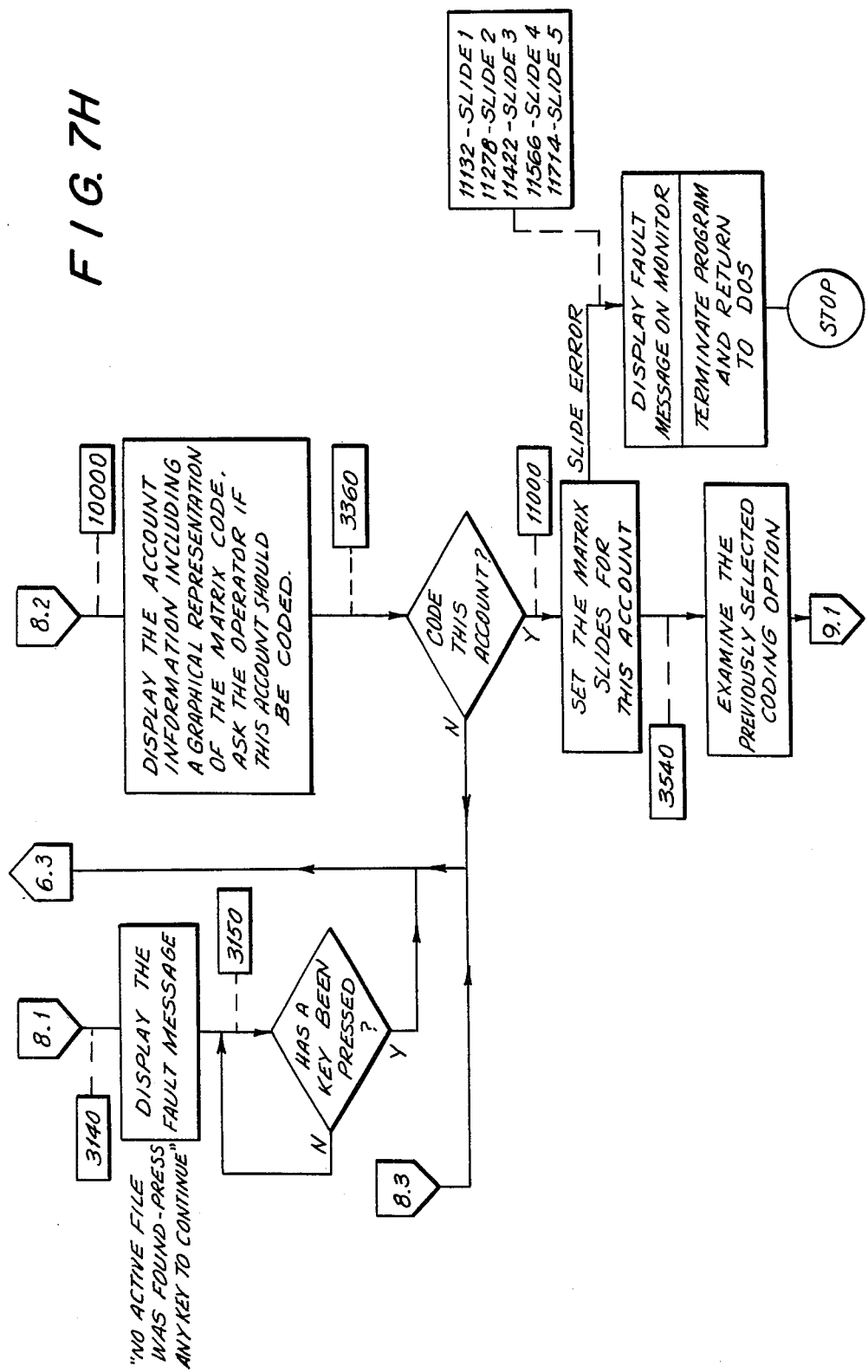

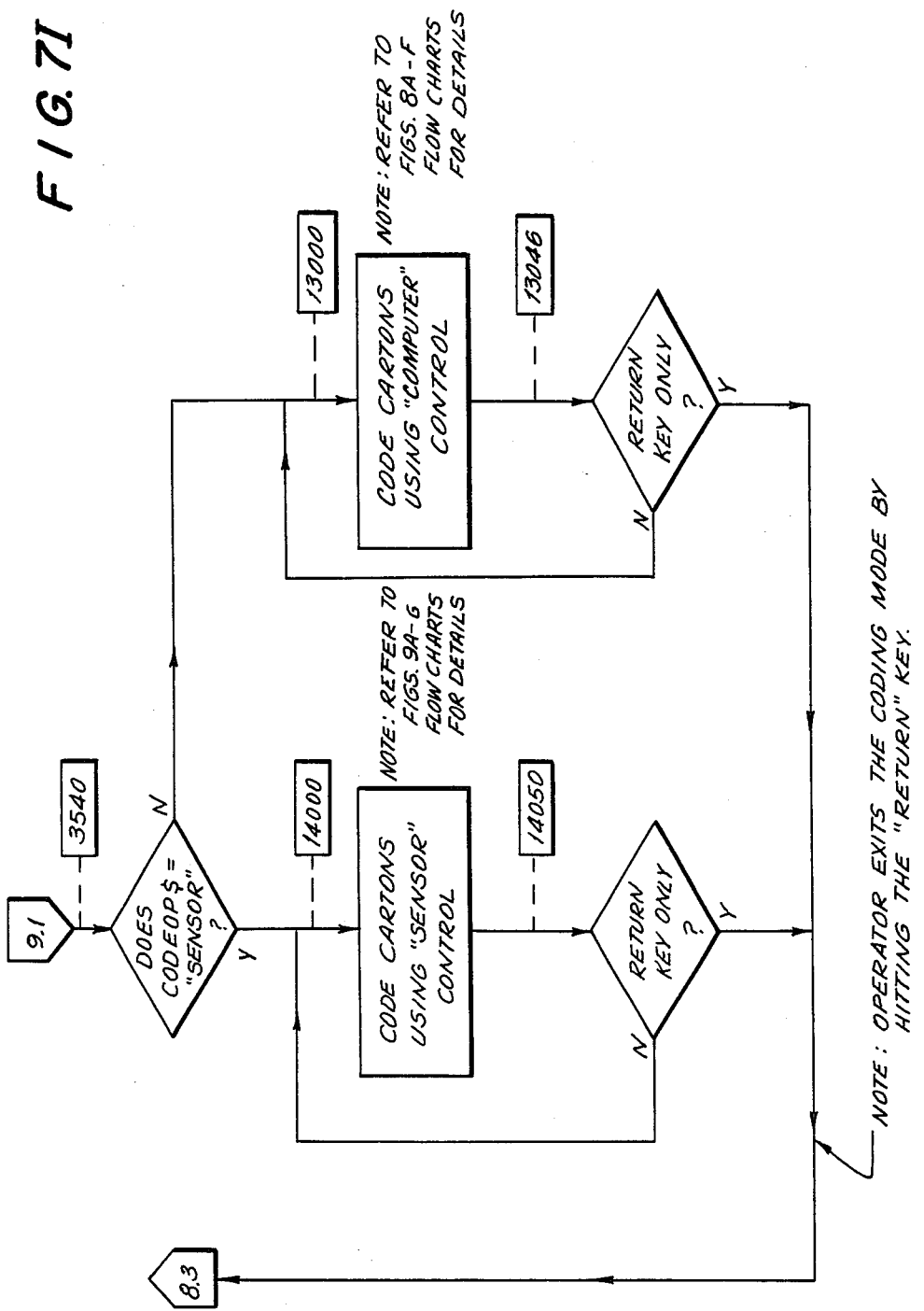

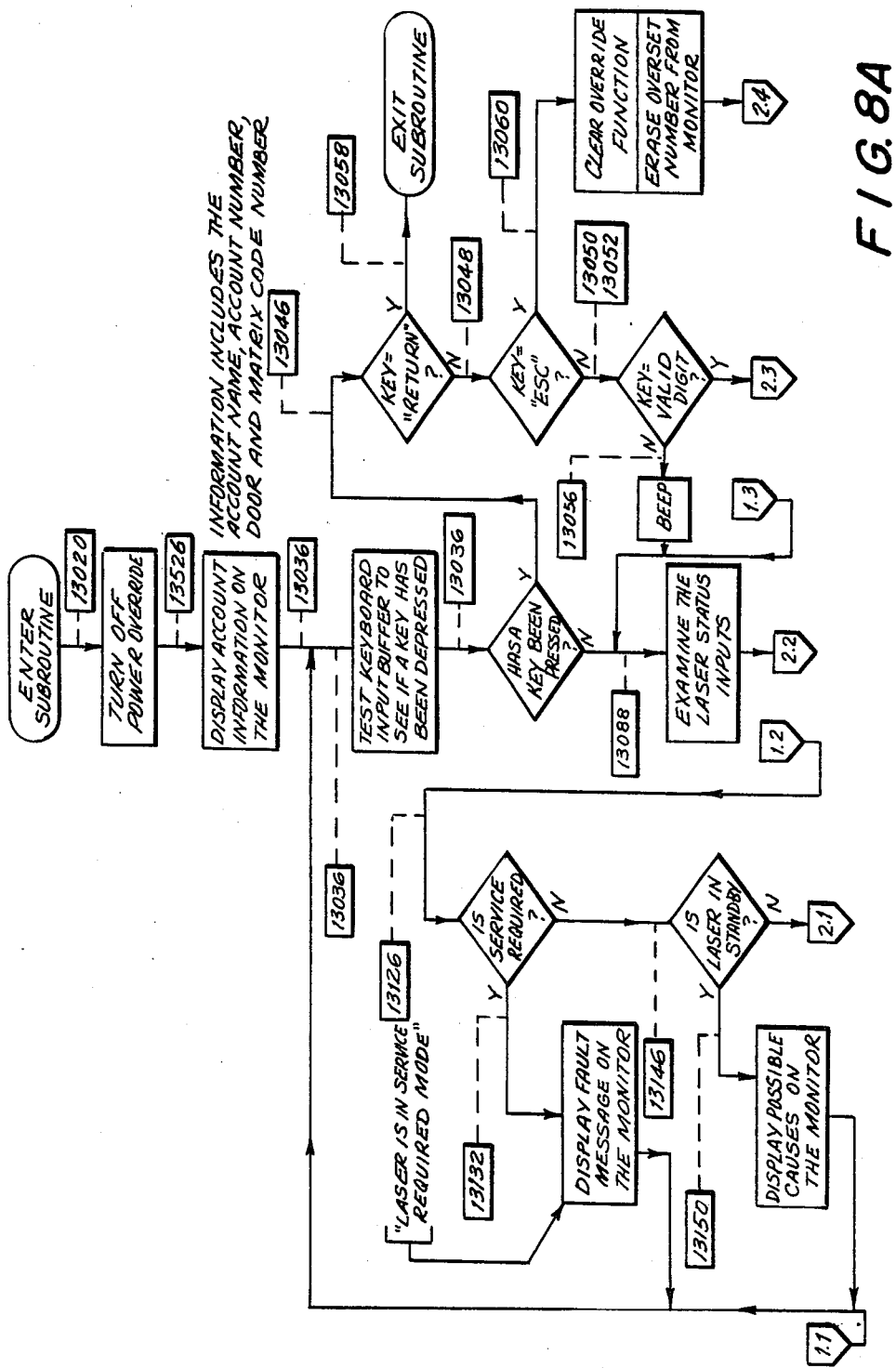

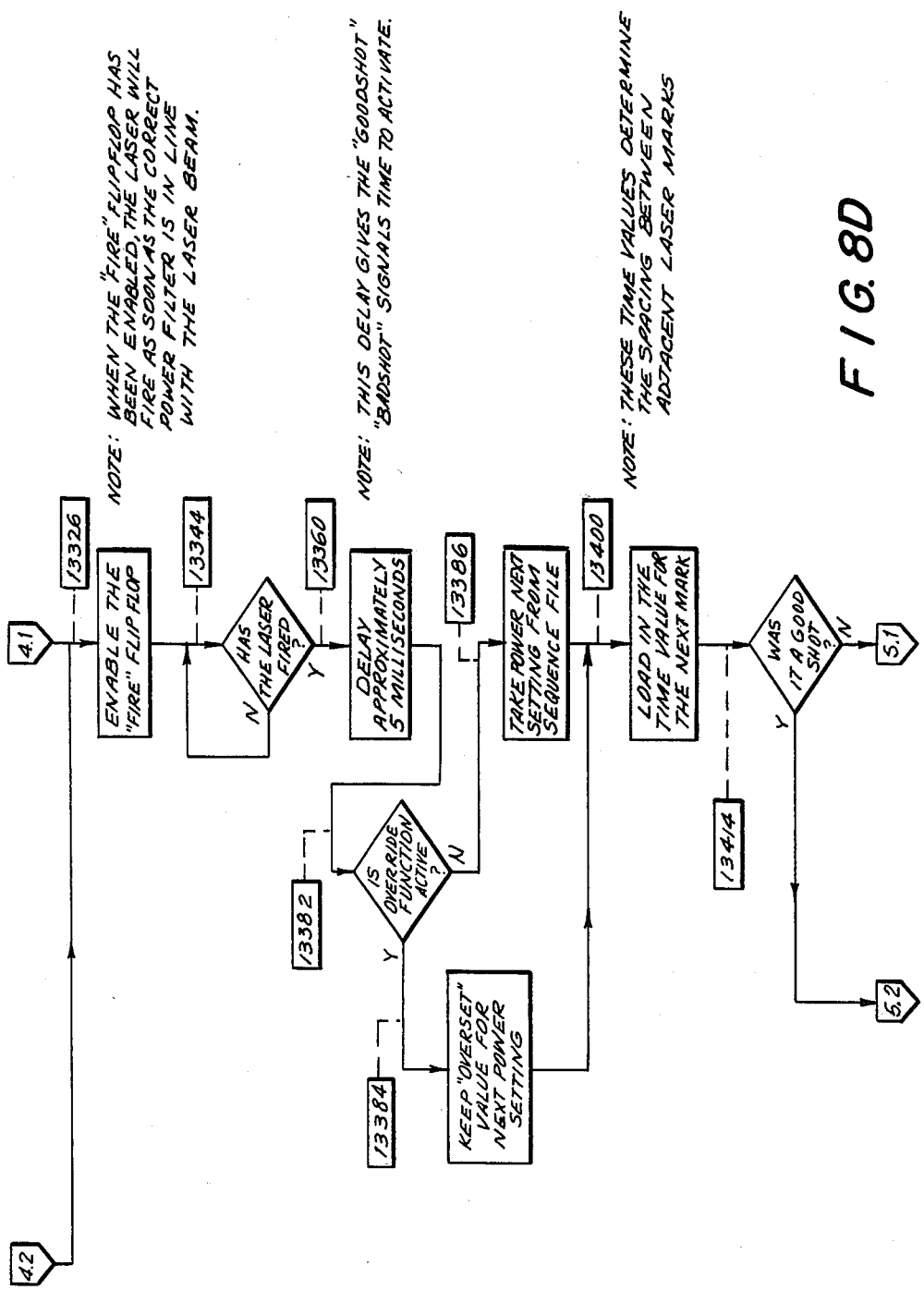

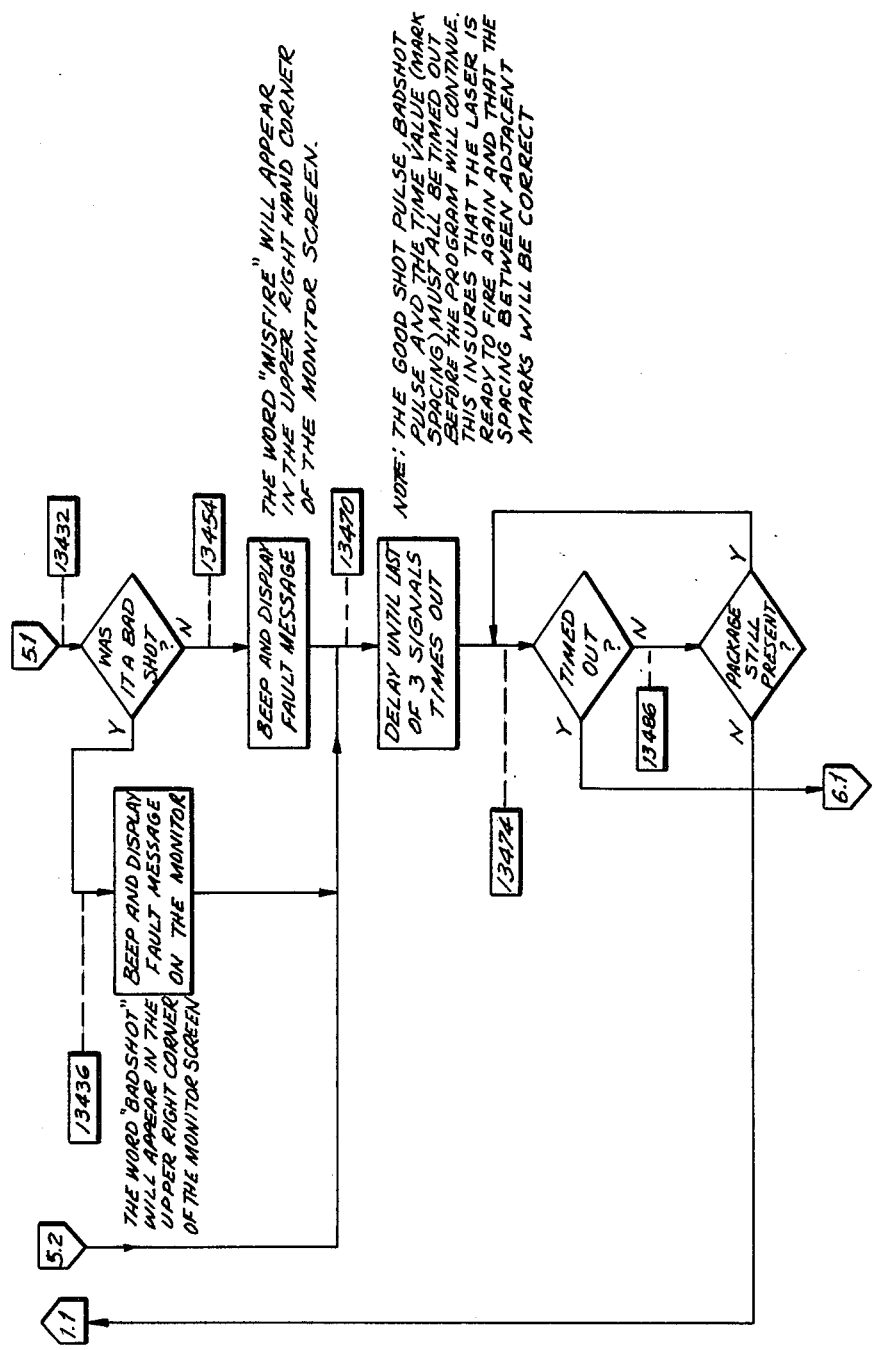

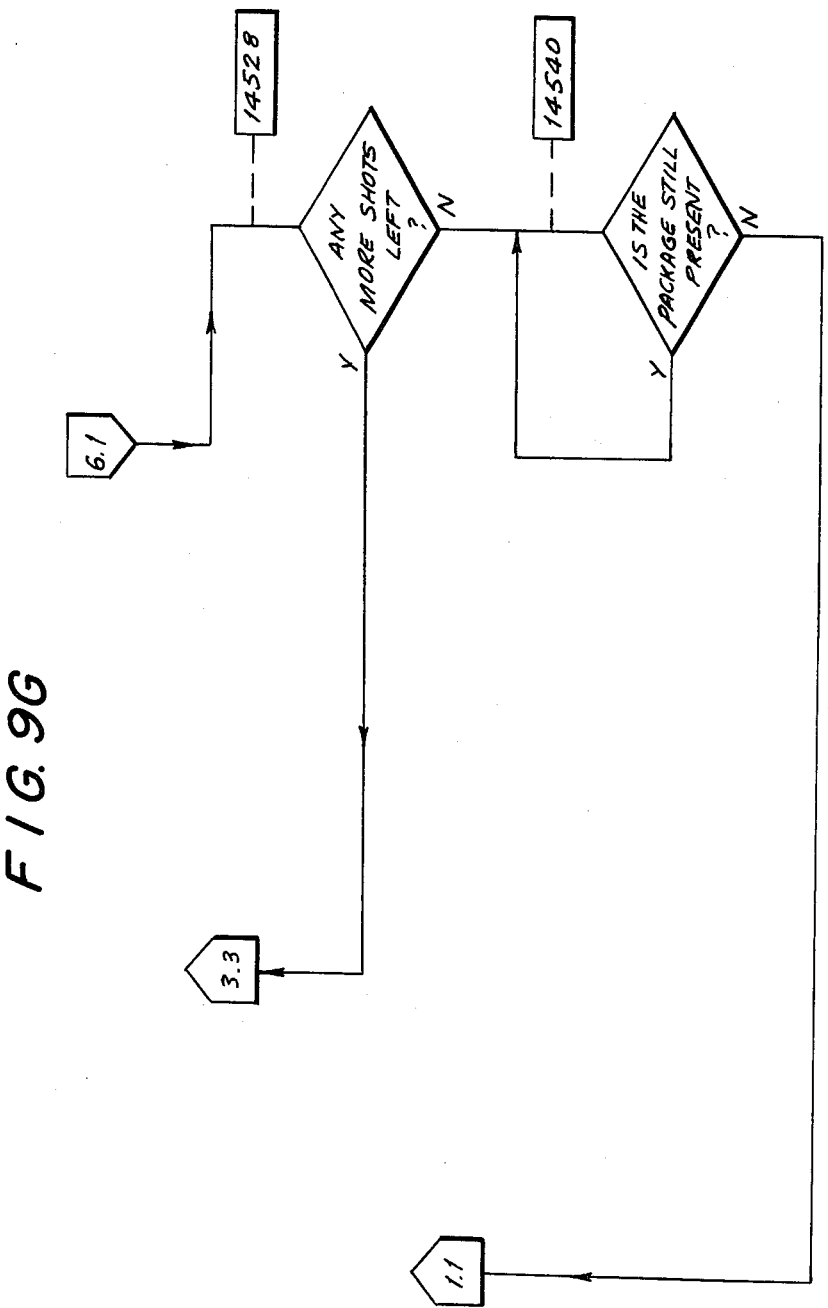

SYSTEM AND METHOD FOR ENCODING OBJECTS

BACKGROUND OF THE INVENTION

This invention relates to a system and method for encoding objects. More particularly, this invention relates to a system and method for using a laser to place a microscopically visible code on an object.

For various reasons, it may be desirable to place a code on an object, such as an identification code, that can be read only under magnification. Such a code might be useful, for example, in identifying such articles if they are stolen.

Another use of such a code is in certain retail industries, such as the limited distribution cosmetic and fragrance industry. In such industries, distribution of products is limited to certain authorized retailers. However, it is known that some authorized dealers "divert" a portion of their stock to unauthorized dealers. Manufacturers therefore code each product package so that if it is diverted, the manufacturer can determine the identity of the authorized dealer who was the intended recipient of the package when it was shipped by the manufacturer. The manufacturer can then stop doing business with that dealer, or take other action against him. Unfortunately, the diverters have learned many of the coding systems and have devised means to defeat or attempt to defeat them.

In one system, for example, a pattern of fine pinholes is punched into the cardboard carton containing the product. The placement of the pinholes represents a numerical code identifying the dealer for whom the product was intended. The pinhole pattern is relatively easy to find, particularly because mechanical and aesthetic considerations usually limit its placement to the bottom of the carton. Diverters have learned to defeat the pin coding system by cutting out the coded portion of the package and placing an adhesive label over the damaged area or by adding additional pinholes to the pattern. They can also discard the carton and sell the product without it, or they can substitute a new carton for the coded carton.

It therefore would be desirable to be able to encode objects in a way that the code is difficult to detect, to increase the difficulty of finding and altering or obliterating the code.

It also would be desirable to to able to place the same code in multiple and random locations on an object to further decrease the possibility that all codes will be detected.

SUMMARY OF THE INVENTION

It is an object of this invention to encode objects in such a way that the code is difficult to detect, to increase the difficulty of finding and altering or obliterating the code.

It also is an object of this invention to place the same code in multiple and random locations on an object to further decrease the possibility that all codes will be detected.

These objects are accomplished by the system of the invention for placing a microscopically visible pattern of an object. The system includes means for generating a beam of coherent electromagnetic radiation of a desired wavelength, the beam having an intensity and a cross-sectional area. The system also includes means for adjusting the beam intensity, mask means for imposing the desired pattern on the beam, means for transporting the object past the beam generating means, and means for measuring the reflectivity of the object. Additional means, responsive to the reflectivity measurement, cause the adjusting means to adjust the beam intensity such that the beam intensity is insufficient to produce on the object a pattern that is visible to an unaided eye, but is sufficient to produce on the object a pattern that is visible with the aid of an optical magnifying device.

A method according the invention for placing the pattern on an object includes the steps of generating a beam of coherent electromagnetic radiation of a desired wavelength, the beam having an intensity and cross-sectional area, imposing the desired pattern on the beam, transporting the object past the generating means, measuring the reflectivity of the object, and adjusting the beam intensity in response to the reflectivity measurement such that the beam intensity is insufficient to produce on the object a pattern visible to an unaided eye, but sufficient to produce on the object a pattern that is visible with the aid of an optical magnifying device.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 1A shows a sample code in the coding matrix of FIG. 1;

FIG. 1B shows the dot pattern of FIG. 1A without the grid lines of the coding matrix;

FIG. 6 is a cross-sectional view of the mask of FIG. 5, taken from line 6—6 of FIG. 5;

FIGS. 7A–I are a flowchart of a first software program used with the invention;

FIGS. 8A–F are a flowchart of a second software program used with the invention; and FIGS. 9A–G are a flowchart of a third software program used with the invention.

DETAILED DESCRIPTION OF THE INVENTION

The present invention uses a beam of coherent electromagnetic radiation, such as the beam from a carbon dioxide laser, to code objects, such as cosmetic and fragrance product packages, with a pattern of dots. The pattern of dots is similar to that applied by a mechanical pin coder. However, because of the ability of the laser beam to be finely focused, the pattern can be made quite small. In addition, the intensity of the laser beam can be controlled so that the code is barely etched onto the surface of the package, making it difficult to detect without special microscopes. Further, by pulsing the laser several times while the package is being moved through its field, several identical codes can be placed on the package, further reducing the likelihood that the coding will be defeated by increasing the number of codes a diverter must find.

Figure 1:
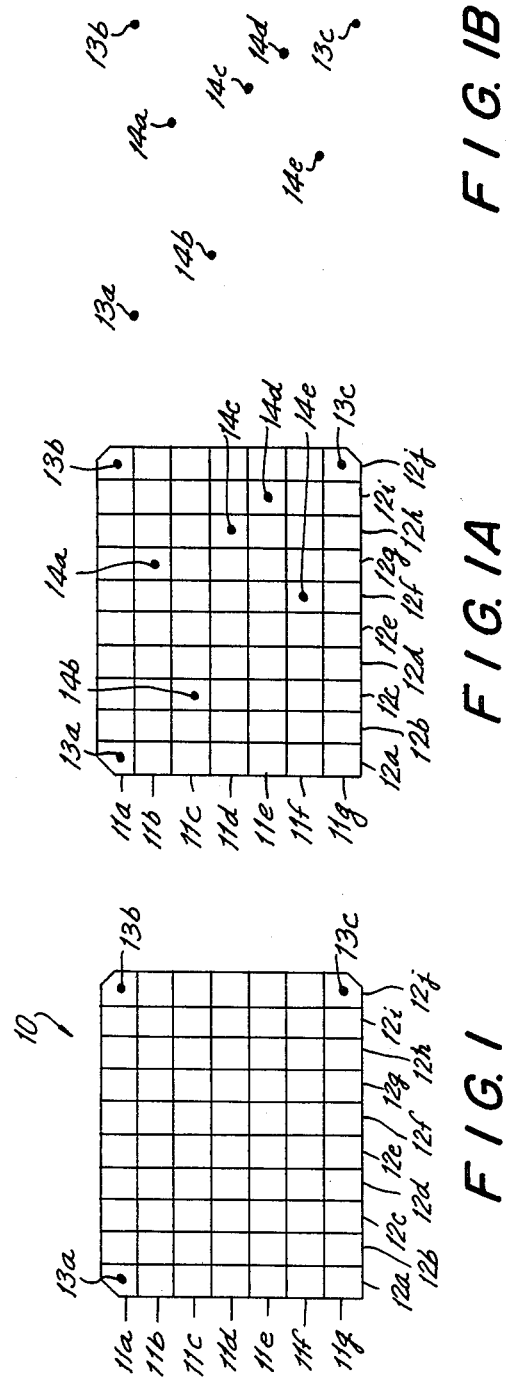
FIG. 1 shows the coding matrix used in the preferred embodiment of the invention.

The coding matrix 10 used in the preferred embodiment of the present invention is shown in FIG. 1. Coding matrix 10 consists of seven rows 11a-g of ten columns 12a-j each. The entire grid, as applied to a package, preferably occupies an area of 0.2 inch by 0.16 inch. The three dots 13a-c are used to determine matrix orientation—i.e., when a package is examined and the code pattern is found, dots 13a-c enable the observer to orient the package properly and read the code. Rows 11a, g are not otherwise used. Five additional dots, one each in rows 11b-f, represent a five digit decimal number, row 11b representing the most significant digit and row 11f representing the least significant digit. Columns 12a-j represent the digits 0-9.

For example, the dot pattern shown in FIG. 1A represents the code "62785". Of course, the grid lines will not appear on the package, but dots 13a-c and 14a-e will, as shown in FIG. 1B.

The same grid could be used for other than decimal codes by using more than one dot in each of rows 11b-f. However, in the preferred embodiment, mechanical limitations, to be described below, prevent the use of more than one dot per row.

Figure 2:
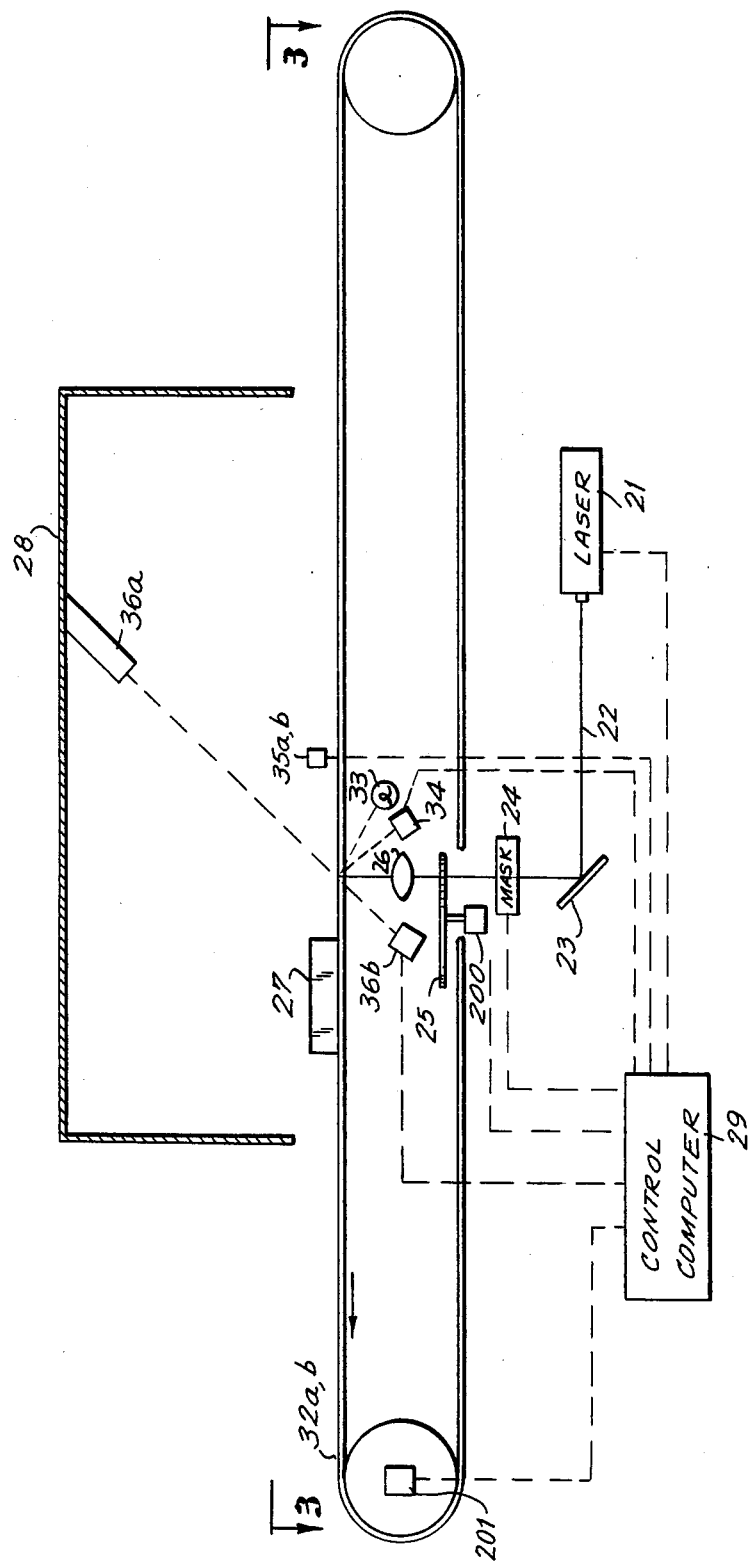
FIG. 2 is a schematic elevational view of the system of the invention.
Figure 3:
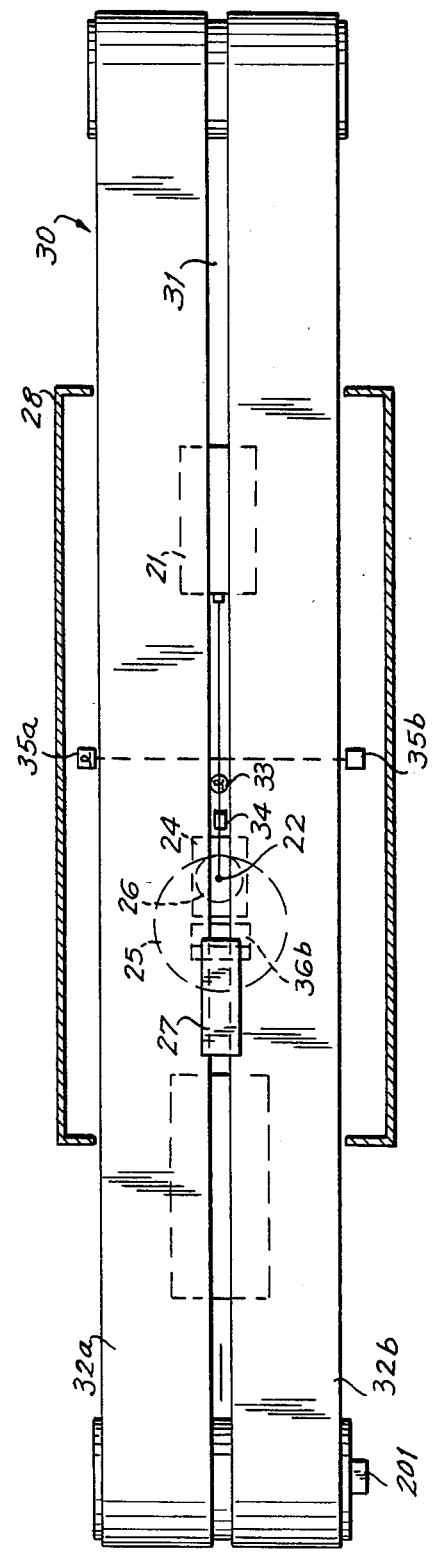
FIG. 3 is a plan view of the system of the invention, taken from line 3—3 of FIG. 2.

A preferred embodiment of the overall system 20 of the invention is shown in FIGS. 2 and 3. A carbon dioxide laser 21 projects a beam 22 of laser light (coherent electromagnetic radiation) at a wavelength of 10,600 nm. Beam 22 is reflected by mirror 23 so that it is aimed upwards through gap 31 between the two segments 32a, b of split conveyor belt 30. Beam 22 then passes through mask 24, described in more detail below, which is set to the desired pattern. Next, beam 22 passes through beam attenuator 25 which attenuates the beam to the desired intensity as discussed below. Condensing lens 26 is interposed between attenuator 25 and conveyor belt 30 to reduce the cross-sectional area of patterned beam 22, and thus to reduce the size of the pattern produced on the surface of package 27, as well as to increase the energy per unit area (intensity) of beam 22. A hood 28 surrounds the laser head area of the system 20—i.e, the area where beam 22 emerges to impinge on package 27—to prevent eye injuries by preventing operators or other personnel from looking into beam 22.

When package 27 is over the laser head area, light source 33, which may be an infrared light-emitting diode having a wavelength of 900 nm, illuminates package 27 with a known light intensity and reflectivity sensor 34 measures the intensity of the reflected light at the point at which beam 22 will strike. Based on that reflectivity measurement, control computer 29, such as an IBM PC or equivalent microcomputer, adjusts beam attenuator 25 to select an intensity for beam 22 which will produce a pattern on package 27 that is not visible to an unaided eye, but is visible under an optical magnifying device such as a 30-power microscope. The necessary intensity is determined by control computer 29 based on two competing factors. First, the lighter the color of the package 27, the lighter the imprinted pattern can be and still be detected by an unaided eye. Second, the lighter the color of the package 27, the more beam energy will be reflected by the package. Therefore, for a lighter package, a certain minimum intensity is necessary to achieve the imprinting of the pattern because of the reflection of beam energy, but there is also a maximum allowable intensity beyond which the imprinted pattern will be dark enough to be visible to the naked eye. On the other hand, a darker package will reflect less of the beam energy, but will require a greater intensity to produce a pattern that is dark enough to be visible even under the microscope.

As package 27 approaches the laser head area, it also passes a package-approaching sensor which prepares the laser firing controls for the impending firing of laser 21. The package-approaching sensor consists of a light source 35a, such as a light emitting diode, and a detector 35b. When package 27 interrupts the beam of light between source 35a and detector 35b, the interuption is interpreted by control computer 29 as the approach of a package. Belt speed sensor 201 allows computer 29 to estimate the time of arrival of package 27 and to prepare the laser firing sequence, which includes the charging of an energy storage capacitor, which requires about 60 milliseconds. When the package is in the field of the laser, a package-present sensor, similarly consisting of a light source 36a and a detector 36b, triggers the firing of laser 21.

Figure 4:
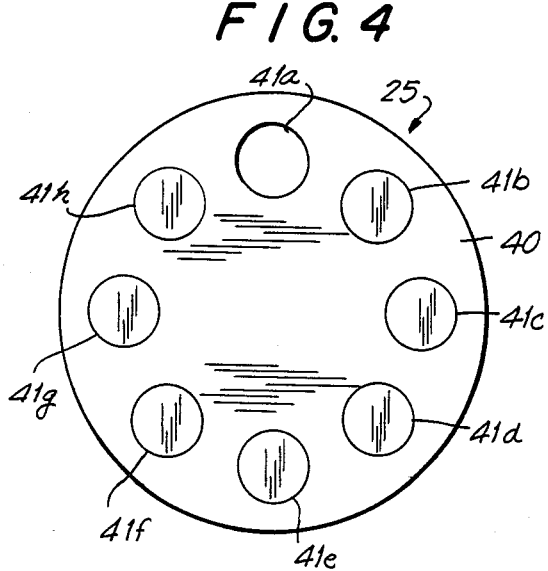
FIG. 4 is an elevational view of a beam attenuator according to the invention.

In the preferred embodiment, laser 21 itself is always operated at its maximum energy level. Laser 21 preferably should be rated at three joules per pulse, and in any case should be rated at at least 15 pulses per second (45 watts of power). A minimum beam intensity of 0.58 joules/cm$^2$ is required prior to lens 26. Beam intensity is controlled by attenuator 25, shown in FIG. 4, which is a rotating disk 40 rotated by a motor 200. Disk 40 has eight transmissive areas 41a-h which can be rotated into the path of beam 22. Each of areas 41a-h contains a material having a different transmittance at the wavelength of beam 22. For example, each of areas 41a-h may have a different thickness of a plastic film having a known transmittance-per-unit thickness at the appropriate wavelength. In the preferred embodiment, Cannings SCB-25, a 25 micron polypopylene film sold by Cannings Parry Packaging of Bristol, England, is used. Area 41a has no film, while areas 41b-h have 1-7 layers of film, respectively. Each layer transmits 92% of incident beam power. Therefore, the percentage of beam power transmitted through each of areas 41a-h is, respectively, 100%, 92%, 85%, 78%, 72%, 66%, 61%, and 56%.

In practice, it has been found that instead of rotating the desired one of areas 41a-h into the beam path when firing laser 21, it is more efficient to allow disk 40 to rotate at a constant speed of, e.g., 1,500 r.p.m., allowing control computer 29 to keep track of the angular position of the disk and to fire laser 21 when the correct one of areas 41a-h is in position in the beam path. A maximum firing delay of 40 milliseconds, the time required for one full revolution of disk 40 at 1,500 r.p.m., will be encountered as control computer 29 waits for the correct one of areas 41a-h to be present in the beam path.

Beam intensity could also be controlled by directly varying the power of laser 21 itself. However, that would require varying the voltage on the energy storage capacitor, which could cause unpredictable transient effects if the variations must be accomplished at high speeds.

Figure 5:
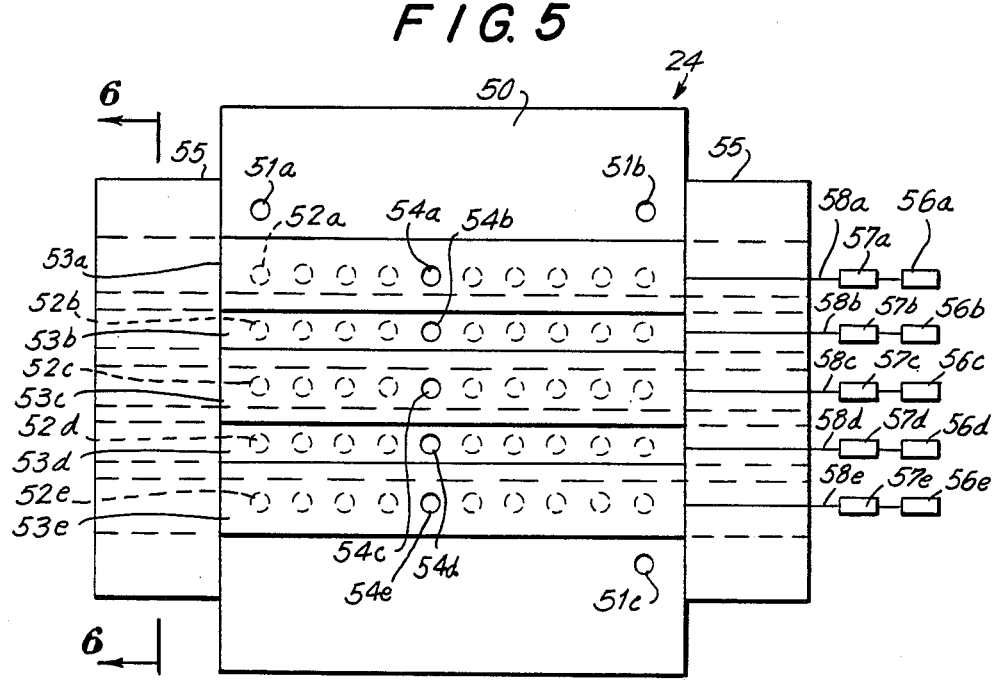
FIG. 5 is an elevational view of a mask according to the invention.
Figure 7A:
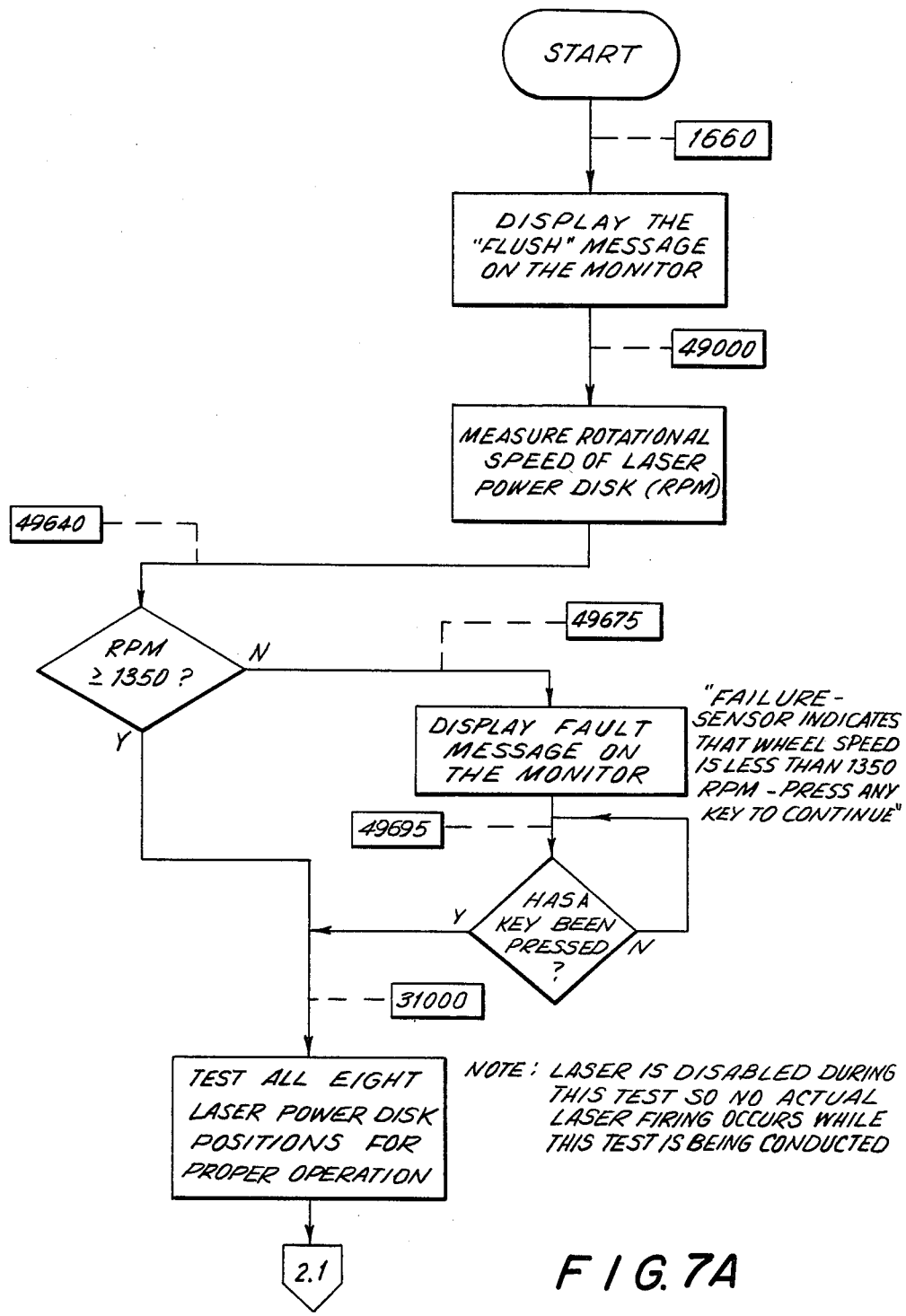
Figure 7B:
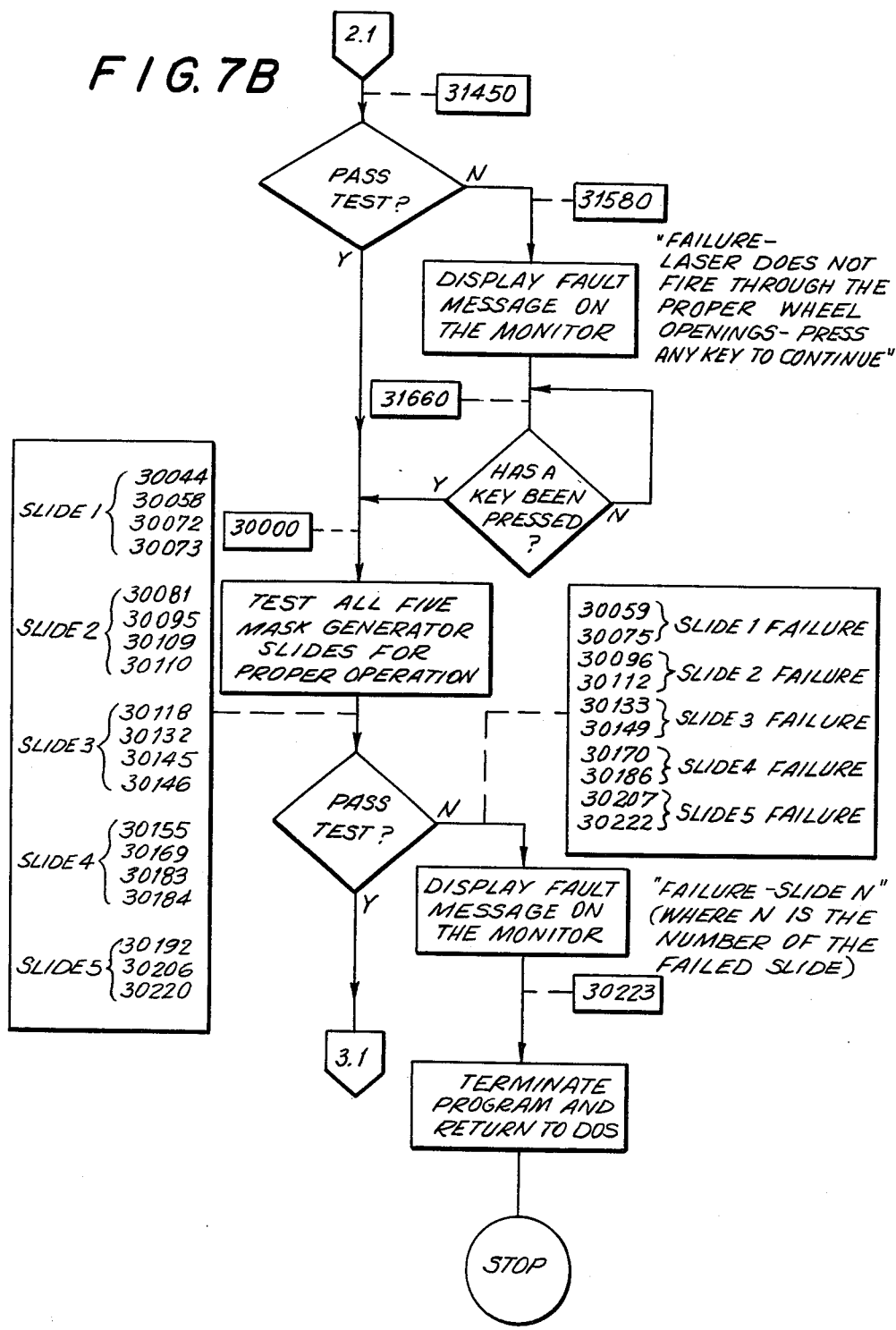
Figure 8B:
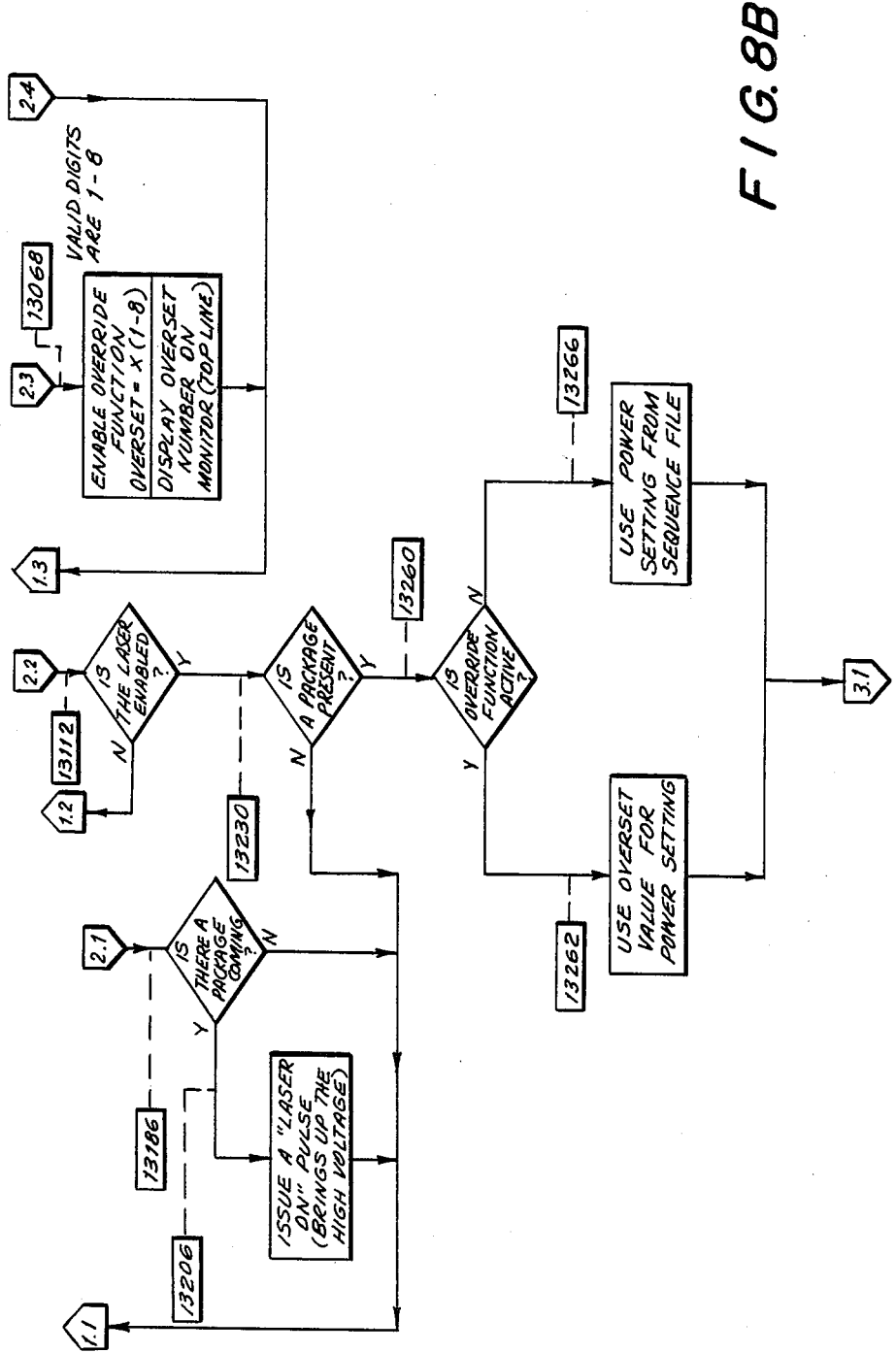
Figure 8C:
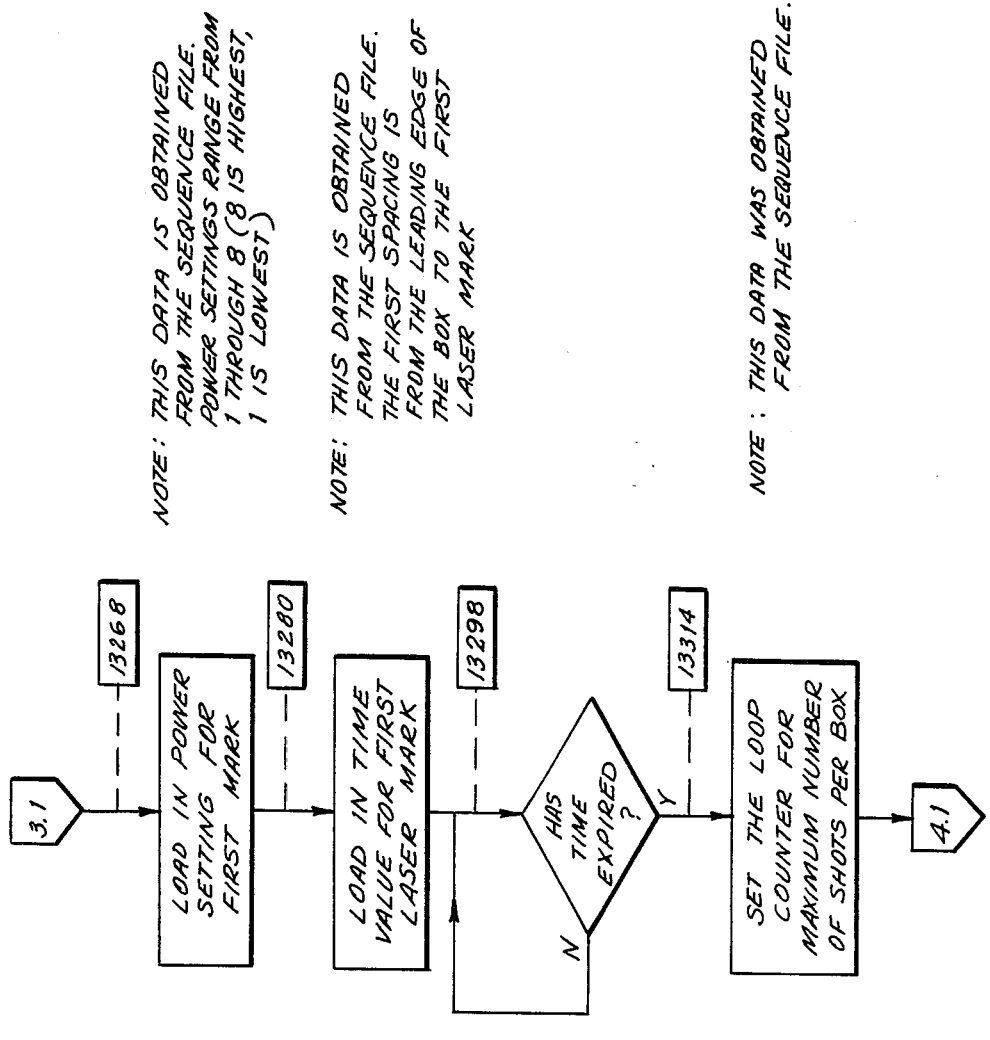
Figure 8F:
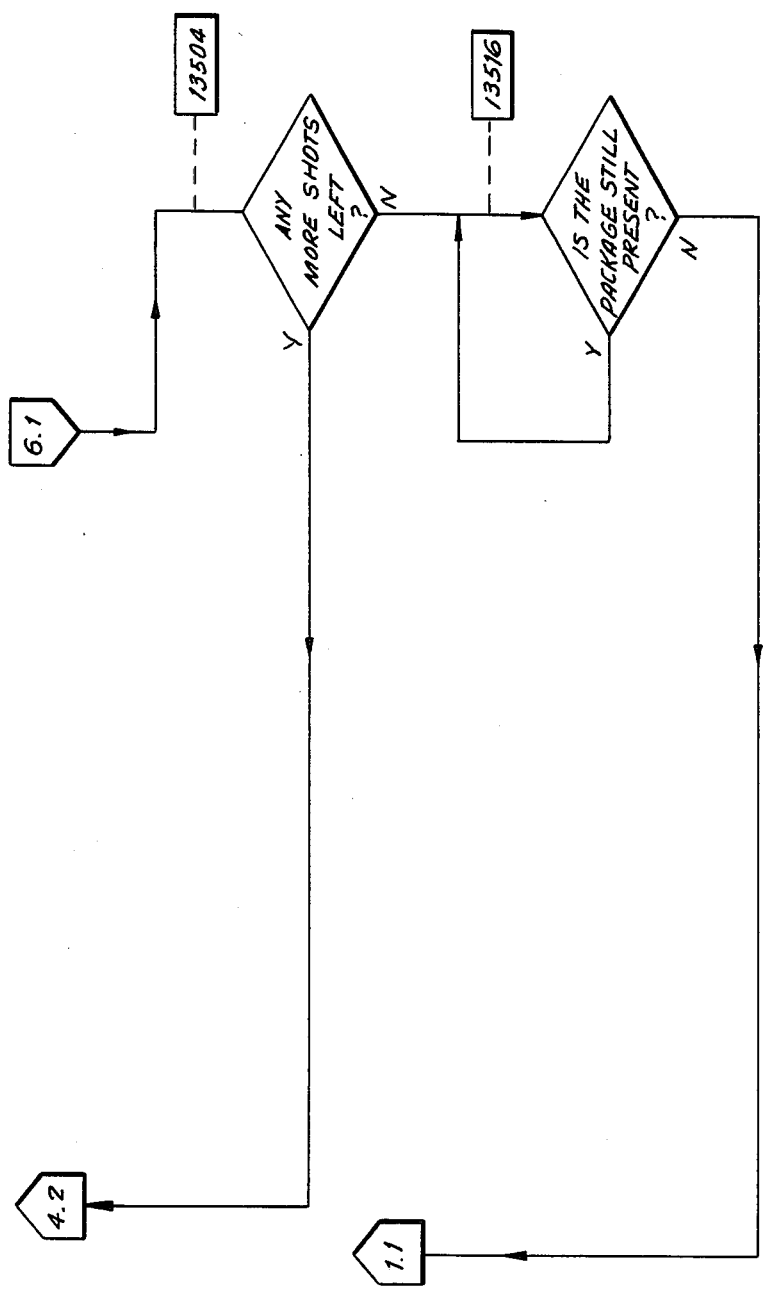
Figure 9A:
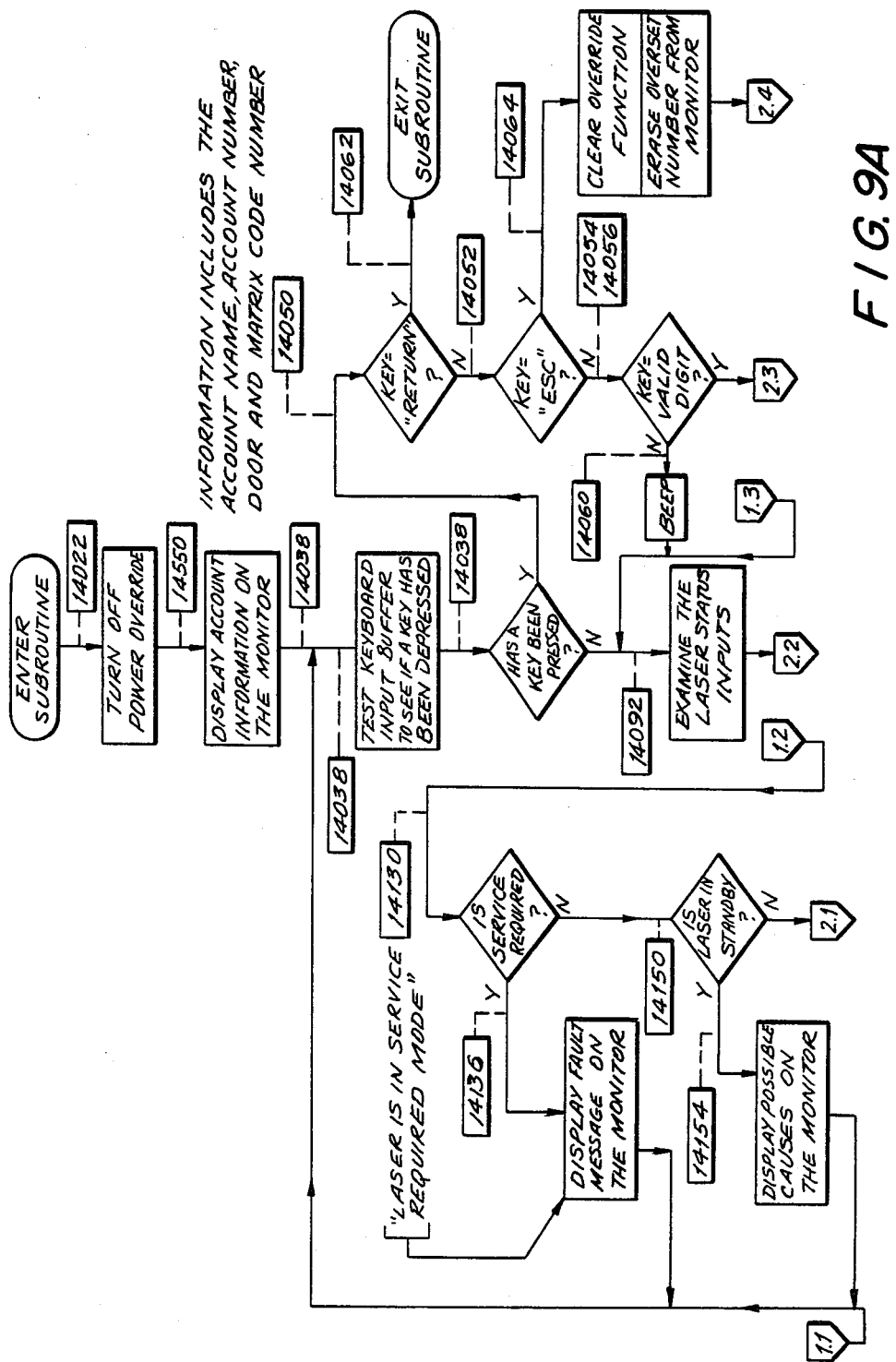
Figure 9B:
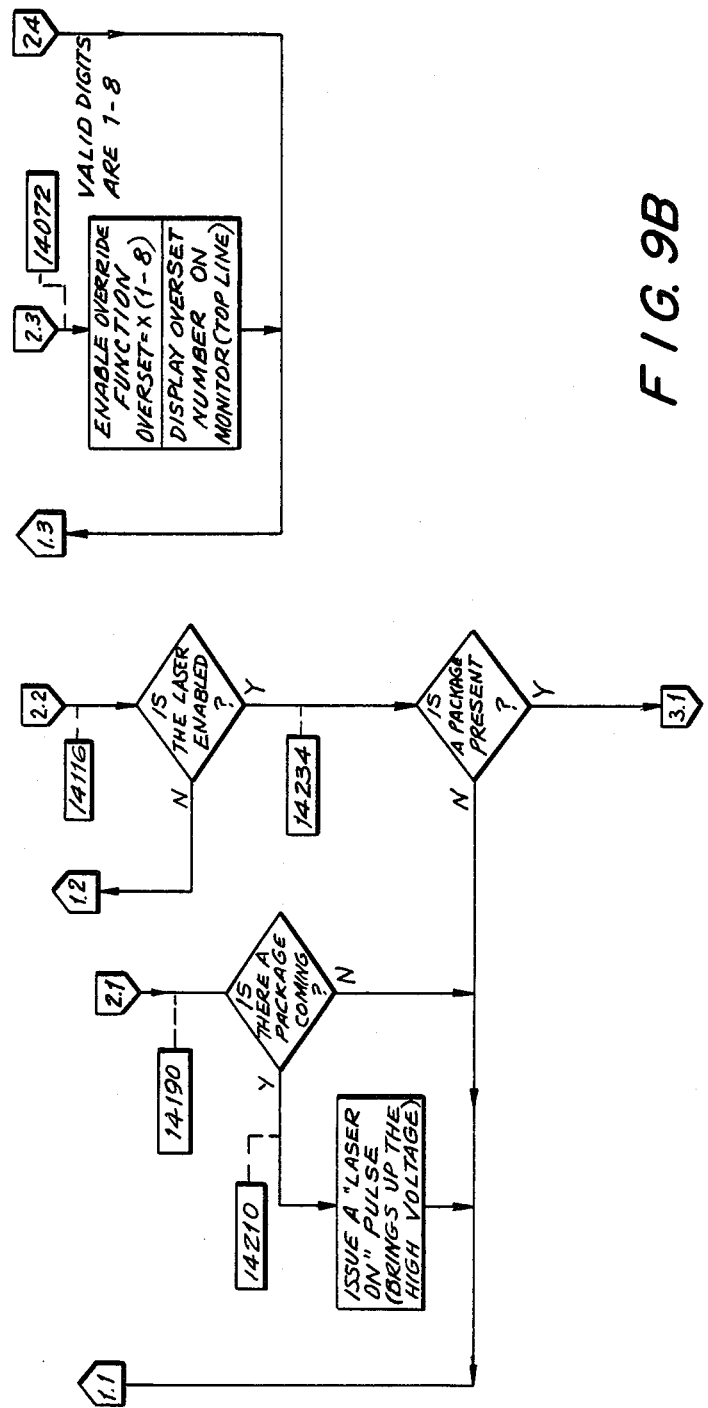
Figure 9C:
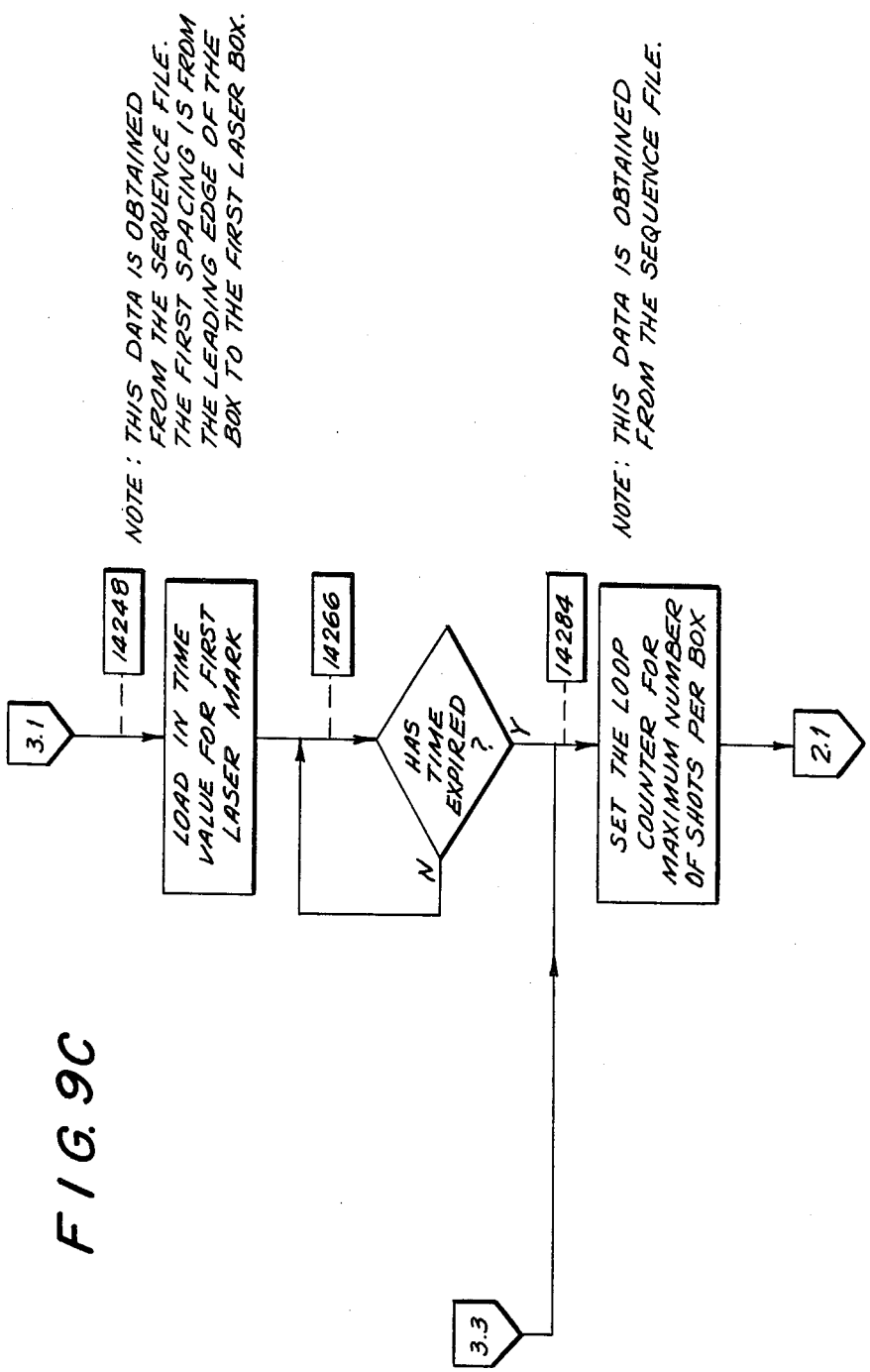
Figure 9D:
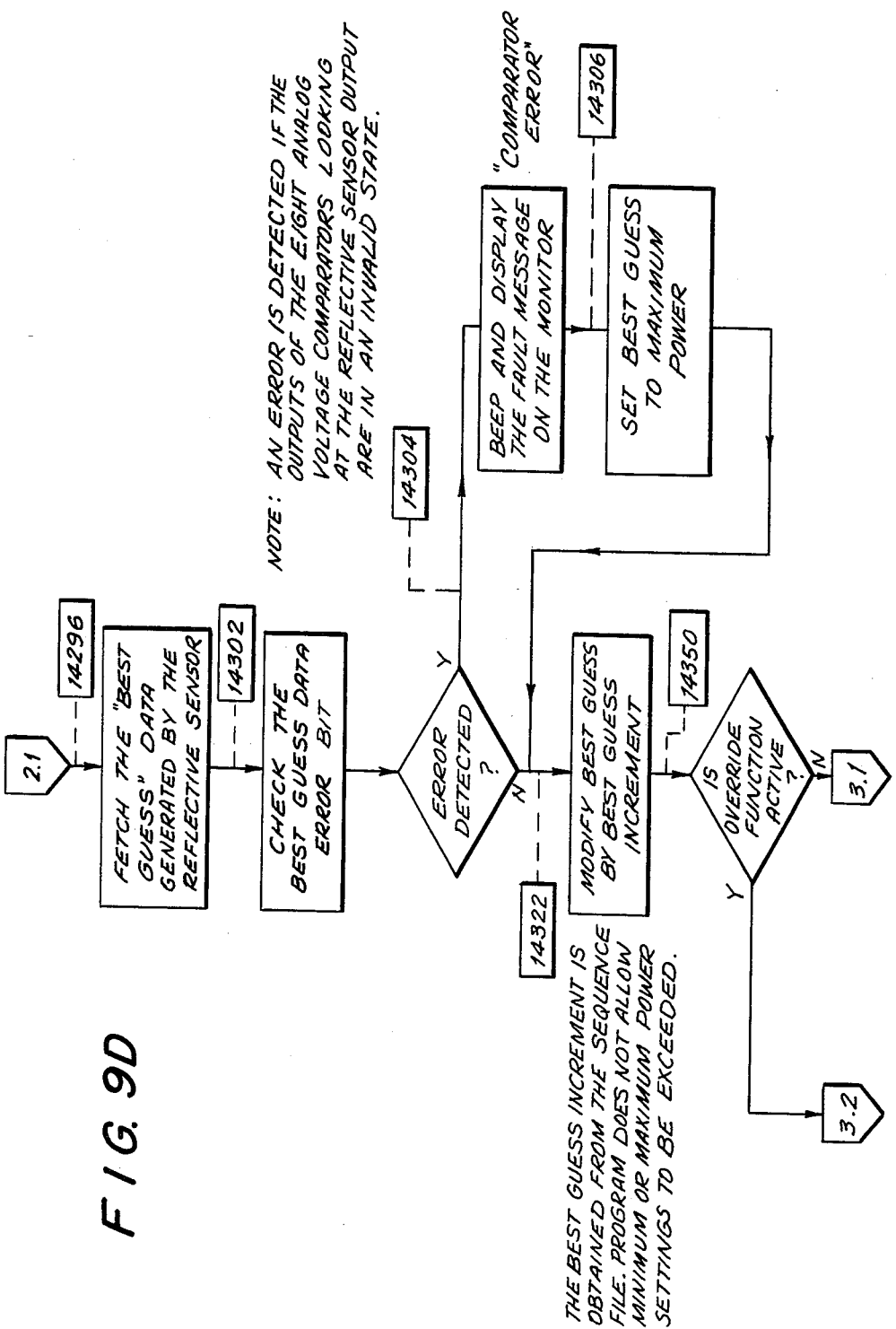
Figure 9E:
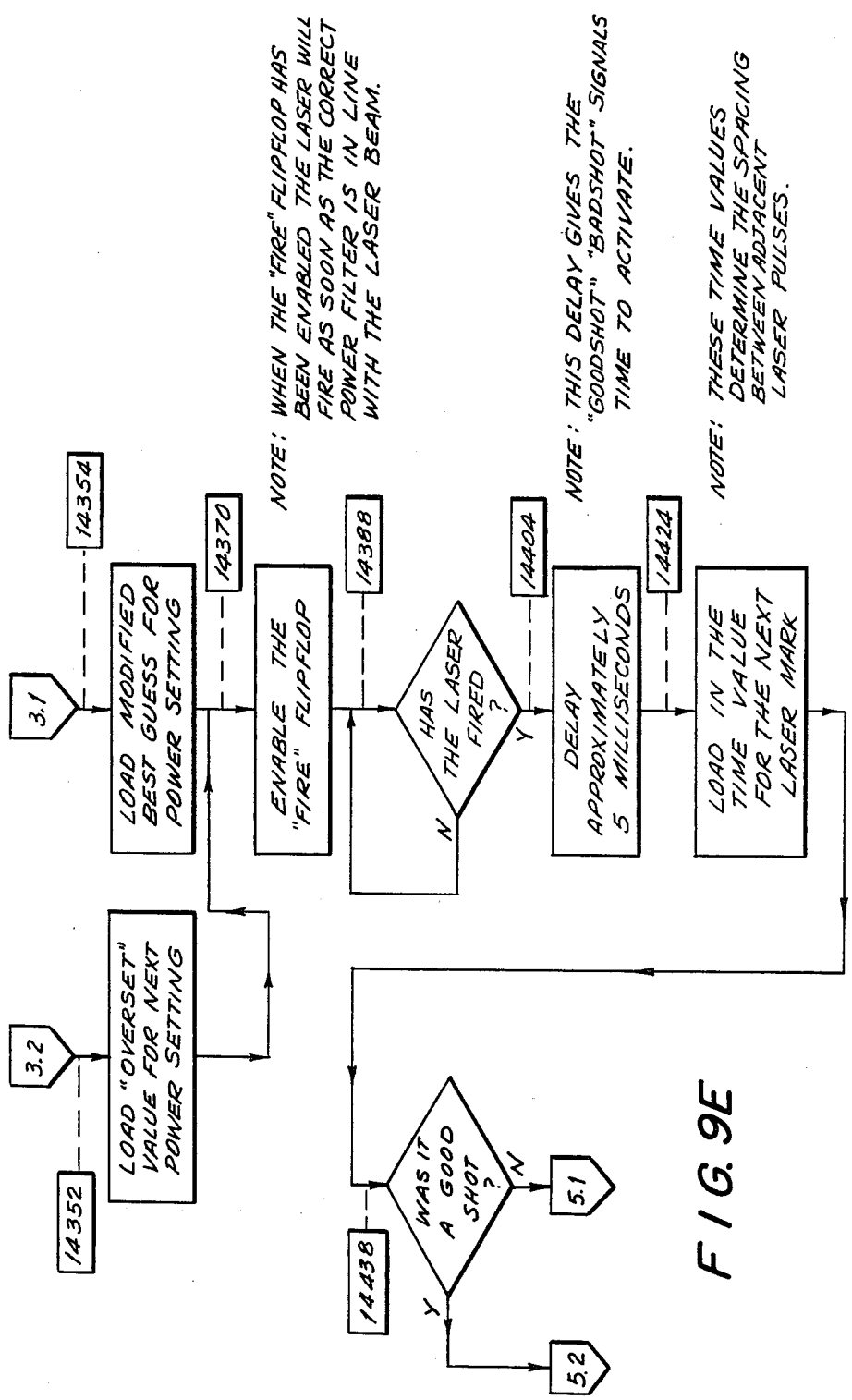
Figure 9F:
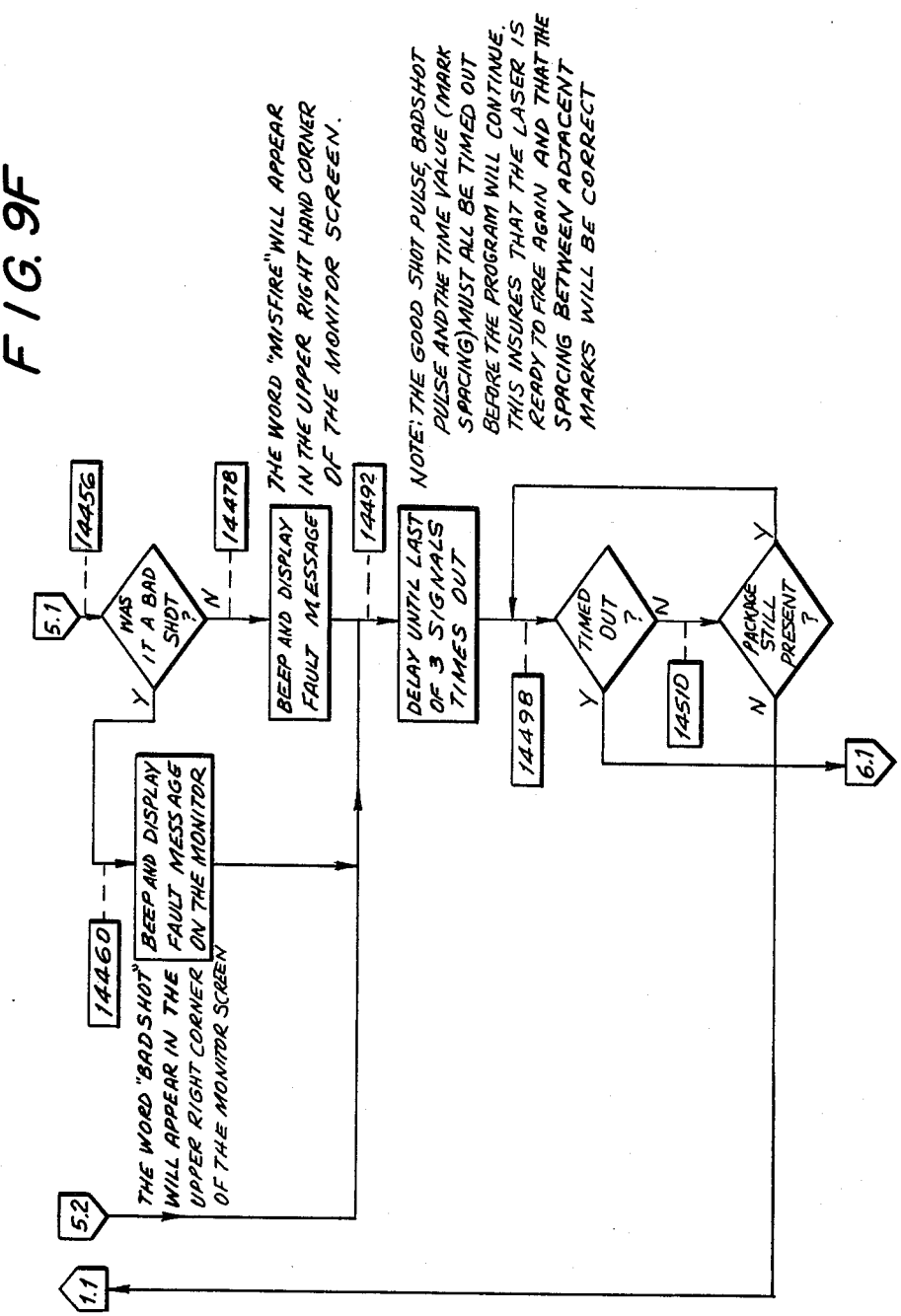

Before passing through attenuator 25, beam 22, which preferably has a cross-sectional area of approximately one square inch, impinges on pattern generating mask 24. Mask 24 is shown in FIGS. 5 and 6 and includes a mask plate 50 which has a cross-sectional area greater than that of beam 22 and which has three holes 51a-c which result in the formation of dots 13a-c in pattern 10, and five rows 52a-e of ten holes each for forming the five-digit decimal number. Five slides 53a-e overlie rows 52a-e. Each of slides 53a-e has one hole 54a-e respectively. Slides 53a-e slide in blocks 55. Stepping motors 56a-e are connected to respective ones of slides 53a-e via rotary-to-linear motion converters 57a-e and plastic arms 58a-e. Stepping motors 56a-e are reliably and easily controlled by computer 29 to accurately line up holes 54a-e over the desired ones of the holes in rows 52a-e to produce the desired pattern. Mask plate 50 and slides 53a-c are preferably made of a material which is both wear-resistant and laser-reflective, such as beryllium-copper alloy, while blocks 55 are preferably made from a heat-resistant material such as aluminum alloy.

The size of the matrix of holes in rows 52a-e preferably is 1.0 inch by 0.8 inch. Using a 5-to-1 condensing lens 26, a pattern size of 0.2 inch by 0.16 inch can be produced. Each of slides 53a-e is provided with chemically etched markings (not shown), and a respective sensor (not shown) can read the markings and confirm to control computer 29 that each slide is being properly positioned for generation of the pattern.

When system 20 is in operation, computer 29 is programmed to set mask 24 to the desired pattern. An operator simply lays packages 27 on belt 30 so that they lie across gap 31. The particular orientation is unimportant and, in fact, the more randomly they are placed, the more random the pattern placement will be. If desired, a group of packages can be run through the system several times to place several patterns on each package, and the patterns can be the same or different for each repetition. In addition, laser 21 can be pulsed to place a row of patterns on each package 27 as it passes through the field of laser 21. The number of patterns that can be imprinted by pulsing laser 21 is limited by the maximum pulse rate of laser 21, the package size and shape, and the belt speed. The rotation speed of disk 40 is also a limiting factor because even if laser 21 is ready to pulse, it cannot be fired until the correct one of areas 41a-h is in the beam path, as discussed above.

Control computer 29 sets the laser power levels and controls the pattern matrix 24 and the firing of laser 21. The main program for use on computer 29, a BASIC listing of which is provided as Appendix A, allows the operator to allow computer 29 to control the beam intensity as determined by reflectivity sensor 34 or to override that intensity selection manually. For example, it may be learned through experience that a particular type of packaging always needs a certain intensity and that because of its color or texture the sensor-controlled intensity is incorrect. The program further allows the operator to instruct the computer to set all intensities for all packages 27 a set number of increments higher (or lower) than the intensities determined by sensor 34. A flowchart of this program, the blocks of which are keyed to the lines of the program listing, as shown in FIGS. 7A-I. Program listings of two major subroutines of this program are provided as Appendices B and C, and flowcharts keyed to the lines of the subroutine listings are shown in FIGS. 8A-F and 9A-G, respectively.

Other programs for use on computer 29 are provided. These other programs allow the operator to create and update account files, to select a code, thereby setting the mask generator, to test various system components, to start up the laser and the conveyor belt, and other similar utility functions. Program listings of these other programs are provided in Appendix D.

The present invention places few limitations on the type of packaging that can be used. One limitation is that if a package is to be wrapped in cellophane or other plastic film—as many packages are, particularly when a group of two or more packages are to be sold as a unit, the film used must be transparent or nearly transparent at the wavelength of beam 22. It is known that certain plastic films are nearly opaque at the desired wavelength while others are nearly transparent.

Thus, a system and method are provided for printing on an object a pattern which is only microscopically visible. One skilled in the art will appreciate that the present invention can be practiced by other than the described embodiments, which are presented for purposes of illustration and not of limitation, and the present invention is limited only by the claims which follow.

© 1986 Estee Lauder Inc.
As an unpublished work
All rights reserved

Appendix A

CBMAINVO.BAS

```
1000    REM ******************** CBMAINVO.BAS ******************************
1010    REM
1020    REM ****************************************************************
1030    REM THIS PROGRAM IS USED TO CODE THE BOXES
1040    REM ****************************************************************
1050    REM
1060    REM ***********************************
1070    REM EQUATE STATEMENTS
1080    REM ***********************************
1090    REM
1100            PORT0  = &H300
1110            PORT1  = &H301
1120            PORT2  = &H302
1130            HSLIDE = &H303
1140            PORT4  = &H304
1150            PORT5  = &H305
1160            PORT6  = &H306
```

```
1170            PORT7 = &H307
1180            PORT8 = &H308
1190            PORT9 = &H309
1200            PORT10 = &H30A
1210            PORT11 = &H30B
1220            PORT12 = &H30C
1230            PORT13 = &H30D
1240            PORT14 = &H30E
1250            PORT15 = &H30F
1260            BIT0 = 1
1270            BIT1 = 2
1280            BIT2 = 4
1290            BIT3 = 8
1300            BIT4 = 16
1310            BIT5 = 32
1320            BIT6 = 64
1330            BIT7 = 128
1340    REM
1350    REM *******************************
1360    REM DIMENSION STATEMENTS
1370    REM *******************************
1380    REM
1390            OPTION BASE 1
1400            DIM SETTING%(25),SPACING(25),SPACECNT%(25)
1410            DIM SPACNTLO%(25),SPACNTHI%(25),BGINC%(25),P$(10)
1420    REM
1430    REM *******************************
1440    REM INITIALIZE THE OUTPUT PORTS
1450    REM *******************************
1460    REM
1470            IPORT11 = &HFF
1480            OUT PORT11,IPORT11
1490            IPORT12 = &HFF
1500            OUT PORT12,IPORT12
1510    REM
1520    REM *******************************
1530    REM INITIALIZE TIMER 0 FOR MODE 0
1540    REM *******************************
1550    REM
1560            IPORT12 = IPORT12 OR ( BIT6 OR BIT7 )
1570            OUT PORT12,IPORT12      ' SET A0 AND A1 TO ONES
1580            OUT PORT15,&H30 ' MODE 0
1590            IPORT12 = IPORT12 AND NOT ( BIT6 OR BIT7 )
1600            OUT PORT12,IPORT12      ' SET A0 AND A1 TO ZEROS
1610    REM
1620    REM *****************************
1630    REM PRINT THE FLUSH MESSAGE
1640    REM *****************************
1650    REM
1660            CLS
1670            LOCATE 4,20,0
1680            PRINT "IF THE A.C. POWER TO THE LASER HAS BEEN OFF
1690            LOCATE 6,20,0
1700            PRINT "THEN MANUALLY FLUSH THE LASER FOR THE LENGTH
1710            LOCATE 8,20,0
1720            PRINT "OF TIME INDICATED BELOW :"
1730            LOCATE 10,15,0
1740            PRINT "         OFF TIME              FLUSH TIME"
1750            LOCATE 11,15,0
1760            PRINT "         --------              ----------
1770            LOCATE 12,15,0
1780            PRINT "        8 HRS OR LESS          15 SECONDS
1790            LOCATE 14,15,0
1800            PRINT "        24 TO 48 HRS           ONE MINUTE
1810            LOCATE 16,15,0
1820            PRINT "        OVER 48 HOURS          TWO MINUTES
1830            LOCATE 20,25,0
1840            PRINT " PRESS ANY KEY TO CONTINUE"
1850            A$ = INKEY$ : IF A$ = "" THEN 1850
1860    REM
1870    REM ***********************************
```

```
1880    REM TEST WHEEL SPEED - 1350 RPM IS MINIMUM
1890    REM ************************************
1900    REM
1910            GOSUB 49000
1920    REM
1930    REM ****************************************
1940    REM TEST HOLE POSITIONS
1950    REM ****************************************
1960    REM
1970            GOSUB 31000
1980    REM
1990    REM ****************************************
2000    REM TEST THE SLIDES
2010    REM ****************************************
2020    REM
2030            GOSUB 30000
2040    REM
2050    REM *****************************************************************
2060    REM THIS PARAGRAPH DISPLAYS THE MAIN MENU OPTIONS
2070    REM *****************************************************************
2080    REM
2090            CLS
2100            GOSUB 2420
2110            A$ = INKEY$ : IF A$ = "" THEN 2110
2120            TEMP = LEN(A$) : IF TEMP = 2 GOTO 2150
2130            TEMP = ASC(A$) : IF TEMP = 13 GOTO 2360   ' EXIT PROGRAM
2140            BEEP : GOTO 2110
2150            A$ = RIGHT$(A$,1)
2160            IF A$ = "P" THEN 2190
2170            IF A$ = "H" THEN 2270
2180            BEEP : GOTO 2110
2190            GOSUB 2470
2200            A$ = INKEY$ : IF A$ = "" THEN 2200
2210            TEMP = LEN(A$) : IF TEMP = 2 GOTO 2230
2220            TEMP = ASC(A$) : IF TEMP = 13 GOTO 2690   ' CODE AN ACCOUNT
2230            A$ = RIGHT$(A$,1)
2240            IF A$ = "P" THEN 2270
2250            IF A$ = "H" THEN 2100
2260            BEEP : GOTO 2200
2270            GOSUB 2520
2280            A$ = INKEY$ : IF A$ = "" THEN 2280
2290            TEMP = LEN(A$) : IF TEMP = 2 THEN 2310
2300            TEMP = ASC(A$) : IF TEMP = 13 THEN 2620   ' TEST PATTERN
2310            A$ = RIGHT$(A$,1)
2320            IF A$ = "P" THEN 2100
2330            IF A$ = "H" THEN 2190
2340            BEEP : GOTO 2280
2350            BEEP : GOTO 2190
2360            END         ' EXIT THIS PROGRAM
2370    REM
2380    REM ****************************************
2390    REM INTERNAL SUBROUTINES START HERE
2400    REM ****************************************
2410    REM
2420            LOCATE 12,1
2430            PRINT"          [X]        EXIT THIS PROGRAM
2440            PRINT"          [ ]        CODE AN ACCOUNT
2450            PRINT"          [ ]        MAKE A TEST MARK
2460            RETURN
2470            LOCATE 12,1
2480            PRINT"          [ ]        EXIT THIS PROGRAM
2490            PRINT"          [X]        CODE AN ACCOUNT
2500            PRINT"          [ ]        MAKE A TEST MARK
2510            RETURN
2520            LOCATE 12,1
2530            PRINT"          [ ]        EXIT THIS PROGRAM
2540            PRINT"          [ ]        CODE AN ACCOUNT
2550            PRINT"          [X]        MAKE A TEST MARK
2560            RETURN
2570    REM
2580    REM ****************************************
```

```
2590        REM MAKE A TEST MARK
2600        REM ********************************
2610        REM
2620                GOSUB 18000
2630                GOTO 2090            ' RETURN TO MAIN MENU
2640        REM
2650        REM ******************************
2660        REM SELECT A CODING OPTION
2670        REM ******************************
2680        REM
2690                GOSUB 25000          ' DISPLAY SEQUENCE TYPES
2700        REM
2710        REM ******************************
2720        REM SELECT A SEQUENCE NUMBER
2730        REM ******************************
2740        REM
2750                CLS
2751                LOCATE 12,20
2752                INPUT "ENTER THE SEQUENCE NUMBER ==> ",SEQNUM$
2753                CLS
2754                GOSUB 15000          ' READ IN THE SEQUENCE VALUES
2760        REM
2770        REM ************************************
2780        REM CHECK BELT SPEED AGAINST THE SEQUENCE MAXIMUM
2790        REM ************************************
2800        REM
2810                GOSUB 17000
2811        REM
2812        REM ******************************
2813        REM RELOAD THE SEQUENCE DATA ( JUST IN CASE BELT SPEED IS DIFFERANT )
2814        REM ******************************
2815        REM
2816                GOSUB 15000
2817        REM
2830        REM ****************************************************************
2840        REM IDENTIFY THE FILE NAME
2850        REM ****************************************************************
2860        REM
2870                ACCTFILE$ = "FRANCE"
2880        REM
2890        REM ******************************
2900        REM ENTER THE ACCOUNT I.D. NUMBER
2910        REM ******************************
2920        REM
2930                CLS : LOCATE 12,20
2940                INPUT " ENTER THE ACCOUNT I.D. NUMBER ==> ",A$
2950                TEMP = LEN(A$)
2960                IF TEMP > 0 THEN 2980
2970                GOTO 2090            ' RETURN TO MENU
2980                GOSUB 24000          ' CHECK FORMAT OF NUMBER
2990                IF RESULT$ = "OK" THEN 3100 ELSE 3000
3000                CLS : LOCATE 12,20
3010                PRINT "FORMAT OF NUMBER JUST ENTERED WAS INVALID"
3020                PRINT
3030                PRINT "PRESS ANY KEY TO CONTINUE"
3040                A$ = INKEY$ : IF A$ = "" THEN 3040 ELSE 2930
3050        REM
3060        REM ******************************
3070        REM SEARCH FOR AN "ACTIVE" FILE WITH THIS ACCOUNT NUMBER
3080        REM ******************************
3090        REM
3100                STARTNUM! = 6
3110                GOSUB 16000          ' SEARCH FOR THE ACCOUNT NUMBER
3120                IF RESULT$ = "FOUND" THEN 3210
3130                CLS
3140        PRINT "NO ACTIVE FILE WAS FOUND - PRESS ANY KEY TO CONTINUE"
3150                A$ = INKEY$ : IF A$ = "" THEN 3150 ELSE 2930
3160        REM
3170        REM ******************************
3180        REM IF THE FILE WAS FOUND SEE IF IT IS ACTIVE
3190        REM ******************************
```

```
3200    REM
3210            IF ST$ = "A" THEN 3340
3220            IF STARTNUM! < TOTREC! THEN 3230 ELSE 3140
3230            STARTNUM! = I! + 1 : GOTO 3110
3240    REM
3250    REM *****************************
3260    REM IF THE FILE WAS FOUND PRINT THE DATA
3270    REM *****************************
3280    REM
3340            GOSUB 10000      ' DISPLAY THE ACCT INFO AND MATRIX
3350            LOCATE 22,20,0
3360            PRINT" DO YOU WANT TO CODE THIS ACCOUNT ? [Y/N] "
3370            A$ = INKEY$ : IF A$ = "" THEN 3370
3380            IF A$ = "N" OR A$ = "n" THEN 2930
3390            IF A$ = "Y" OR A$ = "y" THEN 3460
3400            BEEP : GOTO 3370
3410    REM
3420    REM *****************************
3430    REM SET THE SLIDES
3440    REM *****************************
3450    REM
3460            CLS : LOCATE 12,20
3470            PRINT "SETTING MATRIX CODE - WAIT TEN SECONDS"
3480            GOSUB 11000      ' SET THE SLIDES
3490    REM
3500    REM *****************************
3510    REM EXAMINE PREVIOUSLY SELECTED CODING OPTION
3520    REM *****************************
3530    REM
3540            IF CODEOP$ = "SENSOR" THEN 3670
3550    REM
3560    REM *****************************
3570    REM COMPUTER CONTROL WAS SELECTED
3580    REM *****************************
3590    REM
3600            GOSUB 13000      ' MARK USING COMPUTER CONTROL
3610            GOTO 2930
3620    REM
3630    REM *****************************
3640    REM SENSOR CONTROL WAS SELECTED
3650    REM *****************************
3660    REM
3670            GOSUB 14000      ' MARK USING SENSOR CONTROL
3680            GOTO 2930
3690    REM
3700    REM *****************************
3710    REM INCLUDE THE SUBROUTINES
3720    REM *****************************
3730    REM
9999    REM $INCLUDE:'CBSU10V0.BAS'      ' DISPLAY THE ACCOUNT INFORMATION
10999   REM $INCLUDE:'CBSU11V0.BAS'      ' SET THE SLIDES
11999   REM $INCLUDE:'CBSU12V0.BAS'      ' COMPUTE BELT SPEED
12999   REM $INCLUDE:'CBSU13V0.BAS'      ' MARK USING COMPUTER CONTROL
13999   REM $INCLUDE:'CBSU14V0.BAS'      ' MARK USING SENSOR CONTROL
14999   REM $INCLUDE:'CBSU15V0.BAS'      ' SELECT SEQUENCE
15999   REM $INCLUDE:'CBSU16V0.BAS'      ' SEARCH FOR ACCOUNT NUMBER
16999   REM $INCLUDE:'CBSU17V0.BAS'      ' CHECK BELT SPEED
17999   REM $INCLUDE:'CBSU18V0.BAS'      ' MAKE A TEST MARK
23999   REM $INCLUDE:'RCSU24V0.BAS'      ' CHECK FORMAT OF ACCT. NUMBER
24999   REM $INCLUDE:'CBSU25V0.BAS'      ' DISPLAY SEQUENCE TYPES
29999   REM $INCLUDE:'CBSU30V0.BAS'      ' TEST MATRIX SLIDES
30999   REM $INCLUDE:'CBSU31V0.BAS'      ' TEST WHEEL OPENINGS
48999   REM $INCLUDE:'CBSU49V0.BAS'      ' TEST WHEEL SPEED
60000   END
```

© 1986 Estee Lauder Inc.
As an unpublished work
All rights reserved
Appendix B

CBSU13V0.BAS

```
13000   REM ******************** CBSU13V0.BAS ***************************
13002   REM
13004   REM ***************************************************************
13006   REM THIS PROGRAM CODES BOXES USING COMPUTER CONTROLLED LASER POWER
13008   REM ***************************************************************
13010   REM
13012   REM ************************
13014   REM PRINT READY TO FIRE
13016   REM ************************
13018   REM
13020           OVERRIDE = 0
13024           SCREEN 0,0,0,0 : GOSUB 13526       ' PRINT ACCT. INFO
13026   REM
13028   REM ***************************************
13030   REM HAS A KEY BEEN PRESSED ?
13032   REM ***************************************
13034   REM
13036           A$ = INKEY$ : IF A$ = "" THEN 13088
13037           SCREEN 0,0,0,0
13038           TEMP = LEN(A$)
13040           IF TEMP = 1 THEN 13044
13042           BEEP : GOTO 13088
13044           KEYNUM = ASC(A$)
13046           IF KEYNUM = 13 THEN 13058
13048           IF KEYNUM = 27 THEN 13060
13050           IF KEYNUM < 49 THEN 13056
13052           IF KEYNUM > 56 THEN 13056
13054           GOTO 13068
13056           BEEP : GOTO 13088
13058           RETURN  ' RETURN TO CALLING PROGRAM
13060           OVERRIDE = 0
13062           LOCATE 1,1,0 : TEMP$ = SPACE$(80)
13064           PRINT TEMP$      ' CLEARS THE TOP LINE OF PRINT
13066           GOTO 13088
13068           OVERRIDE = KEYNUM - 48
13070           LOCATE 1,1,0
13072           PRINT "OVERRIDE =" OVERRIDE
13074           OVERSET = ( 8 - OVERRIDE ) * 32
13076           GOTO 13088
13078   REM
13080   REM **************************
13082   REM READ THE LASER STATUS PORT
13084   REM **************************
13086   REM
13088           IPORT11 = IPORT11 AND NOT BIT2
13090           OUT PORT11,IPORT11       ' RESET STATUS FLIP-FLOPS
13092           IPORT11 = IPORT11 OR BIT2
13094           OUT PORT11,IPORT11
13096           FOR I = 1 TO 100         ' DELAY FOR STATUS UPDATE
13098           NEXT I
13100           TEMP = INP( PORT8 )
13102   REM
13104   REM **************************
13106   REM IS THE LASER ENABLED ?
13108   REM ***************************************
13110   REM
13112           TEMP1 = TEMP AND BIT3
13114           IF TEMP1 = 0 THEN 13230  ' ZERO IS ACTIVE STATE
13116   REM
13118   REM ***************************************
13120   REM IS SERVICE REQUIRED ?
13122   REM ****************************************8
13124   REM
```

```
13126              TEMP1 = TEMP AND BIT4
13128              IF TEMP > 0 THEN 13146
13130              SCREEN ,,2,2 : LOCATE 12,30
13132              PRINT " LASER IS IN SERVICE REQUIRED MODE "
13134              GOTO 13036
13136    REM
13138    REM ************************************
13140    REM IS LASER IN THE STANDBY MODE ?
13142    REM ************************************
13144    REM
13146              TEMP1 = TEMP AND BIT2
13148              IF TEMP1 = 0 THEN 13186
13150              SCREEN ,,1,1 : LOCATE 11,20
13152              PRINT " THE LASER IS NOT ENABLED "
13154              LOCATE 12,20
13156              PRINT"------------------------"
13158              LOCATE 14,10
13160              PRINT " CHECK THE POSSIBLE CAUSES THAT ARE LISTED BELOW :"
13162              LOCATE 16,10
13164              PRINT " 1. THE LASER POWER IS NOT TURNED ON "
13166              LOCATE 18,10
13168              PRINT " 2. THE LASER KEY HAS NOT BEEN TURNED ON "
13170              LOCATE 20,10
13172              PRINT " 3. THE LASER IS WARMING UP ( WARM-UP LIGHT FLACHING )"
13174              GOTO 13036
13176    REM
13178    REM ***********************************************
13180    REM IS THERE A PACKAGE COMING ?
13182    REM ***********************************************
13184    REM
13186              TEMP1 = TEMP AND BIT6
13188              IF TEMP1 = 0 THEN 13206    ' ZERO IS ACTIVE STATE
13192              SCREEN 0,0,0,0 : GOSUB 13526     ' PRINT ACCT. INFO
13194              GOTO 13036
13196    REM
13198    REM ***********************************************
13200    REM ISSUE A LASER ON PULSE AND THEN PRINT "READY TO FIRE"
13202    REM ***********************************************
13204    REM
13206              IPORT11 = IPORT11 AND NOT BIT0
13208              OUT PORT11,IPORT11
13210              IPORT11 = IPORT11 OR BIT0
13212              OUT PORT11,IPORT11
13216              SCREEN 0,0,0,0 : GOSUB 13526     ' PRINT ACCT. INFO
13218              GOTO 13036
13220    REM
13222    REM ***********************************************
13224    REM IS THERE A PACKAGE PRESENT ?
13226    REM ***********************************************
13228    REM
13230              TEMP1 = TEMP AND BIT0
13232              IF TEMP1 > 0 THEN GOTO 13036     ' ZERO IS ACTIVE STATE
13234    REM
13250    REM ***********************************************
13252    REM LOAD FIRST POWER SETTING INTO LATCH
13254    REM ***********************************************
13256    REM
13258              IPORT11 = IPORT11 AND NOT ( BIT5 OR BIT6 OR BIT7 )
13260              IF OVERRIDE = 0 THEN 13266
13262              IPORT11 = IPORT11 OR OVERSET
13264              GOTO 13268
13266              IPORT11 = IPORT11 OR SETTING%( 1 )
13268              OUT PORT11,IPORT11
13270    REM
13272    REM ***********************************************
13274    REM LOAD FIRST SPACECNT INTO TIMER 0 ( LSB FIRST )
13276    REM ***********************************************
13278    REM
13280              IPORT12 = IPORT12 AND NOT ( BIT6 OR BIT7 ) OR BIT5
13282              OUT PORT12,IPORT12       ' SET A0 AND A1 TO ZERO, GATE0 TO ONE
13284              OUT PORT15,SPACNTLO%( 1 )          ' LOAD LSB
```

```
13286            OUT PORT15,SPACNTHI%( 1 )           ' LOAD MSB
13288   REM
13290   REM *******************************
13292   REM HAS SPACE TIMER TIMED OUT ?
13294   REM *******************************
13296   REM
13298            TEMP = INP( PORT9 )
13300            TEMP = TEMP AND BIT2
13302            IF TEMP > 0 THEN 13298
13304   REM
13306   REM **********************************
13308   REM SET LOOP FOR NUMBER OF SHOTS
13310   REM **********************************
13312   REM
13314            FOR I = 2 TO (NUMSHOTS + 1)
13316   REM
13318   REM *******************************
13320   REM  ENABLE THE FIRE FLIP-FLOP
13322   REM *******************************
13324   REM
13326            IPORT11 = IPORT11 AND NOT BIT3
13328            OUT PORT11,IPORT11
13330            IPORT11 = IPORT11 OR BIT3
13332            OUT PORT11,IPORT11
13334   REM
13336   REM *******************************
13338   REM HAS THE LASER FIRED ?
13340   REM *******************************
13342   REM
13344            TEMP = INP( PORT8 )
13346            TEMP = TEMP AND BIT5
13348            IF TEMP = 0 THEN 13344
13350   REM
13352   REM *******************************
13354   REM DELAY APPROX. 5 MILLI-SECONDS
13356   REM *******************************
13358   REM
13360            OUT PORT15,5
13362            OUT PORT15,0
13364            TEMP = INP( PORT9 )
13366            TEMP = TEMP AND BIT2
13368            IF TEMP > 0 THEN 13364
13370   REM
13372   REM *******************************
13374   REM  LOAD THE NEXT POWER SETTING INTO THE LATCH
13376   REM *******************************
13378   REM
13380            IPORT11 = IPORT11 AND NOT ( BIT5 OR BIT6 OR BIT7 )
13382            IF OVERRIDE = 0 THEN 13386
13384            GOTO 13400
13386            IPORT11 = IPORT11 OR SETTING%( I )
13388            OUT PORT11,IPORT11
13390   REM
13392   REM *******************************
13394   REM LOAD THE NEXT SPACE CNT ( LSB FIRST )
13396   REM *******************************
13398   REM
13400            OUT PORT15,SPACNTLO%( I )
13402            OUT PORT15,SPACNTHI%( I )
13404   REM
13406   REM ***************************
13408   REM WAS IT A GOOD SHOT ?
13410   REM ***************************
13412   REM
13414            TEMP = INP( PORT9 )
13416            TEMP1 = TEMP AND BIT1
13418            IF TEMP1 = 0 THEN 13432
13420            GOTO 13470
13422   REM
13424   REM ***************************
13426   REM WAS IT A BAD SHOT ?
```

```
13428       REM ******************************
13430       REM
13432                  TEMP1 = TEMP AND BIT0
13434                  IF TEMP1 = 0 THEN 13454
13436                  BEEP
13438                  SCREEN 0,0,0,0 : LOCATE 1,60
13440                  PRINT "BAD SHOT        "
13442                  GOTO 13470
13444       REM
13446       REM ******************************
13448       REM BEEP AND PRINT MISFIRE
13450       REM ******************************
13452       REM
13454                  BEEP
13456                  SCREEN 0,0,0,0 : LOCATE 1,60
13458                  PRINT "MISFIRE         "
13460       REM
13462       REM ******************************
13464       REM HAVE ALL THREE SIGNALS TIMED OUT ?
13466       REM ******************************
13468       REM
13470                  TEMP = INP( PORT9 )
13472                  TEMP = TEMP AND ( BIT0 OR BIT1 OR BIT2 )
13474                  IF TEMP = 0 THEN 13504
13476       REM
13478       REM ******************************
13480       REM IS A PACKAGE STILL PRESENT ?
13482       REM ******************************
13484       REM
13486                  TEMP = INP( PORT8 )
13488                  TEMP = TEMP AND BIT0
13490                  IF TEMP = 0 THEN 13470
13492                  GOTO 13036
13494       REM
13496       REM ******************************
13498       REM HAVE NUMSHOTS ALL BEEN FIRED ?
13500       REM ******************************
13502       REM
13504                  NEXT I
13506       REM
13508       REM ********************************
13510       REM IS THE PACKAGE STILL PRESENT ?
13512       REM ********************************
13514       REM
13516                  TEMP = INP( PORT8 )
13518                  TEMP = TEMP AND BIT0
13520                  IF TEMP = 0 THEN 13516
13522                  GOTO 13036
13524       REM
13526       REM **********************
13528       REM THIS INTERNAL SUBROUTINE PRINTS THE ACCT. INFO
13530       REM **********************
13532       REM
13533                  LOCATE 12,30,0
13534                  PRINT "ACCOUNT BEING CODED"
13535                  LOCATE 13,30
13536                  PRINT "-------------------"
13538                  LOCATE 15,15
13540                  PRINT "NAME : "NA$
13542                  LOCATE 17,15
13544                  PRINT "DOOR : "DR$
13546                  LOCATE 19,15
13548                  PRINT "CODE : "MC$
13550                  RETURN
```

© 1986 Estee Lauder Inc.
As an unpublished work
All rights reserved

Appendix C
CBSU14V0.BAS

```
14000   REM ********************* CBSU14V0.BAS *************************
14002   REM
14004   REM ***************************************************************
14006   REM THIS PROGRAM CODES BOXES USING SENSOR CONTROLLED LASER POWER
14008   REM ***************************************************************
14010   REM
14012   REM ************************
14014   REM PRINT READY TO FIRE
14016   REM ************************
14018   REM
14020           CLS
14022           OVERRIDE = 0
14024           SCREEN 0,0,0,0
14026           GOSUB 14550         ' PRINT ACCT. INFO
14028   REM
14030   REM ****************************************
14032   REM HAS A KEY BEEN PRESSED ?
14034   REM ****************************************
14036   REM
14038           A$ = INKEY$ : IF A$ = "" THEN 14092
14040           SCREEN 0,0,0,0
14042           TEMP = LEN(A$)
14044           IF TEMP = 1 THEN 14048
14046           BEEP : GOTO 14092
14048           KEYNUM = ASC(A$)
14050           IF KEYNUM = 13 THEN 14062           ' RETURN KEY
14052           IF KEYNUM = 27 THEN 14064           ' ESC KEY
14054           IF KEYNUM < 49 THEN 14060
14056           IF KEYNUM > 56 THEN 14060
14058           GOTO 14072
14060           BEEP : GOTO 14092
14062           RETURN      ' RETURN TO CALLING PROGRAM
14064           OVERRIDE = 0
14066           LOCATE 1,1,0 : TEMP$ = SPACE$(80)
14068           PRINT TEMP$         ' CLEARS THE TOP LINE OF PRINT
14070           GOTO 14092
14072           OVERRIDE = KEYNUM - 48
14074           LOCATE 1,1,0
14076           PRINT" OVERRIDE = "OVERRIDE
14078           OVERSET = ( 8 - OVERRIDE ) * 32
14080           GOTO 14092
14082   REM
14084   REM **************************
14086   REM READ THE LASER STATUS PORT
14088   REM **************************
14090   REM
14092           IPORT11 = IPORT11 AND NOT BIT2
14094           OUT PORT11,IPORT11       ' RESET STATUS FLIP-FLOPS
14096           IPORT11 = IPORT11 OR BIT2
14098           OUT PORT11,IPORT11
14100           FOR I = 1 TO 100         ' DELAY FOR STATUS UPDATE
14102           NEXT I
14104           TEMP = INP( PORT8 )
14106   REM
14108   REM ****************************
14110   REM IS THE LASER ENABLED ?
14112   REM ****************************************
14114   REM
14116           TEMP1 = TEMP AND BIT3
14118           IF TEMP1 = 0 THEN 14234  ' ZERO IS ACTIVE STATE
14120   REM
14122   REM ****************************************
14124   REM IS SERVICE REQUIRED ?
14126   REM *****************************************8
14128   REM
14130           TEMP1 = TEMP AND BIT4
14132           IF TEMP > 0 THEN 14150
```

```
14134              SCREEN,,2,2 : LOCATE 12,30
14136              PRINT " LASER IS IN SERVICE REQUIRED MODE "
14138              GOTO 14038
14140    REM
14142    REM ************************************
14144    REM IS LASER IN THE STANDBY MODE ?
14146    REM ************************************
14148    REM
14150              TEMP1 = TEMP AND BIT2
14152              IF TEMP1 = 0 THEN 14190
14154              SCREEN ,,1,1 : LOCATE 11,20
14156              PRINT " THE LASER IS NOT ENABLED "
14158              LOCATE 12,20
14160              PRINT"---------------------------"
14162              LOCATE 14,10
14164              PRINT " CHECK THE POSSIBLE CAUSES THAT ARE LISTED BELOW :"
14166              LOCATE 16,10
14168              PRINT " 1. THE LASER POWER IS NOT TURNED ON "
14170              LOCATE 18,10
14172              PRINT " 2. THE LASER KEY HAS NOT BEEN TURNED ON "
14174              LOCATE 20,10
14176              PRINT " 3. THE LASER IS WARMING UP ( WARM-UP LIGHT FLASHING )"
14178              GOTO 14038
14180    REM
14182    REM **************************************************
14184    REM IS THERE A PACKAGE COMING ?
14186    REM **************************************************
14188    REM
14190              TEMP1 = TEMP AND BIT6
14192              IF TEMP1 = 0 THEN 14210   ' ZERO IS ACTIVE STATE
14194              SCREEN 0,0,0,0
14196              GOSUB 14550       ' PRINT ACCT. INFO
14198              GOTO 14038
14200    REM
14202    REM **************************************************
14204    REM ISSUE A LASER ON PULSE AND THEN PRINT "READY TO FIRE"
14206    REM **************************************************
14208    REM
14210              IPORT11 = IPORT11 AND NOT BIT0
14212              OUT PORT11,IPORT11
14214              IPORT11 = IPORT11 OR BIT0
14216              OUT PORT11,IPORT11
14218              SCREEN 0,0,0,0
14220              GOSUB 14550       ' PRINT ACCT. INFO
14222              GOTO 14038
14224    REM
14226    REM **************************************************
14228    REM IS THERE A PACKAGE PRESENT ?
14230    REM **************************************************
14232    REM
14234              TEMP1 = TEMP AND BIT0
14236              IF TEMP1 > 0 THEN GOTO 14038     ' ZERO IS ACTIVE STATE
14238    REM
14240    REM **************************************************
14242    REM LOAD FIRST SPACECNT INTO TIMER 0 ( LSB FIRST )
14244    REM **************************************************
14246    REM
14248              IPORT12 = IPORT12 AND NOT ( BIT6 OR BIT7 ) OR BIT5
14250              OUT PORT12,IPORT12   ' SET A0 AND A1 TO ZERO, GATE0 TO ONE
14252              OUT PORT15,SPACNTLO%( 1 )     ' LOAD LSB
14254              OUT PORT15,SPACNTHI%( 1 )     ' LOAD MSB
14256    REM
14258    REM **************************************
14260    REM HAS SPACE TIMER TIMED OUT ?
14262    REM **************************************
14264    REM
14266              TEMP = INP( PORT9 )
14268              TEMP = TEMP AND BIT2
14270              IF TEMP > 0 THEN 14266
14272    REM
```

```
14274    REM ********************************************
14276    REM SET LOOP FOR NUMBER OF SHOTS
14278    REM ********************************************
14280    REM
14282              SCREEN 0,0,0,0 : LOCATE 5,1
14284              FOR I = 2 TO (NUMSHOTS + 1)
14286    REM
14288    REM ********************************************
14290    REM FETCH THE BEST GUESS DATA ( CHECK THE ERROR BIT )
14292    REM ********************************************
14294    REM
14296              BGUESS% = INP(PORT9)
14298              BGUESS% = BGUESS% AND ( BIT3 OR BIT4 OR BIT5 OR BIT6 )
14300              BGUESS% = ( BGUESS% ) \ 8         ' RIGHT SHIFT 3 PLACES
14302              IF BGUESS% < 8   THEN 14308
14304              BEEP : PRINT"COMPARATOR ERROR";
14306              BGUESS% = 0        ' FULL POWER
14308              BGUESS% = 8 - BGUESS%   ' REMAP THE VALUE
14310              PRINT " B";BGUESS%;
14312    REM
14314    REM ********************************************
14316    REM ADD THE BEST GUESS INCREMENT TO BEST GUESS
14318    REM ********************************************
14320    REM
14322              BGUESS% = BGUESS% + BGINC%( I - 1 )
14324              IF BGUESS% < 8 THEN 14328
14326              BGUESS% = 8 : GOTO 14342
14328              IF BGUESS% > 1 THEN 14342
14330              BGUESS% = 1
14332    REM
14334    REM ********************************************
14336    REM LOAD THE NEXT POWER SETTING
14338    REM ********************************************
14340    REM
14342              PRINT "M";BGUESS%;
14344              BGUESS% =   8 - BGUESS%            ' REMAP THE VALUE
14346              BGUESS% = BGUESS% * 32  ' SHIFT LEFT 5 PLACES
14348              IPORT11 = IPORT11 AND NOT ( BIT5 OR BIT6 OR BIT7 )
14350              IF OVERRIDE = 0 THEN 14354
14352              IPORT11 = IPORT11 OR OVERSET : GOTO 14356
14354              IPORT11 = IPORT11 OR BGUESS%
14356              OUT PORT11,IPORT11
14358    REM
14360    REM ********************************************
14362    REM  ENABLE THE FIRE FLIP-FLOP
14364    REM ********************************************
14366    REM
14368    REM
14370              IPORT11 = IPORT11 AND NOT BIT3
14372              OUT PORT11,IPORT11
14374              IPORT11 = IPORT11 OR BIT3
14376              OUT PORT11,IPORT11
14378    REM
14380    REM ********************************************
14382    REM HAS THE LASER FIRED ?
14384    REM ********************************************
14386    REM
14388              TEMP = INP( PORT8 )
14390              TEMP = TEMP AND BIT5
14392              IF TEMP = 0 THEN 14388
14394    REM
14396    REM ********************************************
14398    REM DELAY APPROX. 5 MILLI-SECONDS
14400    REM ********************************************
14402    REM
14404              OUT PORT15,5
14406              OUT PORT15,0
14408              TEMP = INP( PORT9 )
14410              TEMP = TEMP AND BIT2
14412              IF TEMP > 0 THEN 14408
```

```
14414        REM
14416        REM *******************************
14418        REM LOAD THE NEXT SPACE CNT ( LSB FIRST )
14420        REM *******************************
14422        REM
14424                OUT PORT15,SPACNTLO%( I )
14426                OUT PORT15,SPACNTHI%( I )
14428        REM
14430        REM ****************************
14432        REM WAS IT A GOOD SHOT ?
14434        REM ****************************
14436        REM
14438                TEMP = INP( PORT9 )
14440                TEMP1 = TEMP AND BIT1
14442                IF TEMP1 = 0 THEN 14456
14444                GOTO 14494
14446        REM
14448        REM ******************************
14450        REM WAS IT A BAD SHOT ?
14452        REM ******************************
14454        REM
14456                TEMP1 = TEMP AND BIT0
14458                IF TEMP1 = 0 THEN 14478
14460                BEEP
14462                SCREEN 0,0,0,0 : LOCATE 1,60
14464                PRINT "BAD SHOT     "
14466                GOTO 14494
14468        REM
14470        REM ******************************
14472        REM BEEP AND PRINT MISFIRE
14474        REM ******************************
14476        REM
14478                BEEP
14480                SCREEN 0,0,0,0 : LOCATE 1,60
14482                PRINT "MISFIRE    "
14484        REM
14486        REM ******************************
14488        REM HAVE ALL THREE SIGNALS TIMED OUT ?
14490        REM ******************************
14492        REM
14494                TEMP = INP( PORT9 )
14496                TEMP = TEMP AND ( BIT0 OR BIT1 OR BIT2 )
14498                IF TEMP = 0 THEN 14528
14500        REM
14502        REM ******************************
14504        REM IS A PACKAGE STILL PRESENT ?
14506        REM ******************************
14508        REM
14510                TEMP = INP( PORT8 )
14512                TEMP = TEMP AND BIT0
14514                IF TEMP = 0 THEN 14494
14516                GOTO 14038
14518        REM
14520        REM ******************************
14522        REM HAVE NUMSHOTS ALL BEEN FIRED ?
14524        REM ******************************
14526        REM
14528                NEXT I
14530        REM
14532        REM ******************************
14534        REM IS THE PACKAGE STILL PRESENT ?
14536        REM ******************************
14538        REM
14540                TEMP = INP( PORT8 )
14542                TEMP = TEMP AND BIT0
14544                IF TEMP = 0 THEN 14540
14546                GOTO 14038
14548        REM
14550        REM ****************************
14552        REM THIS INTERNAL SUBROUTINE PRINTS THE ACCT. INFO
14554        REM ****************************
```

```
14556       REM
14558           LOCATE 12,30,0
14560           PRINT "ACCOUNT BEING CODED"
14562           LOCATE 13,30,0
14564           PRINT "-------------------"
14566           LOCATE 15,15
14568           PRINT "NAME : "NA$
14570           LOCATE 17,15
14572           PRINT "DOOR : "DR$
14574           LOCATE 19,15
14576           PRINT "CODE : "MC$
14578           RETURN
```

© 1986 Estee Lauder Inc.
As an unpublished work
All rights reserved

Appendix D

ANYCODE.BAS

```
1000    REM ******************** ANYCODE.BAS ******************************
1010    REM
1020    REM ***************************************************************
1030    REM THIS PROGRAM IS USED TO PUT ANY CODE ON THE BOXES
1040    REM ***************************************************************
1050    REM
1060    REM ***********************************
1070    REM EQUATE STATEMENTS
1080    REM ***********************************
1090    REM
1100            PORT0 = &H300
1110            PORT1 = &H301
1120            PORT2 = &H302
1130            HSLIDE = &H303
1140            PORT4 = &H304
1150            PORT5 = &H305
1160            PORT6 = &H306
1170            PORT7 = &H307
1180            PORT8 = &H308
1190            PORT9 = &H309
1200            PORT10 = &H30A
1210            PORT11 = &H30B
1220            PORT12 = &H30C
1230            PORT13 = &H30D
1240            PORT14 = &H30E
1250            PORT15 = &H30F
1260            BIT0 = 1
1270            BIT1 = 2
1280            BIT2 = 4
1290            BIT3 = 8
1300            BIT4 = 16
1310            BIT5 = 32
1320            BIT6 = 64
1330            BIT7 = 128
1340    REM
1350    REM ***********************************
1360    REM DIMENSION STATEMENTS
1370    REM ***********************************
1380    REM
1390            OPTION BASE 1
1400            DIM SETTING%(25),SPACING(25),SPACECNT%(25)
1410            DIM SPACNTLO%(25),SPACNTHI%(25),BGINC%(25),P$(10)
1420    REM
1430    REM ***********************************
1440    REM INITIALIZE THE OUTPUT PORTS
1450    REM ***********************************
1460    REM
1470            IPORT11 = &HFF
1480            OUT PORT11,IPORT11
1490            IPORT12 = &HFF
```

```
1500                OUT PORT12,IPORT12
1510     REM
1520     REM ******************************
1530     REM INITIALIZE TIMER 0 FOR MODE 0
1540     REM ******************************
1550     REM
1560                IPORT12 = IPORT12 OR ( BIT6 OR BIT7 )
1570                OUT PORT12,IPORT12        ' SET A0 AND A1 TO ONES
1580                OUT PORT15,%H30 ' MODE 0
1590                IPORT12 = IPORT12 AND NOT ( BIT6 OR BIT7 )
1600                OUT PORT12,IPORT12        ' SET A0 AND A1 TO ZEROS
1610     REM
1870     REM *****************************************
1880     REM TEST WHEEL SPEED - 1350 RPM IS MINIMUM
1890     REM *****************************************
1900     REM
1910                GOSUB 49000
1920     REM
1930     REM *****************************************
1940     REM TEST HOLE POSITIONS
1950     REM *****************************************
1960     REM
1970                GOSUB 31000
1980     REM
2050     REM ****************************************************************
2060     REM THIS PARAGRAPH DISPLAYS THE MAIN MENU OPTIONS
2070     REM ****************************************************************
2080     REM
2090                CLS
2100                GOSUB 2420
2110                A$ = INKEY$ : IF A$ = "" THEN 2110
2120                TEMP = LEN(A$) : IF TEMP = 2 GOTO 2150
2130                TEMP = ASC(A$) : IF TEMP = 13 GOTO 2360  ' EXIT PROGRAM
2140                BEEP : GOTO 2110
2150                A$ = RIGHT$(A$,1)
2160                IF A$ = "P" THEN 2190
2170                IF A$ = "H" THEN 2270
2180                BEEP : GOTO 2110
2190                GOSUB 2470
2200                A$ = INKEY$ : IF A$ = "" THEN 2200
2210                TEMP = LEN(A$) : IF TEMP = 2 GOTO 2230
2220                TEMP = ASC(A$) : IF TEMP = 13 GOTO 2690  ' ANY CODE
2230                A$ = RIGHT$(A$,1)
2240                IF A$ = "P" THEN 2270
2250                IF A$ = "H" THEN 2100
2260                BEEP : GOTO 2200
2270                GOSUB 2520
2280                A$ = INKEY$ : IF A$ = "" THEN 2280
2290                TEMP = LEN(A$) : IF TEMP = 2 THEN 2310
2300                TEMP = ASC(A$) : IF TEMP = 13 THEN 2620  ' TEST PATTERN
2310                A$ = RIGHT$(A$,1)
2320                IF A$ = "P" THEN 2100
2330                IF A$ = "H" THEN 2190
2340                BEEP : GOTO 2280
2350                BEEP : GOTO 2190
2360                END       ' EXIT THIS PROGRAM
2370     REM
2380     REM ****************************************
2390     REM INTERNAL SUBROUTINES START HERE
2400     REM ****************************************
2410     REM
2420                LOCATE 12,1
2430                PRINT"          [X]         EXIT THIS PROGRAM
2440                PRINT"          [ ]         ANY CODE
2450                PRINT"          [ ]         MAKE A TEST MARK
2460                RETURN
2470                LOCATE 12,1
2480                PRINT"          [ ]         EXIT THIS PROGRAM
2490                PRINT"          [X]         ANY CODE
2500                PRINT"          [ ]         MAKE A TEST MARK
```

```
2510            RETURN
2520            LOCATE 12,1
2530            PRINT"           [ ]         EXIT THIS PROGRAM
2540            PRINT"           [ ]         ANY CODE
2550            PRINT"           [X]         MAKE A TEST MARK
2560            RETURN
2570    REM
2580    REM ********************************
2590    REM MAKE A TEST MARK
2600    REM ********************************
2610    REM
2620            GOSUB 18000
2630            GOTO 2090         ' RETURN TO MAIN MENU
2640    REM
2650    REM ******************************
2660    REM SELECT A CODING OPTION
2670    REM ******************************
2680    REM
2690            GOSUB 25000       ' DISPLAY SEQUENCE TYPES
2700    REM
2710    REM ********************************
2720    REM SELECT A SEQUENCE NUMBER
2730    REM ********************************
2740    REM
2750            CLS
2751            LOCATE 12,20
2752            INPUT "ENTER THE SEQUENCE NUMBER ==> ",SEQNUM$
2753            CLS
2754            GOSUB 15000       ' READ IN THE SEQUENCE VALUES
2760    REM
2770    REM ************************************
2780    REM CHECK BELT SPEED AGAINST THE SEQUENCE MAXIMUM
2790    REM ************************************
2800    REM
2810            GOSUB 17000
2811    REM
2812    REM ****************************
2813    REM RELOAD THE SEQUENCE DATA ( JUST IN CASE BELT SPEED IS DIFFERANT )
2814    REM ****************************
2815    REM
2816            GOSUB 15000
2817    REM
2890    REM ****************************
2900    REM ENTER A FIVE DIGIT CODE
2910    REM ****************************
2920    REM
2930            CLS : LOCATE 12,20
2940            INPUT " ENTER A FIVE DIGIT CODE ==> ",A$
2950            TEMP = LEN(A$)
2960            IF TEMP = 5 THEN 2985
2970            IF TEMP = 0 THEN  2090
2980            BEEP : GOTO 2930
2985            MC$ = A$
2990            NA$ = "ANYCODE"
2995            GOTO 3460
3410    REM
3420    REM ****************************
3430    REM SET THE SLIDES
3440    REM ****************************
3450    REM
3460            CLS : LOCATE 12,20
3470            PRINT "SETTING MATRIX CODE - WAIT TEN SECONDS"
3480            GOSUB 11000       ' SET THE SLIDES
3490    REM
3500    REM ******************************
3510    REM EXAMINE PREVIOUSLY SELECTED CODING OPTION
3520    REM ******************************
3530    REM
3540            IF CODEOP$ = "SENSOR" THEN 3670
3550    REM
```

```
3560    REM ********************************
3570    REM COMPUTER CONTROL WAS SELECTED
3580    REM ********************************
3590    REM
3600            GOSUB 13000      ' MARK USING COMPUTER CONTROL
3610            GOTO 2930
3620    REM
3630    REM ********************************
3640    REM SENSOR CONTROL WAS SELECTED
3650    REM ********************************
3660    REM
3670            GOSUB 14000      ' MARK USING SENSOR CONTROL
3680            GOTO 2930
3690    REM
3700    REM ********************************
3710    REM INCLUDE THE SUBROUTINES
3720    REM ********************************
3730    REM
10999   REM $INCLUDE:'CBSU11V0.BAS'    ' SET THE SLIDES
11999   REM $INCLUDE:'CBSU12V0.BAS'    ' COMPUTE BELT SPEED
12999   REM $INCLUDE:'CBSU13V0.BAS'    ' MARK USING COMPUTER CONTROL
13999   REM $INCLUDE:'CBSU14V0.BAS'    ' MARK USING SENSOR CONTROL
14999   REM $INCLUDE:'CBSU15V0.BAS'    ' SELECT SEQUENCE
16999   REM $INCLUDE:'CBSU17V0.BAS'    ' CHECK BELT SPEED
17999   REM $INCLUDE:'CBSU18V0.BAS'    ' MAKE A TEST MARK
24999   REM $INCLUDE:'CBSU25V0.BAS'    ' DISPLAY SEQUENCE TYPES
30999   REM $INCLUDE:'CBSU31V0.BAS'    ' TEST WHEEL OPENINGS
48999   REM $INCLUDE:'CBSU49V0.BAS'    ' TEST WHEEL SPEED
60000   END
```

CANCEL.BAS

```
1000    REM ******************** CANCEL.BAS ********************************
1010    REM
1020    REM **************************************************************
1030    REM THIS PROGRAM IS USED TO PUT A CANCEL CODE ON THE BOXES
1035    REM THE CANCEL CODE IS 99999
1040    REM **************************************************************
1050    REM
1060    REM ********************************
1070    REM EQUATE STATEMENTS
1080    REM ********************************
1090    REM
1100            PORT0  = &H300
1110            PORT1  = &H301
1120            PORT2  = &H302
1130            HSLIDE = &H303
1140            PORT4  = &H304
1150            PORT5  = &H305
1160            PORT6  = &H306
1170            PORT7  = &H307
1180            PORT8  = &H308
1190            PORT9  = &H309
1200            PORT10 = &H30A
1210            PORT11 = &H30B
1220            PORT12 = &H30C
1230            PORT13 = &H30D
1240            PORT14 = &H30E
1250            PORT15 = &H30F
1260            BIT0 = 1
1270            BIT1 = 2
1280            BIT2 = 4
1290            BIT3 = 8
1300            BIT4 = 16
1310            BIT5 = 32
1320            BIT6 = 64
1330            BIT7 = 128
1340    REM
1350    REM ********************************
1360    REM DIMENSION STATEMENTS
1370    REM ********************************
```

```
1380    REM
1390            OPTION BASE 1
1400            DIM SETTING%(25),SPACING(25),SPACECNT%(25)
1410            DIM SPACNTLO%(25),SPACNTHI%(25),BGINC%(25),P$(10)
1420    REM
1430    REM *******************************
1440    REM INITIALIZE THE OUTPUT PORTS
1450    REM *******************************
1460    REM
1470            IPORT11 = &HFF
1480            OUT PORT11,IPORT11
1490            IPORT12 = &HFF
1500            OUT PORT12,IPORT12
1510    REM
1520    REM *******************************
1530    REM INITIALIZE TIMER 0 FOR MODE 0
1540    REM *******************************
1550    REM
1560            IPORT12 = IPORT12 OR ( BIT6 OR BIT7 )
1570            OUT PORT12,IPORT12         ' SET A0 AND A1 TO ONES
1580            OUT PORT15,&H30 ' MODE 0
1590            IPORT12 = IPORT12 AND NOT ( BIT6 OR BIT7 )
1600            OUT PORT12,IPORT12         ' SET A0 AND A1 TO ZEROS
1610    REM
1870    REM ************************************
1880    REM TEST WHEEL SPEED - 1350 RPM IS MINIMUM
1890    REM ************************************
1900    REM
1910            GOSUB 49000
1920    REM
1930    REM ************************************
1940    REM TEST HOLE POSITIONS
1950    REM ************************************
1960    REM
1970            GOSUB 31000
1980    REM
1990    REM *************************
2000    REM TEST THE SLIDES
2010    REM *************************
2020    REM
2030            GOSUB 30000
2040    REM
2050    REM ********************************************************************
2060    REM THIS PARAGRAPH DISPLAYS THE MAIN MENU OPTIONS
2070    REM ********************************************************************
2080    REM
2090            CLS
2100            GOSUB 2420
2110            A$ = INKEY$ : IF A$ = "" THEN 2110
2120            TEMP = LEN(A$) : IF TEMP = 2 GOTO 2150
2130            TEMP = ASC(A$) : IF TEMP = 13 GOTO 2360 ' EXIT PROGRAM
2140            BEEP : GOTO 2110
2150            A$ = RIGHT$(A$,1)
2160            IF A$ = "P" THEN 2190
2170            IF A$ = "H" THEN 2270
2180            BEEP : GOTO 2110
2190            GOSUB 2470
2200            A$ = INKEY$ : IF A$ = "" THEN 2200
2210            TEMP = LEN(A$) : IF TEMP = 2 GOTO 2230
2220            TEMP = ASC(A$) : IF TEMP = 13 GOTO 2690 ' CANCEL CODE
2230            A$ = RIGHT$(A$,1)
2240            IF A$ = "P" THEN 2270
2250            IF A$ = "H" THEN 2100
2260            BEEP : GOTO 2200
2270            GOSUB 2520
2280            A$ = INKEY$ : IF A$ = "" THEN 2280
2290            TEMP = LEN(A$) : IF TEMP = 2 THEN 2310
2300            TEMP = ASC(A$) : IF TEMP = 13 THEN 2620 ' TEST PATTERN
2310            A$ = RIGHT$(A$,1)
2320            IF A$ = "P" THEN 2100
```

```
2330            IF A$ = "H" THEN 2190
2340            BEEP : GOTO 2280
2350            BEEP : GOTO 2190
2360            END         ' EXIT THIS PROGRAM
2370    REM
2380    REM ****************************
2390    REM INTERNAL SUBROUTINES START HERE
2400    REM ****************************
2410    REM
2420            LOCATE 12,1
2430            PRINT"       [X]        EXIT THIS PROGRAM
2440            PRINT"       [ ]        CANCEL CODE
2450            PRINT"       [ ]        MAKE A TEST MARK
2460            RETURN
2470            LOCATE 12,1
2480            PRINT"       [ ]        EXIT THIS PROGRAM
2490            PRINT"       [X]        CANCEL CODE
2500            PRINT"       [ ]        MAKE A TEST MARK
2510            RETURN
2520            LOCATE 12,1
2530            PRINT"       [ ]        EXIT THIS PROGRAM
2540            PRINT"       [ ]        CANCEL CODE
2550            PRINT"       [X]        MAKE A TEST MARK
2560            RETURN
2570    REM
2580    REM ****************************
2590    REM MAKE A TEST MARK
2600    REM ****************************
2610    REM
2620            GOSUB 18000
2630            GOTO 2090      ' RETURN TO MAIN MENU
2640    REM
2650    REM ****************************
2660    REM SELECT A CODING OPTION
2670    REM ****************************
2680    REM
2690            GOSUB 25000    ' DISPLAY SEQUENCE TYPES
2700    REM
2710    REM ****************************
2720    REM SELECT A SEQUENCE NUMBER
2730    REM ****************************
2740    REM
2750            CLS
2751            LOCATE 12,20
2752            INPUT "ENTER THE SEQUENCE NUMBER ==> ",SEQNUM$
2753            CLS
2754            GOSUB 15000    ' READ IN THE SEQUENCE VALUES
2760    REM
2770    REM ****************************
2780    REM CHECK BELT SPEED AGAINST THE SEQUENCE MAXIMUM
2790    REM ****************************
2800    REM
2810            GOSUB 17000
2811    REM
2812    REM ****************************
2813    REM RELOAD THE SEQUENCE DATA ( JUST IN CASE BELT SPEED IS DIFFERANT )
2814    REM ****************************
2815    REM
2816            GOSUB 15000
2817    REM
2890    REM ****************************
2900    REM SET IN THE CANCEL CODE - 99999
2910    REM ****************************
2920    REM
2980            CLS
2985            MC$ = "99999"
2990            NA$ = "CANCEL CODE"
2995            GOTO 3460
3410    REM
3420    REM ****************************
3430    REM SET THE SLIDES
```

```
3440    REM ******************************
3450    REM
3460            CLS : LOCATE 12,20
3470            PRINT "SETTING MATRIX CODE - WAIT TEN SECONDS"
3480            GOSUB 11000      ' SET THE SLIDES
3490    REM
3500    REM ******************************
3510    REM EXAMINE PREVIOUSLY SELECTED CODING OPTION
3520    REM ******************************
3530    REM
3540            IF CODEOP$ = "SENSOR" THEN 3670
3550    REM
3560    REM ******************************
3570    REM COMPUTER CONTROL WAS SELECTED
3580    REM ******************************
3590    REM
3600            GOSUB 13000      ' MARK USING COMPUTER CONTROL
3610            GOTO 2090
3620    REM
3630    REM ******************************
3640    REM SENSOR CONTROL WAS SELECTED
3650    REM ******************************
3660    REM
3670            GOSUB 14000      ' MARK USING SENSOR CONTROL
3680            GOTO 2090
3690    REM
3700    REM ******************************
3710    REM INCLUDE THE SUBROUTINES
3720    REM ******************************
3730    REM
10999   REM $INCLUDE:'CBSU11V0.BAS'     ' SET THE SLIDES
11999   REM $INCLUDE:'CBSU12V0.BAS'     ' COMPUTE BELT SPEED
12999   REM $INCLUDE:'CBSU13V0.BAS'     ' MARK USING COMPUTER CONTROL
13999   REM $INCLUDE:'CBSU14V0.BAS'     ' MARK USING SENSOR CONTROL
14999   REM $INCLUDE:'CBSU15V0.BAS'     ' SELECT SEQUENCE
16999   REM $INCLUDE:'CBSU17V0.BAS'     ' CHECK BELT SPEED
17999   REM $INCLUDE:'CBSU18V0.BAS'     ' MAKE A TEST MARK
24999   REM $INCLUDE:'CBSU25V0.BAS'     ' DISPLAY SEQUENCE TYPES
29999   REM $INCLUDE:'CBSU30V0.BAS'     ' TEST MATRIX SLIDES
30999   REM $INCLUDE:'CBSU31V0.BAS'     ' TEST WHEEL OPENINGS
48999   REM $INCLUDE:'CBSU49V0.BAS'     ' TEST WHEEL SPEED
60000   END
```

CBSU10V0.BAS

```
10000   REM ****************** CBSU10V0.BAS **************************
10005   REM
10010   REM ***********************************************************
10015   REM THIS SUBROUTINE DISPLAYS THE ACCOUNT INFORMATION
10020   REM ***********************************************************
10025   REM
10030   REM ****************************
10035   REM DISPLAY THE 5 VARIABLE DOTS
10040   REM ****************************
10045   REM
10050           MATCODE$ = MC$
10055           TEMP$ = MATCODE$
10060           GOSUB 10280
10065           DIGIT$ = MID$(TEMP$,1,1)
10070           DIGIT = ASC(DIGIT$) - 48
10075           CIRCLE ( 336 + 32*DIGIT,21),5
10080           DIGIT$ = MID$(TEMP$,2,1)
10085           DIGIT = ASC(DIGIT$) - 48
10090           CIRCLE ( 336 + 32*DIGIT,35),5
10095           DIGIT$ = MID$(TEMP$,3,1)
10100           DIGIT = ASC(DIGIT$) - 48
10105           CIRCLE ( 336 + 32*DIGIT,49),5
10110           DIGIT$ = MID$(TEMP$,4,1)
10115           DIGIT = ASC(DIGIT$) - 48
10120           CIRCLE ( 336 + 32*DIGIT,63),5
10125           DIGIT$ = MID$(TEMP$,5,1)
```

```
10130            DIGIT = ASC(DIGIT$) -48
10135            CIRCLE ( 336 + 32*DIGIT,77),5
10140    REM
10145    REM *****************************
10150    REM DISPLAY THE ACCOUNT DATA
10155    REM *****************************
10160    REM
10165            LOCATE 1,1
10170            PRINT "ACCT. NUMBER : ";AN$
10175            LOCATE 5,1
10180            PRINT "MATRIX CODE NUMBER : ";MATCODE$
10185            LOCATE 9,1
10190            PRINT "STATUS : MADE ACTIVE ";
10195            PRINT USING "\         \";AD$
10200            LOCATE 11,1
10205            IF ST$ = "A" THEN 10210 ELSE 10215
10210            PRINT "          STILL ACTIVE" : GOTO 10225
10215            PRINT "          MADE INACTIVE ";
10220            PRINT USING "\         \";DD$;
10225            LOCATE 17,1
10230            PRINT "NAME : ";NA$
10235            LOCATE 19,1
10240            PRINT "DOOR : ";DR$
10245            RETURN
10250    REM
10255    REM *****************************
10260    REM THIS INTERNAL SUBROUTINE DRAWS THE MATRIX ON THE SCREEN INCLUDING
10265    REM THE THREE FIXED DOTS ( THESE DOTS ARE FILLED IN )
10270    REM *****************************
10275    REM
10280            CLS
10285            SCREEN 2
10290            LINE (320,0)-(639,0)
10295            LINE (320,14)-(639,14)
10300            LINE (320,28)-(639,28)
10305            LINE (320,42)-(639,42)
10310            LINE (320,56)-(639,56)
10315            LINE (320,70)-(639,70)
10320            LINE (320,84)-(639,84)
10325            LINE (320,98)-(639,98)
10330            LINE (320,0)-(320,98)
10335            LINE (352,0)-(352,98)
10340            LINE (384,0)-(384,98)
10345            LINE (416,0)-(416,98)
10350            LINE (448,0)-(448,98)
10355            LINE (480,0)-(480,98)
10360            LINE (512,0)-(512,98)
10365            LINE (544,0)-(544,98)
10370            LINE (576,0)-(576,98)
10375            LINE (608,0)-(608,98)
10380            LINE(639,0)-(639,98)
10385            CIRCLE ( 336,7),5 : PAINT (336,7)
10390            CIRCLE ( 624,7),5 : PAINT (624,7)
10395            CIRCLE ( 624,91),5 : PAINT (624,91)
10400            LOCATE 14,42,1
10405            PRINT " 0   1   2   3   4   5   6   7   8   9"
10410            LOCATE 3,34 : PRINT"MSD";
10415            LOCATE 10,34 : PRINT "LSD"
10420            RETURN
                                CBSU11V0.BAS

11000    REM ****************** CBSU11V0.BAS ************************
11002    REM
11004    REM **********************************************************
11006    REM THIS SUBROUTINE IS USED TO SET THE SLIDES TO THE 5-DIGIT CODE
11008    REM THAT HAS BEEN ENTERED FROM THE KEYBOARD
11010    REM **********************************************************
11012    REM
11014    REM *****************************
11016    REM INITIALIZATION CODE
```

```
11018   REM ****************************
11020   REM
11024           A$ = MC$
11026   REM
11028   REM ****************************
11030   REM CALCULATE THE STEPS FOR SLIDE 1
11032   REM ****************************
11034   REM
11036           B$ = MID$(A$,1,1)
11038           STEPS = 38 + 50 * ( ASC(B$) - 48 )
11040   REM
11042   REM ****************************
11044   REM MOVE THE SLIDE TO THE HOME POSITION - NO DELAY
11046   REM ****************************
11048   REM
11050           FOR I = 1 TO 600
11052           TEMP = INP( HSLIDE ) AND BIT0
11054           IF TEMP = 0 THEN 11076
11056           MSTEP = MSKPORT2 AND &HF
11058           GOSUB 11790
11060           MSKPORT2 = (MSKPORT2 AND &HF0 ) OR MSTEP
11062           OUT PORT2,MSKPORT2
11064           NEXT I
11066   REM
11068   REM ****************************
11070   REM MOVE THE SLIDE OUT 0.050 INCHES
11072   REM ****************************
11074   REM
11076           FOR I = 1 TO 25
11078           MSTEP = MSKPORT2 AND &HF
11080           GOSUB 11764       ' FIND THE NEXT NSTEP
11082           MSKPORT2 = ( MSKPORT2 AND &HF0 ) OR MSTEP
11084           OUT PORT2,MSKPORT2
11086           NEXT I
11088   REM
11090   REM ****************************
11092   REM TEST THE SENSOR - SHOULD BE A ONE
11094   REM ****************************
11096   REM
11098           TEMP = INP( HSLIDE ) AND BIT0
11100           IF TEMP = 0 THEN 11132
11102   REM
11104   REM ****************************
11106   REM MOVE SLIDE TO THE HOME POSITION - WITH DELAY
11108   REM ****************************
11110   REM
11112           FOR I = 1 TO 600
11114           TEMP = INP( HSLIDE ) AND BIT0
11116           IF TEMP = 0 THEN 11144
11118           MSTEP = MSKPORT2 AND &HF
11120           GOSUB 11790       ' FIND THE NEXT MSTEP
11122           MSKPORT2 = ( MSKPORT2 AND &HF0 ) OR MSTEP
11124           OUT PORT2,MSKPORT2
11126           FOR J = 1 TO 25
11128           NEXT J
11130           NEXT I
11132           CLS :PRINT "ERROR - SLIDE MOTOR1 " : BEEP : END
11134   REM
11136   REM ****************************
11138   REM MOVE THE SLIDE OUT TO THE NUMBER POSITION
11140   REM ****************************
11142   REM
11144           FOR I = 1 TO STEPS
11146           MSTEP = MSKPORT2 AND &HF
11148           GOSUB 11764
11150           MSKPORT2 = ( MSKPORT2 AND &HF0 ) OR MSTEP
11152           OUT PORT2,MSKPORT2
11154           NEXT I
11156   REM
11158   REM ****************************
```

```
11160    REM THE SENSOR SHOULD BE A ONE
11162    REM ****************************
11164    REM
11166            TEMP = INP( HSLIDE ) AND BITO
11168            IF TEMP = 0 THEN 11132
11170    REM
11172    REM
11174    REM ****************************
11176    REM CALCULATE THE STEPS FOR SLIDE2
11178    REM ****************************
11180    REM
11182            B$ = MID$(A$,2,1)
11184            STEPS = 491 - 50 * ( ASC(B$) - 48 )
11186    REM
11188    REM ****************************
11190    REM GO TO THE HOME POSITION - NO DELAY
11192    REM ****************************
11194    REM
11196            FOR I = 1 TO 600
11198            TEMP = INP( HSLIDE ) AND BIT3
11200            IF TEMP = 0 THEN 11222
11202            MSTEP = MSKPORTO AND &HF
11204            GOSUB 11790
11206            MSKPORTO = ( MSKPORTO AND &HFO ) OR MSTEP
11208            OUT PORTO,MSKPORTO
11210            NEXT I
11212    REM
11214    REM ****************************
11216    REM MOVE THE SLIDE OUT 0.050 INCHES
11218    REM ****************************
11220    REM
11222            FOR I = 1 TO 25
11224            MSTEP = MSKPORTO AND &HF
11226            GOSUB 11764      ' FIND THE NEXT NSTEP
11228            MSKPORTO = ( MSKPORTO AND &HFO ) OR MSTEP
11230            OUT PORTO,MSKPORTO
11232            NEXT I
11234    REM
11236    REM ****************************
11238    REM TEST THE SENSOR - SHOULD BE A ONE
11240    REM ****************************
11242    REM
11244            TEMP = INP( HSLIDE ) AND BIT3
11246            IF TEMP = 0 THEN 11278
11248    REM
11250    REM ****************************
11252    REM MOVE SLIDE TO THE HOME POSITION - WITH DELAY
11254    REM ****************************
11256    REM
11258            FOR I = 1 TO 600
11260            TEMP = INP( HSLIDE ) AND BIT3
11262            IF TEMP = 0 THEN 11290
11264            MSTEP = MSKPORTO AND &HF
11266            GOSUB 11790      ' FIND THE NEXT MSTEP
11268            MSKPORTO = ( MSKPORTO AND &HFO ) OR MSTEP
11270            OUT PORTO,MSKPORTO
11272            FOR J = 1 TO 25
11274            NEXT J
11276            NEXT I
11278            CLS : PRINT "ERROR - SLIDE MOTOR2 " : BEEP : END
11280    REM
11282    REM ****************************
11284    REM MOVE THE SLIDE OUT TO THE NUMBER POSITION
11286    REM ****************************
11288    REM
11290            FOR I = 1 TO STEPS
11292            MSTEP = MSKPORTO AND &HF
11294            GOSUB 11764
11296            MSKPORTO = ( MSKPORTO AND &HFO ) OR MSTEP
11298            OUT PORTO,MSKPORTO
11300            NEXT I
```

```
11302   REM
11304   REM ****************************
11306   REM TEST THE SENSOR SHOULD BE A ONE
11308   REM ****************************
11310   REM
11312           TEMP = INP( HSLIDE ) AND BIT3
11314           IF TEMP = 0 THEN 11278
11316   REM
11318   REM ******************************
11320   REM CALCULATE THE STEPS FOR SLIDE3
11322   REM ******************************
11324   REM
11326           B$ = MID$(A$,3,1)
11328           STEPS = 40 + 50 * ( ASC(B$) - 48 )
11330   REM
11332   REM ********************************
11334   REM MOVE SLIDE TO THE HOME POSITION - NO DELAY
11336   REM ********************************
11338   REM
11340           FOR I = 1 TO 600
11342           TEMP = INP( HSLIDE ) AND BIT1
11344           IF TEMP = 0 THEN 11366
11346           MSTEP = ( MSKPORT1 AND &HF0 )\16
11348           GOSUB 11790
11350           MSKPORT1 = ( MSKPORT1 AND &HF ) OR ( MSTEP * 16 )
11352           OUT PORT1,MSKPORT1
11354           NEXT I
11356   REM
11358   REM ***************************
11360   REM MOVE THE SLIDE OUT 0.050 INCHES
11362   REM ***************************
11364   REM
11366           FOR I = 1 TO 25
11368           MSTEP = ( MSKPORT1 AND &HF0 )\16
11370           GOSUB 11764       ' FIND THE NEXT NSTEP
11372           MSKPORT1 = ( MSKPORT1 AND &HF ) OR ( MSTEP * 16 )
11374           OUT PORT1,MSKPORT1
11376           NEXT I
11378   REM
11380   REM ***************************
11382   REM TEST THE SENSOR - SHOULD BE A ONE
11384   REM ***************************
11386   REM
11388           TEMP = INP( HSLIDE ) AND BIT1
11390           IF TEMP = 0 THEN 11422
11392   REM
11394   REM ***************************
11396   REM MOVE SLIDE TO THE HOME POSITION - WITH DELAY
11398   REM ***************************
11400   REM
11402           FOR I = 1 TO 600
11404           TEMP = INP( HSLIDE ) AND BIT1
11406           IF TEMP = 0 THEN 11434
11408           MSTEP = ( MSKPORT1 AND &HF0 )\16
11410           GOSUB 11790       ' FIND THE NEXT MSTEP
11412           MSKPORT1 = ( MSKPORT1 AND &HF ) OR ( MSTEP * 16 )
11414           OUT PORT1,MSKPORT1
11416           FOR J = 1 TO 25
11418           NEXT J
11420           NEXT I
11422           CLS : PRINT "ERROR - SLIDE MOTOR3 " : BEEP : END
11424   REM
11426   REM *******************************
11428   REM MOVE THE SLIDE TO THE NUMBER POSITION
11430   REM *******************************
11432   REM
11434           FOR I = 1 TO STEPS
11436           MSTEP = ( MSKPORT1 AND &HF0 )\16
11438           GOSUB 11764
11440           MSKPORT1 = ( MSKPORT1 AND &HF ) OR ( MSTEP * 16 )
```

```
11442             OUT PORT1,MSKPORT1
11444             NEXT I
11446   REM
11448   REM ******************************
11450   REM THE SENSOR SHOULD BE A ONE
11452   REM ******************************
11454   REM
11456             TEMP = INP( HSLIDE ) AND BIT1
11458             IF TEMP = 0 THEN 11422
11460   REM
11462   REM ***********************
11464   REM CALCULATE THE STEPS FOR SLIDE 4
11466   REM ***********************
11468   REM
11470             B$ = MID$(A$,4,1)
11472             STEPS = 486 - 50 * ( ASC(B$) - 48 )
11474   REM
11476   REM ***********************
11478   REM MOVE THE SLIDE TO THE HOME POSITION
11480   REM ***********************
11482   REM
11484             FOR I = 1 TO 600
11486             TEMP = INP( HSLIDE ) AND BIT4
11488             IF TEMP = 0 THEN 11510
11490             MSTEP = ( MSKPORTO AND &HF0 )\16
11492             GOSUB 11790
11494             MSKPORTO = ( MSKPORTO AND &HF ) OR ( MSTEP * 16 )
11496             OUT PORTO,MSKPORTO
11498             NEXT I
11500   REM
11502   REM ***************************
11504   REM MOVE THE SLIDE OUT 0.050 INCHES
11506   REM ***************************
11508   REM
11510             FOR I = 1 TO 25
11512             MSTEP = ( MSKPORTO AND &HF0 )\16
11514             GOSUB 11764       ' FIND THE NEXT NSTEP
11516             MSKPORTO = ( MSKPORTO AND &HF ) OR ( MSTEP * 16 )
11518             OUT PORTO,MSKPORTO
11520             NEXT I
11522   REM
11524   REM ****************************
11526   REM TEST THE SENSOR - SHOULD BE A ONE
11528   REM ****************************
11530   REM
11532             TEMP = INP( HSLIDE ) AND BIT4
11534             IF TEMP = 0 THEN 11566
11536   REM
11538   REM ****************************
11540   REM MOVE SLIDE TO THE HOME POSITION - WITH DELAY
11542   REM ****************************
11544   REM
11546             FOR I = 1 TO 600
11548             TEMP = INP( HSLIDE ) AND BIT4
11550             IF TEMP = 0 THEN 11578
11552             MSTEP = ( MSKPORTO AND &HF0 )\16
11554             GOSUB 11790       ' FIND THE NEXT MSTEP
11556             MSKPORTO = ( MSKPORTO AND &HF ) OR ( MSTEP * 16 )
11558             OUT PORTO,MSKPORTO
11560             FOR J = 1 TO 25
11562             NEXT J
11564             NEXT I
11566             CLS : PRINT "ERROR - SLIDE MOTOR4 " : BEEP : END
11568   REM
11570   REM ****************************
11572   REM MOVE THE SLIDE TO THE NUMBER POSITION
11574   REM ****************************
11576   REM
11578             FOR I = 1 TO STEPS
11580             MSTEP = ( MSKPORTO AND &HF0 )\16
```

```
11582             GOSUB 11764
11584             MSKPORT0 = ( MSKPORT0 AND &HF ) OR ( MSTEP * 16 )
11586             OUT PORT0,MSKPORT0
11588             NEXT I
11590   REM
11592   REM ******************************
11594   REM SENSOR SHOULD BE A ONE
11596   REM ******************************
11598   REM
11600             TEMP = INP( HSLIDE ) AND BIT4
11602             IF TEMP = 0 THEN 11566
11604   REM
11606   REM
11608   REM ******************************
11610   REM CALCULATE THE STEPS FOR SLIDE 5
11612   REM ******************************
11614   REM
11616             B$ = MID$(A$,5,1)
11618             STEPS = 41 + 50 * ( ASC(B$) - 48 )
11620   REM
11622   REM ******************************
11624   REM MOVE SLIDE TO HOME POSITION - NO DELAY
11626   REM ******************************
11628   REM
11630             FOR I = 1 TO 600
11632             TEMP = INP( HSLIDE ) AND BIT2
11634             IF TEMP = 0 THEN 11658
11636             MSTEP = MSKPORT1 AND &HF
11638             GOSUB 11790
11640             MSKPORT1 = ( MSKPORT1 AND &HF0 ) OR MSTEP
11642             OUT PORT1,MSKPORT1
11644             NEXT I
11646             TEMP = INP( HSLIDE )
11648   REM
11650   REM ******************************
11652   REM MOVE THE SLIDE OUT 0.050 INCHES
11654   REM ******************************
11656   REM
11658             FOR I = 1 TO 25
11660             MSTEP = MSKPORT1 AND &HF
11662             GOSUB 11764        ' FIND THE NEXT NSTEP
11664             MSKPORT1 = ( MSKPORT1 AND &HF0 ) OR MSTEP
11666             OUT PORT1,MSKPORT1
11668             NEXT I
11670   REM
11672   REM ******************************
11674   REM TEST THE SENSOR - SHOULD BE A ONE
11676   REM ******************************
11678   REM
11680             TEMP = INP( HSLIDE ) AND BIT2
11682             IF TEMP = 0 THEN 11714
11684   REM
11686   REM ******************************
11688   REM MOVE SLIDE TO THE HOME POSITION - WITH DELAY
11690   REM ******************************
11692   REM
11694             FOR I = 1 TO 600
11696             TEMP = INP( HSLIDE ) AND BIT2
11698             IF TEMP = 0 THEN 11726
11700             MSTEP = MSKPORT1 AND &HF
11702             GOSUB 11790        ' FIND THE NEXT MSTEP
11704             MSKPORT1 = ( MSKPORT1 AND &HF0 ) OR MSTEP
11706             OUT PORT1,MSKPORT1
11708             FOR J = 1 TO 25
11710             NEXT J
11712             NEXT I
11714             CLS : PRINT "ERROR - SLIDE MOTORS " : BEEP : END
11716   REM
11718   REM ******************************
11720   REM MOVE SLIDE OUT TO THE NUMBER POSITION
```

```
11722     REM *******************************
11724     REM
11726           FOR I = 1 TO STEPS
11728           MSTEP = MSKPORT1 AND &HF
11730           GOSUB 11764
11732           MSKPORT1 = ( MSKPORT1 AND &HF0 ) OR MSTEP
11734           OUT PORT1,MSKPORT1
11736           NEXT I
11738     REM
11740     REM *********************************
11742     REM THE SENSOR SHOULD BE A ONE
11744     REM *********************************
11746     REM
11748           TEMP = INP( HSLIDE ) AND BIT2
11750           IF TEMP = 0 THEN 11714
11752           RETURN
11754     REM
11756     REM *******************************
11758     REM THIS INTERNAL SUBROUTINE MOVES THE SLIDE AWAY FROM HOME
11760     REM *******************************
11762     REM
11764           IF MSTEP = 10 THEN 11766 ELSE 11768
11766           MSTEP = 9 : GOTO 11778
11768           IF MSTEP = 9 THEN 11770 ELSE 11772
11770           MSTEP = 5 : GOTO 11778
11772           IF MSTEP = 5 THEN 11774 ELSE 11776
11774           MSTEP = 6 : GOTO 11778
11776           MSTEP = 10
11778           FOR G = 1 TO 3 : NEXT G         ' DELAY
11779           RETURN
11780     REM
11782     REM *******************************
11784     REM THIS INTERNAL SUBROUTINE MOVES THE SLIDE TOWARDS HOME
11786     REM *******************************
11788     REM
11790           IF MSTEP = 6 THEN 11792 ELSE 11794
11792           MSTEP = 5 : GOTO 11804
11794           IF MSTEP = 5 THEN 11796 ELSE 11798
11796           MSTEP = 9 : GOTO 11804
11798           IF MSTEP = 9 THEN 11800 ELSE 11802
11800           MSTEP = 10 : GOTO 11804
11802           MSTEP = 6
11804           FOR G = 1 TO 3 : NEXT G         ' DELAY
11805           RETURN
                                CBSU12V0.BAS
12000     REM ****************** CBSU12V0.BAS ******************************
12005     REM
12010     REM ****************************************************************
12015     REM THIS SUBROUTINE CALCULATES THE CONVEYOR BELT SPEED IN
12020     REM TERMS OF COUNTS PER INCH ( WHERE ONE COUNT = 1.16 MILLI-SECONDS )
12025     REM ****************************************************************
12030     REM
12035     REM *********************************
12040     REM INITIALIZATION CODE
12045     REM *********************************
12050     REM
12055           PORT8  = &H308
12060           PORT12 = &H30C
12065           PORT14 = &H30E
12070           PORT15 = &H30F
12075           BIT5 = 32
12080           BIT6 = 64
12085           BIT7 = 128
12090           IPORT8  = &HFF
12095           IPORT12 = &HFF
12100           IPORT14 = &HFF
12105           IPORT15 = &HFF
12110     REM
12160     REM *********************************
12165     REM INITIALIZE TIMER 0 FOR MODE 0
```

```
12170   REM *************************************
12175   REM
12180           IPORT12 = IPORT12 OR ( BIT6 OR BIT7 )
12185           OUT PORT12,IPORT12        ' SET A0 AND A1 TO ONES
12190           OUT PORT15,&H30 ' MODE 0
12195           IPORT12 = IPORT12 AND NOT ( BIT6 OR BIT7 )
12200           OUT PORT12,IPORT12        ' SET A0 AND A1 TO ZEROS
12205   REM
12210   REM *************************************
12215   REM INHIBIT THE TIMER USING GATE 0
12220   REM *************************************
12225   REM
12230           IPORT12 = IPORT12 AND NOT BIT5
12235           OUT PORT12,IPORT12
12240   REM
12245   REM *************************************
12250   REM LOAD ONES INTO TIMER 0
12255   REM *************************************
12260   REM
12265           OUT PORT15,&HFF
12270           OUT PORT15,&HFF
12275   REM
12280   REM *************************************
12285   REM WAIT FOR BELT CLOCK TO GO LOW AND THEN HIGH
12290   REM *************************************
12295   REM
12300           TEMP = INP( PORT8 )
12305           TEMP = TEMP AND BIT7
12310           IF TEMP > 1 THEN 12300
12315           TEMP = INP( PORT8 )
12320           TEMP = TEMP AND BIT7
12325           IF TEMP = 0 THEN 12315
12330   REM
12335   REM *************************************
12340   REM ENABLE THE TIMER USING GATE 0
12345   REM *************************************
12350   REM
12355           IPORT12 = IPORT12 OR BIT5
12360           OUT PORT12,IPORT12
12365   REM
12370   REM *************************************
12375   REM WAIT FOR BELT CLOCK TO GO LOW AND THEN HIGH AGAIN
12380   REM *************************************
12385   REM
12390           TEMP = INP( PORT8 )
12395           TEMP = TEMP AND BIT7
12400           IF TEMP > 0 THEN 12390
12405           TEMP = INP( PORT8 )
12410           TEMP = TEMP AND BIT7
12415           IF TEMP = 0 THEN 12405
12420   REM
12425   REM *************************************
12430   REM INHIBIT THE TIMER USING GATE 0
12435   REM *************************************
12440   REM
12445           IPORT12 = IPORT12 AND NOT BIT5
12450           OUT PORT12,IPORT12
12455   REM
12460   REM *************************************
12465   REM READ OUT THE COUNT - LSB FIRST
12470   REM *************************************
12475   REM
12480           TEMPLO = INP( PORT14 )
12485           TEMPHI = INP( PORT14 )
12490           TEMPHI = TEMPHI * 256
12495           BELTCNT = TEMPHI + TEMPLO
12500           BELTCNT = 65535! - BELTCNT
12505   REM
12510   REM *************************************
12515   REM CALCULATE THE BELT SPEED IN COUNTS PER INCH
```

```
12520   REM *********************************************
12525   REM
12530                 BELTSPED = BELTCNT/10.1
12535   REM
12540   REM *********************************************
12545   REM PRINT OUT BELT SPEED IN FEET PER MINMUTE
12550   REM *********************************************
12555   REM
12560            BSPEED = 1164/BELTSPED   ' GIVES INCHES PER SECOND
12565            BSPEED% = BSPEED * 5!    ' GIVES FEET PER MINUTE
12580   REM
12585   REM *********************************************
12590   REM RETURN TO MAIN PROGRAM
12595   REM *********************************************
12600   REM
12615            RETURN
                                CBSU15V0.BAS

15000   REM ******************* CBSU15V0.BAS *******************************
15005   REM
15010   REM ****************************************************************
15015   REM THIS PROGRAM IS USED TO LOAD IN SEQUENCE DATA
15020   REM ****************************************************************
15025   REM
15030   REM *************************************
15035   REM EXAMINE THE CODING OPTION THAT WAS SELECTED
15040   REM *************************************
15045   REM
15050            IF CODEOP$ = "SENSOR" THEN 15370
15055   REM
15105   REM *************************************
15110   REM LOAD THE SEQUENCE DATA INTO THE ARRAYS
15115   REM *************************************
15120   REM
15125            OPEN "CCDATA" + SEQNUM$ FOR INPUT AS #1
15130            INPUT #1,NUMSHOTS,MAXSPEED
15135            FOR I = 1 TO NUMSHOTS
15140            INPUT #1,SETTING%(I)
15145            SETTING%(I) = ( SETTING%(I) - 8 ) * ( - 1 )    ' RE-MAPPING
15146            NEXT I
15150            FOR I = 1 TO NUMSHOTS
15155            INPUT #1,SPACING(I)
15160            NEXT I
15165            CLOSE #1
15170   REM
15175   REM *************************************
15180   REM CONVERT THE SPACING ( INCHES ) TO TIME ( MILLI-SECONDS )
15185   REM *************************************
15190   REM
15195            FOR I = 1 TO NUMSHOTS
15200            SPACECNT%( I ) = BELTSPED * SPACING( I )
15205            NEXT I
15210   REM
15215   REM *********************
15220   REM STRIP SPACING INTO LO BYTES AND HI BYTES
15225   REM *********************
15230   REM
15235            FOR I = 1 TO NUMSHOTS
15240            SPACNTLO%( I ) = SPACECNT%( I ) AND &HFF
15245            SPACNTHI%( I ) = ( SPACECNT%( I ) AND &HFF00 )\256
15250            NEXT I
15255   REM
15260   REM *************************************
15265   REM SHIFT SETTING DATA 5 PLACES
15270   REM *************************************
15275   REM
15280            FOR I = 1 TO NUMSHOTS
15285            SETTING%( I ) = 32 * SETTING%( I )
15290            NEXT I
15295            RETURN
```

```
15300   REM
15305   REM *****************************************
15310   REM SENSOR CONTROL
15315   REM *****************************************
15320   REM
15350   REM *****************************************
15355   REM LOAD THE SEQUENCE DATA INTO THE ARRAYS
15360   REM *****************************************
15365   REM
15370           OPEN "SCDATA" + SEQNUM$ FOR INPUT AS #1
15375           INPUT #1,NUMSHOTS,MAXSPEED
15380           FOR I = 1 TO NUMSHOTS
15385           INPUT #1,BGINC%(I)
15386           BGINC%(I) = BGINC%(I)
15390           NEXT I
15395           FOR I = 1 TO NUMSHOTS
15400           INPUT #1,SPACING(I)
15405           NEXT I
15410           CLOSE #1
15415   REM
15420   REM *****************************************
15425   REM CONVERT THE SPACING ( INCHES ) TO TIME ( MILLI-SECONDS )
15430   REM *****************************************
15435   REM
15440           FOR I = 1 TO NUMSHOTS
15445           SPACECNT%( I ) = BELTSPED * SPACING( I )
15450           NEXT I
15455   REM
15460   REM ***********************
15465   REM STRIP SPACING INTO LO BYTES AND HI BYTES
15470   REM ***********************
15475   REM
15480           FOR I = 1 TO NUMSHOTS
15485           SPACNTLO%( I ) = SPACECNT%( I ) AND &HFF
15490           SPACNTHI%( I ) = ( SPACECNT%( I ) AND &HFF00 )\256
15495           NEXT I
15500   REM
15505   REM ******************************
15510   REM LOAD THE DAC VALUE
15515   REM ******************************
15520   REM
15525           OPEN "CBCALDV0.BAS" FOR INPUT AS #1
15530           INPUT #1,DAC%
15535           CLOSE #1
15540           DAC% = (DAC% * 30)\20            'MULT. BY 1.5
15545           IF DAC% < 255 THEN 15555
15550           DAC% = 255
15555           OUT PORT13,DAC%
15560           RETURN
                                    CBSU17V0.BAS

17000   REM ******************** CBSU17V0.BAS ********************
17010   REM
17020   REM *********************************************************************
17030   REM THIS SUBROUTINE CHECKS THE BELT SPEED AGAINST THE SEQUENCE MAXIMUM
17040   REM *********************************************************************
17050   REM
17060   REM **********************
17070   REM CALCULATE THE BELT SPEED ( BSPEED% )
17080   REM **********************
17090   REM
17091           CLS
17092           LOCATE 10,20
17093           PRINT " MEASURING THE BELT SPEED "
17100           GOSUB 12000
17110   REM
17120   REM ****************************
17130   REM CHECK BELT SPEED AGAINST SEQUENCE NUMBER
17140   REM ****************************
17141   REM
```

```
17150              IF BSPEED% > MAXSPEED THEN 17210
17151              RETURN   ' RETURN TO CALLING PROGRAM
17160     REM
17170     REM ********************************
17180     REM DISPLAY THE REDUCE SPEED MESSAGE
17190     REM ********************************
17200     REM
17210              CLS : SCREEN 2 : LOCATE 10,20
17220              PRINT " REDUCE BELT SPEED BELOW "MAXSPEED
17230              LOCATE 10,60,0
17240              PRINT "FEET PER MINUTE"
17250              LOCATE 20,23
17260              PRINT " PRESS ANY KEY TO CONTINUE PROGRAM "
17270              LINE ( 100,105)-(540,125),1,B
17280              GOSUB 12000    ' CALCULATE BELT SPEED
17290              LOCATE 15,19
17300              PRINT " BELT SPEED ( FEET PER MINUTE ) = "BSPEED%
17310     REM
17320     REM ********************************
17330     REM WAIT FOR A KEY TO BE PRESSED
17340     REM ********************************
17350     REM
17360              A$ = INKEY$
17370              IF A$ = "" THEN 17280
17380              GOTO 17091

CBSU18V0.BAS

18000     REM *************** CBSU18V0.BAS *************************
18002     REM
18004     REM ******************************************************
18006     REM MAKE A TEST MARK
18008     REM ******************************************************
18010     REM
18012     REM ****************************
18014     REM INITIALIZATION CODE
18016     REM ****************************
18018     REM
18020     REM
18022     REM
18024     REM
18026     REM ****************************
18028     REM PRINT A MESSAGE TO THE OPERATOR
18030     REM ****************************
18032     REM
18034              CLS
18036              LOCATE 10,20
18038              PRINT "INSTRUCTIONS FOR TEST MARK"
18040              LOCATE 11,20
18042              PRINT "----------------------------"
18044              LOCATE 13,20
18046              PRINT "STEP1 - STOP THE CONVEYOR"
18048              LOCATE 15,20
18050              PRINT "STEP2 - PLACE TEST BOX OVER THE MARK POINT"
18052              LOCATE 17,20
18054              PRINT "STEP3 - HIT ANY KEY TO START THE MARKING PROCESS"
18056     REM
18058     REM ****************************
18060     REM WAIT FOR A KEY TO BE PRESSED
18062     REM ****************************
18064     REM
18066              A$ = INKEY$ : IF A$ = "" THEN 18066
18068     REM
18070     REM ****************************
18072     REM PRINT START OF TEST MESSAGE
18074     REM ****************************
18076     REM
18078              CLS : LOCATE 10,20
18080              PRINT " TEST IS IN PROGRESS - WAIT 30 SECONDS"
18082     REM
```

```
18084   REM *********************************
18086   REM ISSUE A LASER ON PULSE
18088   REM *********************************
18090   REM
18092          IPORT11 = IPORT11 AND NOT BITO
18094          OUT PORT11,IPORT11
18096          IPORT11 = IPORT11 OR BITO
18098          OUT PORT11,IPORT11
18100    REM
18102   REM *********************************
18104   REM SET THE SLIDES TO THE ALL ZEROS PATTERN
18106   REM *********************************
18108   REM
18110          MC$ = "00000"
18112          GOSUB 11000
18114          GOSUB 18186      ' FIRE THE LASER
18116   REM
18118   REM *********************************
18120   REM FIRE THE NEXT NINE COLUMNS
18122   REM *********************************
18124   REM
18126          FOR V = 1 TO 9
18128          GOSUB 18474      ' MOVE TO THE NEXT COLUMN
18130          GOSUB 18186      ' FIRE THE LASER
18132          NEXT V
18134   REM
18136   REM *********************************
18138   REM PRINT THE DONE MESSAGE
18140   REM *********************************
18142   REM
18144          CLS
18146          LOCATE 10,20
18148          PRINT "DONE"
18150          LOCATE 12,20
18152          PRINT " REMOVE THE TEST BOX AND START THE CONVEYOR"
18154          LOCATE 14,20
18156          PRINT " THEN PRESS ANY KEY TO CONTINUE THE PROGRAM"
18158          A$ = INKEY$
18160          IF A$ = "" THEN 18158
18162          RETURN
18164   REM
18166   REM *********************************
18168   REM *********************************
18170   REM THIS INTERNAL SUBROUTINE FIRES THE LASER
18172   REM *********************************
18174   REM *********************************
18176   REM
18178   REM *****************************
18180   REM READ THE LASER STATUS PORT
18182   REM *****************************
18184   REM
18186          IPORT11 = IPORT11 AND NOT BIT2
18188          OUT PORT11,IPORT11       ' RESET STATUS FLIP-FLOPS
18190          IPORT11 = IPORT11 OR BIT2
18192          OUT PORT11,IPORT11
18194          FOR I = 1 TO 100         ' DELAY FOR STATUS UPDATE
18196          NEXT I
18198          TEMP = INP( PORT8 )
18200   REM
18202   REM *****************************
18204   REM IS THE LASER ENABLED ?
18206   REM *********************************
18208   REM
18210          TEMP1 = TEMP AND BIT3
18212          IF TEMP1 = 0 THEN 18306  ' ZERO IS ACTIVE STATE
18214   REM
18216   REM *********************************
18218   REM IS SERVICE REQUIRED ?
18220   REM *********************************8
18222   REM
```

```
18224            TEMP1 = TEMP AND BIT4
18226            IF TEMP > 0 THEN 18244
18228            CLS : LOCATE 12,30
18230            PRINT " LASER IS IN SERVICE REQUIRED MODE "
18232            GOTO 18186
18234    REM
18236    REM ************************************
18238    REM IS LASER IN THE STANDBY MODE ?
18240    REM ************************************
18242    REM
18244            TEMP1 = TEMP AND BIT2
18246            IF TEMP1 = 0 THEN 18286
18248            LOCATE 11,20
18250            PRINT " THE LASER IS NOT ENABLED "
18252            LOCATE 12,20
18254            PRINT"-------------------------"
18256            LOCATE 14,10
18258            PRINT " CHECK THE POSSIBLE CAUSES THAT ARE LISTED BELOW :"
18260            LOCATE 16,10
18262            PRINT " 1. THE LASER POWER IS NOT TURNED ON "
18264            LOCATE 18,10
18266            PRINT " 2. THE LASER KEY HAS NOT BEEN TURNED ON "
18268            LOCATE 20,10
18270            PRINT " 3. THE LASER IS WARMING UP ( WARM-UP LIGHT FLASHING )"
18272            GOTO 18186
18274    REM
18276    REM
18278    REM *************************************************
18280    REM ISSUE A LASER ON PULSE
18282    REM *************************************************
18284    REM
18286            IPORT11 = IPORT11 AND NOT BIT0
18288            OUT PORT11,IPORT11
18290            IPORT11 = IPORT11 OR BIT0
18292            OUT PORT11,IPORT11
18294            GOTO 18186
18296    REM
18298    REM *********************************************
18300    REM LOAD POWER SETTING INTO LATCH
18302    REM *********************************************
18304    REM
18306            IPORT11 = IPORT11 AND NOT ( BIT5 OR BIT6 OR BIT7 ) ' FULL POWER
18308            OUT PORT11,IPORT11
18310    REM
18312    REM
18314    REM ***********************************
18316    REM   ENABLE THE FIRE FLIP-FLOP
18318    REM ***********************************
18320    REM
18322            IPORT11 = IPORT11 AND NOT BIT3
18324            OUT PORT11,IPORT11
18326            IPORT11 = IPORT11 OR BIT3
18328            OUT PORT11,IPORT11
18330    REM
18332    REM ***********************************
18334    REM HAS THE LASER FIRED ?
18336    REM ***********************************
18338    REM
18340            TEMP = INP( PORT8 )
18342            TEMP = TEMP AND BIT5
18344            IF TEMP = 0 THEN 18340
18346    REM
18348    REM ***************************************
18350    REM DELAY APPROX. 5 MILLI-SECONDS
18352    REM ***************************************
18354    REM
18356            OUT PORT15,5
18358            OUT PORT15,0
18360            TEMP = INP( PORT9 )
18362            TEMP = TEMP AND BIT2
```

```
18364            IF TEMP > 0 THEN 18360
18366    REM
18368    REM *****************************
18370    REM WAS IT A GOOD SHOT ?
18372    REM *****************************
18374    REM
18376             TEMP = INP( PORT9 )
18378             TEMP1 = TEMP AND BIT1
18380             IF TEMP1 = 0 THEN 18394
18382             GOTO 18432
18384    REM
18386    REM *****************************
18388    REM WAS IT A BAD SHOT ?
18390    REM *****************************
18392    REM
18394             TEMP1 = TEMP AND BIT0
18396             IF TEMP1 = 0 THEN 18416
18398             BEEP
18400             LOCATE 16,30
18402             PRINT "BAD SHOT       "
18404             GOTO 18432
18406    REM
18408    REM *****************************
18410    REM BEEP AND PRINT MISFIRE
18412    REM *****************************
18414    REM
18416             BEEP
18418             LOCATE 16,30
18420             PRINT "MISFIRE        "
18422    REM
18424    REM *****************************
18426    REM HAVE BOTH SIGNALS TIMED OUT ?
18428    REM *****************************
18430    REM
18432             TEMP = INP( PORT9 )
18434             TEMP = TEMP AND ( BIT0 OR BIT1 )
18436             IF TEMP = 0 THEN 18450
18438             GOTO 18432
18440    REM
18442    REM *****************************
18444    REM RETURN TO CALLING PROGRAM
18446    REM *****************************
18448    REM
18450             RETURN
18452    REM
18454    REM **********************
18456    REM **********************
18458    REM THIS INTERNAL SUBROUTINE MOVE THE SLIDES OVER ONE COLUMN
18460    REM **********************
18462    REM **********************
18464    REM
18466    REM **********************
18468    REM MOVE SLIDE1
18470    REM **********************
18472    REM
18474             FOR I = 1 TO 50
18476             MSTEP = MSKPORT2 AND &HF
18478             GOSUB 18586
18480             MSKPORT2 = ( MSKPORT2 AND &HF0 ) OR MSTEP
18482             OUT PORT2,MSKPORT2
18484             NEXT I
18486    REM
18488    REM **********************
18490    REM MOVE SLIDE2
18492    REM **********************
18494    REM
18496             FOR I = 1 TO 50
18498             MSTEP = MSKPORT0 AND &HF
18500             GOSUB 18614
18502             MSKPORT0 = ( MSKPORT0 AND &HF0 ) OR MSTEP
```

```
18504              OUT PORT0, MSKPORT0
18506              NEXT I
18508      REM
18510      REM ***********************
18512      REM MOVE SLIDE3
18514      REM ***********************
18516      REM
18518              FOR I = 1 TO 50
18520              MSTEP = ( MSKPORT1 AND &HF0 )\16
18522              GOSUB 18586
18524              MSKPORT1 = ( MSKPORT1 AND &HF ) OR ( MSTEP * 16 )
18526              OUT PORT1, MSKPORT1
18528              NEXT I
18530      REM
18532      REM ****************************
18534      REM MOVE SLIDE4
18536      REM ****************************
18538      REM
18540              FOR I = 1 TO 50
18542              MSTEP = ( MSKPORT0 AND &HF0 )\16
18544              GOSUB 18614
18546              MSKPORT0 = ( MSKPORT0 AND &HF ) OR ( MSTEP * 16 )
18548              OUT PORT0, MSKPORT0
18550              NEXT I
18552      REM
18554      REM ****************************
18556      REM MOVE SLIDE5
18558      REM ****************************
18560      REM
18562              FOR I = 1 TO 50
18564              MSTEP = MSKPORT1 AND &HF
18566              GOSUB 18586
18568              MSKPORT1 = ( MSKPORT1 AND &HF0 ) OR MSTEP
18570              OUT PORT1, MSKPORT1
18572              NEXT I
18574              RETURN
18576      REM
18578      REM ********************************
18580      REM THIS INTERNAL SUBROUTINE MOVES THE SLIDE TOWARDS THE LASER
18582      REM ********************************
18584      REM
18586              IF MSTEP = 10 THEN 18588 ELSE 18590
18588              MSTEP = 9 : GOTO 18600
18590              IF MSTEP = 9 THEN 18592 ELSE 18594
18592              MSTEP = 5 : GOTO 18600
18594              IF MSTEP = 5 THEN 18596 ELSE 18598
18596              MSTEP = 6 : GOTO 18600
18598              MSTEP = 10
18600              FOR G = 1 TO 3  : NEXT G          ' DELAY
18602              RETURN
18604      REM
18606      REM ********************************
18608      REM THIS INTERNAL SUBROUTINE MOVES THE SLIDE AWAY FROM LASER
18610      REM ********************************
18612      REM
18614              IF MSTEP = 6 THEN 18616 ELSE 18618
18616              MSTEP = 5 : GOTO 18628
18618              IF MSTEP = 5 THEN 18620 ELSE 18622
18620              MSTEP = 9 : GOTO 18628
18622              IF MSTEP = 9 THEN 18624 ELSE 18626
18624              MSTEP = 10 : GOTO 18628
18626              MSTEP = 6
18628              FOR G = 1 TO 3  : NEXT G          ' DELAY
18630              RETURN
                                           CBSU30V0.BAS

30000      REM ******************* CBSU30V0.BAS **********************
30001      REM
30002      REM ***********************************************************
30003      REM THIS PROGRAM IS USED TO TEST THE MATRIX SLIDES FOR PROPER
```

```
30004   REM OPERATION
30005   REM ************************************************************
30006   REM
30007   REM *****************************
30008   REM INITIALIZATION CODE
30009   REM *****************************
30010   REM
30011           PORT0 = &H300
30012           PORT1 = &H301
30013           PORT2 = &H302
30014           OUT &H304,0                 ' INITIALIZE THE MOTOR PORTS
30015           HSLIDE = &H303
30016           BIT0 = 1
30017           BIT1 = 2
30018           BIT2 = 4
30019           BIT3 = 8
30020           BIT4 = 16
30021           CLS : LOCATE 10,20,0
30022           PRINT " TESTING THE MATRIX SLIDES - WAIT ONE MINUTE"
30023           LOCATE 13,30,0
30024   REM
30040   REM *******************************
30041   REM MOVE SLIDE 1 TO HOME POSITION
30042   REM *******************************
30043   REM
30044           GOSUB 30236 : IF RESULT$ = "FAIL" THEN 30059
30045           REM
30046   REM *****************************
30047   REM MOVE OUT 500 STEPS AND TEST SENSOR
30048   REM *****************************
30049   REM
30050           STEPS = 500
30051           FOR I = 1 TO STEPS
30052           MSTEP = MSKPORT2 AND &HF
30053           GOSUB 30493
30054           MSKPORT2 = ( MSKPORT2 AND &HF0 ) OR MSTEP
30055           OUT PORT2,MSKPORT2
30056           NEXT I
30057           TEMP = INP( HSLIDE ) AND BIT0
30058           IF TEMP = 1 THEN 30065
30059           PRINT " FAILURE - SLIDE 1" : GOTO 30223
30060   REM
30061   REM *******************************
30062   REM SET STEPCTR TO 500 AND RETURN HOME
30063   REM *******************************
30064   REM
30065           STEPCTR% = 500
30066           GOSUB 30236 : IF RESULT$ = "FAIL" THEN 30059
30067   REM
30068   REM *******************************
30069   REM COMPARE STEPCTR TO ZERO - ERROR IF DIFFERANCE EXCEEDS 2 COUNTS
30070   REM *******************************
30071   REM
30072           IF STEPCTR% > 3 THEN 30075
30073           IF STEPCTR% < -3 THEN 30075
30074           GOTO 30081
30075           PRINT " FAILURE - SLIDE 1   ERROR = "STEPCTR% : GOTO 30223
30076   REM
30077   REM *******************************
30078   REM MOVE SLIDE 2 TO HOME POSITION
30079   REM *******************************
30080   REM
30081           GOSUB 30288 : IF RESULT$ = "FAIL" THEN 30096
30082   REM
30083   REM *******************************
30084   REM MOVE OUT 500 STEPS AND TEST SENSOR
30085   REM *******************************
30086   REM
30087           STEPS = 500
30088           FOR I = 1 TO STEPS
```

```
30089            MSTEP = MSKPORT0 AND &HF
30090            GOSUB 30493
30091            MSKPORT0 = ( MSKPORT0 AND &HF0 ) OR MSTEP
30092            OUT PORT0,MSKPORT0
30093            NEXT I
30094            TEMP = INP( HSLIDE ) AND BIT3
30095            IF TEMP > 0 THEN 30102
30096            PRINT " FAILURE - SLIDE 2" : GOTO 30223
30097   REM
30098   REM *****************************
30099   REM SET STEPCTR TO 500 AND RETURN HOME
30100   REM *****************************
30101   REM
30102            STEPCTR% = 500
30103            GOSUB 30288 : IF RESULT$ = "FAIL" THEN 30096
30104   REM
30105   REM *****************************
30106   REM COMPARE STEPCTR TO ZERO - ERROR IF DIFFERANCE EXCEEDS 2 COUNTS
30107   REM *****************************
30108   REM
30109            IF STEPCTR > 3 THEN 30112
30110            IF STEPCTR < -3 THEN 30112
30111            GOTO 30118
30112            PRINT " FAILURE - SLIDE 2    ERROR = "STEPCTR% : GOTO 30223
30113   REM
30114   REM *****************************
30115   REM MOVE SLIDE 3 TO HOME POSITION
30116   REM *****************************
30117   REM
30118            GOSUB 30340 : IF RESULT$ = "FAIL" THEN 30133
30119   REM
30120   REM *****************************
30121   REM MOVE OUT 500 STEPS
30122   REM *****************************
30123   REM
30124            STEPS = 500
30125            FOR I = 1 TO STEPS
30126            MSTEP = ( MSKPORT1 AND &HF0 ) \ 16
30127            GOSUB 30493
30128            MSKPORT1 = ( MSKPORT1 AND &HF ) OR ( MSTEP * 16 )
30129            OUT PORT1,MSKPORT1
30130            NEXT I
30131            TEMP = INP( HSLIDE ) AND BIT1
30132            IF TEMP > 0 THEN 30139
30133            PRINT " FAILURE - SLIDE 3" : GOTO 30223
30134   REM
30135   REM *****************************
30136   REM SET STEPCTR TO 500 AND RETURN HOME
30137   REM *****************************
30138   REM
30139            STEPCTR% = 500
30140            GOSUB 30340 : IF RESULT$ = "FAIL" THEN 30133
30141   REM
30142   REM *****************************
30143   REM COMPARE STEPCTR TO ZERO - ERROR IF DIFFERANCE EXCEEDS 2 COUNTS
30144   REM *****************************
30145   REM
30146            IF STEPCTR% > 3 THEN 30149
30147            IF STEPCTR% < -3 THEN 30149
30148            GOTO 30155
30149            PRINT " FAILURE -  SLIDE 3    ERROR = "STEPCTR% : GOTO 30223
30150   REM
30151   REM *****************************
30152   REM MOVE SLIDE 4 TO HOME POSITION
30153   REM *****************************
30154   REM
30155            GOSUB 30392 : IF RESULT$ = "FAIL" THEN 30170
30156   REM
30157   REM *****************************
30158   REM MOVE OUT 500 STEPS AND TEST SENSOR
```

```
30159    REM ****************************
30160    REM
30161            STEPS = 500
30162            FOR I = 1 TO STEPS
30163            MSTEP = ( MSKPORT0 AND &HF0 )\ 16
30164            GOSUB 30493
30165            MSKPORT0 = ( MSKPORT0 AND &HF ) OR ( MSTEP * 16 )
30166            OUT PORT0,MSKPORT0
30167            NEXT I
30168            TEMP = INP( HSLIDE ) AND BIT4
30169            IF TEMP > 0 THEN 30176
30170            PRINT " FAILURE - SLIDE 4" : GOTO 30223
30171    REM
30172    REM ****************************
30173    REM SET STEPCTR TO 500 AND RETURN HOME
30174    REM ****************************
30175    REM
30176            STEPCTR% = 500
30177            GOSUB 30392 : IF RESULT$ = "FAIL" THEN 30170
30178    REM
30179    REM ******************************
30180    REM COMPARE STEPCTR TO ZERO - ERROR IF DIFFERANCE EXCEEDS 2 COUNTS
30181    REM ******************************
30182    REM
30183            IF STEPCTR% > 3 THEN 30186
30184            IF STEPCTR% < - 3 THEN 30186
30185            GOTO 30192
30186            PRINT " FAILURE - SLIDE 4   ERROR = "STEPCTR% : GOTO 30223
30187    REM
30188    REM ******************************8
30189    REM MOVE SLIDE 5 TO HOME POSITION
30190    REM ******************************
30191    REM
30192            GOSUB 30444 : IF RESULT$ = "FAIL" THEN 30207
30193    REM
30194    REM ******************************
30195    REM MOVE OUT 500 STEPS
30196    REM ******************************
30197    REM
30198            STEPCTR% = 500
30199            FOR I = 1 TO STEPS
30200            MSTEP = MSKPORT1 AND &HF
30201            GOSUB 30493
30202            MSKPORT1 = ( MSKPORT1 AND &HF0 ) OR MSTEP
30203            OUT PORT1,MSKPORT1
30204            NEXT I
30205            TEMP = INP( HSLIDE ) AND BIT2
30206            IF TEMP > 0 THEN 30213
30207            PRINT "FAILURE - SLIDE 5" : GOTO 30223
30208    REM
30209    REM ******************************
30210    REM SET STEPCTR TO 500 AND RETURN HOME
30211    REM ******************************
30212    REM
30213            STEPCTR% = 500
30214            GOSUB 30444 : IF RESULT$ = "FAIL" THEN 30214
30215    REM
30216    REM ******************************
30217    REM COMPARE STEPCTR TO ZERO - ERROR IF DIFFERANCE EXCEEDS 2 COUNTS
30218    REM ******************************
30219    REM
30220            IF STEPCTR% > 3 OR STEPCTR% < - 3 THEN 30222
30221            RETURN
30222            PRINT " FAILURE - SLIDE 5   ERROR = "STEPCTR% : GOTO 30223
30223            END
30227    REM
30228    REM ****************************
30229    REM SUBROUTINE - HOME ( SLIDE 1 )
30230    REM ****************************
30231    REM
```

```
30232     REM *****************************
30233     REM MOVE THE SLIDE TO THE HOME POSITION - NO DELAY
30234     REM *****************************
30235     REM
30236              FOR I = 1 TO 600
30237              TEMP = INP( HSLIDE ) AND BIT0
30238              IF TEMP = 0 THEN 30249
30239              MSTEP = MSKPORT2 AND &HF
30240              GOSUB 30508
30241              MSKPORT2 = (MSKPORT2 AND &HF0 ) OR MSTEP
30242              OUT PORT2,MSKPORT2 : STEPCTR% = STEPCTR% - 1
30243              NEXT I
30244     REM
30245     REM *************************
30246     REM MOVE THE SLIDE OUT 0.050 INCHES
30247     REM *************************
30248     REM
30249              FOR I = 1 TO 25
30250              MSTEP = MSKPORT2 AND &HF
30251              GOSUB 30493     ' FIND THE NEXT NSTEP
30252              MSKPORT2 = ( MSKPORT2 AND &HF0 ) OR MSTEP
30253              OUT PORT2,MSKPORT2 : STEPCTR% = STEPCTR% + 1
30254              NEXT I
30255     REM
30256     REM ****************************
30257     REM TEST THE SENSOR - SHOULD BE A ONE
30258     REM ****************************
30259     REM
30260              TEMP = INP( HSLIDE ) AND BIT0
30261              IF TEMP = 0 THEN 30277
30262     REM
30263     REM ****************************
30264     REM MOVE SLIDE TO THE HOME POSITION - WITH DELAY
30265     REM ****************************
30266     REM
30267              FOR I = 1 TO 600
30268              TEMP = INP( HSLIDE ) AND BIT0
30269              IF TEMP = 0 THEN 30278
30270              MSTEP = MSKPORT2 AND &HF
30271              GOSUB 30508     ' FIND THE NEXT MSTEP
30272              MSKPORT2 = ( MSKPORT2 AND &HF0 ) OR MSTEP
30273              OUT PORT2,MSKPORT2 : STEPCTR% = STEPCTR% - 1
30274              FOR J = 1 TO 25
30275              NEXT J
30276              NEXT I
30277              RESULT$ = "FAIL" : RETURN
30278              RESULT$ = "PASS" : RETURN
30279     REM
30280     REM *************************
30281     REM SUBROUTINE - HOME ( SLIDE 2 )
30282     REM *************************
30283     REM
30284     REM *************************
30285     REM GO TO THE HOME POSITION - NO DELAY
30286     REM *************************
30287     REM
30288              FOR I = 1 TO 600
30289              TEMP = INP( HSLIDE ) AND BIT3
30290              IF TEMP = 0 THEN 30301
30291              MSTEP = MSKPORT0 AND &HF
30292              GOSUB 30508
30293              MSKPORT0 = ( MSKPORT0 AND &HF0 ) OR MSTEP
30294              OUT PORT0,MSKPORT0 : STEPCTR% = STEPCTR% - 1
30295              NEXT I
30296     REM
30297     REM *************************
30298     REM MOVE THE SLIDE OUT 0.050 INCHES
30299     REM *************************
30300     REM
30301              FOR I = 1 TO 25
```

```
30302               MSTEP = MSKPORT0 AND &HF
30303               GOSUB 30493        ' FIND THE NEXT NSTEP
30304               MSKPORT0 = ( MSKPORT0 AND &HF0 ) OR MSTEP
30305               OUT PORT0,MSKPORT0 : STEPCTR% = STEPCTR% + 1
30306               NEXT I
30307       REM
30308       REM ****************************
30309       REM TEST THE SENSOR - SHOULD BE A ONE
30310       REM ****************************
30311       REM
30312               TEMP = INP( HSLIDE ) AND BIT3
30313               IF TEMP = 0 THEN 30329
30314       REM
30315       REM ****************************
30316       REM MOVE SLIDE TO THE HOME POSITION - WITH DELAY
30317       REM ****************************
30318       REM
30319               FOR I = 1 TO 600
30320               TEMP = INP( HSLIDE ) AND BIT3
30321               IF TEMP = 0 THEN 30330
30322               MSTEP = MSKPORT0 AND &HF
30323               GOSUB 30508        ' FIND THE NEXT MSTEP
30324               MSKPORT0 = ( MSKPORT0 AND &HF0 ) OR MSTEP
30325               OUT PORT0,MSKPORT0 : STEPCTR% = STEPCTR% - 1
30326               FOR J = 1 TO 25
30327               NEXT J
30328               NEXT I
30329               RESULT$ = "FAIL" : RETURN
30330               RESULT$ = "PASS" : RETURN
30331       REM
30332       REM ******************************
30333       REM SUBROUTINE - HOME ( SLIDE 3 )
30334       REM ******************************
30335       REM
30336       REM ******************************
30337       REM MOVE SLIDE TO THE HOME POSITION - NO DELAY
30338       REM ******************************
30339       REM
30340               FOR I = 1 TO 600
30341               TEMP = INP( HSLIDE ) AND BIT1
30342               IF TEMP = 0 THEN 30353
30343               MSTEP = ( MSKPORT1 AND &HF0 )\16
30344               GOSUB 30508
30345               MSKPORT1 = ( MSKPORT1 AND &HF ) OR ( MSTEP * 16 )
30346               OUT PORT1,MSKPORT1 : STEPCTR% = STEPCTR% - 1
30347               NEXT I
30348       REM
30349       REM ****************************
30350       REM MOVE THE SLIDE OUT 0.050 INCHES
30351       REM ****************************
30352       REM
30353               FOR I = 1 TO 25
30354               MSTEP = ( MSKPORT1 AND &HF0 )\16
30355               GOSUB 30493        ' FIND THE NEXT NSTEP
30356               MSKPORT1 = ( MSKPORT1 AND &HF ) OR ( MSTEP * 16 )
30357               OUT PORT1,MSKPORT1 : STEPCTR% = STEPCTR% + 1
30358               NEXT I
30359       REM
30360       REM ****************************
30361       REM TEST THE SENSOR - SHOULD BE A ONE
30362       REM ****************************
30363       REM
30364               TEMP = INP( HSLIDE ) AND BIT1
30365               IF TEMP = 0 THEN 30381
30366       REM
30367       REM ****************************
30368       REM MOVE SLIDE TO THE HOME POSITION - WITH DELAY
30369       REM ****************************
30370       REM
30371               FOR I = 1 TO 600
```

```
30372           TEMP = INP( HSLIDE ) AND BIT1
30373           IF TEMP = 0 THEN 30382
30374           MSTEP = ( MSKPORT1 AND &HF0 )\16
30375           GOSUB 30508      ' FIND THE NEXT MSTEP
30376           MSKPORT1 = ( MSKPORT1 AND &HF ) OR ( MSTEP * 16 )
30377           OUT PORT1,MSKPORT1 : STEPCTR% = STEPCTR% - 1
30378           FOR J = 1 TO 25
30379           NEXT J
30380           NEXT I
30381           RESULT$ = "FAIL" : RETURN
30382           RESULT$ = "PASS" : RETURN
30383   REM
30384   REM **********************
30385   REM SUBROUTINE - HOME ( SLIDE 4 )
30386   REM **********************
30387   REM
30388   REM **************************
30389   REM MOVE THE SLIDE TO THE HOME POSITION
30390   REM **************************
30391   REM
30392           FOR I = 1 TO 600
30393           TEMP = INP( HSLIDE ) AND BIT4
30394           IF TEMP = 0 THEN 30405
30395           MSTEP = ( MSKPORT0 AND &HF0 ) \16
30396           GOSUB 30508
30397           MSKPORT0 = ( MSKPORT0 AND &HF ) OR ( MSTEP * 16 )
30398           OUT PORT0,MSKPORT0 : STEPCTR% = STEPCTR% - 1
30399           NEXT I
30400   REM
30401   REM ***************************
30402   REM MOVE THE SLIDE OUT 0.050 INCHES
30403   REM ***************************
30404   REM
30405           FOR I = 1 TO 25
30406           MSTEP = ( MSKPORT0 AND &HF0 )\16
30407           GOSUB 30493      ' FIND THE NEXT NSTEP
30408           MSKPORT0 = ( MSKPORT0 AND &HF ) OR ( MSTEP * 16 )
30409           OUT PORT0,MSKPORT0 : STEPCTR% = STEPCTR% + 1
30410           NEXT I
30411   REM
30412   REM ****************************
30413   REM TEST THE SENSOR - SHOULD BE A ONE
30414   REM ****************************
30415   REM
30416           TEMP = INP( HSLIDE ) AND BIT4
30417           IF TEMP = 0 THEN 30433
30418   REM
30419   REM ****************************
30420   REM MOVE SLIDE TO THE HOME POSITION - WITH DELAY
30421   REM ****************************
30422   REM
30423           FOR I = 1 TO 600
30424           TEMP = INP( HSLIDE ) AND BIT4
30425           IF TEMP = 0 THEN 30434
30426           MSTEP = ( MSKPORT0 AND &HF0 )\16
30427           GOSUB 30508       ' FIND THE NEXT MSTEP
30428           MSKPORT0 = ( MSKPORT0 AND &HF ) OR ( MSTEP * 16 )
30429           OUT PORT0,MSKPORT0 : STEPCTR% = STEPCTR% - 1
30430           FOR J = 1 TO 25
30431           NEXT J
30432           NEXT I
30433           RESULT$ = "FAIL" : RETURN
30434           RESULT$ = "PASS" : RETURN
30435   REM
30436   REM *******************************
30437   REM SUBROUTINE - HOME ( SLIDE 5 )
30438   REM *******************************
30439   REM
30440   REM *******************************
30441   REM MOVE SLIDE TO HOME POSITION - NO DELAY
```

```
30442       REM ****************************
30443       REM
30444              FOR I = 1 TO 600
30445              TEMP = INP( HSLIDE ) AND BIT2
30446              IF TEMP = 0 THEN 30458
30447              MSTEP = MSKPORT1 AND &HF
30448              GOSUB 30508
30449              MSKPORT1 = ( MSKPORT1 AND &HF0 ) OR MSTEP
30450              OUT PORT1,MSKPORT1 : STEPCTR% = STEPCTR% - 1
30451              NEXT I
30452              TEMP = INP( HSLIDE )
30453       REM
30454       REM ****************************
30455       REM MOVE THE SLIDE OUT 0.050 INCHES
30456       REM ****************************
30457       REM
30458              FOR I = 1 TO 25
30459              MSTEP = MSKPORT1 AND &HF
30460              GOSUB 30493      ' FIND THE NEXT NSTEP
30461              MSKPORT1 = ( MSKPORT1 AND &HF0 ) OR MSTEP
30462              OUT PORT1,MSKPORT1 : STEPCTR% = STEPCTR% + 1
30463              NEXT I
30464       REM
30465       REM ****************************
30466       REM TEST THE SENSOR - SHOULD BE A ONE
30467       REM ****************************
30468       REM
30469              TEMP = INP( HSLIDE ) AND BIT2
30470              IF TEMP = 0 THEN 30486
30471       REM
30472       REM ****************************
30473       REM MOVE SLIDE TO THE HOME POSITION - WITH DELAY
30474       REM ****************************
30475       REM
30476              FOR I = 1 TO 600
30477              TEMP = INP( HSLIDE ) AND BIT2
30478              IF TEMP = 0 THEN 30487
30479              MSTEP = MSKPORT1 AND &HF
30480              GOSUB 30508      ' FIND THE NEXT MSTEP
30481              MSKPORT1 = ( MSKPORT1 AND &HF0 ) OR MSTEP
30482              OUT PORT1,MSKPORT1 : STEPCTR% = STEPCTR% - 1
30483              FOR J = 1 TO 25
30484              NEXT J
30485              NEXT I
30486              RESULT$ = "FAIL" : RETURN
30487              RESULT$ = "PASS" : RETURN
30488       REM
30489       REM ****************************
30490       REM THIS INTERNAL SUBROUTINE MOVES THE SLIDE AWAY FROM HOME
30491       REM ****************************
30492       REM
30493              IF MSTEP = 10 THEN 30494 ELSE 30495
30494              MSTEP = 9 : GOTO 30500
30495              IF MSTEP = 9 THEN 30496 ELSE 30497
30496              MSTEP = 5 : GOTO 30500
30497              IF MSTEP = 5 THEN 30498 ELSE 30499
30498              MSTEP = 6 : GOTO 30500
30499              MSTEP = 10
30500              FOR G = 1 TO 3
30501              NEXT G
30502              RETURN
30503       REM
30504       REM ****************************
30505       REM THIS INTERNAL SUBROUTINE MOVES THE SLIDE TOWARDS HOME
30506       REM ****************************
30507       REM
30508              IF MSTEP = 6 THEN 30509 ELSE 30510
30509              MSTEP = 5 : GOTO 30515
30510              IF MSTEP = 5 THEN 30511 ELSE 30512
30511              MSTEP = 9 : GOTO 30515
```

```
30512           IF MSTEP = 9 THEN 30513 ELSE 30514
30513           MSTEP = 10 : GOTO 30515
30514           MSTEP = 6
30515           FOR G = 1 TO 3
30516           NEXT G
30517           RETURN
30518           END
                                        CBSU31V0.BAS

31000   REM ******************* CBSU31V0.BAS ******************************
31005   REM
31010   REM ******************************************************************
31015   REM THIS PROGRAM CHECKS THE WHEEL POSITIONS ( 0 - 7 )
31020   REM ******************************************************************
31025   REM
31030   REM *******************************
31035   REM INITIALIZATION CODE
31040   REM *******************************
31045   REM
31050           PORT8  = &H308
31055           PORT9  = &H309
31060           PORT10 = &H30A
31065           PORT11 = &H30B
31070           PORT12 = &H30C
31075           PORT13 = &H30D
31080           PORT14 = &H30E
31085           PORT15 = &H30F
31090           BIT0 = 1
31095           BIT1 = 2
31100           BIT2 = 4
31105           BIT3 = 8
31110           BIT4 = 16
31115           BIT5 = 32
31120           BIT6 = 64
31125           BIT7 = 128
31130   REM
31135   REM *******************************
31140   REM SEND OUT A LASER OFF PULSE
31145   REM *******************************
31150   REM
31155           IPORT11 = &HFF
31160           OUT PORT11,IPORT11
31165           IPORT11 = IPORT11 AND NOT BIT1
31170           OUT PORT11,IPORT11
31175           IPORT11 = IPORT11 OR BIT1
31180           OUT PORT11,IPORT11
31185   REM
31190   REM *******************************
31195   REM INITIALIZE TIMER 0 FOR MODE 0
31200   REM *******************************
31205   REM
31210           IPORT12 = &HFF
31215           OUT PORT12,IPORT12
31220           OUT PORT15,&H30         ' MODE 0
31225           IPORT12 = IPORT12 AND NOT ( BIT6 OR BIT7 )
31230           OUT PORT12,IPORT12
31235   REM
31240   REM *******************************
31245   REM TEST ALL EIGHT WHEEL POSITIONS
31250   REM *******************************
31255   REM
31260           FOR I = 1 TO 8
31265   REM
31270   REM *******************************
31275   REM LOAD IN THE WHEEL POSTION
31280   REM *******************************
31285   REM
31290           WHPOS% = I - 1
31295           WHPOS% = WHPOS% * 32
31300           IPORT11 = IPORT11 AND NOT ( BIT5 OR BIT6 OR BIT7 )
```

```
31305            IPORT11 = IPORT11 OR WHPOS%
31310            OUT PORT11,IPORT11
31315    REM
31320    REM ********************************
31325    REM ENABLE THE FIRE FLIP-FLOP
31330    REM ********************************
31335    REM
31340            IPORT11 = IPORT11 AND NOT BIT3
31345            OUT PORT11,IPORT11
31350            IPORT11 = IPORT11 OR BIT3
31355            OUT PORT11,IPORT11
31360    REM
31365    REM ***********************************
31370    REM DELAY FOR ABOUT 50 MILLI-SECONDS
31375    REM ***********************************
31380    REM
31385            OUT PORT15,60
31390            OUT PORT15,0
31395            TEMP% = INP( PORT9 )
31400            TEMP% = TEMP% AND BIT2
31405            IF TEMP% > 0 THEN 31395
31410    REM
31415    REM ***********************************
31420    REM READ IN PORT10 AND TEST THE RESULT
31425    REM ***********************************
31430    REM
31435            TEMP% = INP( PORT10 )
31440            TEMP% = TEMP% AND ( BIT3 OR BIT4 OR BIT5 )
31445            TEMP% = TEMP% \ 8
31450            IF TEMP% = I - 1 THEN 31460
31455            GOTO 31580        ' ERROR CONDITION
31460            NEXT I
31465    REM
31470    REM ***********************************
31475    REM RETURN TO THE CALLING PROGRAM
31480    REM ***********************************
31485    REM
31490            RETURN
31555    REM
31560    REM ***********************************
31565    REM PRINT FAILURE MESSAGE
31570    REM ***********************************
31575    REM
31580            CLS
31590            LOCATE 14,10
31595 PRINT"FAILURE - LASER DOES NOT FIRE THRU THE PROPER WHEEL OPENING"
31600            LOCATE 18,28
31605            PRINT "PRESS ANY KEY TO CONTINUE"
31610    REM
31620    REM *******************************
31630    REM WAIT FOR A KEY TO BE PRESSED
31640    REM *******************************
31650    REM
31660            A$ = INKEY$ : IF A$ = "" THEN 31660
31670            RETURN
                                    CBSU49V0.BAS

49000    REM ****************** CBSU49V0.BAS *********************************
49005    REM
49010    REM *****************************************************************
49015    REM THIS PROGRAM CHECKS THE WHEEL SPEED
49020    REM *****************************************************************
49025    REM
49030    REM *******************************
49035    REM INITIALIZATION CODE
49040    REM *******************************
49045    REM
49050            PORT8 = &H308
49055            PORT9 = &H309
49060            PORT10 = &H30A
```

```
49065          PORT11 = &H30B
49070          PORT12 = &H30C
49075          PORT13 = &H30D
49080          PORT14 = &H30E
49085          PORT15 = &H30F
49090          BIT0 = 1
49095          BIT1 = 2
49100          BIT2 = 4
49105          BIT3 = 8
49110          BIT4 = 16
49115          BIT5 = 32
49120          BIT6 = 64
49125          BIT7 = 128
49130   REM
49135   REM *******************************
49140   REM SEND OUT A LASER OFF PULSE
49145   REM *******************************
49150   REM
49155          IPORT11 = &HFF
49160          OUT PORT11,IPORT11
49165          IPORT11 = IPORT11 AND NOT BIT1
49170          OUT PORT11,IPORT11
49175          IPORT11 = IPORT11 OR BIT1
49180          OUT PORT11,IPORT11
49185   REM
49190   REM *******************************
49195   REM INITIALIZE TIMER 0 FOR MODE 0
49200   REM *******************************
49205   REM
49210          IPORT12 = &HFF
49215          OUT PORT12,IPORT12
49220          OUT PORT15,&H30         ' MODE 0
49225          IPORT12 = IPORT12 AND NOT ( BIT6 OR BIT7 )
49230          OUT PORT12,IPORT12
49235   REM
49240   REM *******************************
49245   REM SET TGATE 0 TO ONE
49250   REM *******************************
49255   REM
49260          CLS
49265          IPORT12 = IPORT12 OR BIT5
49270          OUT PORT12,IPORT12
49275   REM
49280   REM *******************************
49285   REM LOAD COUNT INTO TIMER 0
49290   REM *******************************
49295   REM
49300          OUT PORT15,50
49305          OUT PORT15,0
49310   REM
49315   REM *******************************
49320   REM LOAD IN WHEEL POSTION 0
49325   REM *******************************
49330   REM
49335          IPORT11 = IPORT11 AND NOT ( BIT5 OR BIT6 OR BIT7 )
49340          OUT PORT11,IPORT11
49345   REM
49350   REM *******************************
49355   REM ENABLE THE FIRE FLIP-FLOP
49360   REM *******************************
49365   REM
49370          IPORT11 = IPORT11 AND NOT BIT3
49375          OUT PORT11,IPORT11
49380          IPORT11 = IPORT11 OR BIT3
49385          OUT PORT11,IPORT11
49390   REM
49395   REM *******************************
49400   REM WAIT FOR FIRE FLIP-FLOP TO GET CLEARED OR TIME OUT
49405   REM *******************************
49410   REM
```

```
49415               TEMP% = INP( PORT8 )
49420               TEMP% = TEMP% AND BIT5
49421               IF TEMP% > 0 THEN 49435
49425               TEMP% = INP( PORT9 )
49426               TEMP% = TEMP% AND BIT2
49427               IF TEMP% > 0 THEN 49415
49428               GOTO 49675         ' FAILURE MESSAGE
49430      REM
49431      REM ***********************************
49432      REM RELOAD COUNTER TO MAX COUNT
49433      REM ***********************************
49434      REM
49435               OUT PORT15,&HFF
49436               OUT PORT15,&HFF
49437      REM
49438      REM ***********************************
49440      REM SET TGATE 0 HIGH AND RE-ENABLE THE FIRE-FLOP
49445      REM ***********************************
49450      REM
49455               IPORT12 = IPORT12 OR BIT5
49460               OUT PORT12,IPORT12
49465               IPORT11 = IPORT11 AND NOT BIT3
49470               OUT PORT11,IPORT11
49475               IPORT11 = IPORT11 OR BIT3
49480               OUT PORT11,IPORT11
49485      REM
49490      REM ***********************************
49495      REM WAIT FOR FIRE FLIP-FLOP TO GET CLEARED AGAIN
49500      REM ***********************************
49505      REM
49510               TEMP% = INP( PORT8 )
49515               TEMP% = TEMP% AND BIT5
49520               IF TEMP% = 0 THEN 49510
49525      REM
49530      REM ***********************************
49535      REM SET TGATE 0 LOW
49540      REM ***********************************
49545      REM
49550               IPORT12 = IPORT12 AND NOT BIT5
49555               OUT PORT12,IPORT12
49560      REM
49565      REM ***********************************
49570      REM FETCH THE TIME FROM TIMER 0 AND COMPUTE THE RPM
49575      REM ***********************************
49580      REM
49585               TEMPLO = INP( PORT14 )
49590               TEMPHI = INP( PORT14 )
49595               TEMP = TEMPLO + ( TEMPHI * 256! )
49600               TEMP = 65535! - TEMP
49605               REVTIM = TEMP * .000859
49610               RPM% = 60! / REVTIM
49615      REM
49620      REM *************************
49625      REM CHECK THE RPM ( 1350 IS MINIMUM )
49630      REM *************************
49635      REM
49640               IF RPM% < 1350 THEN 49675
49645               RETURN
49650      REM
49655      REM *************************
49660      REM PRINT THE FAILURE MESSAGE
49665      REM *************************8
49670      REM
49675               LOCATE 12,10
49680 PRINT" FAILURE - SENSOR INDICATES THAT WHEEL SPEED IS LESS THAN 1350 RPM"
49685               LOCATE 16,25
49690               PRINT " PRESS ANY KEY TO CONTINUE"
49695               A$ = INKEY$ : IF A$ = "" THEN 49695
49700               RETURN
```

FRMAINV0.BAS

```
1000    REM ******************** FRMAINV0.BAS ****************************
1010    REM
1020    REM *****************************************************************
1030    REM                          FRANCE
1040    REM *****************************************************************
1050    REM THIS PROGRAM IS USED TO ADD ACCOUNTS OR DISPLAY ACCOUNTS
1060    REM *****************************************************************
1070    REM
1080            ACCTFILE$ = "FRANCE"
1090    REM
1100    REM *******************************
1110    REM DISPLAY THE MENU
1120    REM *******************************
1130    REM
1140            CLS
1150            PRINT "         "ACCTFILE$
1160            PRINT
1170            PRINT "        ************ ACCOUNTS **************"
1180            PRINT
1190            PRINT "        A ----------- ACTIVATE A NEW ACCOUNT
1200            PRINT "        D ----------- DE-ACTIVATE AN OLD ACCOUNT
1210            PRINT "        V ----------- VIEW\PRINT ACCOUNTS
1230            PRINT "        S ----------- SEARCH BY CODE NUMBER
1240            PRINT "        N ----------- NUMBER OF ACCOUNTS
1250            PRINT "        C ----------- CODE BLOCKS
1260            PRINT "        I ----------- INITIALIZE TEST CODE NUMBER
1270            PRINT
1280            PRINT "        X ----------- EXIT FROM THIS PROGRAM
1290            PRINT " "
1300            PRINT "     MAKE A MENU SELECTION "
1310            A$ = INKEY$ : IF A$ = "" THEN 1310
1320    REM
1330    REM *******************************
1340    REM RESPOND TO MENU SELECTION
1350    REM *******************************
1360    REM
1370            IF A$ = "A" OR A$ = "a" THEN 1520
1380            IF A$ = "V" OR A$ = "v" THEN 1610
1390            IF A$ = "N" OR A$ = "n" THEN 1590
1410            IF A$ = "I" OR A$ = "i" THEN 1730
1420            IF A$ = "C" OR A$ = "c" THEN 1890
1430            IF A$ = "D" OR A$ = "d" THEN 1870
1435            IF A$ = "S" OR A$ = "s" THEN 2010
1440            IF A$ = "X" OR A$ = "x" THEN 1460
1450            GOTO 1140
1460            END
1470    REM
1480    REM *******************************
1490    REM A - ACTIVATE A NEW ACCOUNT
1500    REM *******************************
1510    REM
1520            GOSUB 10000      ' INPUT DATA TO A RECORD
1530            GOTO 1140        ' RETURN TO MAIN MENU
1540    REM
1550    REM ***********************************
1560    REM N - DISPLAY NUMBER OF ACCOUNTS
1570    REM ***********************************
1580    REM
1590            GOSUB 19000
1600            GOTO 1140        ' PRINT MAIN MENU
1610    REM
1620    REM ***********************************
1630    REM V - VIEW\PRINT ACCOUNTS
1640    REM ***********************************
1650    REM
1660            GOSUB 15000
1670            GOTO 1140        ' PRINT MAIN MENU
1680    REM
```

```
1690    REM *******************************
1700    REM I - INITIALIZE THE TEST CODE NUMBER
1710    REM *******************************
1720    REM
1730            GOSUB 21000
1740            GOTO 1140
1750    REM
1830    REM *******************************
1840    REM D - DEACTIVATE AN EXISTING ACCOUNT
1850    REM *******************************
1860    REM
1870            GOSUB 14000
1880            GOTO 1140         ' PRINT THE MAIN MENU
1890    REM
1900    REM *******************************
1910    REM C - CODE BLOCKS ( EXAMINE AND/OR MODIFY )
1920    REM *******************************
1930    REM
1940            GOSUB 18000
1950            GOTO 1140         ' PRINT THE MAIN MENU
1960    REM
1970    REM *******************************
1980    REM S - SEARCH BY CODE NUMBER
1990    REM *******************************
2000    REM
2010            GOSUB 13000
2020            GOTO 1140         ' PRINT THE MAIN MENU
2030    REM
2040    REM *******************************
2050    REM INCLUDE THE SUBROUTINES
2060    REM *******************************
2070    REM
2080    REM $INCLUDE:'RCSU10V0.BAS'
10999   REM $INCLUDE:'RCSU11V0.BAS'
11999   REM $INCLUDE:'RCSU12V0.BAS'
12999   REM $INCLUDE:'RCSU13V0.BAS'
13999   REM $INCLUDE:'RCSU14V0.BAS'
14999   REM $INCLUDE:'RCSU15V0.BAS'
15999   REM $INCLUDE:'RCSU16V0.BAS'
16999   REM $INCLUDE:'RCSU17V0.BAS'
17999   REM $INCLUDE:'RCSU18V0.BAS'
18999   REM $INCLUDE:'RCSU19V0.BAS'
19999   REM $INCLUDE:'RCSU20V0.BAS'
20999   REM $INCLUDE:'RCSU21V0.BAS'
23999   REM $INCLUDE:'RCSU24V0.BAS'
                                    RCMAINV0.BAS

1000    REM ******************* RCMAINV0.BAS ******************************
1010    REM
1020    REM ****************************************************************
1030    REM THIS PROGRAM IS USED WHEN WORKING WITH CUSTOMER RECORDS.
1040    REM THE PROGRAM CAN BE USED TO CREATE RECORDS ,EXAMINE RECORDS
1050    REM MODIFY RECORDS , SEARCH FOR RECORDS ETC.
1060    REM ****************************************************************
1070    REM
1080    REM ****************************
1090    REM DISPLAY THE LIST OF FILES TO CHOOSE FROM
1100    REM ****************************
1110    REM
1120            CLS
1130            PRINT "         ************* FILES **************
1140            PRINT
1150            PRINT "         E ----------------------------- ENGLAND"
1160            PRINT "         F ----------------------------- FRANCE"
1170            PRINT "         I ----------------------------- ITALY"
1180            PRINT "         S ----------------------------- SPAIN"
1190            PRINT
1200            PRINT "         X ---------- EXIT FROM THIS PROGRAM"
1210            PRINT "         Z ----------------------SPECIAL MENU"
1220    REM
```

```
1230    REM *****************************
1240    REM RESPOND TO THE FILE SELECTION
1250    REM *****************************
1260    REM
1270            A$ = INKEY$ : IF A$ = "" THEN 1270
1280            IF A$ = "E" THEN ACCTFILE$ = "ENGLAND" : GOTO 1420
1290            IF A$ = "e" THEN ACCTFILE$ = "ENGLAND" : GOTO 1420
1300            IF A$ = "F" THEN ACCTFILE$ = "FRANCE" : GOTO 1420
1310            IF A$ = "f" THEN ACCTFILE$ = "FRANCE" : GOTO 1420
1320            IF A$ = "I" THEN ACCTFILE$ = "ITALY" : GOTO 1420
1330            IF A$ = "i" THEN ACCTFILE$ = "ITALY" : GOTO 1420
1340            IF A$ = "S" THEN ACCTFILE$ = "SPAIN" : GOTO 1420
1350            IF A$ = "s" THEN ACCTFILE$ = "SPAIN" : GOTO 1420
1360            IF A$ = "X" THEN 1390 ELSE IF A$ = "x" THEN 1390
1370            IF A$ = "Z" THEN 2310 ELSE IF A$ = "z" THEN 2310
1380            GOTO 1120
1390            END
1400    REM
1410    REM *******************************
1420    REM DISPLAY THE MENU
1430    REM *******************************
1440    REM
1450            CLS
1460            PRINT "         "ACCTFILE$
1470            PRINT
1480            PRINT "        ************ RECORDS **************"
1490            PRINT
1500            PRINT "        C ---------- CREATE A RECORD
1510            PRINT "        D ---------- DISPLAY A RECORD
1520            PRINT "        N ---------- NUMBER OF RECORDS
1530            PRINT "        P ---------- PRINT A RECORD
1540            PRINT "        S ---------- SEARCH FOR A RECORD
1550            PRINT
1560            PRINT "        X ---------- EXIT FROM THIS PROGRAM
1570            PRINT " "
1580            PRINT "        MAKE A MENU SELECTION "
1590            A$ = INKEY$ : IF A$ = "" THEN 1590
1600    REM
1610    REM ******************************
1620    REM RESPOND TO MENU SELECTION
1630    REM ******************************
1640    REM
1650            IF A$ = "C" OR A$ = "c" THEN 1770
1660            IF A$ = "D" OR A$ = "d" THEN 2050
1670            IF A$ = "N" OR A$ = "n" THEN 1860
1680            IF A$ = "P" OR A$ = "p" THEN 3030
1690            IF A$ = "X" OR A$ = "x" THEN 1120
1700            GOTO 1450
1710            END
1720    REM
1730    REM ******************************
1740    REM C - CREATE A RECORD
1750    REM ******************************
1760    REM
1770            FILESTAT$ = "NEW"
1780            GOSUB 10000      ' INPUT DATA TO A RECORD AND FILE IT
1790            GOTO 1450        ' RETURN TO MAIN MENU
1800    REM
1810    REM
1820    REM ********************************
1830    REM N - DISPLAY NUMBER OF RECORDS
1840    REM ********************************
1850    REM
1860            OPEN ACCTFILE$ AS #1 LEN = 71
1870            FIELD #1, 2 AS TR$
1880            GET #1,1
1890            TOTREC = CVI(TR$)
1900            TEMP = TOTREC - 1
1910            CLS
1920            PRINT " TOTAL NUMBER OF RECORDS IS - ",TEMP
```

```
1930            PRINT " CHANGE THE NUMBER ? [Y/N]"
1940            A$ = INKEY$ : IF A$ = "" THEN 1940
1950            IF A$ = "Y" THEN 1980 ELSE IF A$ = "y" THEN 1980
1960            IF A$ = "N" THEN 2030 ELSE IF A$ = "n" THEN 2030
1970            GOTO 1930
1980            INPUT " ENTER THE NEW NUMBER - " ,TEMP
1990            TOTREC = TEMP + 1
2000            LSET TR$ =MKI$(TOTREC)
2010            PUT #1, 1
2020            CLOSE #1
2030            CLOSE #1 : GOTO 1450
2040    REM
2050    REM
2060    REM *******************************
2070    REM D - DISPLAY AN INDIVIDUAL RECORD
2080    REM *******************************
2090    REM
2100            FILESTAT$ = "OLD"
2110            CLS : INPUT " ENTER THE RECORD NUMBER - ",RECNUM
2120            RECNUM = RECNUM + 1        ' ACTUAL RECORD NUMBER
2130            OPEN ACCTFILE$ AS #1 LEN = 71
2140            FIELD #1,10 AS ID$,40 AS NA$,5 AS CD$,8 AS DA$,8 AS NU$
2150            GET #1,RECNUM
2160            DATES$ = DA$
2170            IDNUM$ = ID$
2180            NAMES$ = NA$
2190            TSTCODE$ = CD$
2200            NUMCODED$ = NU$
2210            CLOSE #1
2220            GOSUB 11000               ' DISPLAY THE INFORMATION
2230            PRINT : PRINT
2240            PRINT "DO YOU WANT TO MODIFY THIS RECORD ? [Y/N] "
2250            A$ = INKEY$ : IF A$ = "" THEN 2250
2260            IF A$ = "Y" THEN 2290 ELSE IF A$ = "y" THEN 2290
2270            IF A$ = "N" THEN 1450 ELSE IF A$ = "n" THEN 1450
2280            CLS : GOTO 2240
2290            GOSUB 10000               ' MODIFY THE RECORD
2300            GOTO 1450                 ' RETURN TO THE MENU
2310    REM
2320    REM *******************************
2330    REM DISPLAY THE SPECIAL MENU
2340    REM *******************************
2350    REM
2360            CLS
2370            PRINT "            *************** SPECIAL MENU **************
2380            PRINT
2390            PRINT "        T --------------- INITIALIZE  TSTCODE NUMBER
2400            PRINT "        N ----------------- DISPLAY NUMBER OF CODES
2410            PRINT
2420            PRINT "        X ------------------------- EXIT THIS MENU
2430    REM
2440    REM *******************************
2450    REM RESPOND TO SPECIAL MENU
2460    REM *******************************
2470    REM
2480            A$ = INKEY$ : IF A$ = "" THEN 2480
2490            IF A$ = "T" OR A$ = "t" THEN 2530
2500            IF A$ = "N" OR A$ = "n" THEN 2880
2510            IF A$ = "X" OR A$ = "x" THEN 1120
2520            GOTO 2360
2530    REM
2540    REM ***************************
2550    REM DISPLAY/MODIFY TSTCODE NUMBER
2560    REM IF TSTCODE IS CHANGED THEN RESET NUMCODES TO ZERO
2570    REM ***************************
2580    REM
2590            OPEN "CODEFILE" AS #1 LEN = 10
2600            FIELD #1, 8 AS TN$
2610            GET #1,1        ' OVERLAPS RECORDS #1 AND #2
2620            TSTNUM! = CVD(TN$)
```

```
2630            CLS
2640            PRINT "TEST NUMBER = ",TSTNUM!
2650            PRINT
2660            PRINT " DO YOU WANT TO CHANGE IT ? [Y/N] "
2670            A$ = INKEY$ : IF A$ = "" THEN 2670
2680            IF A$ = "Y" OR A$ = "y" THEN 2730
2690            IF A$ = "N" OR A$ = "n" THEN 2710
2700            GOTO 2630
2710            CLOSE #1
2720            GOTO 2310
2730    REM
2740    REM *****************************
2750    REM MODIFY TSTNUM
2760    REM *****************************
2770    REM
2780            INPUT " ENTER THE NEW NUMBER - ",TSTNUM!
2790            LSET TN$ = MKD$(TSTNUM!)
2800            PUT #1,1
2810            CLOSE #1
2820            OPEN "CODEFILE" AS #1 LEN = 5
2830            FIELD #1,4 AS NC$
2840            NC$ = MKI$(0)
2850            PUT #1,3
2860            CLOSE #1
2870            GOTO 2310
2875    REM
2880    REM *****************************
2890    REM DISPLAY THE NUMBER OF CODES GENERATED
2900    REM *****************************
2910    REM
2920            OPEN "CODEFILE" AS #1 LEN = 5
2930            FIELD #1 ,. 4 AS NC$
2940            GET #1,3
2950            NUMCODES = CVI(NC$)
2960            CLOSE #1
2970            CLS
2980            PRINT "NUMBER OF CODES GENERATED = ",NUMCODES
2990            PRINT
3000            PRINT "PRESS ANY KEY TO CONTINUE"
3010            A$ = INKEY$ : IF A$ = "" THEN 3010
3020            GOTO 2310
3030    REM
3040    REM *****************************
3050    REM P - PRINT A RECORD
3060    REM *****************************
3070    REM
3071            OPEN ACCTFILE$ AS #1 LEN = 71
3072            FIELD #1,10 AS ID$,40 AS NA$,5 AS CD$,8 AS DA$,8 AS NU$
3075            CLS
3080            INPUT " ENTER STARTING RECORD NUMBER - ",STRTNUM
3085            CLS
3090            INPUT " ENTER ENDING RECORD NUMBER - ",ENDNUM
3100            FOR I = STRTNUM TO ENDNUM
3110            RECNUM = I
3111            GET #1,RECNUM + 1
3120            GOSUB 15000                 ' PRINT THE RECORD
3130            NEXT I
3131            CLOSE #1
3140            GOTO 1450
                                        RCSU10V0.BAS

10000   REM ******************* RCSU10V0.BAS *****************************
10005   REM
10010   REM ***************************************************************
10015   REM THIS PROGRAM IS USED TO ENTER DATA INTO A NEW ACCOUNT
10020   REM ***************************************************************
10025   REM
10030   REM *****************************
10035   REM ENTER THE ACCOUNT I.D. NUMBER
10040   REM *****************************
```

```
10045   REM
10050           CLS : LOCATE 12,20
10051           INPUT "ENTER THE ACCOUNT I.D. NUMBER ==> ",A$
10052           TEMP = LEN(A$)
10053           IF TEMP > 0 THEN 10055
10054           RETURN
10055           GOSUB 24000      ' CHECK FORMAT OF NUMBER
10056           IF RESULT$ = "OK" THEN 10090 ELSE 10057
10057           CLS : LOCATE 12,20
10058           PRINT " FORMAT OF NUMBER JUST ENTERED WAS INVALID "
10059           PRINT
10060           PRINT "PRESS ANY KEY TO CONTINUE"
10061           A$ = INKEY$ : IF A$ = "" THEN 10061 ELSE 10050
10065   REM
10070   REM *******************************
10075   REM SEARCH FOR THE FILE NUMBER
10080   REM *******************************
10085   REM
10090           STARTNUM! = 6
10095           GOSUB 16000      ' SEARCH FOR THE NUMBER
10100           IF RESULT$ = "FOUND" THEN 10130 ELSE 10205
10105   REM
10110   REM *******************************
10115   REM SEE IF THE FILE THAT WAS FOUND IS "ACTIVE"
10120   REM *******************************
10125   REM
10130           IF ST$ = "A" THEN 10170
10131           IF STARTNUM! < TOTOREC! THEN 10132 ELSE 10205
10132           STARTNUM! = I! + 1 : GOTO 10095
10145   REM
10150   REM *******************************
10155   REM AN ACTIVE FILE WITH THIS NUMBER ALREADY EXISTS
10160   REM *******************************
10165   REM
10170           PRINT
10175           PRINT "AN ACTIVE FILE ALREADY EXISTS WITH THIS ACCOUNT NUMBER"
10176           PRINT
10177           PRINT "PRESS ANY KEY TO CONTINUE"
10178           A$ = INKEY$ : IF A$ = "" THEN 10178 ELSE 10180
10180           RETURN
10185   REM
10190   REM *******************************
10195   REM ACCOUNT NUMBER IS VALID - PROCEED WITH DATA ENTRY
10200   REM *******************************
10201   REM
10205           ACTDAT$ = DATE$
10215           CLS : INPUT "NAME ==> ",NAMES$
10220           CLS : INPUT "DOOR ==> ",DOOR$
10225           GOSUB 12000              ' FETCH A CODE
10230           MATCODE$ = TSTCODE$
10235           NUMCODED# = 0
10240           STATUS$ = "A" : DEACTDAT$ = "00-00-0000"
10245   REM
10250   REM *******************************
10255   REM DISPLAY THE INFORMATION
10260   REM *******************************
10265   REM
10270                   GOSUB 11000      ' DISPLAY THE DATA
10275   REM
10280   REM *******************************
10285   REM IS THE DATA CORRECT ?
10290   REM *******************************
10295   REM
10300           GOSUB 10425
10305           A$ = INKEY$ : IF A$ = "" THEN 10305
10310           TEMP = LEN(A$) : IF TEMP = 2 GOTO 10325
10315           TEMP = ASC(A$) : IF TEMP = 13 GOTO 10725 ' MODIFY RECORD
10320           BEEP : GOTO 10305
10325           A$ = RIGHT$(A$,1)
10330           IF A$ = "P" THEN 10345
```

```
10335            IF A$ = "H" THEN 10385
10340            BEEP : GOTO 10305
10345            GOSUB 10450
10350            A$ = INKEY$ : IF A$ = "" THEN 10350
10355            TEMP = LEN(A$) : IF TEMP = 2 GOTO 10365
10360            TEMP = ASC(A$) : IF TEMP = 13 GOTO 10525 ' WRITE THE RECORD
10365            A$ = RIGHT$(A$,1)
10370            IF A$ = "P" THEN 10385
10375            IF A$ = "H" THEN 10300
10380            BEEP : GOTO 10350
10385            GOSUB 10475
10390            A$ = INKEY$ : IF A$ = "" THEN 10390
10395            TEMP = LEN(A$) : IF TEMP = 2 THEN 10405
10400            TEMP = ASC(A$) : IF TEMP = 13 THEN 10645 ' ABORT THE RECORD
10405            A$ = RIGHT$(A$,1)
10410            IF A$ = "P" THEN 10300
10415            IF A$ = "H" THEN 10345
10420            BEEP : GOTO 10390
10425            LOCATE 12,1
10430            PRINT"           [X]      MODIFY THE RECORD
10435            PRINT"           [ ]      FILE THE RECORD
10440            PRINT"           [ ]      ABORT THE RECORD
10445            RETURN
10450            LOCATE 12,1
10455            PRINT"           [ ]      MODIFY THE RECORD
10460            PRINT"           [X]      FILE THE RECORD
10465            PRINT"           [ ]      ABORT THE RECORD
10470            RETURN
10475            LOCATE 12,1
10480            PRINT"           [ ]      MODIFY THE RECORD
10485            PRINT"           [ ]      FILE THE RECORD
10490            PRINT"           [X]      ABORT THE RECORD
10495            RETURN
10500    REM
10505    REM ****************************
10510    REM INCREMENT THE NUMBER OF RECORDS BY ONE
10515    REM ****************************
10520    REM
10525            OPEN ACCTFILE$ AS #1 LEN = 128
10530            FIELD #1 ,4 AS TR$
10535            GET #1,1
10540            RECNUM! = CVS(TR$) + 1 ' ADDING AN ACCOUNT
10545            LSET TR$ = MKS$(RECNUM!)
10550            PUT #1,1
10555            CLOSE #1
10560    REM
10565    REM ****************************
10570    REM WRITE THE RECORD TO THE FILE
10575    REM ****************************
10580    REM
10585            OPEN ACCTFILE$ AS #1 LEN = 128
10590            FIELD #1,9 AS AN$,40 AS NA$,40 AS DR$,1 AS ST$,
                       10 AS AD$,10 AS DD$,5 AS MC$,8 AS NC$
10595            RSET AN$ = ACCTNUM$
10600            LSET NA$ = NAMES$
10605            LSET DR$ = DOOR$
10610            LSET ST$ = STATUS$
10615            LSET AD$ = ACTDAT$
10620            LSET DD$ = DEACTDAT$
10625            LSET MC$ = MATCODE$
10630            LSET NC$ = MKD$(NUMCODED!)
10635            PUT #1, RECNUM!
10640            CLOSE #1
10645    REM
10650    REM ****************************
10655    REM STORE THE NEW VALUE FOR TC!
10660    REM ****************************
10665    REM
10670            OPEN ACCTFILE$ AS #1 LEN = 128
10675            FIELD #1,4 AS TC$
10680            LSET TC$ = MKS$(TC!)
```

```
10685            PUT #1, 2
10690            CLOSE #1
10695            RETURN
10700    REM
10705    REM ***************************
10710    REM MODIFY THE RECORD
10715    REM ***************************
10720    REM
10725            CLS
10730            PRINT"ACCT. NUMBER : "ACCTNUM$
10735            LOCATE 2,16,1
10740            INPUT "",A$
10745            TEMP = LEN(A$)
10750            IF TEMP = 0 THEN GOTO 10760
10755            ACCTNUM$ = A$ : GOTO 10725
10760            CLS
10765            PRINT"NAME : "NAMES$
10770            LOCATE 2,8,1
10775            INPUT "",A$
10780            TEMP = LEN(A$)
10785            IF TEMP = 0 THEN GOTO 10795
10790            NAMES$ = A$ : GOTO 10760
10795            CLS
10800            PRINT"DOOR : "DOOR$
10805            LOCATE 2,8,1
10810            INPUT "",A$
10815            TEMP = LEN(A$)
10820            IF TEMP = 0 THEN 10270
10825            DOOR$ = A$ : GOTO 10800
                                         RCSU12VC.BAS

12000    REM ***************** RCSU12VC.BAS *********************
12010    REM
12020    REM ********************************************************
12030    REM THIS SUBROUTINE GENERATES 5-DIGIT CODE
12040    REM NOTE: NUMCODES IN NOT INCREMENTED BY THIS PROGRAM
12050    REM       SINCE WE STILL HAVE TO CHECK FOR DUPLICATION.
12060    REM ********************************************************
12070    REM
12080    REM ******************************
12090    REM OPEN THE FILE AND GET THE NEXT VALUE FOR TC! ( TEST CODE )
12100    REM ******************************
12110    REM
12120            FLAG$ = "FIRST"            ' FIRST TRY FOR A CODE NUMBER
12130            OPEN ACCTFILE$ AS #1 LEN = 128
12140            FIELD #1 ,4 AS TC$         ' TEST CODE
12150            GET #1,2
12160            TC! = CVS(TC$)
12170            CLOSE #1
12180            GOSUB 17000       ' FETCH AND ASSIGN CODE BLOCKS
12190    REM
12200    REM ******************************
12210    REM IF TC! IS > 999,999 THEN SET TC! = TO 1
12220    REM ******************************
12230    REM
12240            TC! = TC! + 1
12250            TSTCODE$ = STR$(TC!)
12251            TEMP = LEN(TSTCODE$)
12252            TSTCODE$ = RIGHT$( TSTCODE$,TEMP -1 )
12253            TSTCODE$ = "00000" + TSTCODE$
12254            TSTCODE$ = RIGHT$(TSTCODE$,5)
12260            IF TC! < 100000! THEN 12390
12270            IF FLAG$ = "FIRST" THEN 12300
12280            CLS
12290            PRINT "ERROR1 - RAN OUT OF VALID CODES " : END
12300            FLAG$ = "SECOND"
12310            TC! = 0 : GOTO 12240
12340    REM
12350    REM ******************************
12360    REM SEE IF TC! IS WITHIN ONE OF THE CODE BLOCKS
```

```
12370   REM ******************************
12380   REM
12390           IF TC! >= SB1! AND TC! <= EB1! THEN 12550
12400           IF TC! >= SB2! AND TC! <= EB2! THEN 12550
12410           IF TC! >= SB3! AND TC! <= EB3! THEN 12550
12420           IF TC! >= SB4! AND TC! <= EB4! THEN 12550
12430           IF TC! >= SB5! AND TC! <= EB5! THEN 12550
12440           IF TC! >= SB6! AND TC! <= EB6! THEN 12550
12450           IF TC! >= SB7! AND TC! <= EB7! THEN 12550
12460           IF TC! >= SB8! AND TC! <= EB8! THEN 12550
12470           IF TC! >= SB9! AND TC! <= EB9! THEN 12550
12480           IF TC! >= SB10! AND TC! <= EB10! THEN 12550
12490           GOTO 12240        ' INCREMENT TC! AND TRY AGAIN
12500   REM
12510   REM ***********************
12520   REM CHECK TO SEE IF CODE NUMBER ALREADY EXISTS
12530   REM ***********************
12540   REM
12550           OPEN ACCTFILE$ AS #1 LEN = 128
12560           FIELD #1, 4 AS TR$       ' TOTAL RECORDS
12570           GET #1, 1
12580           CLOSE #1
12590           TOTREC! = CVS(TR$)
12600           OPEN ACCTFILE$ AS #1 LEN = 128
12610           FIELD #1, 9 AS AN$,40 AS NA$,40 AS DR$, 1 AS ST$,
                        8 AS AD$,8 AS DD$,5 AS MC$,8 AS NC$
12620           FOR I = 5 TO TOTREC!
12630           GET #1, I
12640           IF TSTCODE$ = MC$ THEN 12680
12650           NEXT I
12660           CLOSE #1
12670           RETURN
12680           GOTO 12240        ' INCREMENT TC! AND TRY AGAIN
                                  RCSU13V0.BAS

13000   REM ***************** RCSU13V0.BAS ***************************
13005   REM
13010   REM ******************************************************
13015   REM THIS SUBROUTINE SEARCHES BY CODE NUMBER
13020   REM ******************************************************
13025   REM
13030   REM ******************************
13035   REM S - SEARCH BY CODE NUMBER
13040   REM ******************************
13045   REM
13050   REM ******************************
13055   REM ENTER THE CODE NUMBER
13060   REM ******************************
13065   REM
13070           CLS : INPUT " ENTER THE CODE NUMBER ==> ",CODENUM$
13075           TEMP = LEN(CODENUM$)
13080           IF TEMP = 0 THEN 13085 ELSE 13115
13085           RETURN
13090   REM
13095   REM ******************************
13100   REM SEARCH FOR AN ACCOUNT WITH THIS CODE NUMBER
13105   REM ******************************
13110   REM
13115           STARTNUM! = 6
13120           GOSUB 20000       ' SEARCH FOR THE ACCOUNT NUMBER
13125           IF RESULT$ = "FOUND" THEN 13180
13130           CLS
13135           PRINT "NO ACCOUNT WAS FOUND WITH THIS CODE NUMBER"
13136           PRINT
13140           PRINT " ---- PRESS ANY KEY TO CONTINUE ---- "
13145           A$ = INKEY$ : IF A$ = "" THEN 13145 ELSE 13150
13150           RETURN
13155   REM
13160   REM ******************************
13165   REM IF THE FILE WAS FOUND PRINT THE DATA
```

```
13170   REM *****************************
13175   REM
13180           MATCODE$ = MC$
13185           TEMP$ = MATCODE$
13190           GOSUB 13490
13195           DIGIT$ = MID$(TEMP$,1,1)
13200           DIGIT = ASC(DIGIT$) - 48
13205           CIRCLE ( 336 + 32*DIGIT,21),5
13210           DIGIT$ = MID$(TEMP$,2,1)
13215           DIGIT = ASC(DIGIT$) - 48
13220           CIRCLE ( 336 + 32*DIGIT,35),5
13225           DIGIT$ = MID$(TEMP$,3,1)
13230           DIGIT = ASC(DIGIT$) - 48
13235           CIRCLE ( 336 + 32*DIGIT,49),5
13240           DIGIT$ = MID$(TEMP$,4,1)
13245           DIGIT = ASC(DIGIT$) - 48
13250           CIRCLE ( 336 + 32*DIGIT,63),5
13255           DIGIT$ = MID$(TEMP$,5,1)
13260           DIGIT = ASC(DIGIT$) -48
13265           CIRCLE ( 336 + 32*DIGIT,77),5
13270           GOSUB 13340      ' DISPLAY ACCOUNT DATA
13275           A$ = INKEY$ : IF A$ = "" THEN 13275 ELSE 13280
13280           IF STARTNUM! < TOTREC! THEN 13285 ELSE 13135
13285           STARTNUM! = I! + 1 : GOTO 13120
13315   REM
13320   REM *****************************
13325   REM THIS INTERNAL SUBROUTINE DISPLAYS THE ACCOUNT DATA
13330   REM *****************************
13340   REM
13345           LOCATE 1,1
13350           PRINT "ACCT. NUMBER : ";AN$
13355           LOCATE 5,1
13360           PRINT "MATRIX CODE NUMBER : ";MATCODE$
13385           LOCATE 9,1
13390           PRINT "STATUS : MADE ACTIVE ";
13395           PRINT USING "\          \";AD$
13400           LOCATE 11,1
13405           IF ST$ = "A" THEN 13410 ELSE 13415
13410           PRINT "         STILL ACTIVE" : GOTO 13425
13415           PRINT "         MADE INACTIVE ";
13420           PRINT USING "\         \";DD$;
13425           LOCATE 18,1
13430           PRINT "NAME : ";NA$
13435           LOCATE 22,1
13440           PRINT "DOOR : ";DR$
13445           LOCATE 24,30
13450           PRINT "PRESS ANY KEY TO CONTINUE THE SEARCH";
13455           RETURN
13460   REM
13465   REM *****************************
13470   REM THIS SUBROUTINE DRAWS THE MATRIX ON THE SCREEN INCLUDING
13475   REM THE THREE FIXED DOTS ( THESE DOTS ARE FILLED IN )
13480   REM *****************************
13485   REM
13490           CLS
13495           SCREEN 2
13500           LINE (320,0)-(639,0)
13505           LINE (320,14)-(639,14)
13510           LINE (320,28)-(639,28)
13515           LINE (320,42)-(639,42)
13520           LINE (320,56)-(639,56)
13525           LINE (320,70)-(639,70)
13530           LINE (320,84)-(639,84)
13535           LINE (320,98)-(639,98)
13540           LINE (320,0)-(320,98)
13545           LINE (352,0)-(352,98)
13550           LINE (384,0)-(384,98)
13555           LINE (416,0)-(416,98)
13560           LINE (448,0)-(448,98)
13565           LINE (480,0)-(480,98)
```

```
13570           LINE (512,0)-(512,98)
13575           LINE (544,0)-(544,98)
13580           LINE (576,0)-(576,98)
13585           LINE (608,0)-(608,98)
13590           LINE(639,0)-(639,98)
13595           CIRCLE ( 336,7),5 : PAINT (336,7)
13600           CIRCLE ( 624,7),5 : PAINT (624,7)
13605           CIRCLE ( 624,91),5 : PAINT (624,91)
13610           LOCATE 14,42,1
13615           PRINT " 0   1   2   3   4   5   6   7   8   9"
13620           LOCATE 3,34 : PRINT"MSD";
13625           LOCATE 10,34 : PRINT "LSD"
13630           RETURN
                              RCSU14V0.BAS

14000   REM ******************* RCSU14V0.BAS *************************
14005   REM
14010   REM *************************************************************
14015   REM THIS PROGRAM IS USED TO DE-ACTIVATE AN EXISTING ACCOUNT
14020   REM *************************************************************
14025   REM
14030   REM ******************************
14035   REM ENTER THE ACCOUNT I.D. NUMBER
14040   REM ******************************
14045   REM
14050           CLS : LOCATE 12,20
14051           INPUT " ENTER THE ACCOUNT I.D. NUMBER ==> ",A$
14052           TEMP = LEN(A$)
14053           IF TEMP > 0 THEN 14055
14054           RETURN
14055           GOSUB 24000      ' CHECK FORMAT OF NUMBER
14056           IF RESULT$ = "OK" THEN 14090
14057           CLS : LOCATE 12,20
14058           PRINT "FORMAT OF NUMBER JUST ENTERED WAS INVALID"
14059           PRINT
14060           PRINT "PRESS ANY KEY TO CONTINUE"
14061           A$ = INKEY$ : IF A$ = "" THEN 14061 ELSE 14050
14065   REM
14070   REM ******************************
14075   REM SEARCH FOR THE FILE NUMBER
14080   REM ******************************
14085   REM
14090           STARTNUM! = 6
14095           GOSUB 16000      ' SEARCH FOR THE NUMBER
14100           IF RESULT$ = "FOUND" THEN 14130 ELSE 14170
14105   REM
14110   REM ******************************
14115   REM SEE IF THE FILE THAT WAS FOUND IS "ACTIVE"
14120   REM ******************************
14125   REM
14130           IF ST$ = "A" THEN 14225
14135           IF STARTNUM! < TOTOREC! THEN 14140 ELSE 14170
14140           STARTNUM! = I! + 1 : GOTO 14095
14145   REM
14150   REM ******************************
14155   REM NO ACTIVE ACCOUNT WITH THIS ACCOUNT NUMBER EXITS
14160   REM ******************************
14165   REM
14170           PRINT
14175           PRINT "NO ACTIVE ACCOUNT EXITS WITH THIS ACCOUNT NUMBER"
14180           PRINT
14185           PRINT "PRESS ANY KEY TO CONTINUE"
14190           A$ = INKEY$ : IF A$ = "" THEN 14190 ELSE 14195
14195           GOTO 14525       ' RETURN
14200   REM
14205   REM ******************************
14210   REM DISPLAY THE ACCOUNT ENTRIES
14215   REM ******************************
14220   REM
14225           ACCTNUM$ = AN$
14230           NAMES$ = NA$
```

```
14235            DOOR$ = DR$
14240            STATUS$ = ST$
14245            ACTDAT$ = AD$
14250            DEACTDAT$ = DD$
14255            MATCODE! = CVS(MC$)
14260            NUMCODED# = CVD(NC$)
14265            CLOSE #1
14266            GOSUB 11000       ' DISPLAY THE DATA
14270   REM
14275   REM ******************************
14280   REM DIPLAY THE OPTIONS
14285   REM ******************************
14290   REM
14295            GOSUB 14380
14300            A$ = INKEY$ : IF A$ = "" THEN 14300
14305            TEMP = LEN(A$) : IF TEMP = 2 GOTO 14320
14310            TEMP = ASC(A$) : IF TEMP = 13 GOTO 14475 ' DE-ACTIVATE
14315            BEEP : GOTO 14300
14320            A$ = RIGHT$(A$,1)
14325            IF A$ = "P" THEN 14340
14330            IF A$ = "H" THEN 14340
14335            BEEP : GOTO 14300
14340            GOSUB 14400
14345            A$ = INKEY$ : IF A$ = "" THEN 14345
14350            TEMP = LEN(A$) : IF TEMP = 2 GOTO 14360
14355            TEMP = ASC(A$) : IF TEMP = 13 GOTO 14525 ' RETURN TO MENU
14360            A$ = RIGHT$(A$,1)
14365            IF A$ = "P" THEN 14295
14370            IF A$ = "H" THEN 14295
14375            BEEP : GOTO 14345
14380            LOCATE 12,1
14385            PRINT"           [X]        DE-ACTIVATE THE ACCOUNT NUMBER
14390            PRINT"           [ ]        RETURN TO MENU ( LEAVE IT ACTIVE
14395            RETURN
14400            LOCATE 12,1
14405            PRINT"           [ ]        DE-ACTIVATE THE ACCOUNT NUMBER
14410            PRINT"           [X]        RETURN TO MENU ( LEAVE IT ACTIVE
14415            RETURN
14446            DEACTDAT$ = DATE$
14450   REM
14455   REM ******************************
14460   REM DE-ACTIVATE THE ACCOUNT AND WRITE IT TO THE FILE
14465   REM ******************************
14470   REM
14475            OPEN ACCTFILE$ AS #1 LEN = 128
14480            FIELD #1,9 AS AN$,40 AS NA$,40 AS DR$,1 AS ST$,
                     10 AS AD$,10 AS DD$,5 AS MC$,8 AS NC$
14481            GET #1, I!
14485            LSET ST$ = "D"
14486            LSET DD$ = DATE$
14490            PUT #1, I!
14495            CLOSE #1
14500   REM
14505   REM ******************************
14510   REM RETURN TO CALLING PROGRAM
14515   REM ******************************
14520   REM
14525            RETURN
                                RCSU15V0.BAS

15000   REM ******************** RCSU15V0.BAS ********************************
15005   REM
15010   REM *******************************************************************
15015   REM THIS PROGRAM IS USED TO VIEW/PRINT ACCOUNTS
15020   REM *******************************************************************
15025   REM
15030   REM ******************************
15035   REM DISPLAY THE OPTIONS
15040   REM ******************************
15045   REM
```

```
15050           CLS
15055           GOSUB 15180
15060           A$ = INKEY$ : IF A$ = "" THEN 15060
15065           TEMP = LEN(A$) : IF TEMP = 2 GOTO 15080
15070           TEMP = ASC(A$) : IF TEMP = 13 GOTO 15280 ' VIEW/PRINT ONE ACCT
15075           BEEP : GOTO 15060
15080           A$ = RIGHT$(A$,1)
15085           IF A$ = "P" THEN 15100
15090           IF A$ = "H" THEN 15140
15095           BEEP : GOTO 15060
15100           GOSUB 15205
15105           A$ = INKEY$ : IF A$ = "" THEN 15105
15110           TEMP = LEN(A$) : IF TEMP = 2 GOTO 15120
15115           TEMP = ASC(A$) : IF TEMP = 13 GOTO 15640 ' PRINT ALL ACCOUNTS
15120           A$ = RIGHT$(A$,1)
15125           IF A$ = "P" THEN 15140
15130           IF A$ = "H" THEN 15055
15135           BEEP : GOTO 15105
15140           GOSUB 15230
15145           A$ = INKEY$ : IF A$ = "" THEN 15145
15150           TEMP = LEN(A$) : IF TEMP = 2 THEN 15160
15155           TEMP = ASC(A$) : IF TEMP = 13 THEN 15825 ' RETURN TO MAIN MENU
15160           A$ = RIGHT$(A$,1)
15165           IF A$ = "P" THEN 15055
15170           IF A$ = "H" THEN 15100
15175           BEEP : GOTO 15145
15180           LOCATE 12,1
15185           PRINT"          [X]      VIEW/PRINT ONE ACCOUNT
15190           PRINT"          [ ]      PRINT ALL ACCOUNTS
15195           PRINT"          [ ]      RETURN TO MAIN MENU
15200           RETURN
15205           LOCATE 12,1
15210           PRINT"          [ ]      VIEW/PRINT ONE ACCOUNT
15215           PRINT"          [X]      PRINT ALL ACCOUNTS
15220           PRINT"          [ ]      RETURN TO MAIN MENU
15225           RETURN
15230           LOCATE 12,1
15235           PRINT"          [ ]      VIEW/PRINT ONE ACCOUNT
15240           PRINT"          [ ]      PRINT ALL ACCOUNTS
15245           PRINT"          [X]      RETURN TO MAIN MENU
15250           RETURN
15255   REM
15260   REM *******************************
15265   REM VIEW/PRINT AN INDIVIDUAL ACCOUNT
15270   REM *******************************
15275   REM
15280           CLS : LOCATE 12,20
15281           INPUT " ENTER THE ACCOUNT I.D. NUMBER ==  ",A$
15282           TEMP = LEN(A$)
15283           IF TEMP > 0 THEN 15285
15284           RETURN
15285           GOSUB 24000       ' CHECK FORMAT OF NUMBER
15286           IF RESULT$ = "OK" THEN 15295
15287           CLS : LOCATE 12,20
15288           PRINT "FORMAT OF NUMBER JUST ENTERED WAS INVALID"
15289           PRINT
15290           PRINT "PRESS ANY KEY TO CONTINUE"
15291           A$ = INKEY$ : IF A$ = "" THEN 15291 ELSE 15280
15295           STARTNUM! = 6             ' START WITH RECORD NUMBER 6
15300           GOSUB 16000       ' SEARCH FOR THE ACCOUNT NUMBER
15305           IF RESULT$ = "FOUND" THEN 15320
15310           CLS : PRINT" NO MORE ACCOUNTS WITH THIS NUMBER "
15311           PRINT
15312           PRINT " ---- PRESS ANY KEY TO CONTINUE ----
15315           A$ = INKEY$ : IF A$ = "" THEN 15315 ELSE 15050
15320           ACCTNUM$ = AN$
15325           NAMES$ = NA$
15330           DOOR$ = DR$
15335           STATUS$ = ST$
15340           ACTDAT$ = AD$
```

```
15345            DEACTDAT$ = DD$
15350            MATCODE$ = MC$
15355            NUMCODED# = CVD(NC$)
15360            CLOSE #1
15365            GOSUB 11000              ' DISPLAY THE INFORMATION
15370    REM
15375    REM ************************
15380    REM PRINT OUT THIS ACCOUNT ? - ELSE RETURN TO LOCAL MENU
15385    REM ************************
15390    REM
15395            LOCATE 13,10
15400            PRINT "PRINT THIS ACCOUNT ON THE PRINTER ? ";
15405            GOSUB 15495             ' "YES" IS SHOWN
15410            A$ = INKEY$ : IF A$ = "" THEN 15410
15415            TEMP = LEN(A$) : IF TEMP = 2 GOTO 15430
15420            TEMP = ASC(A$) : IF TEMP = 13 GOTO 15600 ' YES - PRINT IT
15425            BEEP : GOTO 15410
15430            A$ = RIGHT$(A$,1)
15435            IF A$ = "P" THEN 15450
15440            IF A$ = "H" THEN 15450
15445            BEEP : GOTO 15410
15450            GOSUB 15515             ' "NO" IS SHOWN
15455            A$ = INKEY$ : IF A$ = "" THEN 15455
15460            TEMP = LEN(A$) : IF TEMP = 2 THEN 15475
15465            TEMP = ASC(A$) : IF TEMP = 13 THEN 15560 ' NO - KEEP SEARCHING
15470            BEEP : GOTO 15455
15475            A$ = RIGHT$(A$,1)
15480            IF A$ = "P" THEN 15405
15485            IF A$ = "H" THEN 15405
15490            BEEP : GOTO 15455
15495            LOCATE 16,1
15500            PRINT "         [X]     YES - PRINT IT
15505            PRINT "         [ ]     NO  - KEEP SEARCHING
15510            RETURN
15515            LOCATE 16,1
15520            PRINT "         [ ]     YES - PRINT IT
15525            PRINT "         [X]     NO  - KEEP SEARCHING
15530            RETURN
15535    REM
15540    REM ****************************
15545    REM KEEP ON SEARCHING
15550    REM ****************************
15555    REM
15560            IF STARTNUM! < TOTREC! THEN 15565 ELSE 15570
15565            STARTNUM! = I!+ 1 : GOTO 15300    ' KEEP LOOKING
15570            GOTO 15310
15575    REM
15580    REM ****************************
15585    REM PRINT OUT THE ACCOUNT THAT WAS DISPLAY ON THE CRT
15590    REM ****************************
15595    REM
15600            GOSUB 15830        ' PRINT THE DATA ON THE PRINTER
15605            GOTO 15560         ' SEARCH FOR NEXT FILE
15610    REM
15615    REM ****************************
15620    REM PRINT OUT ALL OF THE ACCOUNTS
15625    REM ****************************
15630    REM
15635            LPRINT : LPRINT
15640            A$ = STRING$(34,42)
15645            B$ = STRING$(80,42)
15650            LPRINT A$;" ACCOUNTS ";A$
15655            LPRINT
15660            LPRINT "FILE NAME : ";
15661            LPRINT USING "\        \";ACCTFILE$;
15665            LPRINT SPC(40) "DATE : ";DATE$
15670            LPRINT
15675            LPRINT B$
15690    REM
15695    REM ****************************
```

```
15700    REM DETERMINE THE NUMBER OF ACCOUNTS
15705    REM ****************************
15710    REM
15715            OPEN ACCTFILE$ AS #1 LEN = 128
15720            FIELD #1, 4 AS TR$
15725            GET #1, 1
15730            TOTREC! = CVS(TR$)
15735            CLOSE #1
15740    REM
15745    REM ****************************
15750    REM PRINT OUT ALL OF THE ACCOUNTS
15755    REM ****************************
15760    REM
15765            OPEN ACCTFILE$ AS #1 LEN = 128
15770            FIELD #1, 9 AS AN$,40 AS NA$,40 AS DR$,1 AS ST$,
                      10 AS AD$,10 AS DD$,5 AS MC$,8 AS NC$
15775            FOR I! = 6 TO TOTREC!
15780            GET #1,I!
15785            GOSUB 15830        ' PRINT THE RECORD
15790            NEXT I!
15795            CLOSE #1
15800    REM
15805    REM ****************************
15810    REM RETURN TO CALLING PROGRAM ( RETURNS TO MAIN MENU )
15815    REM ****************************
15820    REM
15825            RETURN
15830    REM
15835    REM ****************************************************
15840    REM THIS LOCAL SUBROUTINE IS USED TO PRINT THE DATA FROM A RECORD.
15845    REM ****************************************************
15850    REM
15855            LPRINT : LPRINT : LPRINT
15860            LPRINT "ACCT. NUMBER : ";AN$
15865            LPRINT
15870            LPRINT "NAME : ";NA$
15875            LPRINT
15880            LPRINT "DOOR : ";DR$
15885            LPRINT
15890            LPRINT "STATUS : MADE ACTIVE ";
15895            LPRINT USING "\          \";AD$;
15900            IF ST$ = "A" THEN 15905 ELSE 15910
15905            LPRINT "                       STILL ACTIVE" : GOTO 15920
15910            LPRINT "                       MADE INACTIVE ";
15915            LPRINT USING "\          \";DD$
15920            LPRINT
15925            LPRINT "MATRIX CODE NUMBER : ";
15930            LPRINT USING "\   \";MC$
15950            RETURN
                                      RCSU16V0.BAS

16000    REM *************** RCSU16V0.BAS ******************
16010    REM
16020    REM ****************************************
16030    REM THIS PROGRAM SEARCHES FOR A FILE WITH THE PRESELECTED
16040    REM ACCOUNT NUMBER
16050    REM ****************************************
16060    REM
16070    REM ****************************
16080    REM DETERMINE THE NUMBER OF RECORDS THAT NEED TO BE SEARCHED
16090    REM ****************************
16100    REM
16110            OPEN ACCTFILE$ AS #1 LEN = 128
16120            FIELD #1, 4 AS TR$
16130            GET #1, 1
16140            TOTREC! = CVS(TR$)    ' NUMBER OF ACCOUNTS
16150            CLOSE #1
16160    REM
16170    REM ****************************
16180    REM FIND AN ACCOUNT WITH A MATCHING ACCOUNT NUMBER
```

```
16190       REM ****************************
16200       REM
16210             OPEN ACCTFILE$ AS #1 LEN = 128
16220             FIELD #1, 9 AS AN$,40 AS NA$,40 AS DR$,1 AS ST$,
                        10 AS AD$,10 AS DD$,5 AS MC$,8 AS NC$
16230       FOR I! = STARTNUM! TO TOTREC!
16240             GET #1, I!
16260             IF ACCTNUM$ = AN$ THEN 16330
16280             NEXT I!
16290             CLOSE #1
16300             RESULT$ = "NOTFOUND"
16310             RETURN
16330             CLOSE #1
16340             RESULT$ = "FOUND"
16350             RETURN
                                    RCSU17V0.BAS

17000       REM ******************* RCSU17V0.BAS ************************
17010       REM
17020       REM ****************************************************
17030       REM THIS SUBROUTINE FETCHES THE CODE BLOCK INFORMATION AND
17040       REM ASSIGNS THE INFORMATION TO A NEW SET OF VARIABLES
17050       REM ****************************************************
17060       REM
17070       REM
17080             OPEN ACCTFILE$ AS #1 LEN = 128
17090             FIELD #1,4 AS S1$,4 AS E1$,4 AS S2$,4 AS E2$,4 AS S3$,4 AS E3
                        4 AS S4$,4 AS E4$,4 AS S5$,4 AS E5$,4 AS S6$,4 AS E6$,4 AS S7$
                        4 AS E7$,4 AS S8$,4 AS E8$,4 AS S9$,4 AS E9$,4 AS S10$,4 AS E1
17100             GET #1,3
17110             SB1! = CVS(S1$) : EB1! = CVS(E1$)
17120             SB2! = CVS(S2$) : EB2! = CVS(E2$)
17130             SB3! = CVS(S3$) : EB3! = CVS(E3$)
17140             SB4! = CVS(S4$) : EB4! = CVS(E4$)
17150             SB5! = CVS(S5$) : EB5! = CVS(E5$)
17160             SB6! = CVS(S6$) : EB6! = CVS(E6$)
17170             SB7! = CVS(S7$) : EB7! = CVS(E7$)
17180             SB8! = CVS(S8$) : EB8! = CVS(E8$)
17190             SB9! = CVS(S9$) : EB9! = CVS(E9$)
17200             SB10! = CVS(S10$) : EB10! = CVS(E10$)
17210             CLOSE #1
17220             RETURN
                                    RCSU18V0.BAS
18000       REM ******************* RCSU18V0.BAS ************************
18010       REM
18020       REM ****************************************************
18030       REM THIS SUBROUTINE IS USED TO EXAMINE AND/OR MODIFY THE CODE
18040       REM BLOCKS.
18050       REM ****************************************************
18060       REM
18120             OPEN ACCTFILE$ AS #1 LEN = 128
18130             FIELD #1,4 AS S1$,4 AS E1$,4 AS S2$,4 AS E2$,4 AS S3$,4 AS E3
                        4 AS S4$,4 AS E4$,4 AS S5$,4 AS E5$,4 AS S6$,4 AS E6$,4 AS S7$
                        4 AS E7$,4 AS S8$,4 AS E8$,4 AS S9$,4 AS E9$,4 AS S10$,4 AS E1
18140             GET #1,3
18150             SB1! = CVS(S1$) : EB1! = CVS(E1$)
18160             SB2! = CVS(S2$) : EB2! = CVS(E2$)
18170             SB3! = CVS(S3$) : EB3! = CVS(E3$)
18180             SB4! = CVS(S4$) : EB4! = CVS(E4$)
18190             SB5! = CVS(S5$) : EB5! = CVS(E5$)
18200             SB6! = CVS(S6$) : EB6! = CVS(E6$)
18210             SB7! = CVS(S7$) : EB7! = CVS(E7$)
18220             SB8! = CVS(S8$) : EB8! = CVS(E8$)
18230             SB9! = CVS(S9$) : EB9! = CVS(E9$)
18240             SB10! = CVS(S10$) : EB10! = CVS(E10$)
18250             CLS
18260             PRINT"***************** CODE BLOCKS *********************
18270             PRINT"
18280             PRINT"                                    START       END"
18290             PRINT"                                    -------   -------"
```

```
18300          PRINT
18310          PRINT"BLOCK  1                  ";
18320          PRINT USING "         ######";SB1!,EB1!
18330          PRINT"BLOCK  2                  ";
18340          PRINT USING "         ######";SB2!,EB2!
18350          PRINT"BLOCK  3                  ";
18360          PRINT USING "         ######";SB3!,EB3!
18370          PRINT"BLOCK  4                  ";
18380          PRINT USING "         ######";SB4!,EB4!
18390          PRINT"BLOCK  5                  ";
18400          PRINT USING "         ######";SB5!,EB5!
18410          PRINT"BLOCK  6                  ";
18420          PRINT USING "         ######";SB6!,EB6!
18430          PRINT"BLOCK  7                  ";
18440          PRINT USING "         ######";SB7!,EB7!
18450          PRINT"BLOCK  8                  ";
18460          PRINT USING "         ######";SB8!,EB8!
18470          PRINT"BLOCK  9                  ";
18480          PRINT USING "         ######";SB9!,EB9!
18490          PRINT"BLOCK  10                 ";
18500          PRINT USING "         ######";SB10!,EB10!
18510          PRINT
18520          PRINT
18530          PRINT "WOULD YOU LIKE TO CHANGE A BLOCK   (Y/N) "
18540          A$ = INKEY$ : IF A$ = "" THEN 18540
18550          IF A$ = "Y" OR A$ = "y" THEN 18580
18560          IF A$ = "N" OR A$ = "n" THEN 18930
18570          BEEP : GOTO 18540
18580          INPUT " ENTER BLOCK NUMBER ==> ",BN$
18590          INPUT " ENTER START NUMBER ==> ",SN!
18600          INPUT " ENTER   END   NUMBER ==> ",EN!
18610          IF BN$ = "1" THEN 18720
18620          IF BN$ = "2" THEN 18740
18630          IF BN$ = "3" THEN 18760
18640          IF BN$ = "4" THEN 18780
18650          IF BN$ = "5" THEN 18800
18660          IF BN$ = "6" THEN 18820
18670          IF BN$ = "7" THEN 18840
18680          IF BN$ = "8" THEN 18860
18690          IF BN$ = "9" THEN 18880
18700          IF BN$ = "10" THEN 18900
18710          GOTO 18580
18720          LSET S1$ = MKS$(SN!)
18730          LSET E1$ = MKS$(EN!) : GOTO 18920
18740          LSET S2$ = MKS$(SN!)
18750          LSET E2$ = MKS$(EN!) : GOTO 18920
18760          LSET S3$ = MKS$(SN!)
18770          LSET E3$ = MKS$(EN!) : GOTO 18920
18780          LSET S4$ = MKS$(SN!)
18790          LSET E4$ = MKS$(EN!) : GOTO 18920
18800          LSET S5$ = MKS$(SN!)
18810          LSET E5$ = MKS$(EN!) : GOTO 18920
18820          LSET S6$ = MKS$(SN!)
18830          LSET E6$ = MKS$(EN!) : GOTO 18920
18840          LSET S7$ = MKS$(SN!)
18850          LSET E7$ = MKS$(EN!) : GOTO 18920
18860          LSET S8$ = MKS$(SN!)
18870          LSET E8$ = MKS$(EN!) : GOTO 18910
18880          LSET S9$ = MKS$(SN!)
18890          LSET E9$ = MKS$(EN!) : GOTO 18920
18900          LSET S10$ = MKS$(SN!)
18910          LSET E10$ = MKS$(EN!) : GOTO 18920
18920          PUT #1,3 : GOTO 18140
18930          PUT #1,3
18940          CLOSE #1
18950          RETURN
                                        RCSU19V0.BAS

19000   REM ******************* RCSU19V0.BAS *************************
19010   REM
```

```
19020     REM ************************************************
19030     REM THIS SUBROUTINE IS USED TO DISPLAY THE NUMBER OF ACCOUNTS
19040     REM THAT EXIST IN THE FILE ( ACTIVE OR INACTIVE ).
19050     REM ************************************************
19060     REM
19070           OPEN ACCTFILE$ AS #1 LEN = 128
19080           FIELD #1, 4 AS TR$         ' TOTAL RECORDS
19090           GET #1,1
19100           NUMACCTS! = CVS(TR$) - 5           ' 5 FOR HOUSE KEEPING
19110           CLS
19120           PRINT " NUMBER OF ACCOUNTS IS - ",NUMACCTS!
19130           PRINT " CHANGE THE NUMBER ? [Y/N]"
19140           A$ = INKEY$ : IF A$ = "" THEN 19140
19150           IF A$ = "Y" THEN 19180 ELSE IF A$ = "y" THEN 19180
19160           IF A$ = "N" THEN 19220 ELSE IF A$ = "n" THEN 19220
19170           GOTO 19130
19180           INPUT " ENTER THE NEW NUMBER - " ,TEMP!
19190           NUMACCTS! = TEMP!
19200           LSET TR$ =MKS$(NUMACCTS! + 5)
19210           PUT #1, 1
19220           CLOSE #1 : GOTO 1140
19230           RETURN
                                         RCSU20V0.BAS

20000     REM *************** RCSU20V0.BAS ***********************
20010     REM
20020     REM ************************************************
20030     REM THIS PROGRAM SEARCHES FOR A FILE WITH THE PRESELECTED
20040     REM CODE NUMBER
20050     REM ************************************************
20060     REM
20070     REM *************************
20080     REM DETERMINE THE NUMBER OF RECORDS THAT NEED TO BE SEARCHED
20090     REM *************************
20100     REM
20110           OPEN ACCTFILE$ AS #1 LEN = 128
20120           FIELD #1, 4 AS TR$
20130           GET #1, 1
20140           TOTREC! = CVS(TR$)       ' NUMBER OF ACCOUNTS
20150           CLOSE #1
20160     REM
20170     REM *************************
20180     REM FIND AN ACCOUNT WITH A MATCHING CODE NUMBER
20190     REM *************************
20200     REM
20210           OPEN ACCTFILE$ AS #1 LEN = 128
20220           FIELD #1, 9 AS AN$,40 AS NA$,40 AS DR$,1 AS ST$,
                      10 AS AD$,10 AS DD$,5 AS MC$,8 AS NC$
20230           FOR I! = STARTNUM! TO TOTREC!
20240           GET #1, I!
20250           IF CODENUM$ = MC$ THEN 20300
20260           NEXT I!
20270           CLOSE #1
20280           RESULT$ = "NOTFOUND"
20290           RETURN
20300           CLOSE #1
20310           RESULT$ = "FOUND"
20320           RETURN
                                         RCSU21V0.BAS

21000     REM *************** RCSU21V0.BAS ***********************
21010     REM
21020     REM ************************************************
21030     REM THIS SUBROUTINE IS USED TO INITIALIZE THE TEST CODE NUMBER
21040     REM ************************************************
21050     REM
21060     REM *****************************
21070     REM I - INITIALIZE THE TEST CODE NUMBER
21080     REM *****************************
21090     REM
```

```
21100    REM *****************************
21110    REM INITIALIZE THE TEST CODE NUMBER
21120    REM *****************************
21130    REM
21140           OPEN ACCTFILE$ AS #1 LEN = 128
21150           FIELD #1, 4 AS TC$
21160           GET #1, 2
21170           TSTCODE! = CVS(TC$)
21180           CLS : PRINT "TEST CODE IS EQUAL TO - ",TSTCODE!
21190           PRINT
21200           PRINT "DO YOU WANT TO CHANGE IT ? [Y/N] "
21210           A$ = INKEY$ : IF A$ = "" THEN 21210
21220           IF A$ = "Y" OR A$ = "y" THEN 21290
21230           IF A$ = "N" OR A$ = "n" THEN 21330
21240           BEEP : GOTO 21210
21250    REM
21260    REM *****************************
21270    REM CHANGE THE TEST CODE NUMBER
21280    REM *****************************
21290           CLS
21300           INPUT " ENTER THE NEW TEST CODE NUMBER ==> ",TSTCODE!
21310           LSET TC$ = MKS$(TSTCODE!)
21320           PUT #1,2
21330           CLOSE #1
21340           RETURN       ' RETURN TO MENU
                                   RCSU23V0.BAS

23000    REM ****************** RCSU23V0.BAS *********************
23010    REM
23020    REM ****************************************************
23030    REM THIS SUBROUTINE IS USED TO PRINT THE DATA FROM A RECORD.
23040    REM ****************************************************
23050    REM
23060    REM *****************************
23070    REM PRINT THE INFORMATION
23080    REM *****************************
23090    REM
23100           CLS
23110           LPRINT "ACCT. NUMBER : ";ACCTNUM$
23120           LPRINT
23130           LPRINT "NAME : ";NAMES$
23140           LPRINT
23150           LPRINT "DOOR : ";DOOR$
23160           LPRINT
23170           LPRINT "STATUS : MADE ACTIVE ";
23180           LPRINT USING "\      \";ACTDAT$;
23190           IF STATUS$ = "A" THEN 23200 ELSE 23210
23200           LPRINT "              STILL ACTIVE" : GOTO 23230
23210           LPRINT "              MADE INACTIVE ";
23220           LPRINT USING "\      \";DEACTDAT$
23230           LPRINT
23240           LPRINT "MATRIX CODE NUMBER : ";
23250           LPRINT USING "\   \";MATCODE$;
23260           LPRINT "              CARTONS CODED : ";
23270           LPRINT USING "#########";NUMCODED#
23280    REM
23290    REM *****************************
23300    REM RETURN TO THE CALLING PROGRAM
23310    REM *****************************
23320    REM
23330           RETURN
                                   RCSU24V0.BAS

24000    REM ****************** RCSU24V0.BAS *********************
24005    REM
24010    REM ****************************************************
24015    REM THIS SUBROUTINE IS USED TO CHECK THE ACCOUNT NUMBER ( A$)
24020    REM ****************************************************
24025    REM
24030    REM *****************************
```

```
24035   REM MAKE SURE THE TOTAL LENGTH DOES NOT EXCEED 9 CHARACTERS
24040   REM *****************************
24045   REM
24050           TLENGTH = LEN(A$)
24055           IF TLENGTH >9 THEN 24500
24060   REM
24065   REM *****************************
24070   REM FIND OUT WHERE THE DASH IS ( IF THERE IS ONE )
24075   REM *****************************
24080   REM
24085           B$ = "-"
24090           DASHPOS = INSTR(A$,B$)
24095           IF DASHPOS > 0 THEN 24135
24100           LDIGITS$ = A$
24105           RDIGITS$ = "001" : GOTO 24170
24110   REM
24115   REM *****************************
24120   REM SEPARATE THE DIGITS TO LEFT OF DASH FROM THOSE TO RIGHT OF DASH
24125   REM *****************************
24130   REM
24135           LDIGITS$ = LEFT$(A$,DASHPOS - 1)
24140           RDIGITS$ = RIGHT$(A$,TLENGTH - DASHPOS)
24145   REM
24150   REM *****************************
24155   REM CHECK THE LENGTH OF LDIGITS$ AND RDIGITS$
24160   REM *****************************
24165   REM
24170           LLENGTH = LEN(LDIGITS$)
24175           IF LLENGTH > 5 OR LLENGTH = 0 THEN 24500
24180           RLENGTH = LEN(RDIGITS$)
24185           IF RLENGTH > 3 OR RLENGTH = 0 THEN 24500
24170   REM
24195   REM *****************************
24200   REM MAKE SURE LDIGITS$ AND RDIGITS$ IS NUMERIC
24205   REM *****************************
24210   REM
24215           TSTSTRG$ = LDIGITS$
24220           GOSUB 24510         ' TEST FOR NUMERIC
24225           IF RESULT$ = "OK" THEN 24230 ELSE 24495
24230           TSTSTRG$ = RDIGITS$
24235           GOSUB 24510
24240           IF RESULT$ = "OK" THEN 24260 ELSE 24500
24245   REM
24250   REM *****************************
24255   REM REPLACE LEADING ZEROS IN LDIGITS$ WITH SPACES
24260   REM *****************************
24265   REM
24270           FOR I = 1 TO LLENGTH
24275           TEMP$ = LEFT$(LDIGITS$,1)
24280           IF TEMP$ = "0" THEN 24285 ELSE 24320
24285           LDIGITS$ = RIGHT$( LDIGITS$,LLENGTH - I )
24290           NEXT I
24295   REM
24300   REM *****************************
24305   REM RIGHT JUSIFY LDIGITS$ IN A FIELD OF 5 SPACES
24310   REM *****************************
24315   REM
24320           FLEFT$ = SPACE$(5)
24325           RSET FLEFT$ = LDIGITS$
24330   REM
24335   REM
24340   REM *****************************
24345   REM ADD LEADING ZEROS TO RDIGITS
24350   REM *****************************
24355   REM
24360           IF RLENGTH = 1 THEN LZ$ = "00" : GOTO 24375
24365           IF RLENGTH = 2 THEN LZ$ = "0"  : GOTO 24375
24370           LZ$ = ""
24375           FRIGHT$ = LZ$ + RDIGITS$
24380   REM
```

```
24385   REM ************************************
24390   REM IF FRIGHT$ = "000" THEN MAKE IT INVALID
24395   REM ************************************
24400   REM
24405           IF FRIGHT$ = "000" THEN 24500
24410   REM
24415   REM ************************************
24420   REM RECOMBINE FLEFTS$ AND FRIGHT$ WITH A DASH IN BETWEEN
24425   REM ************************************
24430   REM
24435           ACCTNUM$ = FLEFT$ + "-" + FRIGHT$
24440   REM
24445   REM ************************************
24450   REM SET RESULT = TO "OK" AND RETURN TO CALLING PROGRAM
24455   REM ************************************
24460   REM
24465           RESULT$ = "OK"
24470           RETURN
24475   REM
24480   REM ************************************
24485   REM SET RESULT TO "NOT OK" AND RETURN TO CALLING PROGRAM
24490   REM ************************************
24495   REM
24500           RESULT$ = "NOT OK"
24505           RETURN
24510   REM
24515   REM ************************************
24520   REM THIS INTERNAL SUBROUTINE TESTS TSTSTRG$ FOR NUMERIC ONLY CHARACTERS
24525   REM ************************************
24530   REM
24535           FOR J = 1 TO LEN(TSTSTRG$)
24540           TEMP$ = MID$(TSTSTRG$,J,1)
24545           TEMP = ASC(TEMP$)
24550           IF TEMP < 48 OR TEMP > 57 THEN 24570
24555           NEXT J
24560           RESULT$ = "OK"
24565           RETURN
24570           RESULT$ = "NOT OK"
24575           RETURN
                                        TPMAINV0.BAS

1000    REM ******************** TPMAINV0.BAS *******************************
1010    REM
1020    REM ***************************************************************
1030    REM TEST PROGRAMS
1040    REM ***************************************************************
1050    REM
1060    REM ************************************
1070    REM EQUATE STATEMENTS
1080    REM ************************************
1090    REM
1100            PORT0 = &H300
1110            PORT1 = &H301
1120            PORT2 = &H302
1130            HSLIDE = &H303
1140            PORT4 = &H304
1150            PORT5 = &H305
1160            PORT6 = &H306
1170            PORT7 = &H307
1180            PORT8 = &H308
1190            PORT9 = &H309
1200            PORT10 = &H30A
1210            PORT11 = &H30B
1220            PORT12 = &H30C
1230            PORT13 = &H30D
1240            PORT14 = &H30E
1250            PORT15 = &H30F
1260            BIT0 = 1
1270            BIT1 = 2
1280            BIT2 = 4
1290            BIT3 = 8
```

```
1300            BIT4 = 16
1310            BIT5 = 32
1320            BIT6 = 64
1330            BIT7 = 128
1340    REM
1350    REM ********************************
1360    REM DIMENSION STATEMENTS
1370    REM ********************************
1380    REM
1390            OPTION BASE 1
1400            DIM SETTING%(25),SPACING(25),SPACECNT%(25)
1410            DIM SPACNTLO%(25),SPACNTHI%(25),BGINC%(25)
1420    REM
1430    REM ********************************
1440    REM INITIALIZE THE OUTPUT PORTS
1450    REM ********************************
1460    REM
1470            IPORT11 = &HFF
1480            OUT PORT11,IPORT11
1490            IPORT12 = &HFF
1500            OUT PORT12,IPORT12
1510    REM
1520    REM ******************************
1530    REM INITIALIZE TIMER 0 FOR MODE 0
1540    REM ******************************
1550    REM
1560            IPORT12 = IPORT12 OR ( BIT6 OR BIT7 )
1570            OUT PORT12,IPORT12         ' SET A0 AND A1 TO ONES
1580            OUT PORT15,&H30 ' MODE 0
1590            IPORT12 = IPORT12 AND NOT ( BIT6 OR BIT7 )
1600            OUT PORT12,IPORT12         ' SET A0 AND A1 TO ZEROS
1610    REM
2150    REM ********************************
2160    REM DISPLAY THE TEST PROGRAM MENU
2170    REM ********************************
2180    REM
2190            CLS
2200            LOCATE 10,1,0
2210            PRINT "                    TEST PROGRAMS"
2220            PRINT
2230            PRINT "          *************** MENU ****************"
2240            PRINT
2250            PRINT "          A -------------- TEST MATRIX SLIDES
2260            PRINT "          B -------------- TEST WHEEL POSITIONS
2280            PRINT "          C -------------- TEST TIMER CIRCUIT
2271            PRINT "          D -------------- TEST PKG COMING SENSOR
2292            PRINT "          E -------------- TEST PKG PRESENT SENSOR
2300            PRINT
2310            PRINT "          X -------------- EXIT THE TEST PROGRAMS
2340    REM
2350    REM ******************************
2360    REM RESPOND TO THE MENU SELECTION
2370    REM ******************************
2380    REM
2390            A$ = INKEY$ : IF A$ = "" THEN 2390
2400            IF A$ = "A" OR A$ = "a" THEN 3020
2410            IF A$ = "B" OR A$ = "b" THEN 3080
2420            IF A$ = "C" OR A$ = "c" THEN 3200
2430            IF A$ = "D" OR A$ = "d" THEN 3266
2440            IF A$ = "E" OR A$ = "e" THEN 3272
2450            IF A$ = "X" OR A$ = "x" THEN 2461
2460            BEEP : GOTO 2390
2461            END
2470    REM
2980    REM ******************************
2990    REM TEST THE SLIDES
3000    REM ******************************
3010    REM
3020            GOSUB 30000 : GOTO 2190
3030    REM
```

```
3040    REM ******************************
3050    REM TEST THE WHEEL POSITIONS
3060    REM ******************************
3070    REM
3080            GOSUB 31000 : GOTO 2190
3090    REM
3160    REM ******************************
3170    REM TEST THE TIMER CIRCUIT
3180    REM ******************************
3190    REM
3200            GOSUB 33000 : GOTO 2190
3210    REM
3262    REM ******************************
3263    REM TEST THE PACKAGE COMING SENSOR
3264    REM ******************************
3265    REM
3266            GOSUB 35000 : GOTO 2190
3267    REM
3268    REM ******************************
3269    REM TEST THE PACKAGE PRESENT SENSOR
3270    REM ******************************
3271    REM
3272            GOSUB 36000 : GOTO 2190
3273    REM
4180    REM ******************************
4190    REM INCLUDE THE SUBROUTINES
4200    REM ******************************
4210    REM
4220    REM $INCLUDE:'TPSU30V0.BAS'
30999   REM $INCLUDE:'TPSU31V0.BAS'
32999   REM $INCLUDE:'TPSU33V0.BAS'
34999   REM $INCLUDE:'TPSU35V0.BAS'
35999   REM $INCLUDE:'TPSU36V0.BAS'
60000           END
                                TPSU10V0.BAS

10000   REM ******************* TPSU10V0.BAS *************************
10010   REM
10020   REM **************************************************************
10030   REM THIS PROGRAM TESTS THE TIMER CIRCUIT
10040   REM **************************************************************
10050   REM
10060   REM ******************************
10070   REM INITIALIZATION CODE
10080   REM ******************************
10090   REM
10100           PORT9  = &H309
10110           PORT12 = &H30C
10120           PORT14 = &H30E
10130           PORT15 = &H30F
10140           BIT0 = 1
10150           BIT1 = 2
10160           BIT2 = 4
10170           BIT3 = 8
10180           BIT4 = 16
10190           BIT5 = 32
10200           BIT6 = 64
10210           BIT7 = 128
10211   REM
10212   REM ******************************
10213   REM SET TGATE 0 LOW
10214   REM ******************************
10215   REM
10216           IPORT12 = &HFF
10217           IPORT12 = IPORT12 AND NOT BIT5
10218           OUT PORT12,IPORT12
10220   REM
10230   REM ******************************
10240   REM INITIALIZE TIMER 0 FOR MODE 0
10250   REM ******************************
```

```
10260   REM
10280           IPORT12 = IPORT12 OR ( BIT6 OR BIT7 )
10290           OUT PORT12,IPORT12
10300           OUT PORT15,&H30  ' MODE 0
10310           IPORT12 = IPORT12 AND NOT ( BIT6 OR BIT7 )
10320           OUT PORT12,IPORT12         ' SET A0 AND A1 TO ZEROS
10330   REM
10340   REM *******************************
10350   REM PRINT MESSAGE
10360   REM *******************************
10370   REM
10380           CLS : LOCATE 12,20
10390           PRINT" THE TIMER IS BEING TESTED - WAIT 12 SECONDS "
10400           PRINT
10410   REM
10490   REM *********************************
10500   REM LOAD 9 SECONDS INTO TIMER 0 ( 11641 COUNTS )
10510   REM *********************************
10520   REM
10540           TEMPHI% = 11641 \ 256
10550           TEMPLO% = 11641 - ( TEMPHI% * 256 )
10560           OUT PORT15,TEMPLO%
10570           OUT PORT15,TEMPHI%
10575           FOR I = 1 TO 10
10576           NEXT I
10580   REM
10590   REM *********************************
10600   REM READ BACK THE COUNT AND CHECK IT
10610   REM *********************************
10620   REM
10630           TEMPL% = INP( PORT14 )
10640           TEMPH% = INP( PORT14 )
10650           IF TEMPL% = TEMPLO% THEN 10660 ELSE 11200
10660           IF TEMPH% = TEMPHI% THEN 10711 ELSE 11200
10670   REM
10680   REM ***************************
10690   REM LET TWO SECONDS GO BY
10700   REM ***************************
10710   REM
10711           TIME$ = "12:00:00"         ' SET TIME$ TO HIGH NOON
10720           IF TIME$ = "12:00:02" THEN 10780 ELSE 10720
10730   REM
10740   REM ******************************
10750   REM SET TGATE 0 HIGH AND WAIT FOR 9 MORE SECONDS
10760   REM ******************************
10770   REM
10780           IPORT12 = IPORT12 OR BIT5
10790           OUT PORT12,IPORT12
10810           IF TIME$ = "12:00:11" THEN 10870 ELSE 10810
10820   REM
10830   REM ***************************
10840   REM MAKE SURE PORT9 BIT2 IS HIGH
10850   REM ***************************
10860   REM
10870           TEMP = INP( PORT9 )
10880           TEMP = TEMP AND BIT2
10890           IF TEMP = 0 THEN 11200
10900   REM
10910   REM ***************************
10920   REM WAIT FOR TWO MORE SECONDS
10930   REM ***************************
10940   REM
10950           IF TIME$ = "12:00:13" THEN 11010 ELSE 10950
10960   REM
10970   REM *********************************
10980   REM MAKE SURE THAT PORT9 BIT2 IS NOW LOW
10990   REM *********************************
11000   REM
11010           TEMP = INP( PORT9 )
11020           TEMP = TEMP AND BIT2
```

```
11030            IF TEMP > 0 THEN 11200
11040     REM
11050  REM *********************************
11060  REM PRINT O.K. MESSAGE
11070  REM **********************************8
11080     REM
11090            LOCATE 14,20
11100            PRINT " TIMER IS O.K. "
11110            LOCATE 16,20
11120            PRINT " PRESS ANY KEY TO CONTINUE"
11130            A$ = INKEY$ : IF A$ = "" THEN 11130
11140            END
11150     REM
11160  REM *********************************
11170  REM PRINT FAILURE MESSAGE
11180  REM **********************************8
11190     REM
11200            LOCATE 14,20
11210            PRINT " TIMER FAILURE "
11220            LOCATE 16,20
11230            PRINT " PRESS ANY KEY TO CONTINUE "
11240            A$ = INKEY$ : IF A$ = "" THEN 11240
11250            END
                                         TPSU11V0.BAS

11000  REM ****************** TPSU11V0.BAS ********************************
11005  REM
11010  REM *****************************************************************
11015  REM THIS PROGRAM TEST THE WHEEL POSITIONS ( 0 - 7 )
11020  REM *****************************************************************
11025  REM
11030  REM ********************************
11035  REM INITIALIZATION CODE
11040  REM ********************************
11045  REM
11050            PORT8  = &H308
11055            PORT9  = &H309
11060            PORT10 = &H30A
11065            PORT11 = &H30B
11070            PORT12 = &H30C
11075            PORT13 = &H30D
11080            PORT14 = &H30E
11085            PORT15 = &H30F
11090            BIT0 = 1
11095            BIT1 = 2
11100            BIT2 = 4
11105            BIT3 = 8
11110            BIT4 = 16
11115            BIT5 = 32
11120            BIT6 = 64
11125            BIT7 = 128
11130  REM
11135  REM ********************************
11140  REM SEND OUT A LASER OFF PULSE
11145  REM ********************************
11150  REM
11155            IPORT11 = &HFF
11160            OUT PORT11,IPORT11
11165            IPORT11 = IPORT11 AND NOT BIT1
11170            OUT PORT11,IPORT11
11175            IPORT11 = IPORT11 OR BIT1
11180            OUT PORT11,IPORT11
11185  REM
11190  REM ********************************
11195   REM INITIALIZE TIMER 0 FOR MODE 0
11200  REM ********************************
11205  REM
11210            IPORT12 = &HFF
11215            OUT PORT12,IPORT12
11220            OUT PORT15,&H30          ' MODE 0
```

```
11225               IPORT12 = IPORT12 AND NOT ( BIT6 OR BIT7 )
11230               OUT PORT12,IPORT12
11235   REM
11240   REM ********************************
11245   REM TEST ALL EIGHT WHEEL POSITIONS
11250   REM ********************************
11255   REM
11260               FOR I = 1 TO 8
11265   REM
11270   REM ********************************
11275   REM LOAD IN THE WHEEL POSTION
11280   REM ********************************
11285   REM
11290               WHPOS% = I - 1
11295               WHPOS% = WHPOS% * 32
11300               IPORT11 = IPORT11 AND NOT ( BIT5 OR BIT6 OR BIT7 )
11305               IPORT11 = IPORT11 OR WHPOS%
11310               OUT PORT11,IPORT11
11315   REM
11320   REM ********************************
11325   REM ENABLE THE FIRE FLIP-FLOP
11330   REM ********************************
11335   REM
11340               IPORT11 = IPORT11 AND NOT BIT3
11345               OUT PORT11,IPORT11
11350               IPORT11 = IPORT11 OR BIT3
11355               OUT PORT11,IPORT11
11360   REM
11365   REM ************************************
11370   REM DELAY FOR ABOUT 50 MILLI-SECONDS
11375   REM ************************************
11380   REM
11385               OUT PORT15,60
11390               OUT PORT15,0
11395               TEMP% = INP( PORT9 )
11400               TEMP% = TEMP% AND BIT2
11405               IF TEMP% > 0 THEN 11395
11410   REM
11415   REM ************************************
11420   REM READ IN PORT10 AND TEST THE RESULT
11425   REM ************************************
11430   REM
11435               TEMP% = INP( PORT10 )
11440               TEMP% = TEMP% AND ( BIT3 OR BIT4 OR BIT5 )
11445               TEMP% = TEMP% \ 8
11450               IF TEMP% = I - 1 THEN 11460
11455               GOTO 11580        ' ERROR CONDITION
11460               NEXT I
11465   REM
11470   REM ************************************
11475   REM PRINT O.K. MESSAGE
11480   REM ************************************
11485   REM
11490               CLS : LOCATE 12,31
11495               PRINT "TEST IS O.K"
11500               LOCATE 14,20
11505               PRINT " ( LASER FIRES THRU PROPER HOLE )"
11510               LOCATE 16,23
11515               PRINT " PRESS ANY KEY TO CONTINUE "
11520   REM
11525   REM ************************************
11530   REM WAIT FOR A KEY TO BE PRESSED
11535   REM ************************************
11540   REM
11545               A$ = INKEY$  : IF A$ = "" THEN 11545
11550               RETURN
11555   REM
11560   REM ************************************
11565   REM PRINT FAILURE MESSAGE
11570   REM ************************************
```

```
11575        REM
11580                CLS : LOCATE 12,37
11585                PRINT "FAILED"
11590                LOCATE 14,20
11595                PRINT "(LASER DOES NOT FIRE THRU THE PROPER OPENING)"
11600                LOCATE 16,28
11605                PRINT "PRESS ANY KEY TO CONTINUE"   : GOTO 11545
                             TFSU12V0.BAS

12000        REM ****************** TFSU12V0.BAS *************************
12005        REM
12010        REM *********************************************************
12015        REM THIS PROGRAM TEST THE WHEEL SPEED
12020        REM *********************************************************
12025        REM
12030        REM ********************************
12035        REM INITIALIZATION CODE
12040        REM ********************************
12045        REM
12050                PORT8  = &H308
12055                PORT9  = &H309
12060                PORT10 = &H30A
12065                PORT11 = &H30B
12070                PORT12 = &H30C
12075                PORT13 = &H30D
12080                PORT14 = &H30E
12085                PORT15 = &H30F
12090                BIT0 = 1
12095                BIT1 = 2
12100                BIT2 = 4
12105                BIT3 = 8
12110                BIT4 = 16
12115                BIT5 = 32
12120                BIT6 = 64
12125                BIT7 = 128
12130        REM
12135        REM ********************************
12140        REM SEND OUT A LASER OFF PULSE
12145        REM ********************************
12150        REM
12155                IPORT11 = &HFF
12160                OUT PORT11,IPORT11
12165                IPORT11 = IPORT11 AND NOT BIT1
12170                OUT PORT11,IPORT11
12175                IPORT11 = IPORT11 OR BIT1
12180                OUT PORT11,IPORT11
12185        REM
12190        REM ********************************
12195        REM INITIALIZE TIMER 0 FOR MODE 0
12200        REM ********************************
12205        REM
12210                IPORT12 = &HFF
12215                OUT PORT12,IPORT12
12220                OUT PORT15,&H30            ' MODE 0
12225                IPORT12 = IPORT12 AND NOT ( BIT6 OR BIT7 )
12230                OUT PORT12,IPORT12
12235        REM
12240        REM ********************************
12245        REM SET TGATE 0 TO ZERO
12250        REM ********************************
12255        REM
12256                CLS
12260                IPORT12 = IPORT12 AND NOT BIT5
12265                OUT PORT12,IPORT12
12266        REM
12267        REM ********************************
12268        REM LOAD MAX COUNT INTO TIMER 0
12269        REM ********************************
12270        REM
12271                OUT PORT15,&HFF
12272                OUT PORT15,&HFF .
```

```
12273   REM
12275   REM *********************************
12280   REM LOAD IN WHEEL POSTION 0
12285   REM *********************************
12290   REM
12295           IPORT11 = IPORT11 AND NOT ( BIT5 OR BIT6 OR BIT7 )
12300           OUT PORT11,IPORT11
12305   REM
12310   REM *********************************
12315   REM ENABLE THE FIRE FLIP-FLOP
12320   REM *********************************
12325   REM
12330           IPORT11 = IPORT11 AND NOT BIT3
12335           OUT PORT11,IPORT11
12340           IPORT11 = IPORT11 OR BIT3
12345           OUT PORT11,IPORT11
12350   REM
12355   REM ***********************************
12360   REM WAIT FOR FIRE FLIP-FLOP TO GET CLEARED
12365   REM ***********************************
12370   REM
12375           TEMP% = INP( PORT8 )
12380           TEMP% = TEMP% AND BIT5
12385           IF TEMP% = 0 THEN 12375
12390   REM
12395   REM ***********************************
12400   REM SET TGATE 0 HIGH AND RE-ENABLE THE FIRE-FLOP
12405   REM ***********************************
12410   REM
12415           IPORT12 = IPORT12 OR BIT5
12420           OUT PORT12,IPORT12
12425           IPORT11 = IPORT11 AND NOT BIT3
12430           OUT PORT11,IPORT11
12431           IPORT11 = IPORT11 OR BIT3
12432           OUT PORT11,IPORT11
12435   REM
12440   REM ***********************************
12445   REM WAIT FOR FIRE FLIP-FLOP TO GET CLEARED AGAIN
12450   REM ***********************************
12455   REM
12460           TEMP% = INP( PORT8 )
12465           TEMP% = TEMP% AND BIT5
12470           IF TEMP% = 0 THEN 12460
12475   REM
12480   REM ***********************************
12485   REM SET TGATE 0 LOW
12490   REM ***********************************
12495   REM
12500           IPORT12 = IPORT12 AND NOT BIT5
12505           OUT PORT12,IPORT12
12510   REM
12515   REM ***********************************
12520   REM FETCH THE TIME FROM TIMER 0 AND COMPUTE THE RPM
12525   REM ***********************************
12530   REM
12535           TEMPLO = INP( PORT14 )
12540           TEMPHI = INP( PORT14 )
12545           TEMP = TEMPLO + ( TEMPHI * 256! )
12550           TEMP = 65535! - TEMP
12555           REVTIM = TEMP * .000859
12560           RPM% = 60! / REVTIM
12565           LOCATE 12,20
12570           PRINT " WHEEL SPEED ( RPM ) ==> "RPM%
12575           LOCATE 14,20
12580           PRINT " PRESS ANY KEY TO CONTINUE "
12585   REM
12590   REM *************************
12595   REM WAIT FOR A KEY TO BE PRESSED
12600   REM *************************
12605   REM
```

```
12610         A$ = INKEY$ : IF A$ = "" THEN 12260
12615         END
                                    TPSU13V0.BAS

13000   REM ******************* TPSU13V0.BAS *************************
13010   REM
13020   REM **************************************************************
13030   REM THIS PROGRAM TESTS THE PACKAGE COMING SENSOR
13040   REM **************************************************************
13050   REM
13060   REM *****************************
13070   REM INITIALIZATION CODE
13080   REM *****************************
13090   REM
13100         PORT8 = &H308
13110         BIT0 = 1
13120         BIT1 = 2
13130         BIT2 = 4
13140         BIT3 = 8
13150         BIT4 = 16
13160         BIT5 = 32
13170         BIT6 = 64
13180         BIT7 = 128
13190   REM
13200   REM *****************************
13210   REM PUT OUT MESSAGE TO TEST OPERATOR
13230   REM *****************************
13240   REM
13241         CLS : SCREEN 2
13250         CLS : LOCATE 12,25
13260         PRINT " PACKAGE COMING - SENSOR STATUS"
13261         LOCATE 21,23
13262         PRINT " PRESS ANY KEY TO TERMINATE THIS TEST "
13263         LINE (175,105)-(275,125),1,B
13265         LINE (375,105)-(475,125),1,B
13270   REM
13280   REM *****************************
13290   REM TEST SENSOR AND PUT OUT THE APPROPRIATE MESSAGE
13300   REM *****************************
13310   REM
13320         TEMP% = INP( PORT8 )
13330         TEMP% = TEMP% AND BIT6
13340         IF TEMP% > 0 THEN 13471
13350   REM
13360   REM *****************************
13370   REM PRINT " COMING "
13380   REM *****************************
13390   REM
13391         LOCATE 15,48 : PRINT "           "
13400         LOCATE 15,25
13410         PRINT " COMING "
13420         GOTO 13550
13430   REM
13440   REM *****************************
13450   REM PRINT " NOT COMING "
13460   REM *****************************
13470   REM
13471         LOCATE 15,25 : PRINT "           "
13480         LOCATE 15,48
13490         PRINT " NOT COMING "
13500   REM
13510   REM *****************************
13520   REM SEE IF A KEY HAS BEEN PRESSED
13530   REM *****************************
13540   REM
13550         A$ = INKEY$ : IF A$ = "" THEN 13320
13560         SCREEN 0
13570         END
```

TPSU14VO.BAS

```
14000   REM ******************* TPSU14VO.BAS *********************
14010   REM
14020   REM ****************************************************************
14030   REM THIS PROGRAM TESTS THE PACKAGE PRESENT SENSOR
14040   REM ****************************************************************
14050   REM
14060   REM *****************************
14070   REM INITIALIZATION CODE
14080   REM *****************************
14090   REM
14100         PORT8 = &H308
14110         BIT0 = 1
14120         BIT1 = 2
14130         BIT2 = 4
14140         BIT3 = 8
14150         BIT4 = 16
14160         BIT5 = 32
14170         BIT6 = 64
14180         BIT7 = 128
14190   REM
14200   REM *****************************
14210   REM PUT OUT MESSAGE TO TEST OPERATOR
14220   REM *****************************
14230   REM
14240         CLS : SCREEN 2
14250         CLS : LOCATE 12,25
14260         PRINT " PACKAGE PRESENT - SENSOR STATUS"
14270         LOCATE 21,23
14280         PRINT " PRESS ANY KEY TO TERMINATE THIS TEST "
14290         LINE (175,105)-(275,125),1,B
14300         LINE (375,105)-(475,125),1,B
14310   REM
14320   REM *****************************
14330   REM TEST SENSOR AND PUT OUT THE APPROPRIATE MESSAGE
14340   REM *****************************
14350   REM
14360         TEMP% = INP( PORT8 )
14370         TEMP% = TEMP% AND BIT0
14380         IF TEMP% > 0 THEN 14530
14390   REM
14400   REM **************************
14410   REM PRINT " PRESENT"
14420   REM **************************
14430   REM
14440         LOCATE 15,48 : PRINT "          "
14450         LOCATE 15,25
14460         PRINT " PRESENT"
14470         GOTO 14610
14480   REM
14490   REM **************************
14500   REM PRINT " NOT PRESENT"
14510   REM **************************
14520   REM
14530         LOCATE 15,25 : PRINT "          "
14540         LOCATE 15,48
14550         PRINT " NOT PRESENT"
14560   REM
14570   REM ****************************
14580   REM SEE IF A KEY HAS BEEN PRESSED
14590   REM ****************************
14600   REM
14610         A$ = INKEY$ : IF A$ = "" THEN 14360
14620         SCREEN 0
14630         END
```

TPSU30V0.BAS

```
30000   REM ******************* TPSU30V0.BAS *********************
30001   REM
```

```
30002   REM ***********************************************
30003   REM THIS PROGRAM IS USED TO TEST THE MATRIX SLIDES FOR PROPER
30004   REM OPERATION
30005   REM ***********************************************
30006   REM
30007   REM ******************************
30008   REM INITIALIZATION CODE
30009   REM ******************************
30010   REM
30011           PORT0 = &H300
30012           PORT1 = &H301
30013           PORT2 = &H302
30014           OUT &H304,0              ' INITIALIZE THE MOTOR PORTS
30015           HSLIDE = &H303
30016           BIT0 = 1
30017           BIT1 = 2
30018           BIT2 = 4
30019           BIT3 = 8
30020           BIT4 = 16
30021           CLS : LOCATE 10,1,0
30022   REM
30023   REM ******************************
30024   REM MOVE SLIDE 1 TO HOME POSITION
30025   REM ******************************
30026   REM
30027           GOSUB 30219
30028   REM
30029   REM ******************************
30030   REM MOVE OUT 500 STEPS AND TEST SENSOR
30031   REM ******************************
30032   REM
30033           STEPS = 500
30034           FOR I = 1 TO STEPS
30035           MSTEP = MSKPORT2 AND &HF
30036           GOSUB 30476
30037           MSKPORT2 = ( MSKPORT2 AND &HF0 ) OR MSTEP
30038           OUT PORT2,MSKPORT2
30039           NEXT I
30040           TEMP = INP( HSLIDE ) AND BIT0
30041           IF TEMP = 1 THEN 30048
30042           PRINT " ERROR - SLIDE 1"
30043   REM
30044   REM ******************************
30045   REM SET STEPCTR TO 500 AND RETURN HOME
30046   REM ******************************
30047   REM
30048           STEPCTR% = 500
30049           GOSUB 30219
30050   REM
30051   REM ******************************
30052   REM COMPARE STEPCTR TO ZERO - ERROR IF DIFFERANCE EXCEEDS 2 COUNTS
30053   REM ******************************
30054   REM
30055           IF STEPCTR% > 2 THEN 30058
30056           IF STEPCTR% < -2 THEN 30058
30057           PRINT " STEPCTR1 = "STEPCTR% : GOTO 30064
30058           PRINT " SLIDE 1 ERROR = "STEPCTR%
30059   REM
30060   REM ******************************
30061   REM MOVE SLIDE 2 TO HOME POSITION
30062   REM ******************************
30063   REM
30064           GOSUB 30271
30065   REM
30066   REM ******************************
30067   REM MOVE OUT 500 STEPS AND TEST SENSOR
30068   REM ******************************
30069   REM
30070           STEPS = 500
30071           FOR I = 1 TO STEPS
```

```
30072           MSTEP = MSKPORTO AND &HF
30073           GOSUB 30476
30074           MSKPORTO = ( MSKPORTO AND &HFO ) OR MSTEP
30075           OUT PORTO,MSKPORTO
30076           NEXT I
30077           TEMP = INP( HSLIDE ) AND BIT3
30078           IF TEMP > 0 THEN 30085
30079           PRINT " ERROR - SLIDE 2"
30080   REM
30081   REM *****************************
30082   REM SET STEPCTR TO 500 AND RETURN HOME
30083   REM *****************************
30084   REM
30085           STEPCTR% = 500
30086           GOSUB 30271
30087   REM
30088   REM *****************************
30089   REM COMPARE STEPCTR TO ZERO - ERROR IF DIFFERANCE EXCEEDS 2 COUNTS
30090   REM *****************************
30091   REM
30092           IF STEPCTR > 2 THEN 30095
30093           IF STEPCTR < -2 THEN 30095
30094           PRINT " STEPCTR2 = "STEPCTR% : GOTO 30101
30095           PRINT " SLIDE 2 ERROR = "STEPCTR%
30096   REM
30097   REM *****************************
30098   REM MOVE SLIDE 3 TO HOME POSITION
30099   REM *****************************
30100   REM
30101           GOSUB 30323
30102   REM
30103   REM *****************************
30104   REM MOVE OUT 500 STEPS
30105   REM *****************************
30106   REM
30107           STEPS = 500
30108           FOR I = 1 TO STEPS
30109           MSTEP = ( MSKPORT1 AND &HFO ) \ 16
30110           GOSUB 30476
30111           MSKPORT1 = ( MSKPORT1 AND &HF ) OR ( MSTEP * 16 )
30112           OUT PORT1,MSKPORT1
30113           NEXT I
30114           TEMP = INP( HSLIDE ) AND BIT1
30115           IF TEMP > 0 THEN 30122
30116           PRINT " ERROR - SLIDE3"
30117   REM
30118   REM *****************************
30119   REM SET STEPCTR TO 500 AND RETURN HOME
30120   REM *****************************
30121   REM
30122           STEPCTR% = 500
30123           GOSUB 30323
30124   REM
30125   REM *****************************
30126   REM COMPARE STEPCTR TO ZERO - ERROR IF DIFFERANCE EXCEEDS 2 COUNTS
30127   REM *****************************
30128   REM
30129           IF STEPCTR% > 2 THEN 30132
30130           IF STEPCTR% < -2 THEN 30132
30131           PRINT " STEPCTR3 = "STEPCTR% : GOTO 30138
30132           PRINT " SLIDE 3 ERROR = "STEPCTR%
30133 * REM
30134   REM *****************************
30135   REM MOVE SLIDE 4 TO HOME POSITION
30136   REM *****************************
30137   REM
30138           GOSUB 30375
30139   REM
30140   REM *****************************
30141   REM MOVE OUT 500 STEPS AND TEST SENSOR
```

```
30142      REM ******************************
30143      REM
30144              STEPS = 500
30145              FOR I = 1 TO STEPS
30146              MSTEP = ( MSKPORT0 AND &HF0 )\ 16
30147              GOSUB 30476
30148              MSKPORT0 = ( MSKPORT0 AND &HF ) OR ( MSTEP * 16 )
30149              OUT PORT0,MSKPORT0
30150              NEXT I
30151              TEMP = INP( HSLIDE ) AND BIT4
30152              IF TEMP > 0 THEN 30159
30153              PRINT " ERROR - SLIDE 4"
30154      REM
30155      REM ******************************
30156      REM SET STEPCTR TO 500 AND RETURN HOME
30157      REM ******************************
30158      REM
30159              STEPCTR% = 500
30160              GOSUB 30375
30161      REM
30162      REM ******************************
30163      REM COMPARE STEPCTR TO ZERO - ERROR IF DIFFERANCE EXCEEDS 2 COUNTS
30164      REM ******************************
30165      REM
30166              IF STEPCTR% > 2 THEN 30169
30167              IF STEPCTR% < - 2 THEN 30169
30168              PRINT " STEPCTR4 = "STEPCTR% : GOTO 30175
30169              PRINT " SLIDE 4 ERROR = "STEPCTR%
30170      REM
30171      REM ******************************
30172      REM MOVE SLIDE 5 TO HOME POSITION
30173      REM ******************************
30174      REM
30175              GOSUB 30427
30176      REM
30177      REM ******************************
30178      REM MOVE OUT 500 STEPS
30179      REM ******************************
30180      REM
30181              STEPCTR% = 500
30182              FOR I = 1 TO STEPS
30183              MSTEP = MSKPORT1 AND &HF
30184              GOSUB 30476
30185              MSKPORT1 = ( MSKPORT1 AND &HF0 ) OR MSTEP
30186              OUT PORT1,MSKPORT1
30187              NEXT I
30188              TEMP = INP( HSLIDE ) AND BIT2
30189              IF TEMP > 0 THEN 30196
30190              PRINT "ERROR - SLIDE 5"
30191      REM
30192      REM ******************************
30193      REM SET STEPCTR TO 500 AND RETURN HOME
30194      REM ******************************
30195      REM
30196              STEPCTR% = 500
30197              GOSUB 30427
30198      REM
30199      REM ******************************
30200      REM COMPARE STEPCTR TO ZERO - ERROR IF DIFFERANCE EXCEEDS 2 COUNTS
30201      REM ******************************
30202      REM
30203              IF STEPCTR% > 2 THEN 30206
30204              IF STEPCTR% < - 2 THEN 30206
30205              PRINT " STEPCTR5 = "STEPCTR% : GOTO 30207
30206              PRINT " ERROR - SLIDE 5"STEPCTR%
30207              PRINT : PRINT " TEST IS COMPLETE - PRESS ANY KEY TO CONTINUE"
30208              A$ = INKEY$ : IF A$ = "" THEN 30208
30209              RETURN
30210      REM
30211      REM ******************************
```

```
30212   REM SUBROUTINE - HOME ( SLIDE 1 )
30213   REM ******************************
30214   REM
30215   REM ******************************
30216   REM MOVE THE SLIDE TO THE HOME POSITION - NO DELAY
30217   REM ******************************
30218   REM
30219           FOR I = 1 TO 600
30220           TEMP = INP( HSLIDE ) AND BIT0
30221           IF TEMP = 0 THEN 30232
30222           MSTEP = MSKPORT2 AND &HF
30223           GOSUB 30491
30224           MSKPORT2 = (MSKPORT2 AND &HF0 ) OR MSTEP
30225           OUT PORT2,MSKPORT2 : STEPCTR% = STEPCTR% - 1
30226           NEXT I
30227   REM
30228   REM ***************************
30229   REM MOVE THE SLIDE OUT 0.050 INCHES
30230   REM ***************************
30231   REM
30232           FOR I = 1 TO 25
30233           MSTEP = MSKPORT2 AND &HF
30234           GOSUB 30476        ' FIND THE NEXT NSTEP
30235           MSKPORT2 = ( MSKPORT2 AND &HF0 ) OR MSTEP
30236           OUT PORT2,MSKPORT2 : STEPCTR% = STEPCTR% + 1
30237           NEXT I
30238   REM
30239   REM ****************************
30240   REM TEST THE SENSOR - SHOULD BE A ONE
30241   REM ****************************
30242   REM
30243           TEMP = INP( HSLIDE ) AND BIT0
30244           IF TEMP = 0 THEN 30260
30245   REM
30246   REM ****************************
30247   REM MOVE SLIDE TO THE HOME POSITION - WITH DELAY
30248   REM ****************************
30249   REM
30250           FOR I = 1 TO 600
30251           TEMP = INP( HSLIDE ) AND BIT0
30252           IF TEMP = 0 THEN 30261
30253           MSTEP = MSKPORT2 AND &HF
30254           GOSUB 30491        ' FIND THE NEXT MSTEP
30255           MSKPORT2 = ( MSKPORT2 AND &HF0 ) OR MSTEP
30256           OUT PORT2,MSKPORT2 : STEPCTR% = STEPCTR% - 1
30257           FOR J = 1 TO 25
30258           NEXT J
30259           NEXT I
30260           PRINT "ERROR - SLIDE MOTOR1 " : BEEP : RETURN
30261           RETURN
30262   REM
30263   REM **************************
30264   REM SUBROUTINE - HOME ( SLIDE 2 )
30265   REM **************************
30266   REM
30267   REM **************************
30268   REM GO TO THE HOME POSITION - NO DELAY
30269   REM **************************
30270   REM
30271           FOR I = 1 TO 600
30272           TEMP = INP( HSLIDE ) AND BIT3
30273           IF TEMP = 0 THEN 30284
30274           MSTEP = MSKPORT0 AND &HF
30275           GOSUB 30491
30276           MSKPORT0 = ( MSKPORT0 AND &HF0 ) OR MSTEP
30277           OUT PORT0,MSKPORT0 : STEPCTR% = STEPCTR% - 1
30278           NEXT I
30279   REM
30280   REM **************************
30281   REM MOVE THE SLIDE OUT 0.050 INCHES
```

```
30282   REM ****************************
30283   REM
30284           FOR I = 1 TO 25
30285           MSTEP = MSKPORT0 AND &HF
30286           GOSUB 30476        ' FIND THE NEXT NSTEP
30287           MSKPORT0 = ( MSKPORT0 AND &HF0 ) OR MSTEP
30288           OUT PORT0,MSKPORT0 : STEPCTR% = STEPCTR% + 1
30289           NEXT I
30290   REM
30291   REM ****************************
30292   REM TEST THE SENSOR - SHOULD BE A ONE
30293   REM ****************************
30294   REM
30295           TEMP = INP( HSLIDE ) AND BIT3
30296           IF TEMP = 0 THEN 30312
30297   REM
30298   REM ****************************
30299   REM MOVE SLIDE TO THE HOME POSITION - WITH DELAY
30300   REM ****************************
30301   REM
30302           FOR I = 1 TO 600
30303           TEMP = INP( HSLIDE ) AND BIT3
30304           IF TEMP = 0 THEN 30313
30305           MSTEP = MSKPORT0 AND &HF
30306           GOSUB 30491        ' FIND THE NEXT MSTEP
30307           MSKPORT0 = ( MSKPORT0 AND &HF0 ) OR MSTEP
30308           OUT PORT0,MSKPORT0 : STEPCTR% = STEPCTR% - 1
30309           FOR J = 1 TO 25
30310           NEXT J
30311           NEXT I
30312           PRINT "ERROR - SLIDE MOTOR2 " : BEEP : RETURN
30313           RETURN
30314   REM
30315   REM ****************************
30316   REM SUBROUTINE - HOME ( SLIDE 3 )
30317   REM ****************************
30318   REM
30319   REM ****************************
30320   REM MOVE SLIDE TO THE HOME POSITION - NO DELAY
30321   REM ****************************
30322   REM
30323           FOR I = 1 TO 600
30324           TEMP = INP( HSLIDE ) AND BIT1
30325           IF TEMP = 0 THEN 30336
30326           MSTEP = ( MSKPORT1 AND &HF0 )\16
30327           GOSUB 30491
30328           MSKPORT1 = ( MSKPORT1 AND &HF ) OR ( MSTEP * 16 )
30329           OUT PORT1,MSKPORT1 : STEPCTR% = STEPCTR% - 1
30330           NEXT I
30331   REM
30332   REM ****************************
30333   REM MOVE THE SLIDE OUT 0.050 INCHES
30334   REM ****************************
30335   REM
30336           FOR I = 1 TO 25
30337           MSTEP = ( MSKPORT1 AND &HF0 )\16
30338           GOSUB 30476        ' FIND THE NEXT NSTEP
30339           MSKPORT1 = ( MSKPORT1 AND &HF ) OR ( MSTEP * 16 )
30340           OUT PORT1,MSKPORT1 : STEPCTR% = STEPCTR% + 1
30341           NEXT I
30342   REM
30343   REM ****************************
30344   REM TEST THE SENSOR - SHOULD BE A ONE
30345   REM ****************************
30346   REM
30347           TEMP = INP( HSLIDE ) AND BIT1
30348           IF TEMP = 0 THEN 30364
30349   REM
30350   REM ****************************
30351   REM MOVE SLIDE TO THE HOME POSITION - WITH DELAY
```

```
30352   REM ********************
30353   REM
30354           FOR I = 1 TO 600
30355           TEMP = INP( HSLIDE ) AND BIT1
30356           IF TEMP = 0 THEN 30365
30357           MSTEP = ( MSKPORT1 AND &HF0 )\16
30358           GOSUB 30491        ' FIND THE NEXT MSTEP
30359           MSKPORT1 = ( MSKPORT1 AND &HF ) OR ( MSTEP * 16 )
30360           OUT PORT1,MSKPORT1 : STEPCTR% = STEPCTR% - 1
30361           FOR J = 1 TO 25
30362           NEXT J
30363           NEXT I
30364           PRINT "ERROR - SLIDE MOTOR3 " : BEEP : RETURN
30365           RETURN
30366   REM
30367   REM *********************
30368   REM SUBROUTINE - HOME ( SLIDE 4 )
30369   REM *********************
30370   REM
30371   REM **********************
30372   REM MOVE THE SLIDE TO THE HOME POSITION
30373   REM **********************
30374   REM
30375           FOR I = 1 TO 600
30376           TEMP = INP( HSLIDE ) AND BIT4
30377           IF TEMP = 0 THEN 30388
30378           MSTEP = ( MSKPORT0 AND &HF0 )\16
30379           GOSUB 30491
30380           MSKPORT0 = ( MSKPORT0 AND &HF ) OR ( MSTEP * 16 )
30381           OUT PORT0,MSKPORT0 : STEPCTR% = STEPCTR% - 1
30382           NEXT I
30383   REM
30384   REM ***************************
30385   REM MOVE THE SLIDE OUT 0.050 INCHES
30386   REM ***************************
30387   REM
30388           FOR I = 1 TO 25
30389           MSTEP = ( MSKPORT0 AND &HF0 )\16
30390           GOSUB 30476        ' FIND THE NEXT NSTEP
30391           MSKPORT0 = ( MSKPORT0 AND &HF ) OR ( MSTEP * 16 )
30392           OUT PORT0,MSKPORT0 : STEPCTR% = STEPCTR% + 1
30393           NEXT I
30394   REM
30395   REM ***************************
30396   REM TEST THE SENSOR - SHOULD BE A ONE
30397   REM ***************************
30398   REM
30399           TEMP = INP( HSLIDE ) AND BIT4
30400           IF TEMP = 0 THEN 30416
30401   REM
30402   REM ***************************
30403   REM MOVE SLIDE TO THE HOME POSITION - WITH DELAY
30404   REM ***************************
30405   REM
30406           FOR I = 1 TO 600
30407           TEMP = INP( HSLIDE ) AND BIT4
30408           IF TEMP = 0 THEN 30417
30409           MSTEP = ( MSKPORT0 AND &HF0 )\16
30410           GOSUB 30491        ' FIND THE NEXT MSTEP
30411           MSKPORT0 = ( MSKPORT0 AND &HF ) OR ( MSTEP * 16 )
30412           OUT PORT0,MSKPORT0 : STEPCTR% = STEPCTR% - 1
30413           FOR J = 1 TO 25
30414           NEXT J
30415           NEXT I
30416           PRINT "ERROR - SLIDE MOTOR4 " : BEEP : RETURN
30417           RETURN
30418   REM
30419   REM ******************************
30420   REM SUBROUTINE - HOME ( SLIDE 5 )
30421   REM ******************************
```

```
30422    REM
30423    REM ******************************
30424    REM MOVE SLIDE TO HOME POSITION - NO DELAY
30425    REM ******************************
30426    REM
30427             FOR I = 1 TO 600
30428             TEMP = INP( HSLIDE ) AND BIT2
30429             IF TEMP = 0 THEN 30441
30430             MSTEP = MSKPORT1 AND &HF
30431             GOSUB 30491
30432             MSKPORT1 = ( MSKPORT1 AND &HF0 ) OR MSTEP
30433             OUT PORT1,MSKPORT1 : STEPCTR% = STEPCTR% - 1
30434             NEXT I
30435             TEMP = INP( HSLIDE )
30436    REM
30437    REM ******************************
30438    REM MOVE THE SLIDE OUT 0.050 INCHES
30439    REM ******************************
30440    REM
30441             FOR I = 1 TO 25
30442             MSTEP = MSKPORT1 AND &HF
30443             GOSUB 30476      ' FIND THE NEXT NSTEP
30444             MSKPORT1 = ( MSKPORT1 AND &HF0 ) OR MSTEP
30445             OUT PORT1,MSKPORT1 : STEPCTR% = STEPCTR% + 1
30446             NEXT I
30447    REM
30448    REM ******************************
30449    REM TEST THE SENSOR - SHOULD BE A ONE
30450    REM ******************************
30451    REM
30452             TEMP = INP( HSLIDE ) AND BIT2
30453             IF TEMP = 0 THEN 30469
30454    REM
30455    REM ******************************
30456    REM MOVE SLIDE TO THE HOME POSITION - WITH DELAY
30457    REM ******************************
30458    REM
30459             FOR I = 1 TO 600
30460             TEMP = INP( HSLIDE ) AND BIT2
30461             IF TEMP = 0 THEN 30470
30462             MSTEP = MSKPORT1 AND &HF
30463             GOSUB 30491      ' FIND THE NEXT MSTEP
30464             MSKPORT1 = ( MSKPORT1 AND &HF0 ) OR MSTEP
30465             OUT PORT1,MSKPORT1 : STEPCTR% = STEPCTR% - 1
30466             FOR J = 1 TO 25
30467             NEXT J
30468             NEXT I
30469             PRINT "ERROR - SLIDE MOTORS " : BEEP : RETURN
30470             RETURN
30471    REM
30472    REM ******************************
30473    REM THIS INTERNAL SUBROUTINE MOVES THE SLIDE AWAY FROM HOME
30474    REM ******************************
30475    REM
30476             IF MSTEP = 10 THEN 30477 ELSE 30478
30477             MSTEP = 9 : GOTO 30483
30478             IF MSTEP = 9 THEN 30479 ELSE 30480
30479             MSTEP = 5 : GOTO 30483
30480             IF MSTEP = 5 THEN 30481 ELSE 30482
30481             MSTEP = 6 : GOTO 30483
30482             MSTEP = 10
30483             FOR G = 1 TO 3
30484             NEXT G
30485             RETURN
30486    REM
30487    REM ******************************
30488    REM THIS INTERNAL SUBROUTINE MOVES THE SLIDE TOWARDS HOME
30489    REM ******************************
30490    REM
30491             IF MSTEP = 6 THEN 30492 ELSE 30493
```

```
30492           MSTEP = 5 : GOTO 30498
30493           IF MSTEP = 5 THEN 30494 ELSE 30495
30494           MSTEP = 9 : GOTO 30498
30495           IF MSTEP = 9 THEN 30496 ELSE 30497
30496           MSTEP = 10 : GOTO 30498
30497           MSTEP = 6
30498           FOR G = 1 TO 3
30499           NEXT G
30500           RETURN
30501           END
                                        TPSU31V0.BAS

31000   REM ****************** TUSU31V0.BAS ******************************
31005   REM
31010   REM **************************************************************
31015   REM THIS PROGRAM TEST THE WHEEL POSITIONS ( 0 - 7 )
31020   REM **************************************************************
31025   REM
31030   REM ******************************
31035   REM INITIALIZATION CODE
31040   REM ******************************
31045   REM
31050            PORT8 = &H308
31055            PORT9 = &H309
31060            PORT10 = &H30A
31065            PORT11 = &H30B
31070            PORT12 = &H30C
31075            PORT13 = &H30D
31080            PORT14 = &H30E
31085            PORT15 = &H30F
31090            BIT0 = 1
31095            BIT1 = 2
31100            BIT2 = 4
31105            BIT3 = 8
31110            BIT4 = 16
31115            BIT5 = 32
31120            BIT6 = 64
31125            BIT7 = 128
31130   REM
31135   REM ******************************
31140   REM SEND OUT A LASER OFF PULSE
31145   REM ******************************
31150   REM
31155            IPORT11 = &HFF
31160            OUT PORT11,IPORT11
31165            IPORT11 = IPORT11 AND NOT BIT1
31170            OUT PORT11,IPORT11
31175            IPORT11 = IPORT11 OR BIT1
31180            OUT PORT11,IPORT11
31185   REM
31190   REM ******************************
31195   REM INITIALIZE TIMER 0 FOR MODE 0
31200   REM ******************************
31205   REM
31210            IPORT12 = &HFF
31215            OUT PORT12,IPORT12
31220            OUT PORT15,&H30          ' MODE 0
31225            IPORT12 = IPORT12 AND NOT ( BIT6 OR BIT7 )
31230            OUT PORT12,IPORT12
31235   REM
31240   REM ******************************
31245   REM TEST ALL EIGHT WHEEL POSITIONS
31250   REM ******************************
31255   REM
31260            FOR I = 1 TO 8
31265   REM
31270   REM ******************************
31275   REM LOAD IN THE WHEEL POSTION
31280   REM ******************************
31285   REM
```

```
31290            WHPOS% = I - 1
31295            WHPOS% = WHPOS% * 32
31300            IPORT11 = IPORT11 AND NOT ( BIT5 OR BIT6 OR BIT7 )
31305            IPORT11 = IPORT11 OR WHPOS%
31310            OUT PORT11,IPORT11
31315    REM
31320    REM *******************************
31325    REM ENABLE THE FIRE FLIP-FLOP
31330    REM *******************************
31335    REM
31340            IPORT11 = IPORT11 AND NOT BIT3
31345            OUT PORT11,IPORT11
31350            IPORT11 = IPORT11 OR BIT3
31355            OUT PORT11,IPORT11
31360    REM
31365    REM *******************************
31370    REM DELAY FOR ABOUT 50 MILLI-SECONDS
31375    REM *******************************
31380    REM
31385            OUT PORT15,60
31390            OUT PORT15,0
31395            TEMP% = INP( PORT9 )
31400            TEMP% = TEMP% AND BIT2
31405            IF TEMP% > 0 THEN 31395
31410    REM
31415    REM *******************************
31420    REM READ IN PORT10 AND TEST THE RESULT
31425    REM *******************************
31430    REM
31435            TEMP% = INP( PORT10 )
31440            TEMP% = TEMP% AND ( BIT3 OR BIT4 OR BIT5 )
31445            TEMP% = TEMP% \ 8
31450            IF TEMP% = I - 1 THEN 31460
31455            GOTO 31580         ' ERROR CONDITION
31460            NEXT I
31465    REM
31470    REM *******************************
31475    REM PRINT O.K. MESSAGE
31480    REM *******************************
31485    REM
31490            CLS : LOCATE 12,31
31495            PRINT "TEST IS O.K"
31500            LOCATE 14,20
31505            PRINT " ( LASER FIRES THRU PROPER HOLE )"
31510            LOCATE 16,23
31515            PRINT " PRESS ANY KEY TO CONTINUE "
31520    REM
31525    REM *******************************
31530    REM WAIT FOR A KEY TO BE PRESSED
31535    REM *******************************
31540    REM
31545            A$ = INKEY$  : IF A$ = "" THEN 31545
31550            RETURN
31555    REM
31560    REM *******************************
31565    REM PRINT FAILURE MESSAGE
31570    REM *******************************
31575    REM
31580            CLS : LOCATE 12,37
31585            PRINT "FAILED"
31590            LOCATE 14,20
31595            PRINT "(LASER DOES NOT FIRE THRU THE PROPER OPENING)"
31600            LOCATE 16,28
31605            PRINT "PRESS ANY KEY TO CONTINUE" : GOTO 31545
                                TPSU33V0.BAS

33000    REM ******************* TUSU33V0.BAS ****************************
33005    REM
33010    REM *************************************************************
33015    REM THIS PROGRAM TESTS THE TIMER CIRCUIT
```

```
33020   REM ***********************************************************
33025   REM
33030   REM *******************************
33035   REM INITIALIZATION  CODE
33040   REM *******************************
33045   REM
33050           PORT9  = &H309
33055           PORT12 = &H30C
33060           PORT14 = &H30E
33065           PORT15 = &H30F
33070           BIT0 = 1
33075           BIT1 = 2
33080           BIT2 = 4
33085           BIT3 = 8
33090           BIT4 = 16
33095           BIT5 = 32
33100           BIT6 = 64
33105           BIT7 = 128
33110   REM
33115   REM **************************
33120   REM SET TGATE 0 LOW
33125   REM **************************
33130   REM
33135           IPORT12 = &HFF
33140           IPORT12 = IPORT12 AND NOT BIT5
33145           OUT PORT12,IPORT12
33150   REM
33155   REM *********************************
33160   REM INITIALIZE TIMER 0 FOR MODE 0
33165   REM *********************************
33170   REM
33175           IPORT12 = IPORT12 OR ( BIT6 OR BIT7 )
33180           OUT PORT12,IPORT12
33185           OUT PORT15,&H30 ' MODE 0
33190           IPORT12 = IPORT12 AND NOT ( BIT6 OR BIT7 )
33195           OUT PORT12,IPORT12        ' SET A0 AND A1 TO ZEROS
33200   REM
33205   REM *********************************
33210   REM PRINT MESSAGE
33215   REM *********************************
33220   REM
33225           CLS : LOCATE 12,20
33230           PRINT" THE TIMER IS BEING TESTED - WAIT 12 SECONDS "
33235           PRINT
33240   REM
33245   REM **********************************
33250   REM LOAD 9 SECONDS INTO TIMER 0 ( 11641 COUNTS )
33255   REM **********************************
33260   REM
33265           TEMPHI% = 11641 \ 256
33270           TEMPLO% = 11641 - ( TEMPHI% * 256 )
33275           OUT PORT15,TEMPLO%
33280           OUT PORT15,TEMPHI%
33285           FOR I = 1 TO 10
33290           NEXT I
33295   REM
33300   REM *********************************
33305   REM READ BACK THE COUNT AND CHECK IT
33310   REM *********************************
33315   REM
33320           TEMPL% = INP( PORT14 )
33325           TEMPH% = INP( PORT14 )
33330           IF TEMPL% = TEMPLO% THEN 33335 ELSE 33605
33335           IF TEMPH% = TEMPHI% THEN 33365 ELSE 33605
33340   REM
33345   REM ****************************
33350   REM LET TWO SECONDS GO BY
33355   REM ****************************
33360   REM
33365           TIME$ = "12:00:00"        ' SET TIME$ TO HIGH NOON
```

```
33370           IF TIME$ = "12:00:02" THEN 33400 ELSE 33370
33375   REM
33380   REM ******************************
33385   REM SET TGATE 0 HIGH AND WAIT FOR 9 MORE SECONDS
33390   REM ******************************
33395   REM
33400           IPORT12 = IPORT12 OR BIT5
33405           OUT PORT12,IPORT12
33410           IF TIME$ = "12:00:11" THEN 33440 ELSE 33410
33415   REM
33420   REM ******************************
33425   REM MAKE SURE PORT9 BIT2 IS HIGH
33430   REM ******************************
33435   REM
33440           TEMP = INP( PORT9 )
33445           TEMP = TEMP AND BIT2
33450           IF TEMP = 0 THEN 33605
33455   REM
33460   REM ******************************
33465   REM WAIT FOR TWO MORE SECONDS
33470   REM ******************************
33475   REM
33480           IF TIME$ = "12:00:13" THEN 33510 ELSE 33480
33485   REM
33490   REM ******************************
33495   REM MAKE SURE THAT PORT9 BIT2 IS NOW LOW
33500   REM ******************************
33505   REM
33510           TEMP = INP( PORT9 )
33515           TEMP = TEMP AND BIT2
33520           IF TEMP > 0 THEN 33605
33525   REM
33530   REM ******************************
33535   REM PRINT O.K. MESSAGE
33540   REM ******************************
33545   REM
33550           LOCATE 14,20
33555           PRINT " TIMER IS O.K. "
33560           LOCATE 16,20
33565           PRINT " PRESS ANY KEY TO CONTINUE"
33570           A$ = INKEY$ : IF A$ = "" THEN 33570
33575           RETURN
33580   REM
33585   REM ******************************
33590   REM PRINT FAILURE MESSAGE
33595   REM ******************************
33600   REM
33605           LOCATE 14,20
33610           PRINT " TIMER FAILURE "
33615           LOCATE 16,20
33620           PRINT " PRESS ANY KEY TO CONTINUE "
33625           A$ = INKEY$ : IF A$ = "" THEN 33625
33630           RETURN
                                TPSU35V0.BAS

35000   REM ******************** TUSU35V0.BAS ********************
35010   REM
35020   REM ******************************************************
35030   REM THIS PROGRAM TESTS THE PACKAGE COMING SENSOR
35040   REM ******************************************************
35050   REM
35060   REM ******************************
35070   REM INITIALIZATION CODE
35080   REM ******************************
35090   REM
35100           PORT8 = &H308
35110           BIT0 = 1
35120           BIT1 = 2
35130           BIT2 = 4
35140           BIT3 = 8
```

```
35150            BIT4 = 16
35160            BIT5 = 32
35170            BIT6 = 64
35180            BIT7 = 128
35190   REM
35200   REM ******************************
35210   REM PUT OUT MESSAGE TO TEST OPERATOR
35220   REM ******************************
35230   REM
35240            CLS : SCREEN 2
35250            CLS : LOCATE 12,25
35260            PRINT " PACKAGE COMING - SENSOR STATUS"
35270            LOCATE 21,23
35280            PRINT " PRESS ANY KEY TO TERMINATE THIS TEST "
35290            LINE (175,105)-(275,125),1,B
35300            LINE (375,105)-(475,125),1,B
35310   REM
35320   REM ******************************
35330   REM TEST SENSOR AND PUT OUT THE APPROPRIATE MESSAGE
35340   REM ******************************
35350   REM
35360            TEMP% = INP( PORT8 )
35370            TEMP% = TEMP% AND BIT6
35380            IF TEMP% > 0 THEN 35530
35390   REM
35400   REM **************************
35410   REM PRINT " COMING "
35420   REM **************************
35430   REM
35440            LOCATE 15,48 : PRINT "            "
35450            LOCATE 15,25
35460            PRINT " COMING "
35470            GOTO 35610
35480   REM
35490   REM **************************
35500   REM PRINT " NOT COMING "
35510   REM **************************
35520   REM
35530            LOCATE 15,25 : PRINT "          "
35540            LOCATE 15,48
35550            PRINT " NOT COMING "
35560   REM
35570   REM **************************
35580   REM SEE IF A KEY HAS BEEN PRESSED
35590   REM **************************
35600   REM
35610            A$ = INKEY$ : IF A$ = "" THEN 35360
35620            SCREEN 0
35630            RETURN
                                    TPSU36V0.BAS

36000   REM ******************** TUSU36V0.BAS ********************
36010   REM
36020   REM ************************************************************
36030   REM THIS PROGRAM TESTS THE PACKAGE PRESENT SENSOR
36040   REM ************************************************************
36050   REM
36060   REM ******************************
36070   REM INITIALIZATION CODE
36080   REM ******************************
36090   REM
36100            PORT8 = &H308
36110            BIT0 = 1
36120            BIT1 = 2
36130            BIT2 = 4
36140            BIT3 = 8
36150            BIT4 = 16
36160            BIT5 = 32
36170            BIT6 = 64
36180            BIT7 = 128
```

```
36190       REM
36200       REM ****************************
36210       REM PUT OUT MESSAGE TO TEST OPERATOR
36220       REM ****************************
36230       REM
36240                CLS : SCREEN 2
36250                CLS : LOCATE 12,25
36260                PRINT " PACKAGE PRESENT - SENSOR STATUS"
36270                LOCATE 21,23
36280                PRINT " PRESS ANY KEY TO TERMINATE THIS TEST "
36290                LINE (175,105)-(275,125),1,B
36300                LINE (375,105)-(475,125),1,B
36310       REM
36320       REM ****************************
36330       REM TEST SENSOR AND PUT OUT THE APPROPRIATE MESSAGE
36340       REM ****************************
36350       REM
36360                TEMP% = INP( PORT8 )
36370                TEMP% = TEMP% AND BIT0
36380                IF TEMP% > 0 THEN 36530
36390       REM
36400       REM **************************
36410       REM PRINT " PRESENT"
36420       REM **************************
36430       REM
36440                LOCATE 15,48 : PRINT "          "
36450                LOCATE 15,25
36460                PRINT " PRESENT"
36470                GOTO 36610
36480       REM
36490       REM **************************
36500       REM PRINT " NOT PRESENT"
36510       REM **************************
36520       REM
36530                LOCATE 15,25 : PRINT "          "
36540                LOCATE 15,48
36550                PRINT " NOT PRESENT"
36560       REM
36570       REM ****************************
36580       REM SEE IF A KEY HAS BEEN PRESSED
36590       REM ****************************
36600       REM
36610                A$ = INKEY$ : IF A$ = "" THEN 36360
36620                SCREEN 0
36630                RETURN
                                     UPSU40V0.BAS

40000  REM ****************** UPSU40V0.BAS ********************
40010  REM
40020  REM **********************************************************
40030  REM THIS PROGRAM IS USED TO SET THE SLIDES TO THE 5-DIGIT CODE
40040  REM THAT IS ENTERED FROM THE KEYBOARD
40050  REM **********************************************************
40060  REM
40070  REM ****************************
40080  REM INITIALIZATION CODE
40090  REM ****************************
40100  REM
40110           PORT0 = &H300
40120           PORT1 = &H301
40130           PORT2 = &H302
40140           OUT &H304,0              ' INITIALIZE THE MOTOR PORTS
40150           HSLIDE = &H303
40160           BIT0 = 1
40170           BIT1 = 2
40180           BIT2 = 4
40190           BIT3 = 8
40200           BIT4 = 16
40210  REM
40220  REM ****************************
```

```
40230    REM INPUT A 5-DIGIT NUMBER FROM THE KEYBOARD
40240    REM ****************************
40250    REM
40260            CLS
40270            LOCATE 1,1,0
40280            PRINT "       TO PROGRAM THE SLIDES ENTER 5 DIGITS FOLLOWED"
40290            PRINT
40300            PRINT "       BY A RETURN KEY. TO EXIT THIS PROGRAM PRESS THE"
40310            PRINT
40320            PRINT "       RETURN KEY ONLY"
40330            PRINT
40340            INPUT "       PLACE YOUR INPUT HERE ==> ",MC$
40350            TEMP% = LEN( MC$ ) : IF TEMP% = 5 THEN 40420
40360            CLS : RETURN
40370    REM
40380    REM ******************************
40390    REM CALL THE SUBROUTINE THAT SETS THE SLIDES
40400    REM ******************************
40410    REM
40420            GOSUB 11000         ' SET THE SLIDES
40430            GOTO 40260

41000    REM ****************** TUSU41VO.BAS ******************
41005    REM
41010    REM ***********************************************
41015    REM THIS PROGRAM IS USED TO MEASURE THE MOVEMENTS OF THE TOP
41020    REM SLIDE ( SLIDE # 1 )
41025    REM ***********************************************
41030    REM
41035    REM ******************************
41040    REM INITIALIZATION CODE
41045    REM ******************************
41050    REM
41055            PORT2 = &H302
41060            STEPCTR = 0
41065            OUT &H304,0          ' INITIALIZE THE MOTOR PORTS
41070            MSTEP = MSKPORT2 AND &HF
41075            HSLIDE = &H303
41080            BIT0 = 1
41085    REM
41090    REM ******************************
41095    REM DISPLAY THE INSTRUCTIONS
41100    REM ******************************
41105    REM
41110            CLS : LOCATE 10,1,0
41115            PRINT "          PROGRAM INSTRUCTIONS ( SLIDE 1 )"
41120            PRINT
41125            PRINT "     PRESS THE HOME KEY TO MOVE SLIDE HOME"
41130            PRINT ".    PRESS THE LEFT ARROW KEY TO MOVE TOWARDS HOME"
41135            PRINT "     PRESS THE RIGHT ARROW KEY TO MOVE AWAY FROM HOME"
41140            PRINT "     PRESS ANY OTHER KEY TO EXIT THE PROGRAM"
41141            GOTO 41355
41145    REM
41150    REM ******************************
41155    REM READ IN A KEY FROM THE KEYBOARD
41160    REM ******************************
41165    REM
41170            A$ = INKEY$ : IF A$ = "" THEN 41170
41175            A$ = RIGHT$(A$,1)
41180            IF A$ = "G" THEN 41355
41185            IF A$ = "K" THEN 41225
41190            IF A$ = "M" THEN 41295
41195            RETURN
41200    REM
41205    REM ******************************
41210    REM MOVE ONE STEP TOWARDS HOME IF SENSOR IS HIGH
41215    REM ******************************
41220    REM
41225            TEMP = INP( HSLIDE ) AND BIT0
```

```
41230           IF TEMP = 0 THEN GOTO 41170
41235           MSTEP = MSKPORT2 AND &HF
41240           GOSUB 41595
41245           MSKPORT2 = ( MSKPORT2 AND &HF0 ) OR MSTEP
41250           OUT PORT2,MSKPORT2
41255           STEPCTR = STEPCTR - 1
41260           LOCATE 20,40,0 : PRINT "STEP COUNTER = "STEPCTR
41265           GOTO 41170
41270   REM
41275   REM ******************************
41280   REM MOVE ONE STEP AWAY FROM HOME
41285   REM ******************************
41290   REM
41295           MSTEP = MSKPORT2 AND &HF
41300           GOSUB 41530
41305           MSKPORT2 = ( MSKPORT2 AND &HF0 ) OR MSTEP
41310           OUT PORT2,MSKPORT2
41315           STEPCTR = STEPCTR + 1
41320           LOCATE 20,40,0 : PRINT "STEP COUNTER = "STEPCTR
41325           GOTO 41170
41330   REM
41335   REM ***************************
41340   REM MOVE THE SLIDE OUT 0.100 INCHES
41345   REM ***************************
41350   REM
41355           FOR I = 1 TO 50
41360           MSTEP = MSKPORT2 AND &HF
41365           GOSUB 41530       ' FIND THE NEXT NSTEP
41370           MSKPORT2 = ( MSKPORT2 AND &HF0 ) OR MSTEP
41375           OUT PORT2,MSKPORT2
41380           NEXT I
41385   REM
41390   REM ***************************
41395   REM TEST THE SENSOR - SHOULD BE A ONE
41400   REM ***************************
41405   REM
41410           TEMP = INP( HSLIDE ) AND BIT0
41415           IF TEMP = 0 THEN 41485
41420   REM
41425   REM ***************************
41430   REM MOVE SLIDE TO THE HOME POSITION
41435   REM ***************************
41440   REM
41445           FOR I = 1 TO 600
41450           TEMP = INP( HSLIDE ) AND BIT0
41455           IF TEMP = 0 THEN 41490
41460           MSTEP = MSKPORT2 AND &HF
41465           GOSUB 41595       ' FIND THE NEXT MSTEP
41470           MSKPORT2 = ( MSKPORT2 AND &HF0 ) OR MSTEP
41475           OUT PORT2,MSKPORT2
41480           NEXT I
41485           PRINT "ERROR - SLIDE MOTOR1 "
41490           STEPCTR = 0
41495           LOCATE 20,40,0 : PRINT "STEP COUNTER = "STEPCTR
41500           GOTO 41170
41505   REM
41510   REM ******************************
41515   REM THIS INTERNAL SUBROUTINE MOVES THE SLIDE AWAY FROM HOME
41520   REM ******************************
41525   REM
41530           IF MSTEP = 10 THEN 41535 ELSE 41540
41535           MSTEP = 9 : GOTO 41565
41540           IF MSTEP = 9 THEN 41545 ELSE 41550
41545           MSTEP = 5 : GOTO 41565
41550           IF MSTEP = 5 THEN 41555 ELSE 41560
41555           MSTEP = 6 : GOTO 41565
41560           MSTEP = 10
41565           RETURN
41570   REM
41575   REM ******************************
41580   REM THIS INTERNAL SUBROUTINE MOVES THE SLIDE TOWARDS HOME
```

```
41585   REM *******************************
41590   REM
41595           IF MSTEP = 6 THEN 41600 ELSE 41605
41600           MSTEP = 5 : GOTO 41630
41605           IF MSTEP = 5 THEN 41610 ELSE 41615
41610           MSTEP = 9 : GOTO 41630
41615           IF MSTEP = 9 THEN 41620 ELSE 41625
41620           MSTEP = 10 : GOTO 41630
41625           MSTEP = 6
41630           RETURN
41635           END
                                        UPSU42V0.BAS
42000   REM ******************* TUSU42V0.BAS *********************
42005   REM
42010   REM ****************************************************
42015   REM THIS PROGRAM IS USED TO MEASURE THE MOVEMENTS OF THE 2ND
42020   REM SLIDE FROM THE TOP ( SLIDE # 2 )
42025   REM ****************************************************
42030   REM
42035   REM *******************************
42040   REM INITIALIZATION CODE
42045   REM *******************************
42050   REM
42055           PORT0 = &H300
42060           STEPCTR = 0
42065           OUT &H304,0                    ' INITIALIZE THE MOTOR PORTS
42070           MSTEP = MSKPORT0 AND &HF
42075           HSLIDE = &H303
42080           BIT3 = 8
42085   REM
42090   REM *******************************
42095   REM DISPLAY THE INSTRUCTIONS
42100   REM *******************************
42105   REM
42110           CLS : LOCATE 10,1,0
42115           PRINT "         PROGRAM INSTRUCTIONS ( SLIDE 2 )"
42120           PRINT
42125           PRINT "    PRESS THE HOME KEY TO MOVE SLIDE HOME"
42130           PRINT "    PRESS THE LEFT ARROW KEY TO MOVE TOWARDS HOME"
42135           PRINT "    PRESS THE RIGHT ARROW KEY TO MOVE AWAY FROM HOME
42140           PRINT "    PRESS ANY OTHER KEY TO EXIT THE PROGRAM
42141           GOTO 42355
42145   REM
42150   REM *******************************
42155   REM READ IN A KEY FROM THE KEYBOARD
42160   REM *******************************
42165   REM
42170           A$ = INKEY$ : IF A$ = "" THEN 42170
42175           A$ = RIGHT$(A$,1)
42180           IF A$ = "G" THEN 42355
42185           IF A$ = "K" THEN 42225
42190           IF A$ = "M" THEN 42295
42195           RETURN
42200   REM
42205   REM *******************************
42210   REM MOVE ONE STEP TOWARDS HOME IF SENSOR IS HIGH
42215   REM *******************************
42220   REM
42225           TEMP = INP( HSLIDE ) AND BIT3
42230           IF TEMP = 0 THEN GOTO 42170
42235           MSTEP = MSKPORT0 AND &HF
42240           GOSUB 42595
42245           MSKPORT0 = ( MSKPORT0 AND &HF0 ) OR MSTEP
42250           OUT PORT0,MSKPORT0
42255           STEPCTR = STEPCTR - 1
42260           LOCATE 20,40,0 : PRINT "STEP COUNTER = "STEPCTR
42265           GOTO 42170
42270   REM
42275   REM *******************************
42280   REM MOVE ONE STEP AWAY FROM HOME
```

```
42285    REM ******************************
42290    REM
42295            MSTEP = MSKPORT0 AND &HF
42300            GOSUB 42530
42305            MSKPORT0 = ( MSKPORT0 AND &HF0 ) OR MSTEP
42310            OUT PORT0,MSKPORT0
42315            STEPCTR = STEPCTR + 1
42320            LOCATE 20,40,0 : PRINT "STEP COUNTER = "STEPCTR
42325            GOTO 42170
42330    REM
42335    REM ******************************
42340    REM MOVE THE SLIDE OUT 0.100 INCHES
42345    REM ******************************
42350    REM
42355            FOR I = 1 TO 50
42360            MSTEP = MSKPORT0 AND &HF
42365            GOSUB 42530      ' FIND THE NEXT NSTEP
42370            MSKPORT0 = ( MSKPORT0 AND &HF0 ) OR MSTEP
42375            OUT PORT0,MSKPORT0
42380            NEXT I
42385    REM
42390    REM ******************************
42395    REM TEST THE SENSOR - SHOULD BE A ONE
42400    REM ******************************
42405    REM
42410            TEMP = INP( HSLIDE ) AND BIT3
42415            IF TEMP = 0 THEN 42485
42420    REM
42425    REM ******************************
42430    REM MOVE SLIDE TO THE HOME POSITION
42435    REM ******************************
42440    REM
42445            FOR I = 1 TO 600
42450            TEMP = INP( HSLIDE ) AND BIT3
42455            IF TEMP = 0 THEN 42490
42460            MSTEP = MSKPORT0 AND &HF
42465            GOSUB 42595      ' FIND THE NEXT MSTEP
42470            MSKPORT0 = ( MSKPORT0 AND &HF0 ) OR MSTEP
42475            OUT PORT0,MSKPORT0
42480            NEXT I
42485            PRINT "ERROR - SLIDE MOTOR1 "
42490            STEPCTR = 0
42495            LOCATE 20,40,0 : PRINT "STEP COUNTER = "STEPCTR
42500            GOTO 42170
42505    REM
42510    REM ******************************
42515    REM THIS INTERNAL SUBROUTINE MOVES THE SLIDE AWAY FROM HOME
42520    REM ******************************
42525    REM
42530            IF MSTEP = 10 THEN 42535 ELSE 42540
42535            MSTEP = 9 : GOTO 42565
42540            IF MSTEP = 9 THEN 42545 ELSE 42550
42545            MSTEP = 5 : GOTO 42565
42550            IF MSTEP = 5 THEN 42555 ELSE 42560
42555            MSTEP = 6 : GOTO 42565
42560            MSTEP = 10
42565            RETURN
42570    REM
42575    REM ******************************
42580    REM THIS INTERNAL SUBROUTINE MOVES THE SLIDE TOWARDS HOME
42585    REM ******************************
42590    REM
42595            IF MSTEP = 6 THEN 42600 ELSE 42605
42600            MSTEP = 5 : GOTO 42630
42605            IF MSTEP = 5 THEN 42610 ELSE 42615
42610            MSTEP = 9 : GOTO 42630
42615            IF MSTEP = 9 THEN 42620 ELSE 42625
42620            MSTEP = 10 : GOTO 42630
42625            MSTEP = 6
42630            RETURN
42635            END
```

UPSU43V0.BAS

```
43000   REM ******************* TUSU43V0.BAS **********************
43005   REM
43010   REM *******************************************************
43015   REM THIS PROGRAM IS USED TO MEASURE THE MOVEMENTS OF THE 3RD
43020   REM SLIDE DOWN FROM THE TOP ( SLIDE # 3 )
43025   REM *******************************************************
43030   REM
43035   REM ****************************
43040   REM INITIALIZATION CODE
43045   REM ****************************
43050   REM
43055        PORT1 = &H301
43060        STEPCTR = 0
43065        OUT &H304,0                    ' INITIALIZE THE MOTOR PORTS
43070        MSTEP = MSKPORT1 AND &HF0
43075        HSLIDE = &H303
43080        BIT1 = 2
43085   REM
43090   REM ****************************
43095   REM DISPLAY THE INSTRUCTIONS
43100   REM ****************************
43105   REM
43110        CLS : LOCATE 10,1,0
43115        PRINT "              PROGRAM INSTRUCTIONS ( SLIDE 3 )"
43120        PRINT
43125        PRINT "        PRESS THE HOME KEY TO MOVE SLIDE HOME"
43130        PRINT "        PRESS THE LEFT ARROW KEY TO MOVE TOWARDS HOME"
43135        PRINT "        PRESS THE RIGHT ARROW KEY TO MOVE AWAY FROM HOME"
43140        PRINT "        PRESS ANY OTHER KEY TO EXIT THE PROGRAM"
43141        GOTO 43355
43145   REM
43150   REM ********************************
43155   REM READ IN A KEY FROM THE KEYBOARD
43160   REM ********************************
43165   REM
43170        A$ = INKEY$ : IF A$ = "" THEN 43170
43175        A$ = RIGHT$(A$,1)
43180        IF A$ = "G" THEN 43355
43185        IF A$ = "K" THEN 43225
43190        IF A$ = "M" THEN 43295
43195        RETURN
43200   REM
43205   REM ************************************
43210   REM MOVE ONE STEP TOWARDS HOME IF SENSOR IS HIGH
43215   REM ************************************
43220   REM
43225        TEMP = INP( HSLIDE ) AND BIT1
43230        IF TEMP = 0 THEN GOTO 43170
43235        MSTEP = ( MSKPORT1 AND &HF0 )\16
43240        GOSUB 43595
43245        MSKPORT1 = ( MSKPORT1 AND &HF ) OR ( MSTEP * 16 )
43250        OUT PORT1,MSKPORT1
43255        STEPCTR = STEPCTR - 1
43260        LOCATE 20,40,0 : PRINT "STEP COUNTER = "STEPCTR
43265        GOTO 43170
43270   REM
43275   REM ********************************
43280   REM MOVE ONE STEP AWAY FROM HOME
43285   REM ***********************************
43290   REM
43295        MSTEP = ( MSKPORT1 AND &HF0 )\16
43300        GOSUB 43530
43305        MSKPORT1 = ( MSKPORT1 AND &HF ) OR ( MSTEP * 16 )
43310        OUT PORT1,MSKPORT1
43315        STEPCTR = STEPCTR + 1
43320        LOCATE 20,40,0 : PRINT "STEP COUNTER = "STEPCTR
43325        GOTO 43170
43330   REM
```

```
43335   REM ****************************
43340   REM MOVE THE SLIDE OUT 0.100 INCHES
43345   REM ****************************
43350   REM
43355           FOR I = 1 TO 50
43360           MSTEP = ( MSKPORT1 AND &HF0 )\16
43365           GOSUB 43530      '--FIND THE NEXT MSTEP
43370           MSKPORT1 = ( MSKPORT1 AND &HF ) OR ( MSTEP * 16 )
43375           OUT PORT1,MSKPORT1
43380           NEXT I
43385   REM
43390   REM ****************************
43395   REM TEST THE SENSOR - SHOULD BE A ONE
43400   REM ****************************
43405   REM
43410           TEMP = INP( HSLIDE ) AND BIT1
43415           IF TEMP = 0 THEN 43485
43420   REM
43425   REM ****************************
43430   REM MOVE SLIDE TO THE HOME POSITION
43435   REM ****************************
43440   REM
43445           FOR I = 1 TO 600
43450           TEMP = INP( HSLIDE ) AND BIT1
43455           IF TEMP = 0 THEN 43490
43460           MSTEP = ( MSKPORT1 AND &HF0 )\16
43465           GOSUB 43595      ' FIND THE NEXT MSTEP
43470           MSKPORT1 = ( MSKPORT1 AND &HF ) OR ( MSTEP * 16 )
43475           OUT PORT1,MSKPORT1
43480           NEXT I
43485           PRINT "ERROR - SLIDE MOTOR1 "
43490           STEPCTR = 0
43495           LOCATE 20,40,0 : PRINT "STEP COUNTER = "STEPCTR
43500           GOTO 43170
43505   REM
43510   REM ****************************
43515   REM THIS INTERNAL SUBROUTINE MOVES THE SLIDE AWAY FROM HOME
43520   REM ****************************
43525   REM
43530           IF MSTEP = 10 THEN 43535 ELSE 43540
43535           MSTEP = 9 : GOTO 43565
43540           IF MSTEP = 9 THEN 43545 ELSE 43550
43545           MSTEP = 5 : GOTO 43565
43550           IF MSTEP = 5 THEN 43555 ELSE 43560
43555           MSTEP = 6 : GOTO 43565
43560           MSTEP = 10
43565           RETURN
43570   REM
43575   REM ****************************
43580   REM THIS INTERNAL SUBROUTINE MOVES THE SLIDE TOWARDS HOME
43585   REM ****************************
43590   REM
43595           IF MSTEP = 6 THEN 43600 ELSE 43605
43600           MSTEP = 5 : GOTO 43630
43605           IF MSTEP = 5 THEN 43610 ELSE 43615
43610           MSTEP = 9 : GOTO 43630
43615           IF MSTEP = 9 THEN 43620 ELSE 43625
43620           MSTEP = 10 : GOTO 43630
43625           MSTEP = 6
43630           RETURN
43635           END
                                        UPSU44V0.BAS

44000   REM ******************** TUSU44V0.BAS ********************
44005   REM
44010   REM ********************************************************
44015   REM THIS PROGRAM IS USED TO MEASURE THE MOVEMENTS OF THE 4TH
44020   REM SLIDE FROM THE TOP ( SLIDE # 4 )
44025   REM ********************************************************
44030   REM
```

```
44035    REM ****************************
44040    REM INITIALIZATION CODE
44045    REM ****************************
44050    REM
44055         PORT0 = &H300
44060         STEPCTR = 0
44065         OUT &H304,0              ' INITIALIZE THE MOTOR PORTS
44070         MSTEP = MSKPORT0 AND &HF0
44075         HSLIDE = &H303
44080         BIT4 = 16
44085    REM
44090    REM ****************************
44095    REM DISPLAY THE INSTRUCTIONS
44100    REM ****************************
44105    REM
44110         CLS : LOCATE 10,1,0
44115         PRINT "         PROGRAM INSTRUCTIONS ( SLIDE 4 )"
44120         PRINT
44125         PRINT "      PRESS THE HOME KEY TO MOVE SLIDE HOME"
44130         PRINT "      PRESS THE LEFT ARROW KEY TO MOVE TOWARDS HOME"
44135         PRINT "      PRESS THE RIGHT ARROW KEY TO MOVE AWAY FROM HOME"
44140         PRINT "      PRESS ANY OTHER KEY TO EXIT THE PROGRAM
44145         GOTO 44360
44150    REM
44155    REM ****************************
44160    REM READ IN A KEY FROM THE KEYBOARD
44165    REM ****************************
44170    REM
44175         A$ = INKEY$ : IF A$ = "" THEN 44175
44180         A$ = RIGHT$(A$,1)
44185         IF A$ = "G" THEN 44360
44190         IF A$ = "K" THEN 44230
44195         IF A$ = "M" THEN 44300
44200         RETURN
44205    REM
44210    REM ****************************
44215    REM MOVE ONE STEP TOWARDS HOME IF SENSOR IS HIGH
44220    REM ****************************
44225    REM
44230         TEMP = INP( HSLIDE ) AND BIT4
44235         IF TEMP = 0 THEN GOTO 44175
44240         MSTEP = ( MSKPORT0 AND &HF0 )\16
44245         GOSUB 44600
44250         MSKPORT0 = ( MSKPORT0 AND &HF ) OR ( MSTEP * 16 )
44255         OUT PORT0,MSKPORT0
44260         STEPCTR = STEPCTR - 1
44265         LOCATE 20,40,0 : PRINT "STEP COUNTER = "STEPCTR
44270         GOTO 44175
44275    REM
44280    REM ****************************
44285    REM MOVE ONE STEP AWAY FROM HOME
44290    REM ****************************
44295    REM
44300         MSTEP = ( MSKPORT0 AND &HF0 )\16
44305         GOSUB 44535
44310         MSKPORT0 = ( MSKPORT0 AND &HF ) OR ( MSTEP * 16 )
44315         OUT PORT0,MSKPORT0
44320         STEPCTR = STEPCTR + 1
44325         LOCATE 20,40,0 : PRINT "STEP COUNTER = "STEPCTR
44330         GOTO 44175
44335    REM
44340    REM ****************************
44345    REM MOVE THE SLIDE OUT 0.100 INCHES
44350    REM ****************************
44355    REM
44360         FOR I = 1 TO 50
44365         MSTEP = ( MSKPORT0 AND &HF0 )\16
44370         GOSUB 44535      ' FIND THE NEXT NSTEP
44375         MSKPORT0 = ( MSKPORT0 AND &HF ) OR ( MSTEP * 16 )
44380         OUT PORT0,MSKPORT0
```

```
44385            NEXT I
44390    REM
44395    REM ****************************
44400    REM TEST THE SENSOR - SHOULD BE A ONE
44405    REM ****************************
44410    REM
44415            TEMP = INP( HSLIDE ) AND BIT4
44420            IF TEMP = 0 THEN 44490
44425    REM
44430    REM ****************************
44435    REM MOVE SLIDE TO THE HOME POSITION
44440    REM ****************************
44445    REM
44450            FOR I = 1 TO 600
44455            TEMP = INP( HSLIDE ) AND BIT4
44460            IF TEMP = 0 THEN 44495
44465            MSTEP = ( MSKPORT0 AND &HF0 )\16
44470            GOSUB 44600        ' FIND THE NEXT MSTEP
44475            MSKPORT0 = ( MSKPORT0 AND &HF ) OR ( MSTEP * 16 )
44480            OUT PORT0,MSKPORT0
44485            NEXT I
44490            PRINT "ERROR - SLIDE MOTOR1 "
44495            STEPCTR = 0
44500            LOCATE 20,40,0 : PRINT "STEP COUNTER = ";STEPCTR
44505            GOTO 44175
44510    REM
44515    REM ******************************
44520    REM THIS INTERNAL SUBROUTINE MOVES THE SLIDE AWAY FROM HOME
44525    REM ******************************
44530    REM
44535            IF MSTEP = 10 THEN 44540 ELSE 44545
44540            MSTEP = 9 : GOTO 44570
44545            IF MSTEP = 9 THEN 44550 ELSE 44555
44550            MSTEP = 5 : GOTO 44570
44555            IF MSTEP = 5 THEN 44560 ELSE 44565
44560            MSTEP = 6 : GOTO 44570
44565            MSTEP = 10
44570            RETURN
44575    REM
44580    REM ******************************
44585    REM THIS INTERNAL SUBROUTINE MOVES THE SLIDE TOWARDS HOME
44590    REM ******************************
44595    REM
44600            IF MSTEP = 6 THEN 44605 ELSE 44610
44605            MSTEP = 5 : GOTO 44635
44610            IF MSTEP = 5 THEN 44615 ELSE 44620
44615            MSTEP = 9 : GOTO 44635
44620            IF MSTEP = 9 THEN 44625 ELSE 44630
44625            MSTEP = 10 : GOTO 44635
44630            MSTEP = 6
44635            RETURN
44640            END
                                    UPSU4SV0.BAS

45000    REM ****************** TUSU4SV0.BAS **********************
45005    REM
45010    REM ****************************************************
45015    REM THIS PROGRAM IS USED TO MEASURE THE MOVEMENTS OF THE 5TH
45020    REM SLIDE FROM THE TOP ( SLIDE # 5 )
45025    REM ****************************************************
45030    REM
45035    REM ****************************
45040    REM INITIALIZATION CODE
45045    REM ****************************
45050    REM
45055            PORT1 = &H301
45060            STEPCTR = 0
45065            OUT &H304,0          ' INITIALIZE THE MOTOR PORTS
45070            MSTEP = MSKPORT1 AND &HF
45075            HSLIDE = &H303
```

```
45080               BIT2 = 4
45085     REM
45090     REM ****************************
45095     REM DISPLAY THE INSTRUCTIONS
45100     REM ****************************
45105     REM
45110               CLS : LOCATE 10,1,0
45115               PRINT "            PROGRAM INSTRUCTIONS ( SLIDE 5 )"
45120               PRINT
45125               PRINT "     PRESS THE HOME KEY TO MOVE SLIDE HOME"
45130               PRINT "     PRESS THE LEFT ARROW KEY TO MOVE TOWARDS HOME"
45135               PRINT "     PRESS THE RIGHT ARROW KEY TO MOVE AWAY FROM HOME"
45140               PRINT "     PRESS ANY OTHER KEY TO EXIT THE PROGRAM"
45145               GOTO 45360
45150     REM
45155     REM ******************************
45160     REM READ IN A KEY FROM THE KEYBOARD
45165     REM ******************************
45170     REM
45175               A$ = INKEY$ : IF A$ = "" THEN 45175
45180               A$ = RIGHT$(A$,1)
45185               IF A$ = "G" THEN 45360
45190               IF A$ = "K" THEN 45230
45195               IF A$ = "M" THEN 45300
45200               RETURN
45205     REM
45210     REM ******************************
45215     REM MOVE ONE STEP TOWARDS HOME IF SENSOR IS HIGH
45220     REM ******************************
45225     REM
45230               TEMP = INP( HSLIDE ) AND BIT2
45235               IF TEMP = 0 THEN GOTO 45175
45240               MSTEP = MSKPORT1 AND &HF
45245               GOSUB 45600
45250               MSKPORT1 = ( MSKPORT1 AND &HF0 ) OR MSTEP
45255               OUT PORT1,MSKPORT1
45260               STEPCTR = STEPCTR - 1
45265               LOCATE 20,40,0 : PRINT "STEP COUNTER = "STEPCTR
45270               GOTO 45175
45275     REM
45280     REM ******************************
45285     REM MOVE ONE STEP AWAY FROM HOME
45290     REM ******************************
45295     REM
45300               MSTEP = MSKPORT1 AND &HF
45305               GOSUB 45535
45310               MSKPORT1 = ( MSKPORT1 AND &HF0 ) OR MSTEP
45315               OUT PORT1,MSKPORT1
45320               STEPCTR = STEPCTR + 1
45325               LOCATE 20,40,0 : PRINT "STEP COUNTER = "STEPCTR
45330               GOTO 45175
45335     REM
45340     REM ****************************
45345     REM MOVE THE SLIDE OUT 0.100 INCHES
45350     REM ****************************
45355     REM
45360               FOR I = 1 TO 50
45365               MSTEP = MSKPORT1 AND &HF
45370               GOSUB 45535        ' FIND THE NEXT NSTEP
45375               MSKPORT1 = ( MSKPORT1 AND &HF0 ) OR MSTEP
45380               OUT PORT1,MSKPORT1
45385               NEXT I
45390     REM
45395     REM ****************************
45400     REM TEST THE SENSOR - SHOULD BE A ONE
45405     REM ****************************
45410     REM
45415               TEMP = INP( HSLIDE ) AND BIT2
45420               IF TEMP = 0 THEN 45490
45425     REM
```

```
45430    REM *****************************
45435    REM MOVE SLIDE TO THE HOME POSITION
45440    REM *****************************
45445    REM
45450            FOR I = 1 TO 600
45455            TEMP = INP( HSLIDE ) AND BIT2
45460            IF TEMP = 0 THEN 45495
45465            MSTEP = MSKPORT1 AND &HF
45470            GOSUB 45600       ' FIND THE NEXT MSTEP
45475            MSKPORT1 = ( MSKPORT1 AND &HF0 ) OR MSTEP
45480            OUT PORT1,MSKPORT1
45485            NEXT I
45490            PRINT "ERROR - SLIDE MOTOR1 "
45495            STEPCTR = 0
45500            LOCATE 20,40,0 : PRINT "STEP COUNTER = ";STEPCTR
45505            GOTO 45175
45510    REM
45515    REM ********************************
45520    REM THIS INTERNAL SUBROUTINE MOVES THE SLIDE AWAY FROM HOME
45525    REM ********************************
45530    REM
45535            IF MSTEP = 10 THEN 45540 ELSE 45545
45540            MSTEP = 9 : GOTO 45570
45545            IF MSTEP = 9 THEN 45550 ELSE 45555
45550            MSTEP = 5 : GOTO 45570
45555            IF MSTEP = 5 THEN 45560 ELSE 45565
45560            MSTEP = 6 : GOTO 45570
45565            MSTEP = 10
45570            RETURN
45575    REM
45580    REM ********************************
45585    REM THIS INTERNAL SUBROUTINE MOVES THE SLIDE TOWARDS HOME
45590    REM ********************************
45595    REM
45600            IF MSTEP = 6 THEN 45605 ELSE 45610
45605            MSTEP = 5 : GOTO 45635
45610            IF MSTEP = 5 THEN 45615 ELSE 45620
45615            MSTEP = 9 : GOTO 45635
45620            IF MSTEP = 9 THEN 45625 ELSE 45630
45625            MSTEP = 10 : GOTO 45635
45630            MSTEP = 6
45635            RETURN
45640            END
                                       UPSU46V0.BAS

46000    REM ******************* UPSU46V0.BAS *************************
46002    REM
46004    REM ************************************************************
46006    REM THIS PROGRAM IS USED TO GENERATE SEQUENCE DATA FILES
46008    REM ************************************************************
46010    REM
46012    REM ********************************
46014    REM INITIALIZATION CODE
46016    REM ********************************
46018    REM
46020    REM
46022    REM ********************************
46024    REM DISPLAY THE MAIN MENU OPTIONS
46026    REM ********************************
46028    REM
46030            CLS : LOCATE 8,1
46032            PRINT "           MAIN MENU OPTIONS"
46034            GOSUB 46086
46036            A$ = INKEY$ : IF A$ = "" THEN 46036
46038            TEMP = LEN(A$) : IF TEMP = 2 GOTO 46044
46040            TEMP = ASC(A$) : IF TEMP = 13 GOTO 46084 ' EXIT PROGRAM
46042            BEEP : GOTO 46036
46044            A$ = RIGHT$(A$,1)
46046            IF A$ = "P" THEN 46052
46048            IF A$ = "H" THEN 46068
```

```
46050           BEEP : GOTO 46036
46052           GOSUB 46096
46054           A$ = INKEY$ : IF A$ = "" THEN 46054
46056           TEMP = LEN(A$) : IF TEMP = 2 GOTO 46060
46058           TEMP = ASC(A$) : IF TEMP = 13 GOTO 46128 ' SENSOR CONTROL
46060           A$ = RIGHT$(A$,1)
46062           IF A$ = "P" THEN 46068
46064           IF A$ = "H" THEN 46034
46066           BEEP : GOTO 46054
46068           GOSUB 46106
46070           A$ = INKEY$ : IF A$ = "" THEN 46070
46072           TEMP = LEN(A$) : IF TEMP = 2 THEN 46076
46074           TEMP = ASC(A$) : IF TEMP = 13 THEN 46224 ' COMPUTER CONTROL
46076           A$ = RIGHT$(A$,1)
46078           IF A$ = "P" THEN 46034
46080           IF A$ = "H" THEN 46052
46082           BEEP : GOTO 46070
46084           RETURN      ' EXIT THE PROGRAM
46086           LOCATE 12,1
46088           PRINT"         [X]         EXIT THIS PROGRAM
46090           PRINT"         [ ]         SENSOR CONTROLLED LASER POWER
46092           PRINT"         [ ]         COMPUTER CONTROLLED LASER POWER
46094           RETURN
46096           LOCATE 12,1
46098           PRINT"         [ ]         EXIT THIS PROGRAM
46100           PRINT"         [X]         SENSOR CONTROLLED LASER POWER
46102           PRINT"         [ ]         COMPUTER CONTROLLED LASER POWER
46104           RETURN
46106           LOCATE 12,1
46108           PRINT"         [ ]         EXIT THIS PROGRAM
46110           PRINT"         [ ]         SENSOR CONTROLLED LASER POWER
46112           PRINT"         [X]         COMPUTER CONTROLLED LASER POWER
46114           RETURN
46116   REM
46118   REM
46120   REM ********************************
46122   REM DISPLAY THE SENSOR CONTROLLED OPTIONS
46124   REM ********************************
46126   REM
46128           CLS : LOCATE 8,1
46130           PRINT "          SENSOR CONTROLLED DATA FILES "
46132           GOSUB 46182
46134           A$ = INKEY$ : IF A$ = "" THEN 46134
46136           TEMP = LEN(A$) : IF TEMP = 2 GOTO 46142
46138           TEMP = ASC(A$) : IF TEMP = 13 GOTO 46030 ' RETURN TO MAIN MENU
46140           BEEP : GOTO 46134
46142           A$ = RIGHT$(A$,1)
46144           IF A$ = "P" THEN 46150
46146           IF A$ = "H" THEN 46166
46148           BEEP : GOTO 46134
46150           GOSUB 46192
46152           A$ = INKEY$ : IF A$ = "" THEN 46152
46154           TEMP = LEN(A$) : IF TEMP = 2 GOTO 46158
46156           TEMP = ASC(A$) : IF TEMP = 13 GOTO 46328 ' GENERATE A SEQUENCE
46158           A$ = RIGHT$(A$,1)
46160           IF A$ = "P" THEN 46166
46162           IF A$ = "H" THEN 46132
46164           BEEP : GOTO 46152
46166           GOSUB 46202
46168           A$ = INKEY$ : IF A$ = "" THEN 46168
46170           TEMP = LEN(A$) : IF TEMP = 2 THEN 46174
46172           TEMP = ASC(A$) : IF TEMP = 13 THEN 46488 ' DISPLAY A SEQUENCE
46174           A$ = RIGHT$(A$,1)
46176           IF A$ = "P" THEN 46132
46178           IF A$ = "H" THEN 46150
46180           BEEP : GOTO 46168
46182           LOCATE 12,1
46184           PRINT"         [X]         RETURN TO MAIN MENU
46186           PRINT"         [ ]         GENERATE A SEQUENCE
46188           PRINT"         [ ]         DISPLAY A SEQUENCE
```

```
46190           RETURN
46192           LOCATE 12,1
46194           PRINT"            [ ]         RETURN TO MAIN MENU
46196           PRINT"            [X]         GENERATE A SEQUENCE
46198           PRINT"            [ ]         DISPLAY A SEQUENCE
46200           RETURN
46202           LOCATE 12,1
46204           PRINT"            [ ]         RETURN TO MAIN MENU
46206           PRINT"            [ ]         GENERATE A SEQUENCE
46208           PRINT"            [X]         DISPLAY A SEQUENCE
46210           RETURN
46212    REM
46214    REM
46216    REM ********************************
46218    REM DISPLAY THE COMPUTER CONTROLLED OPTIONS
46220    REM ********************************
46222    REM
46224           CLS : LOCATE 8,1
46226           PRINT "            COMPUTER CONTROLLED DATA FILES"
46228           GOSUB 46278
46230           A$ = INKEY$ : IF A$ = "" THEN 46230
46232           TEMP = LEN(A$) : IF TEMP = 2 GOTO 46238
46234           TEMP = ASC(A$) : IF TEMP = 13 GOTO 46030 ' RETURN TO MAIN MENU
46236           BEEP : GOTO 46230
46238           A$ = RIGHT$(A$,1)
46240           IF A$ = "P" THEN 46246
46242           IF A$ = "H" THEN 46262
46244           BEEP : GOTO 46230
46246           GOSUB 46298
46248           A$ = INKEY$ : IF A$ = "" THEN 46248
46250           TEMP = LEN(A$) : IF TEMP = 2 GOTO 46254
46252           TEMP = ASC(A$) : IF TEMP = 13 GOTO 46530 ' GENERATE A SEQUENCE
46254           A$ = RIGHT$(A$,1)
46256           IF A$ = "P" THEN 46262
46258           IF A$ = "H" THEN 46228
46260           BEEP : GOTO 46248
46262           GOSUB 46298
46264           A$ = INKEY$ : IF A$ = "" THEN 46264
46266           TEMP = LEN(A$) : IF TEMP = 2 THEN 46270
46268           TEMP = ASC(A$) : IF TEMP = 13 THEN 46696 ' DISPLAY A SEQUENCE
46270           A$ = RIGHT$(A$,1)
46272           IF A$ = "P" THEN 46228
46274           IF A$ = "H" THEN 46246
46276           BEEP : GOTO 46264
46278           LOCATE 12,1
46280           PRINT"            [X]         RETURN TO MAIN MENU
46282           PRINT"            [ ]         GENERATE A SEQUENCE
46284           PRINT"            [ ]         DISPLAY A SEQUENCE
46286           RETURN
46288           LOCATE 12,1
46290           PRINT"            [ ]         RETURN TO MAIN MENU
46292           PRINT"            [X]         GENERATE A SEQUENCE
46294           PRINT"            [ ]         DISPLAY A SEQUENCE
46296           RETURN
46298           LOCATE 12,1
46300           PRINT"            [ ]         RETURN TO MAIN MENU
46302           PRINT"            [ ]         GENERATE A SEQUENCE
46304           PRINT"            [X]         DISPLAY A SEQUENCE
46306           RETURN
46308    REM
46310    REM
46312    REM ********************************
46314    REM GENERATE A SENSOR CONTROLLED DATA FILE
46316    REM ********************************
46318    REM
46320    REM ********************************
46322    REM ENTER THE SEQUENCE NUMBER
46324    REM ********************************
46326    REM
46328           CLS : INPUT " ENTER THE SEQUENCE NUMBER ==> ",SEQNUM$
```

```
46330   REM
46332   REM *****************************
46334   REM ENTER THE NUMBER OF SHOTS
46336   REM *****************************
46338   REM
46340           CLS
46342           INPUT " ENTER THE NUMBER OF SHOTS ==> ",NUMSHOTS
46344   REM
46346   REM *****************************
46348   REM ENTER MAXIMUM BELT SPEED FOR THIS SEQUENCE
46350   REM *****************************
46352   REM
46354           CLS
46356           INPUT " ENTER MAXIMUM BELT SPEED ( FT PER MIN ) ==> ",MAXSPEED
46358   REM
46360   REM *****************************
46362   REM ENTER THE BEST GUESS INCREMENTS
46364   REM *****************************
46366   REM
46368           CLS
46370           FOR I = 1 TO NUMSHOTS
46372           PRINT" ENTER A BEST GUESS MODIFIER " : PRINT
46373           PRINT" ( + FOR MORE POWER, - FOR LESS POWER )" : PRINT
46374           INPUT" BEST GUESS MODIFIER ==> ",BGINC%(I)
46376           CLS : NEXT I
46378   REM
46380   REM *****************************
46382   REM ENTER THE SPACINGS IN INCHES
46384   REM *****************************
46386   REM
46388           BEEP
46390           FOR I = 1 TO NUMSHOTS
46392           CLS
46394           INPUT " ENTER A SPACING ( IN INCHES ) ==> ",SPACING(I)
46396           NEXT I
46398           BEEP
46400   REM
46402   REM *****************************
46404   REM DISPLAY THE DATA - IS IT CORRECT ?
46406   REM *****************************
46408   REM
46410           CLS : PRINT " NUMBER OF SHOTS = ",NUMSHOTS : PRINT
46412           PRINT : PRINT " MAXIMUM BELT SPEED ( FT PER MIN ) ==>"MAXSPEED
46414           PRINT : PRINT
46416           PRINT " BEST GUESS INCREMENTS"
46418           PRINT
46420           FOR I = 1 TO NUMSHOTS
46422           PRINT BGINC%(I),
46424           NEXT I
46426           PRINT : PRINT
46428           PRINT " SPACINGS "
46430           PRINT
46432           FOR I = 1 TO NUMSHOTS
46434           PRINT SPACING(I),
46436           NEXT I
46438           PRINT : PRINT : PRINT
46440           INPUT " IS THIS DATA CORRECT ? [Y/N] ",A$
46442           IF A$ = "Y" OR A$ = "y" THEN 46458
46444           IF A$ = "N" OR A$ ="n" THEN 46340
46446           GOTO 46128
46448   REM
46450   REM *****************************
46452   REM WRITE THE DATA TO DISK
46454   REM *****************************
46456   REM
46458           OPEN "GCDATA" + SEQNUM$ FOR OUTPUT AS #1
46460           WRITE #1,NUMSHOTS,MAXSPEED
46462           FOR I = 1 TO NUMSHOTS
46464           WRITE #1,BGINC%(I)
46466           NEXT I
```

```
46468           FOR I = 1 TO NUMSHOTS
46470           WRITE #1,SPACING(I)
46472           NEXT I
46474           CLOSE #1
46476           GOTO 46128        ' RETURN TO SENSOR MENU
46478   REM
46480   REM *******************************
46482   REM DISPLAY THE DATA FROM A FILE
46484   REM *******************************
46486   REM
46488           CLS : INPUT " ENTER THE SEQUENCE NUMBER ==> ",SEQNUM$
46490           OPEN "SCDATA" + SEQNUM$ FOR INPUT AS #1
46492           INPUT #1,NUMSHOTS,MAXSPEED
46494           FOR I = 1 TO NUMSHOTS
46496           INPUT #1,BGINC%(I)
46498           NEXT I
46500           FOR I = 1 TO NUMSHOTS
46502           INPUT #1,SPACING(I)
46504           NEXT I
46506           CLOSE #1
46508           GOTO 46410        ' IS THE DATA CORRECT ?
46510   REM
46512   REM
46514   REM *******************************
46516   REM GENERATE A COMPUTER CONTROLLED DATA FILE
46518   REM *******************************
46520   REM
46522   REM *******************************
46524   REM ENTER THE SEQUENCE NUMBER
46526   REM *******************************
46528   REM
46530           CLS : INPUT " ENTER THE SEQUENCE NUMBER ==> ",SEQNUM$
46532   REM
46534   REM *******************************
46536   REM ENTER THE NUMBER OF SHOTS
46538   REM *******************************
46540   REM
46542           CLS
46544           INPUT " ENTER TNE NUMBER OF SHOTS ==> ",NUMSHOTS
46546   REM
46548   REM *******************************
46550   REM ENTER THE MAXIMUM BELT SPEED
46552   REM *******************************
46554   REM
46556           CLS
46558           INPUT " ENTER MAXIMUM BELT SPEED ( FT PER MIN ) == ",MAXSPEED
46560   REM
46562   REM *******************************
46564   REM ENTER THE POWER NUMBER ( 1 THRU 8 )
46566   REM *******************************
46567   REM
46568           CLS
46570           FOR I = 1 TO NUMSHOTS
46572           CLS : PRINT " ENTER A POWER SETTING ( 1 TO 8 )" : PRINT
46573           PRINT " ( 1 = MINIMUM POWER, 8 = MAXIMUM POWER )" : PRINT
46574           INPUT" POWER SETTING ==> ",SETTING%(I)
46575           NEXT I
46576   REM
46578   REM *******************************
46580   REM ENTER THE SPACINGS IN INCHES
46582   REM *******************************
46584   REM
46586           BEEP
46588           FOR I = 1 TO NUMSHOTS
46590           CLS
46592           INPUT " ENTER A SPACING ( IN INCHES ) ==> ",SPACING(I)
46594           NEXT I
46596           BEEP
46598   REM
46600   REM *******************************
```

```
46602   REM DISPLAY THE DATA - IS IT CORRECT ?
46604   REM ******************************
46606   REM
46608          CLS
46610          PRINT " SEQUENCE NUMBER = ";SEQNUM$
46612          PRINT : PRINT
46614          PRINT " NUMBER OF SHOTS = ";NUMSHOTS
46616          PRINT
46618          PRINT
46620          PRINT " MAXIMUM BELT SPEED ( FT PER MIN ) ==> ";MAXSPEED
46622          PRINT : PRINT
46624          PRINT " POWER SETTING"
46626          PRINT
46628          FOR I = 1 TO NUMSHOTS
46630          PRINT SETTING%(I),
46632          NEXT I
46634          PRINT : PRINT
46636          PRINT " SPACINGS "
46638          PRINT
46640          FOR I = 1 TO NUMSHOTS
46642          PRINT SPACING(I),
46644          NEXT I
46646          PRINT : PRINT : PRINT
46648          INPUT " IS THIS DATA CORRECT ? [Y/N] ",A$
46650          IF A$ = "Y" OR A$ = "y" THEN 46666
46652          IF A$ = "N" OR A$ = "n" THEN 46542
46654          GOTO 46648
46656   REM
46658   REM ***********************************
46660   REM WRITE THE DATA TO DISK
46662   REM ***********************************
46664   REM
46666          OPEN "CCDATA" + SEQNUM$ FOR OUTPUT AS #1
46668          WRITE #1,NUMSHOTS,MAXSPEED
46670          FOR I = 1 TO NUMSHOTS
46672          WRITE #1,SETTING%(I)
46674          NEXT I
46676          FOR I = 1 TO NUMSHOTS
46678          WRITE #1,SPACING(I)
46680          NEXT I
46682          CLOSE #1
46684          GOTO 46224           ' RETURN TO COMPUTER MENU
46686   REM
46688   REM ***********************************
46690   REM DISPLAY THE DATA FROM A FILE
46692   REM ***********************************
46694   REM
46696          CLS : INPUT " ENTER THE SEQUENCE NUMBER ==> ",SEQNUM$
46698          OPEN "CCDATA" + SEQNUM$ FOR INPUT AS #1
46700          INPUT #1,NUMSHOTS,MAXSPEED
46702          FOR I = 1 TO NUMSHOTS
46704          INPUT #1,SETTING%(I)
46706          NEXT I
46708          FOR I = 1 TO NUMSHOTS
46710          INPUT #1,SPACING(I)
46712          NEXT I
46714          CLOSE #1
46716          GOTO 46608           ' IS THE DATA CORRECT ?
46718   REM
                                    UPSU46V0.BAS

48000   REM ****************** UPSU48V0.BAS ***************************
48005   REM
48010   REM ***********************************************************
48015   REM THIS SUBROUTINE CALCULATES THE CONVEYOR BELT SPEED IN
48020   REM TERMS OF COUNTS PER INCH ( WHERE ONE COUNT = 1.16 MILLI-SECONDS )
48025   REM ***********************************************************
48030   REM
48035   REM ***********************************
48040   REM INITIALIZATION CODE
```

```
48045    REM ***********************************
48050    REM
48055          PORT8 = &H308
48060          PORT12 = &H30C
48065          PORT14 = &H30E
48070          PORT15 = &H30F
48075          BIT5 = 32
48080          BIT6 = 64
48085          BIT7 = 128
48090          IPORT8 = &HFF
48095          IPORT12 = &HFF
48100          IPORT14 = &HFF
48105          IPORT15 = &HFF
48110    REM
48115    REM ***********************************
48120    REM PRINT MESSAGE
48125    REM ***********************************
48130    REM
48135          CLS : SCREEN 2 : LOCATE 10,20
48140          PRINT "         CONVEYOR BELT SPEED
48145          LOCATE 20,23
48150          PRINT " PRESS ANY KEY TO CONTINUE PROGRAM "
48155          LINE ( 100,105)-(540,125),1,B
48160    REM
48165    REM ***********************************
48170    REM INITIALIZE TIMER 0 FOR MODE 0
48175    REM ***********************************
48180    REM
48185          IPORT12 = IPORT12 OR ( BIT6 OR BIT7 )
48190          OUT PORT12,IPORT12     ' SET A0 AND A1 TO ONES
48195          OUT PORT15,&H30 ' MODE 0
48200          IPORT12 = IPORT12 AND NOT ( BIT6 OR BIT7 )
48205          OUT PORT12,IPORT12     ' SET A0 AND A1 TO ZEROS
48210    REM
48215    REM ***********************************
48220    REM INHIBIT THE TIMER USING GATE 0
48225    REM ***********************************
48230    REM
48235          IPORT12 = IPORT12 AND NOT BIT5
48240          OUT PORT12,IPORT12
48245    REM
48250    REM ***********************************
48255    REM LOAD ONES INTO TIMER 0
48260    REM ***********************************
48265    REM
48270          OUT PORT15,&HFF
48275          OUT PORT15,&HFF
48280    REM
48285    REM ***********************************
48290    REM WAIT FOR BELT CLOCK TO GO LOW AND THEN HIGH
48295    REM ***********************************
48300    REM
48302          A$ = INKEY$ : IF A$ = "" THEN 48305 ELSE 48620
48305          TEMP = INP( PORT8 )
48310          TEMP = TEMP AND BIT7
48315          IF TEMP > 1 THEN 48302
48317          A$ = INKEY$ : IF A$ = "" THEN 48320 ELSE 48620
48320          TEMP = INP( PORT8 )
48325          TEMP = TEMP AND BIT7
48330          IF TEMP = 0 THEN 48317
48335    REM
48340    REM ***********************************
48345    REM ENABLE THE TIMER USING GATE 0
48350    REM ***********************************
48355    REM
48360          IPORT12 = IPORT12 OR BIT5
48365          OUT PORT12,IPORT12
48370    REM
48375    REM ***********************************
48380    REM WAIT FOR BELT CLOCK TO GO LOW AND THEN HIGH AGAIN
```

```
48385   REM ******************************************
48390   REM
48392           A$ = INKEY$ : IF A$ = "" THEN 48395 ELSE 48620
48395           TEMP = INP( PORT8 )
48400           TEMP = TEMP AND BIT7
48405           IF TEMP > 0 THEN 48392
48407           A$ = INKEY$ : IF A$ = "" THEN 48410 ELSE 48620
48410           TEMP = INP( PORT8 )
48415           TEMP = TEMP AND BIT7
48420           IF TEMP = 0 THEN 48407
48425   REM
48430   REM ******************************************
48435   REM INHIBIT THE TIMER USING GATE 0
48440   REM ******************************************
48445   REM
48450           IPORT12 = IPORT12 AND NOT BIT5
48455           OUT PORT12, IPORT12
48460   REM
48465   REM ******************************************
48470   REM READ OUT THE COUNT - LSB FIRST
48475   REM ******************************************
48480   REM
48485           TEMPLO = INP( PORT14 )
48490           TEMPHI = INP( PORT14 )
48495           TEMPHI = TEMPHI * 256
48500           BELTCNT = TEMPHI + TEMPLO
48505           BELTCNT = 65535! - BELTCNT
48510   REM
48515   REM *******************************************8
48520   REM CALCULATE THE BELT SPEED IN COUNTS PER INCH
48525   REM ******************************************
48530   REM
48535           BELTSPED = BELTCNT/10.1
48540   REM
48545   REM ******************************************
48550   REM PRINT OUT BELT SPEED IN FEET PER MINMUTE
48555   REM ******************************************
48560   REM
48565           BSPEED = 1164/BELTSPED    ' GIVES INCHES PER SECOND
48570           BSPEED% = BSPEED * 5!     ' GIVES FEET PER MINUTE
48575           LOCATE 15,19
48580           PRINT "BELT SPEED ( FEET PER MINUTE ) = "BSPEED%
48585   REM
48590   REM ******************************************
48595   REM RETURN TO MAIN PROGRAM WHEN A KEY IS PRESSED
48600   REM ******************************************
48605   REM
48610           A$ = INKEY$
48615           IF A$ = "" THEN 48235
48620           CLS : SCREEN 0 : LOCATE 1,1,0 : RETURN
                                UPSU49V0.BAS

49000   REM ******************* TUSU49V0.BAS ******************************
49005   REM
49010   REM ******************************************************************
49015   REM THIS PROGRAM DISPLAYS THE WHEEL SPEED
49020   REM ******************************************************************
49025   REM
49030   REM *******************************
49035   REM INITIALIZATION CODE
49040   REM *******************************
49045   REM
49050           PORT8  = &H308
49055           PORT9  = &H309
49060           PORT10 = &H30A
49065           PORT11 = &H30B
49070           PORT12 = &H30C
49075           PORT13 = &H30D
49080           PORT14 = &H30E
49085           PORT15 = &H30F
```

```
49090           BIT0 = 1
49095           BIT1 = 2
49100           BIT2 = 4
49105           BIT3 = 8
49110           BIT4 = 16
49115           BIT5 = 32
49120           BIT6 = 64
49125           BIT7 = 128
49130   REM
49135   REM ******************************
49140   REM SEND OUT A LASER OFF PULSE
49145   REM ******************************
49150   REM
49155           IPORT11 = &HFF
49160           OUT PORT11,IPORT11
49165           IPORT11 = IPORT11 AND NOT BIT1
49170           OUT PORT11,IPORT11
49175           IPORT11 = IPORT11 OR BIT1
49180           OUT PORT11,IPORT11
49185   REM
49190   REM ******************************
49195   REM INITIALIZE TIMER 0 FOR MODE 0
49200   REM ******************************
49205   REM
49210           IPORT12 = &HFF
49215           OUT PORT12,IPORT12
49220           OUT PORT15,&H30         ' MODE 0
49225           IPORT12 = IPORT12 AND NOT ( BIT6 OR BIT7 )
49230           OUT PORT12,IPORT12
49235   REM
49240   REM ******************************
49245   REM SET TGATE 0 TO ONE
49250   REM ******************************
49255   REM
49260           CLS
49265           IPORT12 = IPORT12 OR BIT5
49270           OUT PORT12,IPORT12
49275   REM
49280   REM ******************************
49285   REM LOAD COUNT INTO TIMER 0
49290   REM ******************************
49295   REM
49300           OUT PORT15,50
49305           OUT PORT15,0
49310   REM
49315   REM ******************************
49320   REM LOAD IN WHEEL POSTION 0
49325   REM ******************************
49330   REM
49335           IPORT11 = IPORT11 AND NOT ( BIT5 OR BIT6 OR BIT7 )
49340           OUT PORT11,IPORT11
49345   REM
49350   REM ******************************
49355   REM ENABLE THE FIRE FLIP-FLOP
49360   REM ******************************
49365   REM
49370           IPORT11 = IPORT11 AND NOT BIT3
49375           OUT PORT11,IPORT11
49380           IPORT11 = IPORT11 OR BIT3
49385           OUT PORT11,IPORT11
49390   REM
49395   REM ******************************
49400   REM WAIT FOR FIRE FLIP-FLOP TO GET CLEARED OR TIME OUT
49405   REM ******************************
49410   REM
49415           TEMP% = INP( PORT8 )
49420           TEMP% = TEMP% AND BIT5
49421           IF TEMP% > 0 THEN 49435
49425           TEMP% = INP( PORT9 )
49426           TEMP% = TEMP% AND BIT2
```

```
49427           IF TEMP% > 0 THEN 49415
49428           LOCATE 12,20
49429           PRINT " FAILURE - WHEEL SPEED TOO LOW" : GOTO 49625
49430   REM
49431   REM *********************************
49432   REM RELOAD COUNTER TO MAX COUNT
49433   REM *********************************
49434   REM
49435           OUT PORT15,&HFF
49436           OUT PORT15,&HFF
49437   REM
49438   REM *************************************
49440   REM SET TGATE 0 HIGH AND RE-ENABLE THE FIRE-FLOP
49445   REM *************************************
49450   REM
49455           IPORT12 = IPORT12 OR BIT5
49460           OUT PORT12,IPORT12
49465           IPORT11 = IPORT11 AND NOT BIT3
49470           OUT PORT11,IPORT11
49475           IPORT11 = IPORT11 OR BIT3
49480           OUT PORT11,IPORT11
49485   REM
49490   REM ***************************************
49495   REM WAIT FOR FIRE FLIP-FLOP TO GET CLEARED AGAIN
49500   REM ***************************************
49505   REM
49510           TEMP% = INP( PORT8 )
49515           TEMP% = TEMP% AND BIT5
49520           IF TEMP% = 0 THEN 49510
49525   REM
49530   REM ***************************************
49535   REM SET TGATE 0 LOW
49540   REM ***************************************
49545   REM
49550           IPORT12 = IPORT12 AND NOT BIT5
49555           OUT PORT12,IPORT12
49560   REM
49565   REM *****************************************
49570   REM FETCH THE TIME FROM TIMER 0 AND COMPUTE THE RPM
49575   REM *****************************************
49580   REM
49585           TEMPLO = INP( PORT14 )
49590           TEMPHI = INP( PORT14 )
49595           TEMP = TEMPLO + ( TEMPHI * 256! )
49600           TEMP = 65535! - TEMP
49605           REVTIM = TEMP * .000859
49610           RPM% = 60! / REVTIM
49615           LOCATE 12,20
49620           PRINT " WHEEL SPEED ( RPM ) ==> "RPM%
49625           LOCATE 14,20
49630           PRINT " PRESS ANY KEY TO CONTINUE "
49635   REM
49640   REM ***************************
49645   REM WAIT FOR A KEY TO BE PRESSED
49650   REM ***************************
49655   REM
49660           A$ = INKEY$ : IF A$ = "" THEN 49265
49665           RETURN
                                UPSU50V0.BAS

50000   REM ******************** UPSU50V0.BAS ********************
50010   REM
50020   REM ************************************************************
50030   REM THIS UTILITY PROGRAM DISPLAYS THE BEST GUESS VALUE
50040   REM ************************************************************
50050   REM
50060   REM *********************************
50070   REM INITIALIZATION STATEMENTS
50080   REM *********************************
50090   REM
```

```
50100           PORT9 = &H309
50110           PORT13 = &H30D
50120           BIT0 = 1
50130           BIT1 = 2
50140           BIT2 = 4
50150           BIT3 = 8
50160           BIT4 = 16
50170           BIT5 = 32
50180           BIT6 = 64
50190           BIT7 = 128
50191           CLS
50200   REM
50210   REM ********************************
50220   REM READ IN THE DAC VALUE AND LOAD 1.5 TIMES THE VALUE IN THE DAC
50230   REM ********************************
50240   REM
50250           OPEN "CBCALDV0.BAS" FOR INPUT AS #1
50260           INPUT #1,DAC%
50270           CLOSE #1
50280           DAC% = (DAC% * 30)\20         ' MULT. BY 1.5
50290           IF DAC < 255 THEN 50310
50300           DAC% = 255
50310           OUT PORT13,DAC%
50320   REM
50330   REM ********************************
50340   REM READ IN THE BEST GUESS INFORMATION
50350   REM ********************************
50360   REM
50370           BGUESS% = INP( PORT9 )
50380           BGUESS% = BGUESS% AND ( BIT3 OR BIT4 OR BIT5 )
50390           BGUESS% = ( BGUESS% ) \ 8     ' RIGHT SHIFT 3 PLACES
50395           BGUESS% = 8 - BGUESS%         ' REMAP THE VALUE
50410           LOCATE 12,30
50420           PRINT "BEST GUESS = "BGUESS%
50430           LOCATE 14,20
50440           PRINT "PRESS ANY KEY TO EXIT THIS PROGRAM"
50450           A$ = INKEY$ : IF A$ = "" THEN 50370
50460           CLS : RETURN
                              UPSU52V0.BAS

52000   REM ******************** UPSU52V0.BAS ********************
52010   REM
52020   REM ****************************************************
52030   REM THIS PROGRAM IS USED TO CALIBRATE THE REFLECTIVE SENSOR
52040   REM ****************************************************
52050   REM
52060           PORT9 = &H309
52070           PORT13 = &H30D
52080           BIT7 = 128
52090           CLS : LOCATE 10,1,0
52100           PRINT"       PLACE A WHITE PIECE OF PAPER OVER THE MARK POINT"
52110           PRINT
52120           PRINT"       THEN HIT ANY KEY TO START THE CALIBRATION PROCESS"
52130           A$ = INKEY$    : IF A$ = "" THEN 52130
52140           DAC% = 255
52150           OUT PORT13,DAC%
52160           FOR I = 0 TO 254
52170           COMP% = INP( PORT9 )
52180           COMP% = COMP% AND BIT7
52190           IF COMP% > 0 THEN 52250
52200           DAC% = DAC% - 1
52210           OUT PORT13,DAC%
52220           NEXT I
52230           PRINT "      OVERFLOW ERROR "
52240           GOTO 52300
52250           OPEN "CBCALDV0.BAS" FOR OUTPUT AS #1
52260           WRITE #1 ,DAC%
52270           CLOSE #1
52280           PRINT : PRINT
52290           PRINT "       CALIBRATION HAS BEEN COMPLETED. SENSOR = "DAC%
```

```
52300          PRINT
52310          PRINT "          PRESS ANY KEY TO EXIT THIS PROGRAM"
52320          A$ = INKEY$ : IF A$ = "" THEN 52320
52330          RETURN
```

What is claimed is:

1. A system for placing a microscopically visible pattern on an object, said object having a reflectivity, said system comprising:
- means for generating a beam of coherent electromagnetic radiation of a desired wavelength, said beam having an intensity and a cross-sectional area;
- means for adjusting said beam intensity;
- mask means for imposing said pattern on said beam;
- means for transporting said object past said generating means;
- means for measuring the reflectivity of said object; and
- means for causing said adjusting means to adjust said beam intensity responsive to said reflectivity measurement, such that said beam intensity is insufficient to produce on said object a pattern that is visible to an unaided eye but is sufficient to produce on said object a pattern that is visible with the aid of an optical magnifying device.

2. The system of claim 1 wherein said mask means comprises:
- a plate having an area greater than the cross-sectional area of said beam and having a plurality of openings therein for the passage of said beam, said plate being nontransmissive of coherent electromagnetic radiation of said wavelength between said openings;
- at least one means for selectively occluding said openings, said at least one occluding means being nontransmissive of coherent electromagnetic radiation of said wavelength; and
- means for moving said at least one occluding means.

3. The system of claim 2 wherein:
- said selective occluding means comprises a plurality of sliding members, each of said sliding members overlying a portion of said plate, thereby occluding a portion of said plurality of openings, each of said sliding members further having a single opening therein for alignment with one of said portion of said plurality of openings; and
- said moving means comprises a respective stepping motor associated with and mechanically coupled to a respective one of said plurality of sliding members.

4. The system of claim 1 wherein said beam intensity adjusting means comprises a plurality of media of varying transmissivities at said wavelength and means for selectively interposing one of said media in said beam.

5. The system of claim 4 wherein said interposing means comprises a rotating wheel, said media being angularly distributed about said wheel.

6. The system of claim 1 wherein said transporting means comprises a conveyor belt.

7. The system of claim 6 wherein said conveyor belt is a split belt comprising two parallel coplanar belt sections moving at identical speeds and having a space therebetween, said object being placed across said space and said beam being projected from beneath said belt through said space.

8. The system of claim 1 further comprising override means for manually causing said adjusting means to adjust said beam intensity to a desired value regardless of said reflectivity measurement.

9. The system of claim 1 further comprising control means for causing said beam generating means to generate said beam and for adjusting said mask means.

10. The system of claim 9 wherein said control means and said means for causing said adjusting means to adjust said beam intensity comprise a programmed electronic digital computer.

11. The system of claim 10 further comprising approach sensing means for detecting when said object is approaching said generating means and presence sensing means for detecting when said object is aligned with said generating means, said computer controlling the generation of said beam responsive to signals from said approach and presence sensing means.

12. The system of claim 3 further comprising control means for causing said beam generating means to generate said beam and for controlling said stepping motors.

13. The system of claim 12 wherein said control means and said means for causing said adjusting means to adjust said beam intensity comprise a programmed electronic digital computer.

14. The system of claim 13 further comprising approach sensing means for detecting when said object is approaching said generating means and presence sensing means for detecting when said object is aligned with said generating means, said computer controlling the generation of said beam responsive to signals from said approach and presence sensing means.

15. A system for placing a microscopically visible pattern on an object, said object having a reflectivity, said system comprising:
- means for generating a beam of coherent electromagnetic radiation of a desired wavelength, said beam having an intensity and a cross-sectional area;
- means for adjusting said beam intensity, said adjusting means comprising a rotating wheel having a plurality of media of varying transmissivities at said wavelength angularly distributed about said wheel for selectively interposing one of said media in said beam;
- mask means for imposing said pattern on said beam, said mask means comprising a plate having an area greater than the cross-sectional area of said beam and having a plurality of openings therein for the passage of said beam, said plate being nontransmissive of coherent electromagnetic radiation of said wavelength between said openings; a plurality of sliding members, each of said sliding members being nontransmissive of coherent electromagnetic radiation of said wavelength and overlying a portion of said plate, thereby occluding a portion of said plurality of openings, each of said sliding members further having a single opening for alignment with one of said portion of said plurality of openings; and a respective stepping motor associated with and mechanically coupled to each respective one of said plurality of sliding members for moving said sliding members and selectively occluding said openings;
- a conveyor belt for transporting said object past said generating means, said conveyor belt being a split belt comprising two parallel coplanar belt sections moving at identical speeds and having a space therebetween, said object being placed across said space and said beam being being projected from beneath said belt through said space;

approach sensing means for detecting when said object is approaching said generating means;

presence sensing means for detecting when said object is aligned with said generating means;

means for measuring the reflectivity of said object;

a programmed electronic digital computer for controlling said stepping motors to adjust said mask means, for controlling the generation of said beam responsive to signal from said approach and presence sensing means, and for rotating said rotating wheel to adjust said beam intensity such that said beam intensity is insufficient to produce on said object a pattern that is visible to an unaided eye but is sufficient to produce on said object a pattern that is visible with the aid of an optical magnifying device; and override means for manually causing said rotating wheel to adjust said beam intensity to a desired value regardless of said reflectivity measurement.

16. A method for placing a microscopically visible pattern on an object, said object having a reflectivity, said method comprising the steps of:

generating a beam of coherent electromagnetic radiation of a desired wavelength, said beam having an intensity and a cross-sectional area;

imposing said pattern on said beam;

transporting said object past said generating means;

measuring the reflectivity of said object; and adjusting said beam intensity responsive to said reflectivity measurement, such that said beam intensity is insufficient to produce on said object a pattern that is visible to an unaided eye but is sufficient to produce on said object a pattern that is visible with the aid of an optical magnifying device.

* * * * *